US007684332B2

(12) United States Patent
Ray et al.

(10) Patent No.: US 7,684,332 B2
(45) Date of Patent: *Mar. 23, 2010

(54) SYSTEM AND METHOD FOR ADJUSTING THE WINDOW SIZE OF A TCP PACKET THROUGH NETWORK ELEMENTS

(75) Inventors: Amar N. Ray, Shawnee, KS (US); Michael K. Bugenhagen, Olathe, KS (US); Robert J. Morrill, Overland Park, KS (US); Cadathur V. Chakravarthy, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 14 days.

This patent is subject to a terminal disclaimer.

(21) Appl. No.: 11/809,395

(22) Filed: May 31, 2007

(65) Prior Publication Data

US 2008/0049624 A1 Feb. 28, 2008

Related U.S. Application Data

(60) Provisional application No. 60/839,333, filed on Aug. 22, 2006, provisional application No. 60/897,543, filed on Jan. 26, 2007, provisional application No. 60/905,624, filed on Mar. 7, 2007, provisional application No. 60/922,246, filed on Apr. 5, 2007.

(51) Int. Cl.
H04L 12/26 (2006.01)

(52) U.S. Cl. .................. 370/235; 370/236; 370/252

(58) Field of Classification Search .................. 370/230, 370/231, 235, 236, 252
See application file for complete search history.

(56) References Cited

U.S. PATENT DOCUMENTS

| 5,479,447 | A | | 12/1995 | Chow et al. |
| 5,878,097 | A | * | 3/1999 | Hase et al. .................. 375/371 |
| 6,055,578 | A | * | 4/2000 | Williams et al. ............ 709/253 |
| 6,327,677 | B1 | | 12/2001 | Garg et al. |
| 6,370,114 | B1 | * | 4/2002 | Gullicksen et al. ......... 370/229 |
| 6,477,590 | B1 | * | 11/2002 | Habusha et al. ............... 710/29 |
| 6,549,946 | B1 | | 4/2003 | Fisher et al. |
| 6,646,987 | B1 | * | 11/2003 | Qaddoura .................... 370/231 |

(Continued)

OTHER PUBLICATIONS

Fujitsu: Ethernet Service OAM; Oveview, Applications, Deployment, and Issues; publication date: Mar. 2, 2006.*

(Continued)

*Primary Examiner*—Daniel J Ryman
*Assistant Examiner*—Jay P Patel
(74) *Attorney, Agent, or Firm*—Sonnenschein Nath & Rosenthal LLP

(57) ABSTRACT

A system for adjusting the window size of a TCP packet on a packet network including a sending network element in communication with a receiving network element for transmitting and receiving data packets between the sending network element and the receiving network element on the packet network, wherein at least one of the sending network element and the receiving network element is configured to determine network performance information of the packet network; concatenate the network performance information into the data packets; and adjust the window size of the TCP packet based on the network performance information. A method for adjusting the window size of a TCP packet on a packet network is also included.

16 Claims, 48 Drawing Sheets

U.S. PATENT DOCUMENTS

| | | | |
|---|---|---|---|
| 6,684,253 | B1 | 1/2004 | Whitaker et al. |
| 6,748,247 | B1 | 6/2004 | Ramakrishnan et al. |
| 6,785,259 | B2 | 8/2004 | Le et al. |
| 6,798,755 | B2 | 9/2004 | Lillie et al. |
| 6,798,786 | B1 | 9/2004 | Lo et al. |
| 6,868,094 | B1 | 3/2005 | Bordonaro et al. |
| 6,891,822 | B1 | 5/2005 | Gubbi et al. |
| 6,975,617 | B2 | 12/2005 | Walker et al. |
| 6,978,223 | B2 | 12/2005 | Milliken |
| 7,006,526 | B1 * | 2/2006 | Biederman ............... 370/466 |
| 7,061,856 | B2 * | 6/2006 | Banerjee .................. 370/216 |
| 7,184,401 | B2 * | 2/2007 | Foore et al. ............... 370/231 |
| 7,184,777 | B2 | 2/2007 | Diener et al. |
| 7,222,190 | B2 * | 5/2007 | Klinker et al. ............ 709/238 |
| 7,263,067 | B2 * | 8/2007 | Sreemanthula et al. ...... 370/236 |
| 7,283,474 | B1 * | 10/2007 | Bergenwall ............... 370/235 |
| 7,307,989 | B2 * | 12/2007 | Ofek et al. ............... 370/389 |
| 7,369,498 | B1 * | 5/2008 | Ma et al. ................. 370/235 |
| 2002/0093948 | A1 | 7/2002 | Dertz et al. |
| 2002/0107966 | A1 | 8/2002 | Baudot et al. |
| 2003/0005144 | A1 | 1/2003 | Engel et al. |
| 2003/0067877 | A1 | 4/2003 | Sivakumar et al. |
| 2003/0118029 | A1 | 6/2003 | Maher, III et al. |
| 2003/0142625 | A1 | 7/2003 | Wan et al. |
| 2003/0189900 | A1 | 10/2003 | Barany et al. |
| 2004/0160979 | A1 | 8/2004 | Pepin et al. |
| 2004/0258226 | A1 | 12/2004 | Host |
| 2005/0027870 | A1 | 2/2005 | Trebes, Jr. |
| 2005/0223097 | A1 | 10/2005 | Ramsayer et al. |
| 2006/0002370 | A1 | 1/2006 | Rabie et al. |
| 2006/0072555 | A1 | 4/2006 | St. Hilaire et al. |
| 2006/0109839 | A1 | 5/2006 | Hino et al. |
| 2007/0263535 | A1 | 11/2007 | Shabtay |
| 2007/0268817 | A1 * | 11/2007 | Smallegange et al. ....... 370/216 |
| 2008/0013531 | A1 | 1/2008 | Elliott et al. |
| 2008/0014908 | A1 | 1/2008 | Vasant |
| 2009/0201828 | A1 * | 8/2009 | Samuels et al. ............. 370/252 |

OTHER PUBLICATIONS

U.S. Non-Final Office Action Dated Jul. 9, 2008; U.S. Appl. No. 11/479,751, filed Jun. 30, 2006.

PCT International Search Report and Written Opinion for PCT/US07/15311, Date Mailed Apr. 21, 2008.

PCT International Search Report and Written Opinion for PCT/US07/15299, Date Mailed Feb. 6, 2008.

PCT International Search Report and Written Opinion for PCT/US07/15203, Date Mailed Feb. 5, 2008.

PCT International Search Report and Written Opinion for PCT/US07/15252, Date Mailed Mar. 21, 2008.

PCT International Search Report and Written Opinion for PCT/US07/81980, Date Mailed Mar. 11, 2008.

ITU-T Newslog, Operators Given Performance Management for Ethernet with New Standard, [Retrieved from ITU-T Newslog, <URL:http://www.itu.int/ITU-T/newslog/default, date, 2006-02-08, aspx>] Feb. 6, 2006.

PCT International Search Report and Written Opinion for PCT/US07/81971, Date Mailed Mar. 11, 2008.

PCT International Search Report and Written Opinion for PCT/US07/18549, Date Mailed May 8, 2008.

* cited by examiner

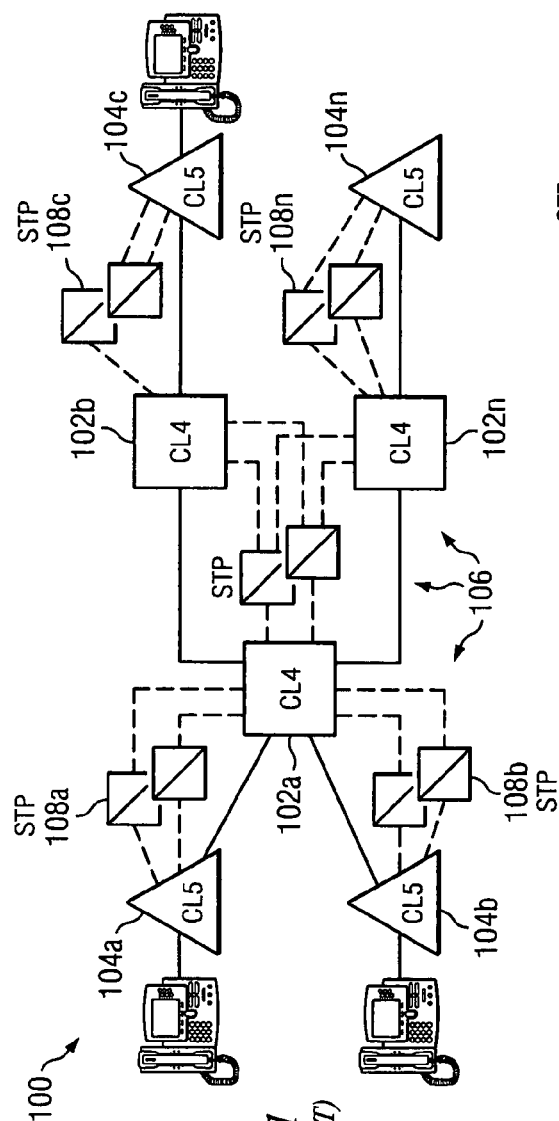
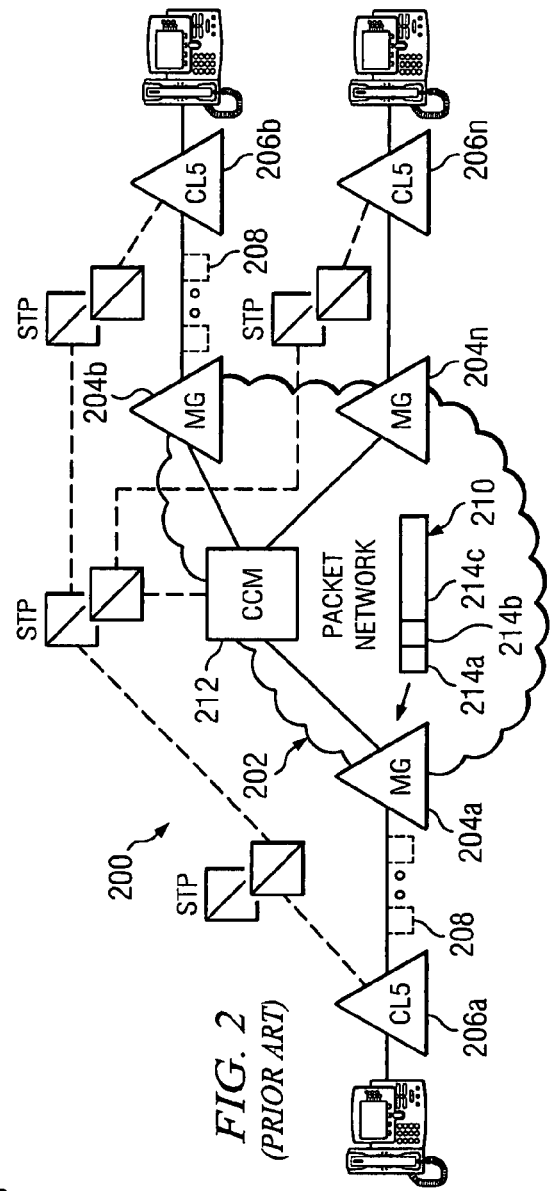
FIG. 1
(PRIOR ART)
FIG. 2
(PRIOR ART)

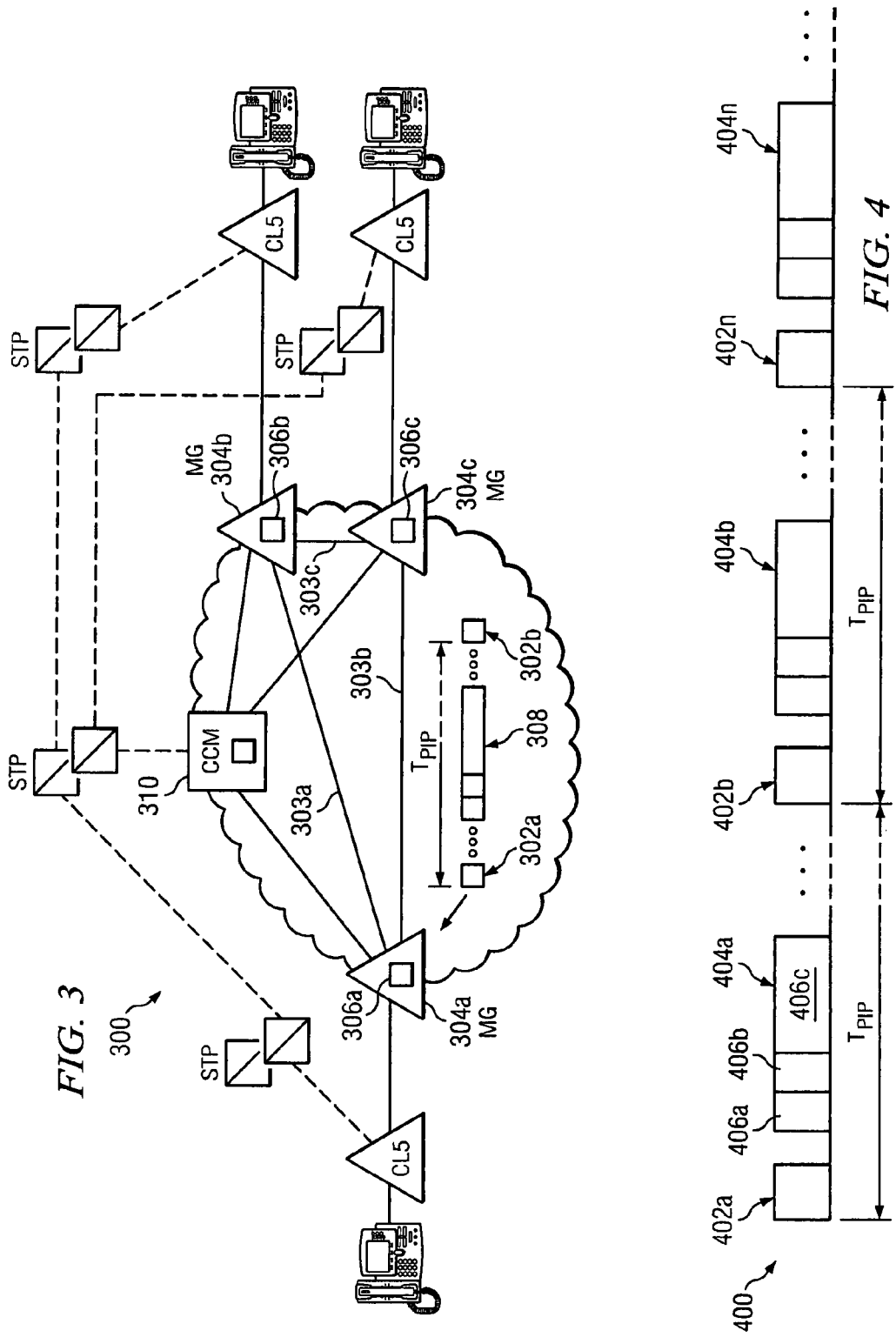

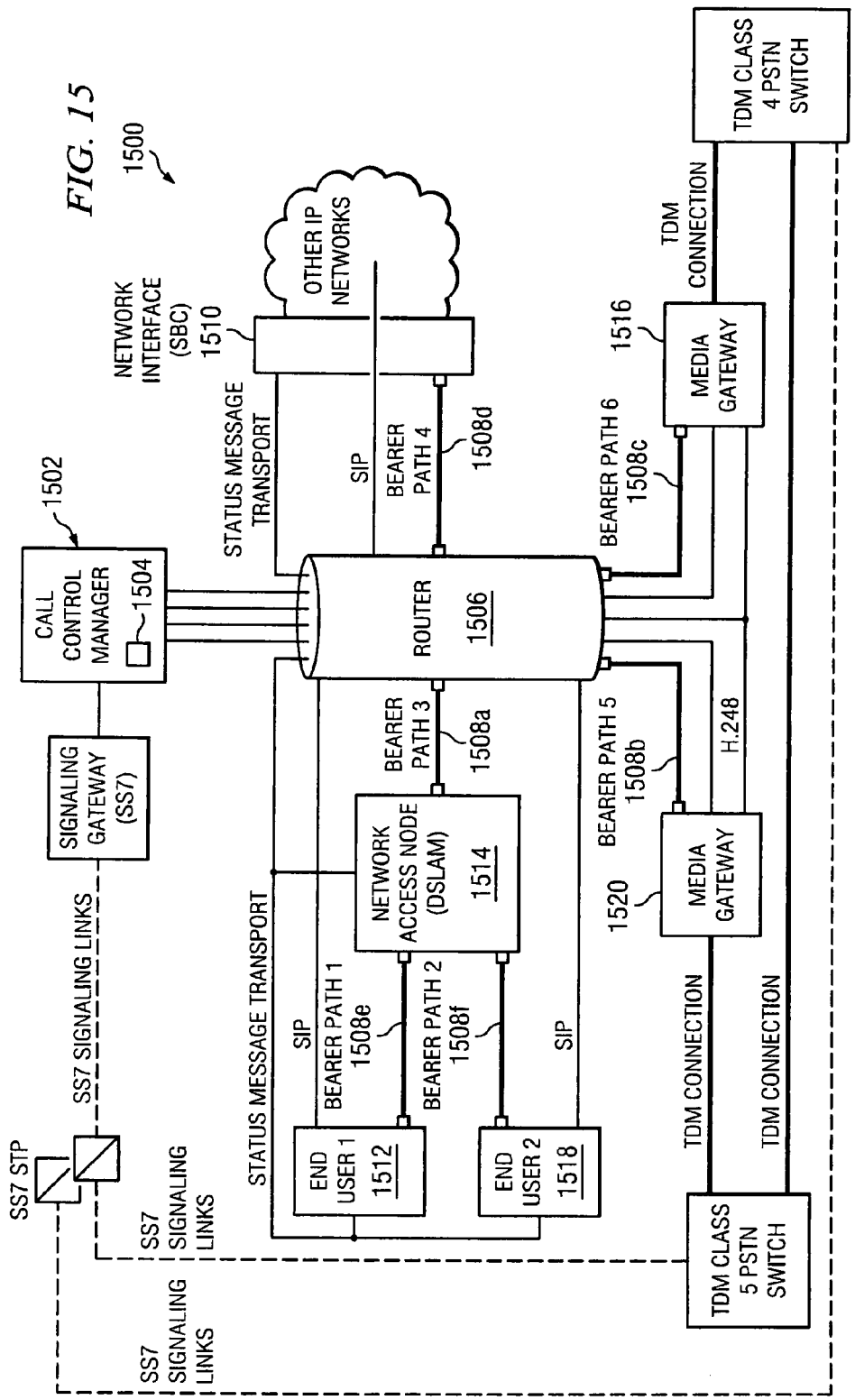

| ENTITY ID | 17b2 | SEGMENT ID | 17b4 | NPI IDS | 17b6 |
|---|---|---|---|---|---|
| SUBSCRIBER 1 | 17b8 | 1 | 17b12 | B/W; PL; J, L | 17b14 |
| | | 2 | | B/W | |
| SUBSCRIBER | 17b10 | z | | PL; J, L | |
| | | y | | PL; J, L | |
| NETWORK OPERATOR 1 | | 5 | | FULL | 17b16 |
| | | NNI | 17b22 | B/W; RT B/W | 17b18 |
| NETWORK OPERATOR 1 | | NETWORK A | 17b24 | FULL | |
| | | NETWORK B | | B/W | |
| VPN PROVIDER 1 | | PATH X | 17b26 | FULL | |
| | | PATH Y | | PL; J; L | |
| VPN PROVIDER | | CPE PATHS | 17b28 | FULL RT | 17b20 |
| | | CPE LINES | 17b30 | FULL | |

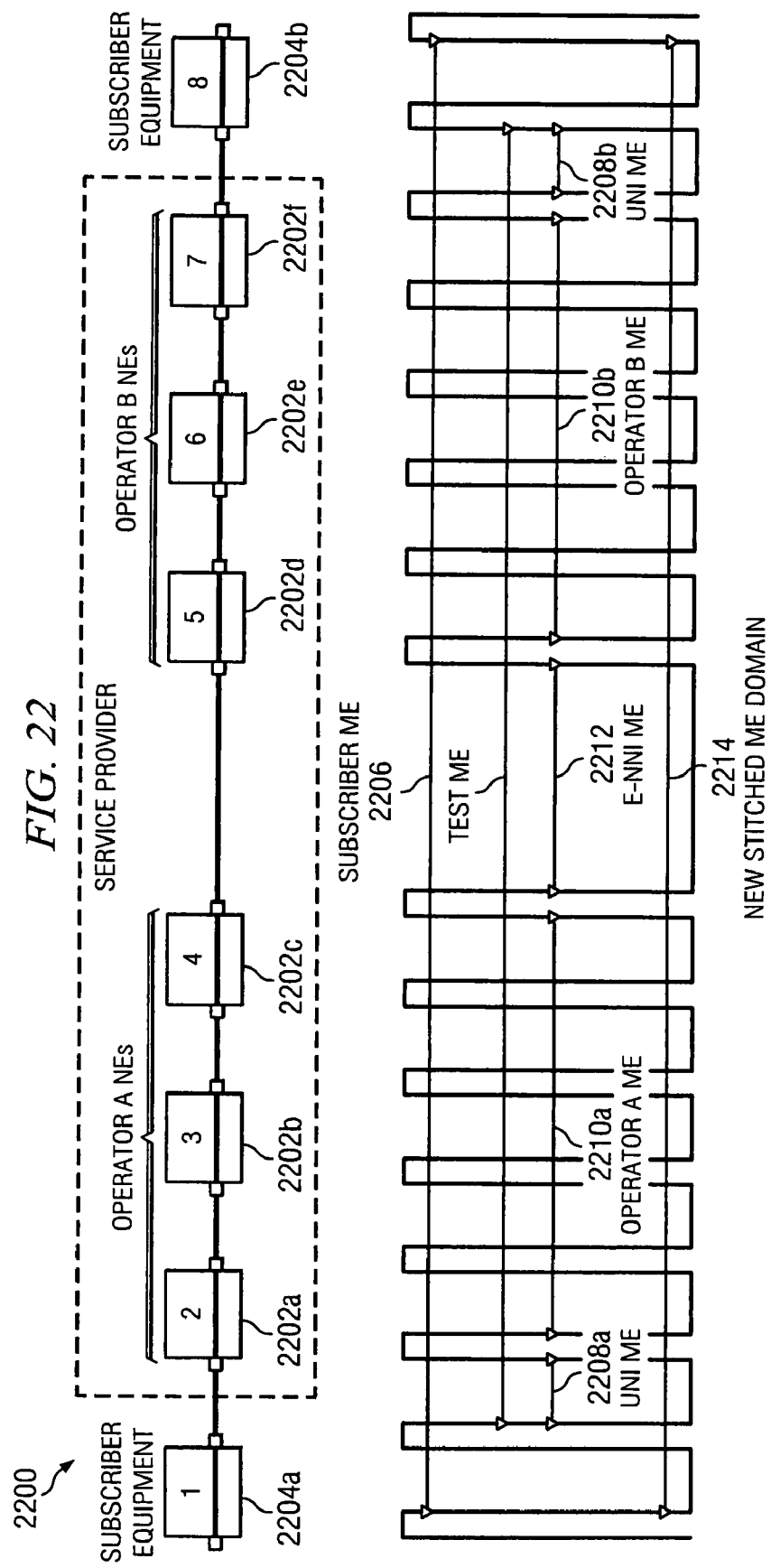

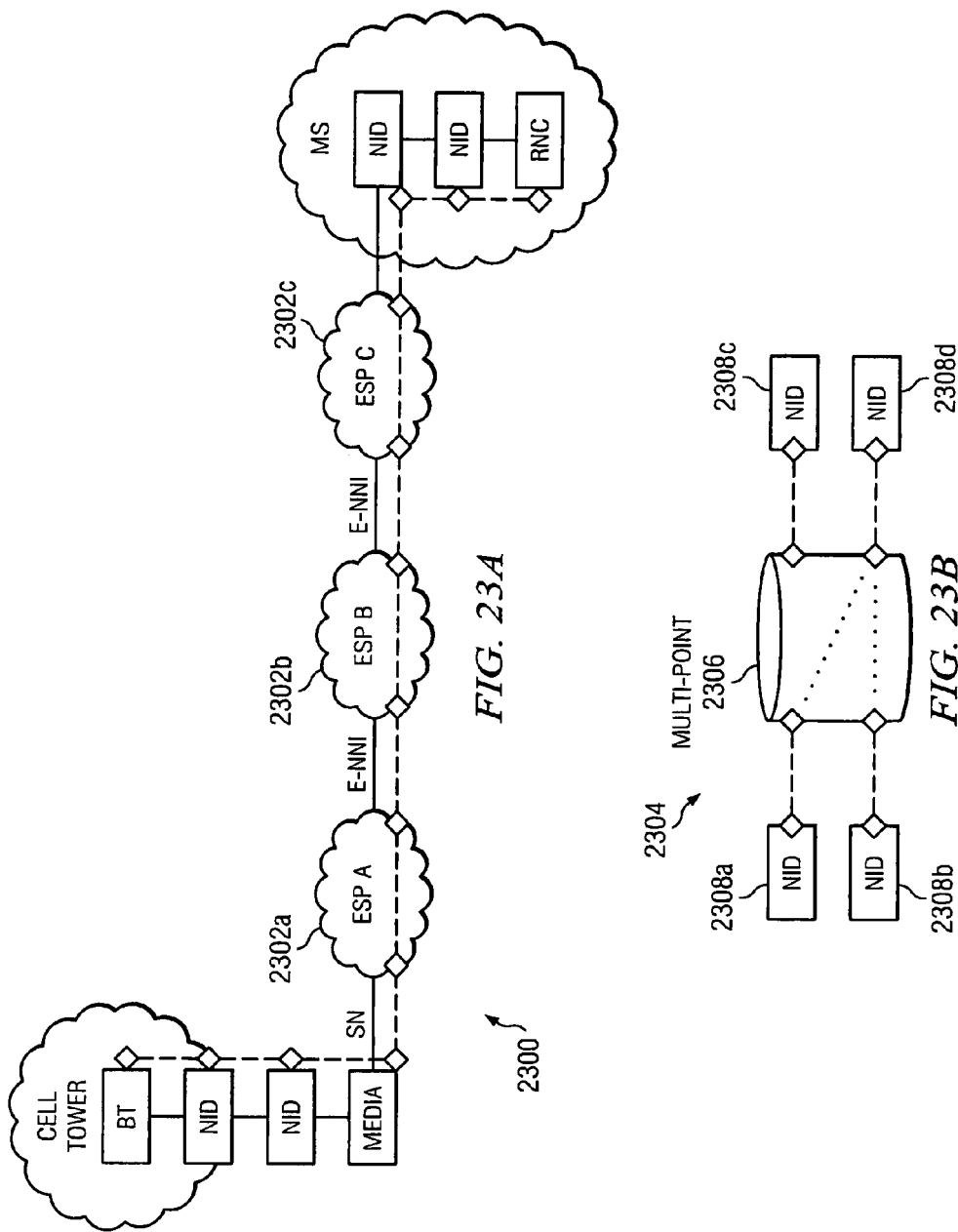

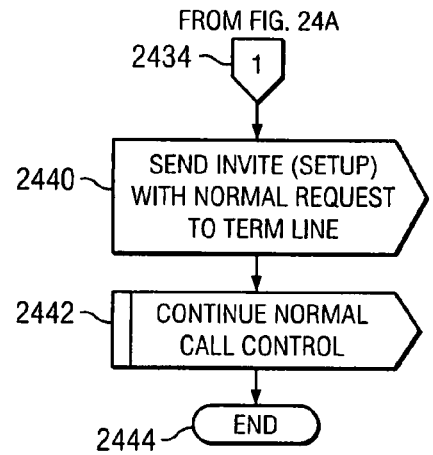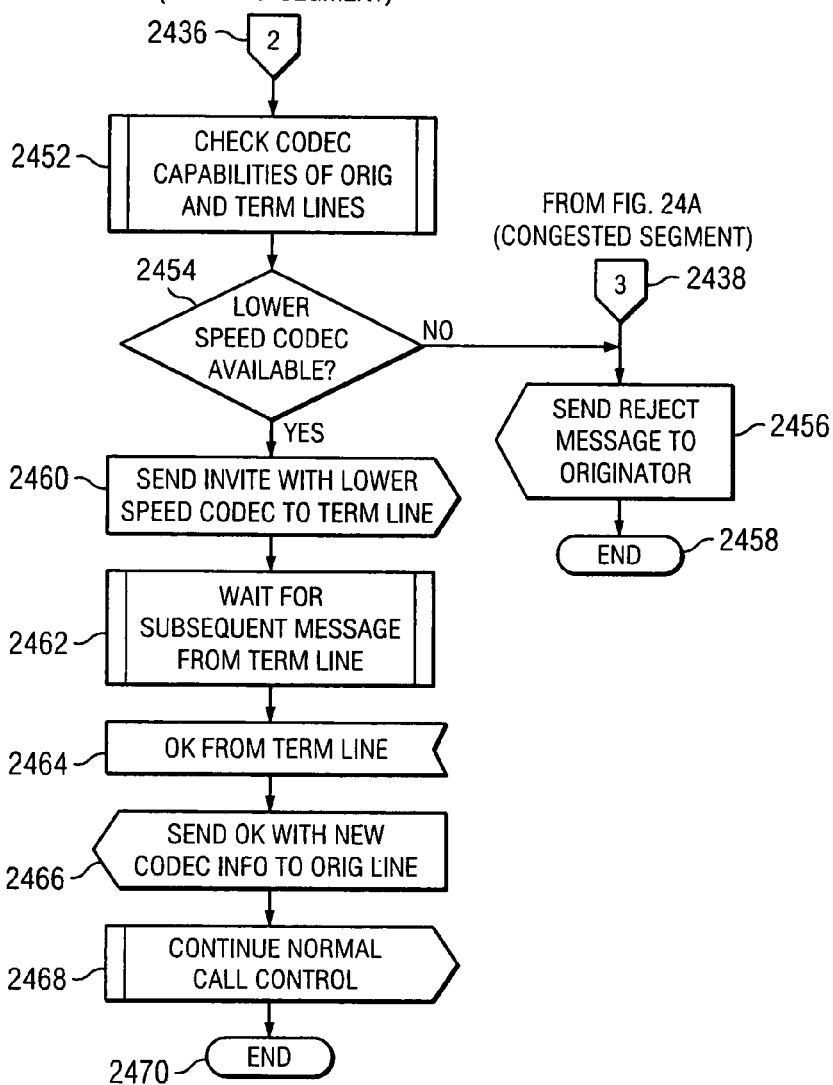

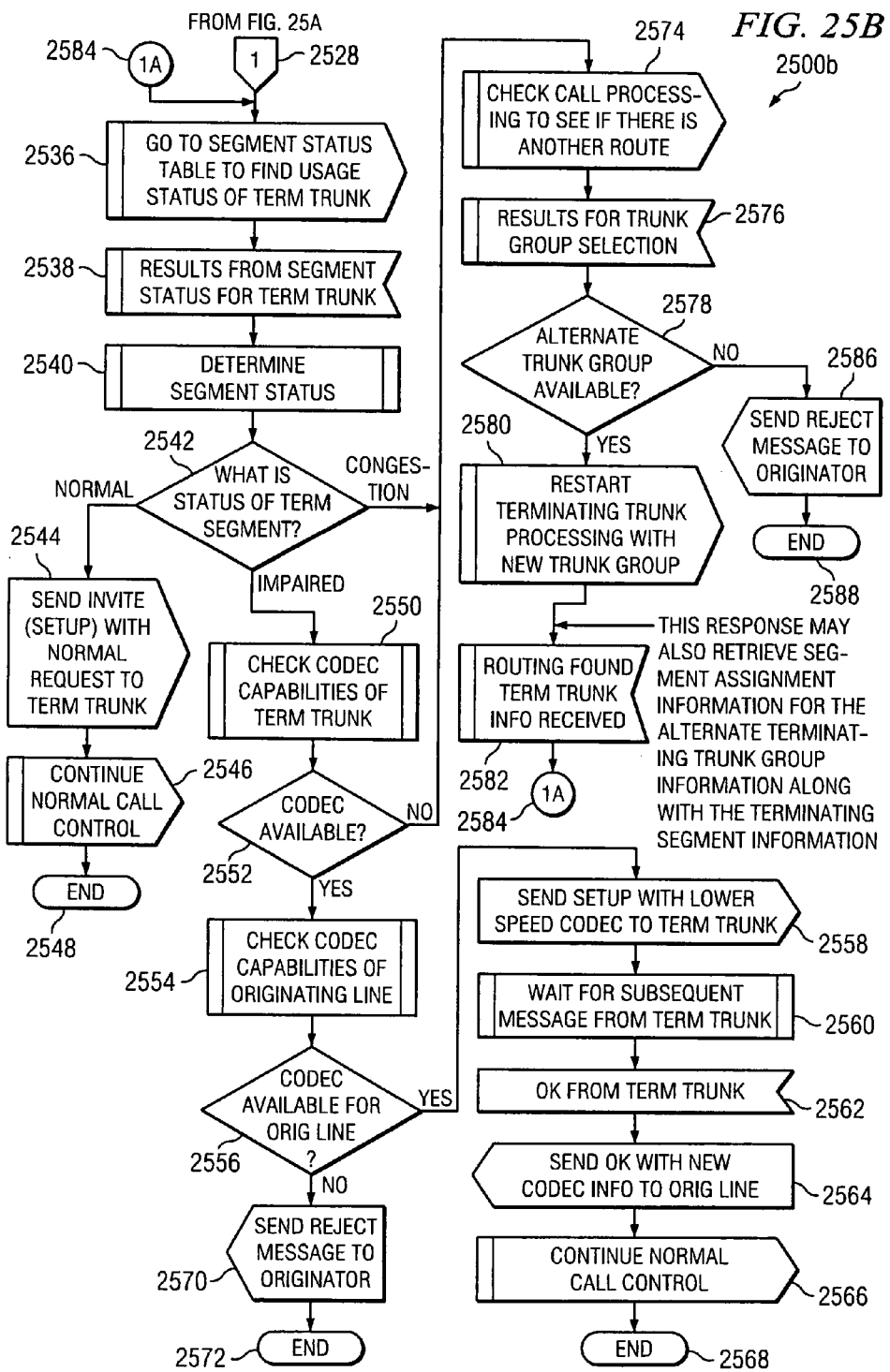

| VALUE | INTERPRETATION |
|---|---|
| 00000000 | DO NOTHING |
| 00000001 | INCREASE THE NUMBER OF ALLOCATED BITS BY ONE |
| 00000010 | DECREASE THE NUMBER OF ALLOCATED BITS BY ONE |
| 00000011 | INCREASE THE TRANSMITTED POWER BY 1dB |
| 00000100 | INCREASE THE TRANSMITTED POWER BY 2dB |
| 00000101 | INCREASE THE TRANSMITTED POWER BY 3dB |
| 00000110 | REDUCE THE TRANSMITTED POWER BY 1dB |
| 00000111 | REDUCE THE TRANSMITTED POWER BY 2dB |
| 00001xxx | RESERVED FOR VENDOR DISCRETIONARY COMMANDS |

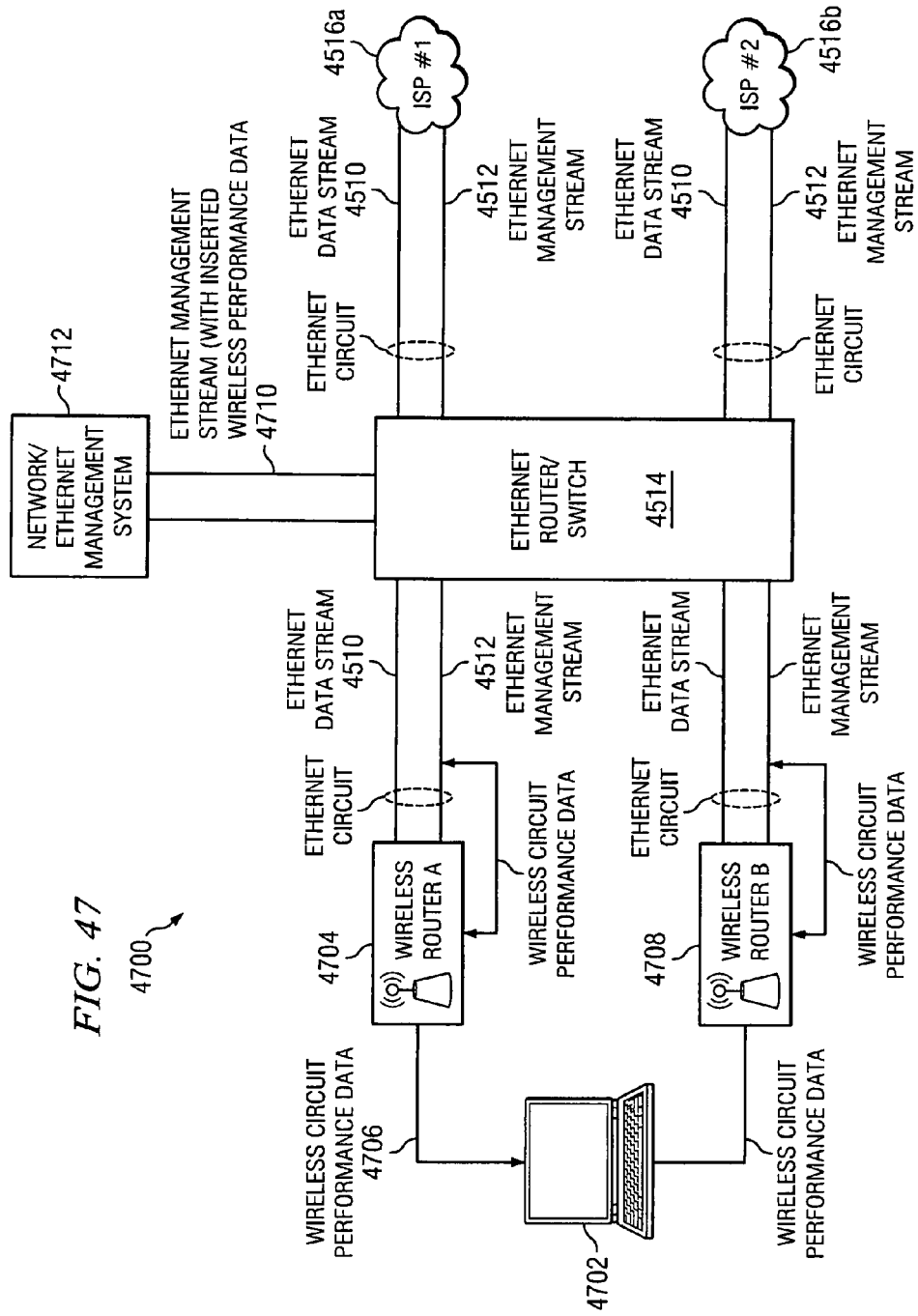

FIG. 65

| ACCESS NODE | PACKET COUNT | PACKET LOSS | LATENCY | JITTER | DELAY | AVERAGE PACKET RATE | PROVISIONED PACKET RATE | REAL TIME PACKET RATE | OTHER NETWORK PARAMETERS |
|---|---|---|---|---|---|---|---|---|---|
| ACCESS NODE #1 | $p^1$ | $l^1$ | $t^1$ | $j^1$ | $d^1$ | $r^1$ | $m^1$ | $k^1$ | ... |
| ACCESS NODE #2 | $p^2$ | $l^2$ | $t^2$ | $j^2$ | $d^2$ | $r^2$ | $m^2$ | $k^2$ | ... |
| ACCESS NODE #3 | $p^3$ | $l^3$ | $t^3$ | $j^3$ | $d^3$ | $r^3$ | $m^3$ | $k^3$ | ... |
| ... | ... | ... | ... | ... | ... | ... | ... | ... | ... |
| ACCESS NODE #n | $p^n$ | $l^n$ | $t^n$ | $j^n$ | $d^n$ | $r^n$ | $m^n$ | $k^n$ | ... |

SYSTEM AND METHOD FOR ADJUSTING THE WINDOW SIZE OF A TCP PACKET THROUGH NETWORK ELEMENTS

CROSS REFERENCE TO RELATED APPLICATIONS

This application claims priority from the following co-pending U.S. Provisional Patent Application 60/839,333 filed on Aug. 22, 2006, 60/897,543 filed Jan. 26, 2007, 60/905,624 filed Mar. 7, 2007, and Ser. No. 60/922,246 filed Apr. 5, 2007; the entire teachings of which are incorporated herein by reference.

BACKGROUND OF THE INVENTION

Telephony has advanced dramatically with the advancement of technology. Telephone communication was once limited to an analog public switched telephone network (PSTN), where the PSTN has been traditionally formed of two types of telephone carriers, local and long distance. The local carriers established local networks for subscribers to communicate within local regions, and the long distance carriers created networks between the local networks to enable subscribers of different local carriers to communicate with one another.

Over time, mobile telephone networks were developed to enable subscribers to use mobile telephones. At first, the wireless networks and handsets were analog. Technology for the wireless networks was developed to provide digital wireless communications, which provided a clearer signal than analog wireless communications.

About the same time that the digital wireless networks were developing, the Internet was also developing. The International Standards Organization (ISO) developed an Open Systems Interconnection (OSI) basic reference model in 1977 that currently includes seven different layers. Each of the layers provides protocols for certain types of operations. More specifically, the seven layers include: physical layer (Layer 1), data link layer (Layer 2), network layer (Layer 3), transport layer (Layer 4), session layer (Layer 5), presentation layer (Layer 6), and application layer (Layer 7). Each entity interacts directly with the layer immediately beneath it and provides facilities for use by the layer above it. The protocols on each layer enable entities to communicate with other entities on the same layer. The Internet initially provided for simple digital data to be communicated between users. One of the early communication application included email. However, as communications standards and protocols developed, the Internet matured to include more advanced communication applications, including voice over Internet protocol (VoIP).

FIG. 1 is an illustration of a legacy telecommunications network that includes class 4 and 5 switches 102a-102n (collectively 102) and 104a-104n (collectively 104), respectively, connected to a signaling system #7 (SS7) network 106 (indicated as dashed lines). Historically, the class 5 switches 104 were generally configured to communicate via in-band signaling verses the use of SS7 signaling and operate to form a local network of subscribers within the network to place telephone calls to one another. The class 4 switches 102 were developed for long distance connections between the class 5 switches 104 at end offices (not shown). The class 4 switches 102, which are monolithic, are generally formed of multiple components, including a port, port cross-connect matrix, switch messaging bus with external signaling units, and call processing unit, as understood in the art. Class 4 switches are circuit based and utilize time division multiplexing (TDM) and are capable of terminating higher high-speed communications, including T1, T3, OC-3, and other four-wire circuit connections. As understood in the art, TDM is a synchronous communications protocol.

The SS7 network 106, which includes signal transfer points (STPs) 108a-108n (collectively 108), service switching points (SSs) on the class 4 and class 5 switches, and service control points (SCPs—not shown). The SS7 network is connected to the class 4 and 5 switches for providing and maintaining inter-switch call services between the switches. The SS7 network is used to signal out-of-band call setup, as out-of-band signaling is more secure and faster than in-band signaling. The call state changes of the inter-switch trunks of the class 4 switch are communicated to the adjoining switches via the SS7 network via a connection to the STP. To manage and route calls, the STPs 108 are used as an Inter-Switch messaging network whereby two switches control the trunking between the switches via messaging over the SS7 network provided by the STP switches that act as the inter-switch message bus. A call state machine of the class 4 switch provides control for routing traffic within the cross-connect matrix of the monolithic switch. The call state machine also provides call control signaling information to other switches via the connections to the STPs. The call control signaling information is routed via the STPs to other switches for call setup and tear-down. The call control information routed by the STPs contains pertinent information about the call to allow the terminating switch to complete various calls.

Telephony has benefited from the development of the OSI model in a vast number of ways. One way has been through separating the call controller into a distributed cross-connect on an asynchronous network, such as asynchronous transfer mode (ATM or a Internet Protocol (IP) network. FIG. 2 is an illustration of a conventional telephony network 200 that includes a packet network 202. In one embodiment, the packet network 202 is an ATM network. Media gateways (MGs) 204a-204n (collectively 204) are media translation or conversion devices that modify and convert protocols between disparate communication networks. The media gateways 204, which are in communication with class 5 switches 206a-206n (collectively 206) are located at the edge of the packet network 202. The media gateways 204 convert TDM packets or streams 208 into packets, frames, or cells (collectively referred to hereinafter as "packets") 210 and vice versa.

The packet network 202 operates independently as a distributed virtual media gateway port cross-connect for voice calls primarily due to one or more call control managers (CCMs) 212 located on the packet network 202. The call control manager 212 is in communication with the media gateways 204 and operates to control the media gateways 204 and provide instructions on how to rotate the packets 210 via far-end address allocations. By separating the call controller from the class 4 switches, the packet network 202 becomes, in effect, the virtual cross-connect of the switching system. The packet network 202 enables packets 210 that include voice data, commonly known as bearer packets, to be tagged with a destination address 214a and origination address 214b for enabling content data 214c to be properly routed from the origination media gateway 204b to the destination media gateway 204a. The media gateways 204 use of the packet network 202 is controlled by the CCM 212 and may communicate the packets 210 over the packet network 202 via IP addresses and virtual circuit (VC) or virtual path (VP) between the media gateways 204 to appropriately route the packets to the correct destination network node through the packet network 202. CCM 212 receives call state processing information from the media gateways 204 and signaling points, and processes the call state changes by using look up tables (not shown). The CCM 212 thereafter communicates packet addressing and state changes to the media gateways 204 to process the call.

Ethernet protocol was developed to provide for a computer network that enables multiple computers to share a common external inter-communication bus. Ethernet is generally used to provide for local area networks (LANs). Ethernet operates by communicating frames of data. While Ethernet operates well within a local environment (e.g., within a building) because Ethernet assumes that there is an known capacity of bandwidth associated with the bus standards set forth in the IEEE 802.3 standard that defines Ethernet. Ethernet is a shared environment, where co-utilization creates transmission errors called collisions. These collisions are detected by Ethernet cards in computers and a random re-transmission timer is used to avoid the next collision. Ethernet poses special problems for use in communications systems given it lacks dedicated bandwidth and time slots. The shared nature of an Ethernet network creates additional complexities in that the amount of available bandwidth can vary when used with wireless technologies.

Communication protocols transmitted over packet networks, such as ATM or IP networks, may utilize TDM based transmission facilities, which are synchronous as compared to Ethernet transmission facilities, which are asynchronous. Synchronous transmission protocols utilize a common clock and channel schema so that each device on the network operates synchronously with a dedicated path. Two types of "connection" state knowledge are present in a dedicated system, such as a TDM. Each channel has a dedicated amount of bandwidth and an error rate that is calculated from a common clock to determine path errors. The two types of connection state awareness functionality are provided by the channel itself and the common clock and data within a TDM header. The common clock provides for a determination of (i) a communications data rate from one end-point to another end-point and (ii) the data quality. Additionally, the TDM protocol includes "far end state" data in a header of a TDM frame to indicate whether there is a connection at the far end, thereby providing an indication of continuity along the communications path. Specifically, in-band end-to-end alarming allows the cross-connect devices to receive indications of continuity problems with other end-points. The in-band alarming is also provided for connection quality, where Bit Error Rate (BER) allows each end-point to know the quality of the data being received. Furthermore, bandwidth is always in use meaning that packets are synchronous, which that the far end knows exactly how many packets are to be sent and received in a given time period (e.g., one second). Computation of utilization is easily made by using the known bandwidth and multiplying it by the "seizure" time or the amount of time in use.

Packet-based communications sessions lack circuit based connection state awareness indicators and clocking functionality to provide a session controller the ability to know the path connectivity state to efficiently manage making call handling decisions with anything other than ample bandwidth to setup and use sessions. This lack of connection path state awareness with the communications protocols, such as Ethernet and Internet protocol (IP) technologies, result in "gaps" in terms of being able to react to decaying transmission path quality and be sensitive to shared use of bandwidth. Most IP call controller solutions are founded on enterprise applications, where a single entity owns the network and scale of the network is relatively small. IP and Ethernet protocols lack the in-band path signaling, quality and use metrics to allow for this scale, or the ability to perform enhanced call handling with paths outside the governance of the packet network.

Because packet communications are asynchronous, there is no common clock, and, thus, there is no way to know how many packets were transmitted, which, in turn, removes the ability to characterize transmission quality of the entire path, the amount of bandwidth available, or the amount in use. Further, packet networks are "converged" meaning they have both real-time and non-real-time bandwidth use. Currently, there is no in-band mechanism for determining real-time and non-real-time bandwidth use; having such information would allow for handling calls. It is commonly understood that proper connection operational assumptions are made by call control engines when the SS7 signaling path is properly operating (e.g., provisioned bandwidth is available) between end-points within the SS7 network. These operational assumptions are problematic as Ethernet, IP, and other data networks become oversubscribed and cause the packet network to become congested and prevent throughput. In cases where an end-point, such as a WiFi telephone, is mobile and bandwidth changes with signal strength (e.g., a WiFi telephone losing bandwidth as an individual walks away from a connection point antenna), the connection operation assumptions also fail to provide graceful call handling.

One available technique in packet networks to prevent oversubscription of real-time media traffic is through the use of call admission control (CAC) or the IP equivalent known as Resource Reservation Protocol (RSVP). CAC is primarily used to prevent congestion in voice traffic and is applied in the call setup phase to ensure there is enough bandwidth for data flow by reserving resources. To reserve bandwidth through the entire packet network, a CAC requires that the CAC procedure be performed at each point along a virtual circuit between two media gateways on which a call is to be routed, and often in a bi-directional fashion. While CAC functionality exists, the use of such CAC functionality is almost never applied because of the amount of time needed by the CAC procedure during call set up. For example, currently, CAC typically cannot operate over 40 calls per second and typical call set-ups on media gateways or class 4 switches may be 200 calls per second or higher.

One technique used to monitor the performance of IP session performance (i.e., after a call session has been established) is the use of the real-time control protocol (RTCP) as defined in IETF RFC 3550. RTCP collects statistics on a media connection, including bytes sent, packets sent, lost packets, jitter, feedback, and round trip delay. Other information may be provided in the RTCP packet using profile specific extensions. RTCP, which operates on a per session basis, is used for quality of service (QoS) reporting after termination of a session. The statistics information may be used, for example, to improve the quality of service by limiting data flow or changing CODEC compression. Utilization of the real-time QoS statistics, however, is limited to the specific session associated with the RTCP stream.

An emerging standard that is being developed for Ethernet performance measures is 802.1AG. This standard operates by generating and communicating an 802.1AG packet or "heart beat" over an Ethernet network segment. The 802.1AG packets are communicated via a Layer 2 Ethernet Virtual Circuit, such as a VLAN or Ethernet tunnel. At the ends and midpoints in Ethernet tunnels, 802.1AG packets are transmitted periodically over the Ethernet network to the far end. The Y.1731 protocol is utilized to calculate the number of data frames communicated between the 802.1AG packets. This configuration enables a performance measures (PM) to compute certain information about the performance of the path between the end-points on an Ethernet network. This combination of 802.1AG and Y.1731 enables the end points to be knowledgeable about the Frame Loss Rate (FLR), packet delay, and jitter in the path. This configuration is helpful to assist in monitoring performance of an Ethernet network path and diagnosing connectivity faults. However, the configuration falls short of providing the amount of real-time bandwidth in use or the total bandwidth in use. This information is useful to the proper management by a session controller handling calls during periods of flux in the packet transmission path, or the management of the real-time traffic.

Service providers often have trouble isolating and diagnosing network problems. To attempt to locate a packet loss problem along a node segment (i.e., a path between two network communications devices) over a network a probe that may be used to trace data packets being communicated over the node segment. This probe, however, is typically an external device from the network communications devices and operates to run a trace over an instant of time to determine network performance information, such as packet loss, jitter, and delay. An operator using the external probe may view results of a trace to diagnose the network communications problem. These results are not accessible to the network communications devices and cannot be accessed by network communications devices to alter network communications.

Telecommunications switching systems today provide for Internet protocol (IP) communications between two end-points within a network or a different network to be terminated to a far end-point. Calls between two end-points are routed to the terminating end-point based on the address input at the originator. This address information is then relayed to a Call Control Manger (CCM) that screens, translates, and routes the call to the terminating subscriber or to another network to be terminated at a far end subscriber's end-point. The basic functionality of this process is widely known within the art and is used throughout telecommunications networks for voice calling.

Within the architecture of this switching system, calls to and from end-points are controlled by the CCM. The CCM may be located within a monolithic device in a TDM switch architecture or provided by an outboard computing device that controls the calls by using signaling that controls network based routing and switching devices located within the network. The latter device is known as soft-switch architecture.

The soft-switch architecture within an IP network controls call processing through use of signaling to and from the end devices and media gateways. One example of a protocol used for this IP signaling is Session Initiation Protocol (SIP). This protocol is currently used mainly with IP telephony, such as VoIP, and can be used as an access protocol between the end-user and the CCM and/or between the CCM of one network and the CCM of another network.

Another protocol used mainly between the CCM and a media gateway is the ITU-T H.248 protocol, commonly known as Megaco. This protocol is a control protocol that allows the CCM to control ingress and egress from/to the media gateway as calls are set up using a media gateway. Within a packet network framework, IP communications between two end-points (both access end-points and media gateways) are controlled by the signaling of the end-point to/from the CCM. The CCM provides authentication, screening, translations and routing based on information that is stored in the CCM and from the state of the end-points that the CCM controls.

Within the soft-switch architecture, call control can only be accomplished based on information possessed by the CCM or the on/off state of the devices that has an association with the CCM. While this configuration is fine in a static environment, packet networks are in a state of change at all times since the network itself can carry different types of information besides voice calls. One skilled in the art knows that a packet network is a converged network that can carry voice, data, and video all in a single path, and routing of calls within a packet network is not static and can vary significantly from call to call.

Because of packet network content communications variables, calls may encounter congestion and loss of voice quality based on latency, jitter, and packet loss. These content communications variables can affect any portion of a call at anytime based on the network elements usage at the time of the call. Unlike a TDM system where dedicated channels and circuits are provided, the CCM only has control of it own end-points. Other end units may attempt calls, computers may send/receive data without talking to the CCM, and other devices may require bandwidth while the original call is progressing, thus causing voice quality problems for the participants. In addition to these basic gaps, many physical layer 1 systems that are poor in regulating bandwidth, are being used for transmission facilities. WiFi, EVDO, 4G (Wax), DSL, and cable systems are all physical layer 1 technologies that demonstrate different bandwidth rates and management of their ability to modify available bandwidth as the Signal-to-Noise (SNR) ratios change.

Conventional soft-switching has not been designed to provide relief for callers when congestion, jitter or delay problems, such as those described above, are encountered. Since conventional CCMs can only determine call success based on connectivity to and from the calling parties, voice quality between two parties is not taken into consideration for call success.

Communication problems of in-band signals over packet networks are difficult to isolate. Currently, if a communication problem exists over a transmission path, there are few techniques to isolate the problem. One technique includes using an external probe to capture and decode packets, commonly know as a trace, traversing over a communications path to help isolate the problem. However, technicians generally only run the trace in response to a customer notifying a communications carrier of a communications problem. If a problem exists across packet networks operated by different carriers, a typical response by a carrier is to contact the other to determine if the other carrier can locate a problem in its network. In other words, locating an in-band communications problem over one or more packet networks is difficult as troubleshooting tools for such problems are limited to out-of-band performance metrics (PM) and are not available as in-band information via control or signaling paths.

A problem that exists with current implementations of telephony over packet networks is that a call control manager does not have information about the bearer path. Traditionally, there was a linkage between transmission path state and the monolithic switch that essentially owned one end of that path where the in-band signaling and line characteristics were available and was an integral part of the information used by the CCM for call processing. As demonstrated in current implementations of VoIP, without knowledge of the bearer path, the call control manager may establish calls that result in poor voice quality or call setup failure.

In addition, IP Service gateways, such as a broadband remote access server (BRAS), functions to limit, commonly known as traffic rate shaping, each customer's DSL traffic to their purchased speed. There is no end-to-end signaling, outside of the embedded TCP flow control mechanism, used to adjust the bursting to eliminate packet loss. Rate shaping is a statically forced bandwidth constraint that alters the nature of a transmission path in the packet networks. This shaping coupled with commonly shared or "over-subscribed" bandwidth normally associated with trunking facilities between networks results in unknown transmission path states between media gateways servicing VoIP and other real-time services, such as Video on Demand (VOD).

Traffic Quality of Service (QoS) management of packets is performed, where multiple flows aggregate into a smaller flows or channels. The application of Internet Protocol QoS is performed at the egress point where traffic is transmitted over a single link. Current traffic engines use the following information to make QOS traffic decisions. The decisions are assigning a Class of Service (CoS) and then acting upon that service to shape, restrict, or pass traffic to an egress point. The variables used to assign priority to traffic flows can be based on: entrance port (assign a whole port a CoS), virtual circuit in a port (assign a CoS to an Ethernet Virtual Circuit, LSP, etc.), priority bit marking of each packet (P bit), protocol type (assigning a CoS to specific types of packets or traffic), IP address and port (assigning a CoS to a whole IP address, or its port addresses), session identification (a HTTP, UDP, or other session addressed call), or otherwise. This priority marking information is used by service points, and shared links to implement QoS for the shared traffic flows. QoS and CoS types of information are made available at the point of aggregation where traffic management or QoS functions occur. However, the number of packets transmitted or lost in the packet stream elsewhere in the network is currently unavailable without the use of a session or path based protocol. These packet loss functions are generally not tracked by QoS mechanisms.

In current traffic rate shaping designs, the Internet may burst a packet stream to a DSL user when the packet network or Digital Subscriber Line Access Multiplexer (DSLAM) itself may not have sufficient bandwidth to accommodate the packet session. In a TCP-based session, the transmission rate is throttled down after packet loss is detected in the session. In VoIP, the packet loss is not counted by the use of Real Time Control Protocol (RTCP) signaling, but it is captured as the call progresses by the end points. RTCP, however, only considers performance of its own sessions and not the transmission path performance as a whole. In both cases, packets are sent over the packet network that get dropped in mid-path and will not make it to the customer premises equipment (CPE) and user. More importantly, there is no cross-session information about the packet loss and no whole path information available in-band.

Also, packet loss can be due to available bandwidth transmission rate fall-off, such as when a WiFi user walks away from a WiFi Access Point (AP) and loses RF signal strength, signal-to-noise ratio increases, or congestion increases due to many users concurrently accessing the AP. All of these types of conditions in the transmission paths can have severe impacts upon the ability to accomplish call processing and call management.

An Internet Service Provider (ISP) may provide different Internet connectivity speeds or data transfer rates based upon their service plans. For example, a user may purchase 1.5 Mbits/sec data transfer rate for a predetermined amount, such as 10 Mbits/sec data transfer rate or higher. In general, the transmission path is between the shared (trunked) BRAS resource and the DSLAM that is supplying. The normal amount of bandwidth consumption in the download direction from the network to the user is high as compared to the upstream direction. However, there is no correlated throttling mechanism in the IP web-server linked to user's ISP service plan that can be used to shape the packet transmissions. So, all of the network traffic is shaped at the BRAS typically based on the user's purchased data transfer rates. Depending upon network conditions, some of this traffic may not make it to the DSL user since the BRAS has no knowledge of the IP service path from itself to the customer.

A problem occurs when the BRAS does realize congestion on a packet network where packets are being dropped due to insufficient bandwidth. Some packets could be dropped in the packet network or at an aggregation device somewhere in the packet network. Currently, there is little intelligence that recognizes the dropped packets in the packet network. In fact, packet networks are designed to discard traffic based on QoS markings. This problem is made worse because transporting packets that will ultimately be dropped adds to congesting the network. The packets consume bandwidth until dropped.

Transmission Control Protocol (TCP) was designed to work in a best-effort, packet store-and-forward environment characterized by the possibility of packet loss, packet disordering, and packet duplication. Packet loss can occur, for example, by a congested network element discarding a packet. Here, a microprocessor or memory of a network element may not have adequate capacity to address all packets routing into and out of the element. Packet disordering can occur, for example, by routing changes occurring during a transmission. Here, packets of TCP connection may be being arbitrarily transmitted partially over a low bandwidth terrestrial path and as routing table changes occur partially over a high bandwidth satellite path. Packet duplication can occur, for example, when two directly-connected network elements use a reliable link protocol and the link goes down after the receiver correctly receives a packet but before the transmitter receives an acknowledgement for the packet.

An embedded capability within TCP protocol is the TCP sliding window technique. The sliding window was developed and deployed as a flow control mechanism used to minimize the inefficiencies of packet-by-packet transmission. The sending of data between TCP enabled end-devices on a connection is accomplished using the sliding window technique. TCP requires that all transmitted data be acknowledged by the receiving host. The sliding windows method is a process by which multiple packets of data can be affirmed with a single acknowledgement.

SUMMARY OF THE INVENTION

To enable for improved packet network performance, the principles of the present invention provide for network performance information to be acquired and concatenated into data packets for adjusting the window size of a TCP packet.

One embodiment may include a system for adjusting the window size of a TCP packet on a packet network including a sending network element in communication with a receiving network element for transmitting and receiving data packets between the sending network element and the receiving network element on the packet network, wherein at least one of the sending network element and the receiving network element is configured to determine network performance information of the packet network; concatenate the network performance information into the data packets; and adjust the window size of the TCP packet based on the network performance information. A method for adjusting the window size of a TCP packet on a packet network is also included.

BRIEF DESCRIPTION OF THE DRAWINGS

Illustrative embodiments of the present invention are described in detail below with reference to the attached drawing figures, which are incorporated by reference herein and wherein:

FIG. 1 is an illustration of a legacy telecommunications network that includes class 4 and 5 switches connected to a signaling system #7 (SS7) network;

FIG. 2 is an illustration of a conventional telephony network that includes a packet network;

FIG. 3 is an illustration of an exemplary packet network that utilizes performance information packets to determine network performance information;

FIG. 4 is an illustration of an exemplary data packet stream including PIP data packets and data packets including real-time and non-real-time content;

FIG. 15 is an illustration of an exemplary packet network having a call control manager with a centralized table of network performance information for use in managing call communications over the packet network;

FIG. 22 is an illustration of an exemplary packet network with one service provider and two operators;

FIGS. 23A and 23B are illustrations of a multi-carrier network having multiple Ethernet service providers (ESPs) and a multi-point network having a multi-point device in communication with network interface devices;

FIGS. 24A-24C (collectively FIG. 24) are flow charts of an exemplary process for performing line-to-line call flow;

FIGS. 25A-25C (collectively FIG. 25) are flow diagrams of an exemplary process for providing call processing for rerouting a call between an originating line and terminating trunk;

FIG. 47 illustrates a wireless network according to an embodiment of the present invention;

FIG. 65 is an example of stored network performance information associated with access nodes in accordance with an illustrative embodiment of the present invention;

DETAILED DESCRIPTION OF THE DRAWINGS

Figure 5:
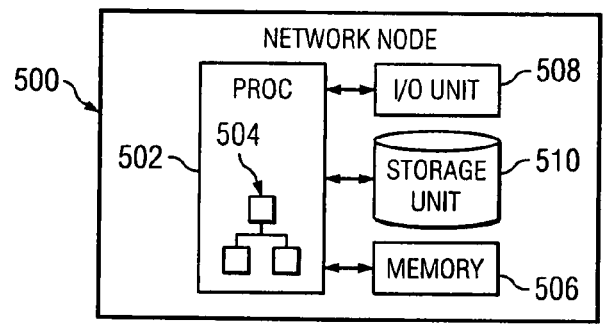
FIG. 5 is a block diagram of an exemplary network node configured to perform functionality in accordance with the principles of the present invention.

FIG. 3 is an illustration of an exemplary packet network 300 that utilizes performance information packets 302a, 302b (collectively 302) communicated in-band, and along virtual packet paths between represented as node links 303a, 303b, and 303c (collectively 303) between network nodes 304a, 304b, and 304c (collectively 304). For purposes of this application, a performance information packet (a "PIP packet" or "PIP data packet") shall mean a packet communicated over data paths of a data packet network that is used by the data packet network to obtain performance information associated with path transmission states of the data packet network. In one embodiment, such PIP packets are communicated in-band along the data or bearer path of a packet network. However, such PIP packet information may also be communicated out-of-band between network elements of the packet network to provide utilization performance measures to other switching and control systems via control signaling over an Operational Support Network or other operations or maintenance network.

A PIP packet may be communicated between the nodes of a network to establish windows of time in which a node collects or determines network performance information, which may be any information that describes packet utilization and performance of a node, node segment, transmission path, or network element. More particularly, a PIP packet may have a timestamp, counter, sequence number or other identifiers to enable the use of the PIP packet by a network node to establish a sampling window of time for collecting or determining such network performance information. Alternatively, a PIP packet may not include such identifier and may instead be generated at regular intervals between nodes of the network. Each network node or path transmission point may transmit PIP packets to a far-end element via the packet transmission path and the far-end element may receive, calculate performance and store the information for use as a utilization and performance measurement or network performance information. Given each communication path may contain information from its transmission to receive paths, the end-points may exchange and track the measures of the bi-directional path via relaying those measures at either given intervals or any other mechanism so that at least one end of the communication path has both the transmit and receive path utilization and performance measurements. The PIP packet may provide a "heartbeat" between network nodes by which the network nodes may use to determine the network performance. A PIP packet may also be used to communicate the collected or determined network performance information between nodes of the network by, for example, including the network performance information in the header or payload portion of the PIP packet. In one embodiment, a PIP packet is an Ethernet Connectivity Fault Management (CFM) packet, such as an 802.1AG packet, and a receiving utilization and performance tracking mechanism may be a ITU Y.1731 protocol stack. However, any packet of data may be utilized under any suitable protocol, as well as calculation methodology to track and store the network performance information.

The PIP packets 302 may be formatted to include any information capable of providing information to network nodes to determine network performance information, where the network performance information may include transmission rate, transmission quality, and/or transmission connectivity. Other network performance information, such as communication path utilization, may additionally be determined.

The PIP data packets 302 provide a "heartbeat" to enable the network nodes 304 at the far-end (i.e., receiving end) to generate network performance information. The PIP data packets 302 may be communicated every $T_{PIP}$ seconds, where $T_{PIP}$ may be less than, equal to, or higher than one second and include a timestamp of the time of communication and a counter value indicating the number of packets previously sent to enable a receiving network node to determine whether any data packets were lost between successive PIP data packets. Transmission rate is an indication of the number of data packets communicated over a time period and can be determined by counting data packets communicated over a network segment during a time period, for example. The PIP data packets may be used in determining a time period over which to measure the transmission rate. Transmission quality is a measure of link state and may include various link state parameters, including packet loss, jitter, and delay, for example. In one embodiment, the PIP data packets 302 may be communicated over Layer 2 of the OSI model and the network performance information may be determined in Layer 2. The network nodes 304 may include transmission performance collection units 306a, 306b, and 306c (collectively 306), respectively, to generate and collect network performance information. Transmission connectivity is an indication of communications between two devices on a network. The connectivity may be indicative of signal strength of communications between the devices, an on/off indication of a device being off or otherwise incapable of communicating, or other suitable performance measures. The transmission performance units 306 may generate network performance information in association with the PIP data packets 302.

Network performance information may also include information associated with non-packet networks, such as cable DOCSIS, wireless CDMA, TDMA, WiMax, or circuit based networks. Without limiting the foregoing, network performance information may include any data that is associated with any wired or wireless network that may be indicative of or otherwise suitable for use in determining the operation or general health of the network. Network performance information may also include information that is not associated with the communication of data between network elements along connection paths, but is instead associated with the performance of network devices themselves located at a particular node of the network. For example, network performance information may indicate buffer utilization levels, buffer overflows, errors experienced in caching or queuing data, latency introduced by a lack of processing, packet loss across a switching fabric of a particular network device such as a switch and router, or any other performance issue associated with a particular network device. It should be understood that different network types and different connection paths may have different indicia of network performance issues. For example, a T1 line may not have data associated with packet loss, jitter, or latency but may instead only present alarms of red, yellow, or green associated with the perceived performance along a T1 connection path. Similarly, there may be a large amount of data associated with wireless networks that are indicative of network performance such as signal to noise ratio, levels of interference, signal strength, or any other suitable data regarding the performance of the wireless network that may be useful and utilized as network performance information.

Continuing with FIG. 3, in addition to generating network performance information based on PIP data packets, the principles of the present invention provide for the network nodes 304 to determine real-time transmission rate or real-time traffic utilization (i.e., a number of data packets including real-time content being communicated over network segments during a time period or, mathematically described, real-time bandwidth use may be determined by tracking the summation of the size of each real-time packet that is transmitted in a given time period, collectively. Alternatively, tracking the real-time packets transmission rate=number of real-time packets*average packet size/given time period). Real-time content is data produced by applications that use real-time and near real-time data packet communications (e.g., VoIP telephone calls). Data packets including real-time content (i.e., real-time data packets) may include payload data 308 representative of speech during a telephone call, video data stream during a live event, music stream during a live concert or live radio broadcast, or gaming data, possibly including embedded voice, during a competitive live gaming session, for example. Non-real-time data packets may include payload data representative of content that does not need to be communicated in real-time (e.g., music download, webpage content, program update download, etc.). Total bandwidth transmission rate or total transmission rate may also be determined so that if the real-time transmission rate is known, then the non-real-time transmission rate is also known.

Determining bandwidth usage, both real-time and total bandwidth usage, can be accomplished by tracking either individual data packets and packet flows or internal network element traffic statistics. Collecting the amount of real-time or total bandwidth usage may be performed in a number of ways, including examining a priority bit marking ('P' bit), type of service (TOS) bit marking, virtual local area network Class of Service (COS) marking, IP address and/or port. Additionally, probes, queuing, scheduler, bus, or path metrics may also be used with any other information associated with a data packet that is capable of indicating whether one or more data packets are real-time or non-real-time may be used in collecting real-time and non-real-time bandwidth usage. For example, accessing other in-use protocol stacks via probes or "cross stack" communication can provide information from real-time control protocols, such as Real Time Protocol (RTP) and Real Time Control Protocol (RTCP). Real-time protocol packets may be used to identify real-time bandwidth rate of communication sessions data packets. By determining bandwidth of real-time and total data packets, and optionally other PIP information, a call control manager 310 may manage network communications sessions in a more intelligent manner. Determining transmission rates may be performed at Layer 1 or Layer 2 of the OSI model. However, it should be understood that determining the network performance information may be performed on a different layer if information is available on the different layers to provide enough information to determine bandwidth utilization of real-time and total data packets being communicated over a node segment. These segments may be a shared path resource as in a media gateway to media gateway path, pin-hole firewall access node path, or they could be to a single subscriber end-point or intermediate trunking point. It is understood that multiple communications devices share the same transmission path and no single session controller may have knowledge of the in-use real-time data packet counts or bandwidth state without this information being derived from the use of PIP packets.

Continuing with FIG. 3, the transmission performance collection units 306 may include one or more modules to determine the network performance information, both with respect to the communication of real-time content and non-real-time content, number of real-time sessions, packet loss rate, jitter, delay, etc. The module(s) may be in the form of software executed by one or more processors, hardware (e.g., ASIC chips), external probes, firmware, or a combination of hardware and software, as understood in the art. The modules may be configured to count the number and size of total data packets and bandwidth of real-time data packets and non-real-time data packets that are being communicated over a node segment (i.e., one or more communications links between two network nodes or connections, processes, or components within a network node), also referred to herein as a network segment. A communications path may include one or more node segments. Counts may include data packets and real-time packets with and/or without error rate. It should be understood that counting non-real-time data packets is equivalent to counting real-time data packets and total bandwidth because real-time data packets may be determined by subtracting non-real-time data packets from total data packets and bandwidth. In one embodiment, multiple channels may be utilized to communicate real-time data packets and non-real-time data packets along different paths through one or more devices and communications paths. Channels may include virtual or physical paths constructed of ports, buses, schedulers, shift registers, cards, and chips used to transfer or move packets through the device. Real-time packet flows may be separated by assigning ports, markings, size, type, and/or other sorting and scheduling methods to map specific traffic to a specific route or path. Using different channels for real-time and non-real-time data packets may enable counting real-time data packets and non-real-time data packets faster than having to analyze information contained within the data packets (e.g., P-bit in data packet header). Alternatively, real-time and non-real-time ports may be configured at a network node to monitor and measure real-time and non-real-time data packets, transmission times, or given path or resource utilization. Real-time and non-real-time bandwidth utilization can also be measured by the amount of time the resource is not in use by multiplying the transmission rate of the path or resource. In addition to measuring the amount of real-time and non-real-time bandwidth utilization, a second measurement to characterize the burst nature (burstiness) of the data flows may be performed. When multiple packet flows of different packetization rates and different bandwidth utilization rates are combined, an average and peak utilization occurs. One example of a measurement to characterize the burstiness of combined real-time flows includes using standard deviation of the peak from the average calculation. Other mathematical methods may be applied to characterize this ability to over-subscribe the real-time flows based on fluxuation in real-time bandwidth usage during the sampling window that calculates average bandwidth use. This added measure of burstiness can be used optionally with the real-time bandwidth usage. Because PIP data packets 302 effectively operate as a clock on an asynchronous network the transmission performance collection units 306 may monitor and/or inspect the PIP data packets 302 to determine rates of total data packets and bandwidth, real-time data packets and bandwidth, and non-real-time data packets being communicated over a network segment.

FIG. 4 is an illustration of an exemplary data packet stream 400 including PIP data packets 402 and data packets 404a-404n (collectively 404), the latter including a packet payload of either real-time or non-real-time content. Each of the data packets 404 may include a header portion including a destination address 406a and origination address 406b, among other header information, and a content or packet payload portion 406c that includes either the real-time or non-real-time data along with other transmission characteristics. Although only a single data packet 404a is shown between successive PIP data packets 402a and 402b, as understood in the art, there may be many data packets 404 that are communicated between successive PIP data packets. By determining a total number of data packets and packet size both real-time and non-real-time, communicated during a time duration (e.g., 1 second) and a number of real-time data packets communicated during that time duration, bandwidth of the total number of data packets and real-time data packets communicated over a node link may be determined. Alternatively, the amount of time a communications path or resource is not in a transmission state may be utilized to determine bandwidth and data packets communicated. Additional information, such as the distribution, burstiness, or timing of the real-time flows, may also be made available within the PIP packets 402. Together, the real-time and non-real-time packets may be used in conjunction with the link capacity to calculate the average utilization over the interval. The bandwidth determination may be performed by monitoring the PIP data packets 402 that are collected to indicate that the time period has completed or inspecting the timestamps contained within each of the PIP data packets 402, which may be more accurate. Monitoring the PIP packets 402 may include monitoring one or more PIP packets 402. Performance calculation modules may track utilization and performance of communications paths and node segments, and create historical performance and utilization measure logs. Collected performance information may be used to detect threshold crossings to be communicated to session controllers, as further described herein. Other network performance information may be determined by monitoring the PIP data packets 402, including jitter, packet loss, and delay, as the PIP data packets 402 may include information indicative of time sent and counter value indicative of number of data packets sent between the previous and current PIP packet. The network performance information may further be categorized as real-time, non-real-time, and/or total network performance information (see TABLE I). In one embodiment, intermediate levels may also be established, such as near-real-time, higher priority non-real-time, etc.

FIG. 5 is a block diagram of an exemplary network node 500 configured to perform functionality in accordance with the principles of the present invention. The network node may include a processing unit 502 that includes one or more processors that execute software 504. In one embodiment, the software 504 may include module(s) that operate as a transmission performance collection function to collect network performance information. The processors 502 may be in communication with a memory 506 configured to store information, such as network performance information, in registers or one or more tables in memory, as understood in the art. The processors 502 may further be in communication with an input/output (I/O) unit 508 that is configured to communicate over one or more communications networks. I/O unit 508 may include one or more access ports (not shown). The processors 502 may also be in communication with a storage unit that is configured to store one or more data repositories (e.g., databases) that store network performance information. The storage unit may work in conjunction with the memory 506.

These memory registers are sometimes referred to as bins. The network node 500 may be one of a wide variety of network nodes, including the Maintenance-End-Points (MEPs) and Maintenance-Intermediate-Points (MIPs) of a Maintenance Entity Group (MEG). The MEPs may include access node devices, such as a digital subscriber line (DSL) modem, or Cable Modem and its corresponding Access node DSLAM or Cable Management Termination System (CMTS). Mobile data element, SIP phone, Video On Demand (VOD) Server or a Media Gateway (MG) device, and/or network-to-network interface (NNI), for example. Additionally, the MEPs may include user network interfaces integrated access devices (IADs), session initiation protocol (SIP) devices, or other end-user devices or customer premises equipment (CPE). The MIPs may include bridges, switches, and routers, for example.

In one embodiment, the memory 506 may store network performance information in bins over a short period of time, such as seconds or minutes, and the storage unit 510 may store historical network performance information for longer periods of time, such as hours, days, weeks, or longer periods of time. By storing recent network performance information, remote network nodes (e.g., call control manager, and resource allocation systems and software) may poll the network node 500 for the network performance information and receive the network performance information in a relatively short period of time as compared to the network node 500 having to access the network performance information from the storage unit 510. Periodic updates may be retrieved via polling, event driven on a regular time basis or during unit initiation or power off, or trigger driven events may also be utilized to transmit the network performance information. The network performance information may include network performance information indicative of data packets including real-time and non-real-time content. TABLE I is an exemplary table that describes an example of network performance information as associated with real-time and non-real-time data packets. Although not illustrated, such data may be identified for communication in each direction over a particular node segment.

TABLE I

Real-Time and Non-Real-Time Network performance information

| Characteristic | Real-Time Measure | Total/Average |
|---|---|---|
| Max Packet Count | 877 | 34749 |
| Avg Packet Count | 852 | 32833 |
| Active use time | .87 | 30005 |
| Peakedness characteristic | 128 | 200 |
| Time Period | 1 s | 1 s |
| Number of RT sessions | 156 | 187 |
| Max Bandwidth (Kbps) | 877 | 34.75 |
| Avg Bandwidth (Kbps) | 852 | 32.83 |
| Packet Loss | 37 | 241 |
| Jitter | .004 s | .006 s |
| Delay | .020 s | .028 s |

Although the time period is shown as 1 second, it should be understood that any time period may be utilized to collect the network performance information. Multiple tables or bins may be used to tabulate different time periods, such as 15 minute, 1 hour, 1 day, and so forth, may be managed for storing the same, different, or additional network performance information and, optionally, over different periods of time. In one embodiment, historical network performance information may be stored in a database to enable a call control manager the ability to predict usage of the network node 500 during an upcoming time period (e.g., next 5 second, next 2 minutes, next day, etc.). For example, if the network node is over-subscribed with users who perform real-time data downloads during the 7 pm-9 pm timeframe, then the call control manager may utilize that information to route certain calls to other network nodes that have less utilization during that timeframe. In another example, real-time and non-real-time files may be stored on a Video On Demand (VOD) server, in which case actual real-time use information could be used to load balance system requests. Many other call and network control functions may be employed by knowing the real-time and total data packet network performance information. Other statistical analysis uses of this data are possible. Another near real-time use is a graphical presentation of this data in Operator Network Management Systems (NMS).

Figure 6:
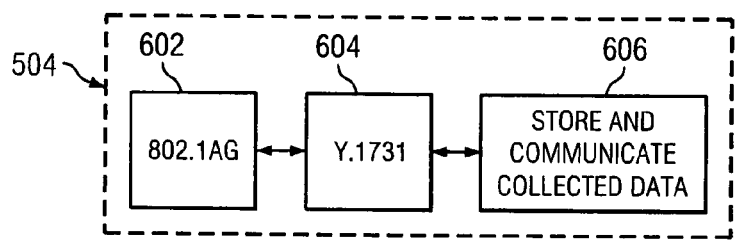
FIG. 6 is a block diagram of exemplary modules configured to determine and collect network performance information in accordance with the principles of the present invention.

FIG. 6 is a block diagram of the software 504 of FIG. 5 and exemplary modules configured to determine and collect network performance information in accordance with the principles of the present invention. In collecting the network performance information, one embodiment of the network node 500 may include IEEE 802.1AG and ITU-T Y.1731 modules 602 and 604, respectively, to generate and receive IEEE 802.1AG data packets and determine network performance information associated therewith. The ITU-T Y.1731 module 604 may be a modified ITU-T Y.1731 function that is configured to collect network performance information associated with data packets containing both real-time and non-real-time content (see, for example, TABLE I). The modified ITU-T Y.1731 module 604 may be configured to collect performance information, such as maximum and average bandwidth for both real-time and total data packets along with other transmission characteristics that are being received and/or transmitted from the network node. One or more modules 606 may be configured to store and communicate collected transmission performance data. As described with respect to FIG. 5, the transmission performance data may be stored in memory and/or storage unit in one or more data repositories, such as database(s) or table(s). Communication of the collected transmission performance data may be triggered by event threshold crossings or pulled by another network system, network node, Element Management Systems, or call control manager, for example, and be performed on a routine basis or in response to a poll, audit, or event (e.g., dropping below a transmission quality threshold). In addition, although 802.1AG and ITU-T Y.1731 standards are presented for generating PIP data packets and collecting network performance information, the principles of the present invention may use other standards and protocols for collecting network performance information for real-time and total data packets being communicated over a node segment.

Figure 7:
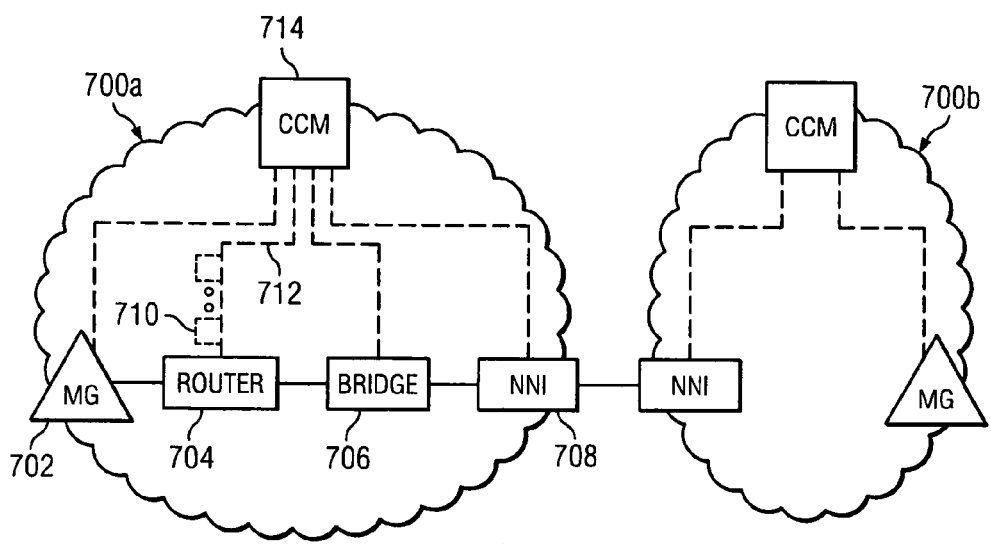
FIG. 7 is an illustration of multiple exemplary data packet networks having exemplary network nodes configured to determine and collect network performance information.

FIG. 7 is an illustration of multiple exemplary data packet networks 700a and 700b (collectively 700) having exemplary network nodes configured within the networks 700 to determine and collect network performance information. The data packet network 700a includes a media gateway 702, router 704, bridge 706, and network-to-network interface (NNI) 708. Other network nodes, such as a session border controller, switch, firewall, computer, satellite, service point or broadband node gateway (VOD server, IP service point, end-point), CPE (customer premises equipment), wireless handset, or any other packet service network node may be configured in accordance with the principles of the present invention. More specifically, each of these network nodes may be configured with modules, such as the modules described with respect to FIG. 6, which produce PIP data packets and collect network performance information for both real-time and total data packets communicated over the network. In one embodiment, a network node, such as router 704, may collect and communicate the network performance information in the form of data packets 710 via communication link 712 to a call control manager 714. The communication of the network performance information may be communicated to the call control manager 714 in response to a poll from the CCM 714, periodically, or in response to an event (e.g., packet loss dropping below a predetermined percentage). Because the CCM 714 communicates with multiple network nodes, the CCM 714 may be configured to route calls based on the network performance information collected from the network nodes.

The PIP data packets that are communicated present an opportunity for network performance information to be communicated along a network path. In one embodiment, network performance information may be collected and appended to or otherwise inserted into PIP data packets so that other network nodes can monitor performance along a virtual path. For example, the network performance information may be collected by a network node, stored in a database, and a summary may be appended with a PIP data packet and communicated to another network node to which the PIP data packet is communicated. This concatenation process may be performed at regular intervals such as every 5 minutes, hourly, or daily, to minimize the amount of data communicated over the data packet network and stored at network nodes. The CCM 714 may collect and store historical network performance information and utilize such information to monitor trends in the network 700*a* and automatically alter network operation or enable network operators to reconfigure the network. For example, if it is determined that the paths to a network node or the network node itself is not operating properly, the CCM 714 may choose or establish a virtual path through different network nodes or different paths through the same node than would otherwise not have been established. As another example, if data packets are being lost, the CCM may choose to force existing and new call sessions to use CODECs of a lower compression rate on the node segment to alleviate congestion and improve call connectivity.

Figure 8:
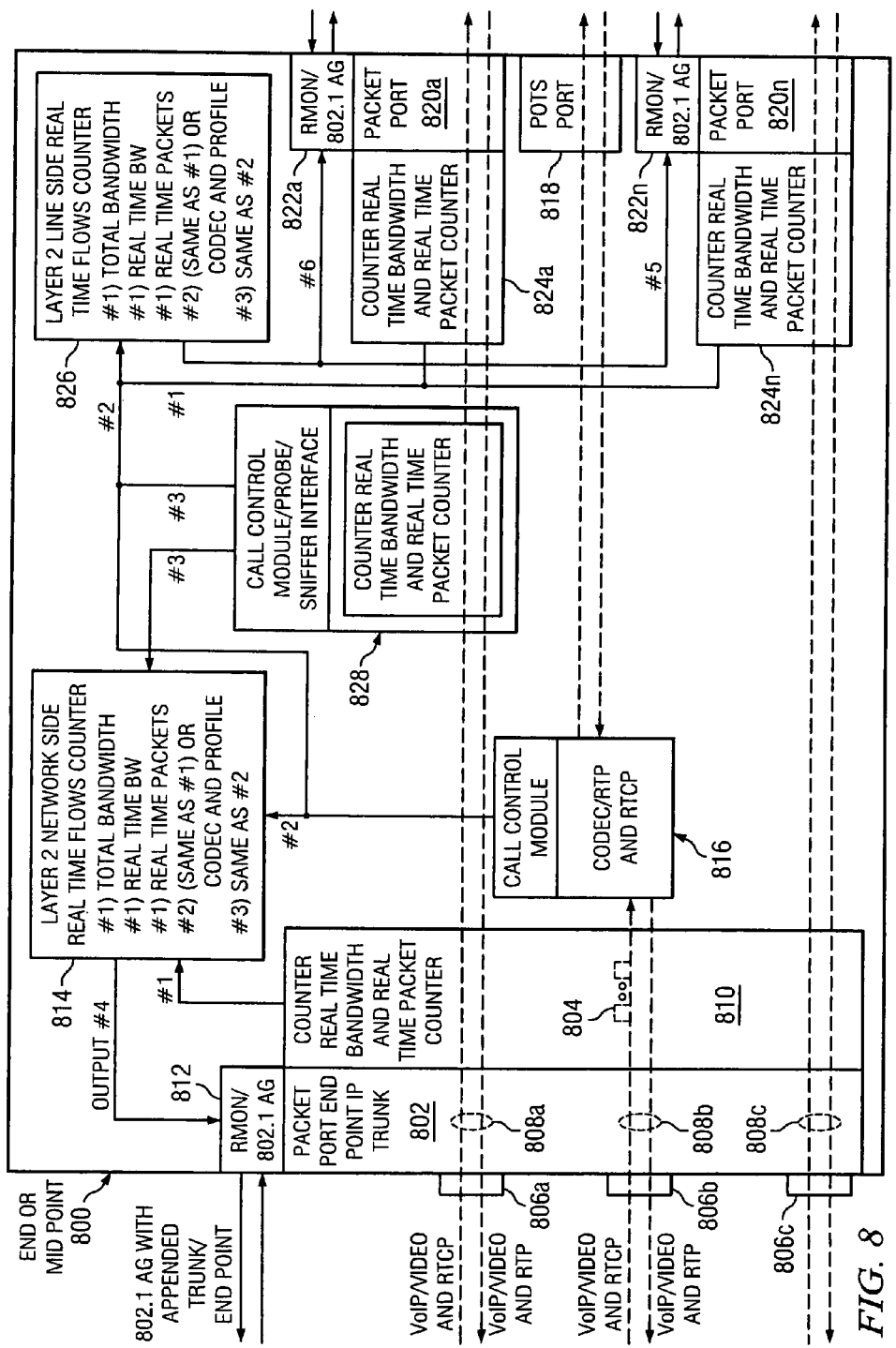
FIG. 8 is a block diagram of an exemplary end or mid-point device showing structural and functional operations used for employing the principles of the present invention.
Figure 9:
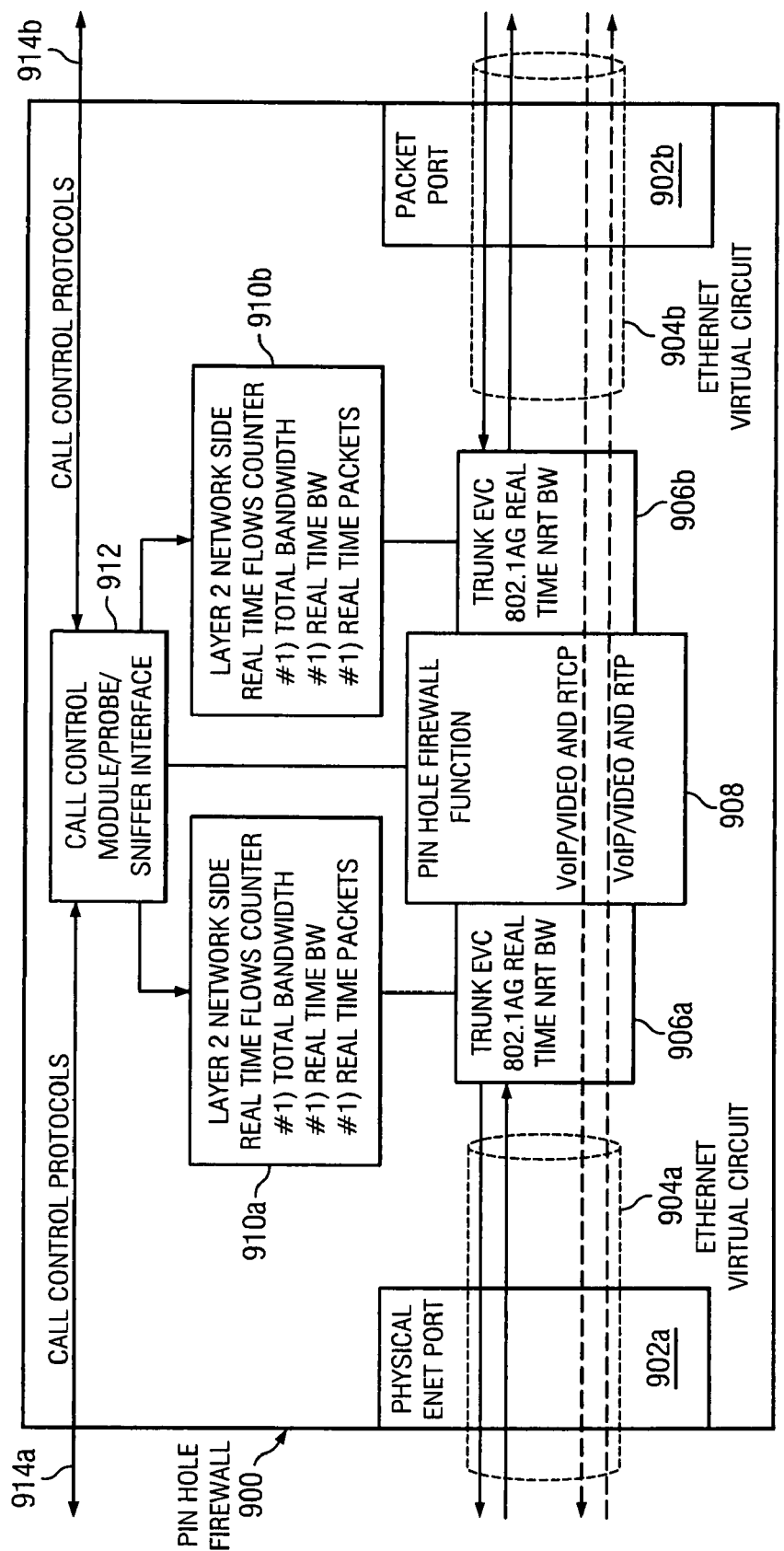
FIG. 9 is a block diagram of an exemplary pin-hole firewall device showing structural and functional operations used for employing the principles of the present invention.
Figure 10:
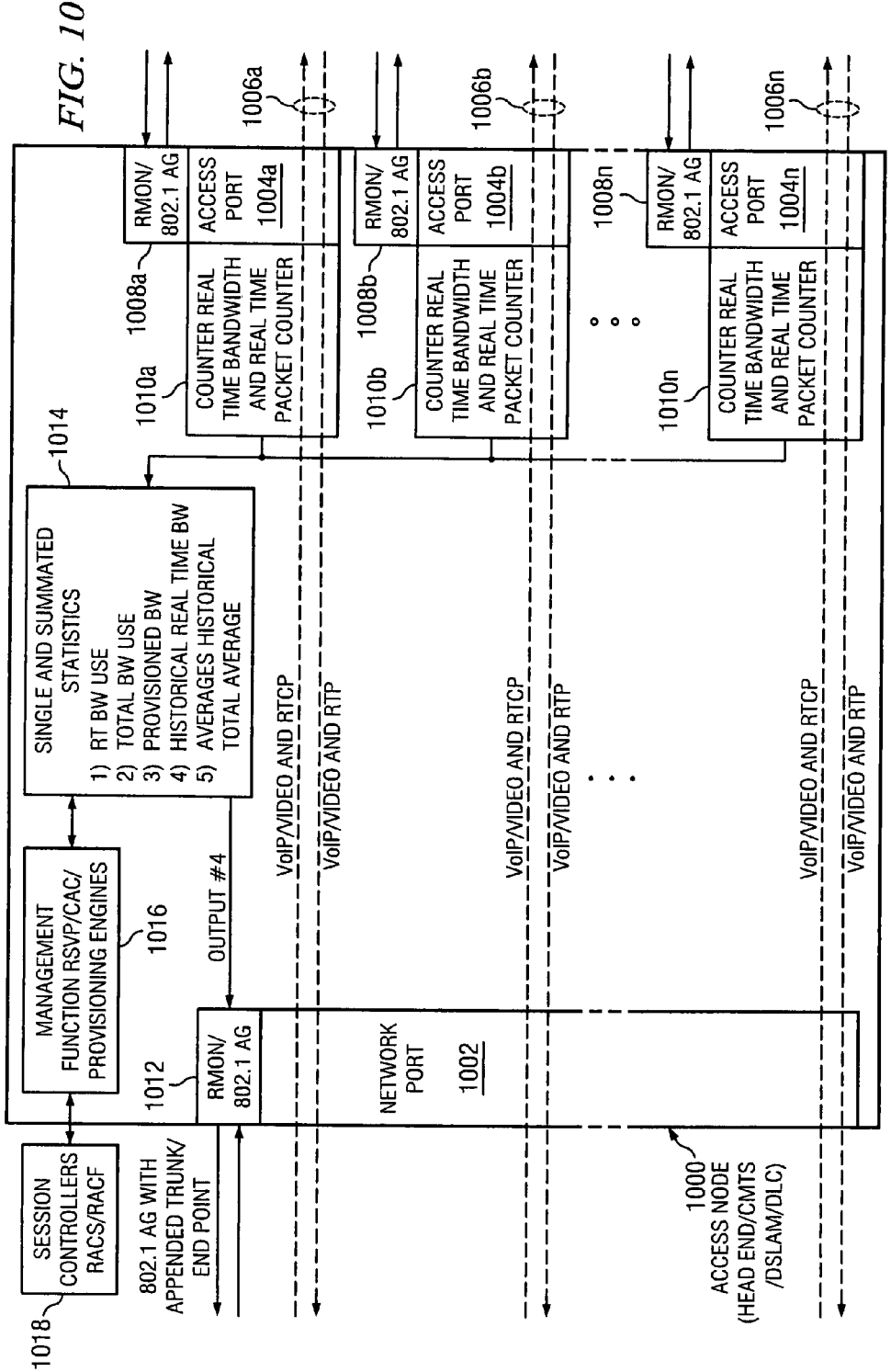
FIG. 10 is a block diagram of an exemplary head-end device showing structural and functional operations used for employing the principles of the present invention.

FIGS. 8-9 are block diagrams that more specifically describe structural and functional operations of network communications devices, (i) end or mid-point devices (FIG. 8), (ii) firewall device (FIG. 9), and head-end device (FIG. 10).

FIG. 8 is a block diagram of an exemplary end or mid-point device or network communications device 800 showing structural and functional operations used for employing the principles of the present invention. The device 800 includes a network packet port or end-point IP trunk 802 that is configured to transmit and receive real-time traffic, such as VoIP, video, RTCP and other real-time data packets 804, via one or more data ports 806*a*-806*c* (collectively 806). Each of the data ports 806 may have one or more communications lines 808*a*-808*c* (collectively 808). Network counters 810 may operate at the network packet port 802 to count data packets including real-time content and total data packets. It should be understood that the network packet port 802 may receive data packets including both real-time and non-real-time content and that data packets containing real-time content should not be delayed any more than is proper to allow for real-time communications (e.g., telephone calls) to occur without an end-user noticing the delay. A remote monitoring function 812 that is associated with the network packet port 802 enables various network monitors and console systems to exchange network-monitoring data, in the exemplary case, 802.1AG data. A set of network-side counter functions 814, which may be executed on one or more processors or be a hardware device (modules), operate to count and determine a number of real-time data packets and total data packets (i.e., number of data packet having real-time and non-real-time content), and determine bandwidth for the data packets including real-time content and bandwidth of total data packets over a time period. The network side-counter functions 814 may be performed on each port, line, and/or entity and generate the network performance information (e.g., packet count and bandwidth) for both transmitted and received data packets. Performance collection engines are understood to be located at the same end-point 812 that transmits the PIP information to the far-end. However, the performance collection engines receive a PIP stream from the far-end for the purpose of measurement and collection.

A call control module 816 connected between the network packet port 802 and a plain old telephone system (POTS) port 818 on a line side of the network communications device 800 may operate to control and manage call connections for a network communications device 800. The call control module 816 may include one or more CODECs using real-time transport protocol (RTP) and/or real time control protocol (RTCP). The network-side counter functions 814 may be in communication with the call control module 816 and generate packet count and bandwidth information based on the data packets being handled by the call control module 816. As understood in the art, CODEC stacks may be any session control protocol based or operate in-band, such as Internet Group Management Protocol (IMGP) for video multicasting, and may have knowledge of the type of call being set-up. Such a configuration also applies to pin-hole firewalls, media gateways, call controllers, and bandwidth reservation protocol systems that use control stacks, bandwidth reservation or resource reservation functionality. It is understood that a network-side counter function may also contain a pseudo utilization counter that indicates bandwidth reservation use information to be passed along with real bandwidth utilization performance and utilization information. The pseudo or reserved use provides an indication of bandwidth use for calls that are being setup, on hold, or simply being reserved. The reservation information may be used in providing the session controllers with the information collected or determined at the network segment. The CODEC stacks and real-time protocols can be used to track correlated per session bandwidth use and report total use to the network side counter function. A few example techniques for counting data packets and determining bandwidth of data packets including real-time data packets and total data packets are provided below:

(i) bandwidth use via reading CODEC settings and packetization rates, (a) in use, and (b) reserved (ii) if IGMP is used for video, (a) track total number of streams—real time, and (b) track individual stream use (bandwidth varies) via CODEC and packetization rates.

Additionally, any network EMS or protocol stack provisioning engine may communicate with the counters 814 and 826 so as to monitor call shaping at the network communications device 800. Real-time performance engines and probes may also communicate with control stacks. Client interacting control stacks may enable a user to select functions to perform in user devices. In summary, these applications may be used on (i) virtual, logical, and physical ports, (ii) firewalls, (iii) traffic shaping instances, (iv) service agents, (v) network elements, and element schedulers, (vi) and/or service points, such as gateways, VOD servers, and conference bridges for example.

The network communications device 800 may further include one or more line-side packet ports 820*a*-820*n* (collectively 820) that are configured to communicate data packets. The line-side packet ports 820 may include respective remote monitors (RMONs) 822a-822n (collectively 822), PIP generators, and performance collection elements (not shown), that are used for exchanging network monitoring data with other network devices and counters 824a-824n (collectively 824). Similar to the network side, the line-side may include a set of line-side counter functions 826 that count packets and determine bandwidth of data packets containing real-time content and total data packets. A call control module, CODEC stack, probe/sniffer interface 828 may be connected to a network-side port and line-side port. The call control module probe 828 may be in communication with both the network-side counter functions 814 and line-side counter functions 826 to count data packets and determine bandwidth of data packets being communicated between a network-side port and line-side port.

FIG. 9 is a block diagram of an exemplary pin-hole firewall device 900 showing structural and functional operations used for employing the principles of the present invention. The pin-hole firewall device 900 includes multiple physical and logical ports 902a and 902b (collectively 902) through which data packet communication sessions are passed via a shared trunk or Ethernet Virtual Circuits (EVCs) 904a and 904b (collectively 904). The data packets (not shown) communicated over the EVCs 904 are communicated through counter and computation functions 906a and 906b (collectively 906) that are configured to count data packets including real-time and non-real-time content and determine bandwidth associated with each. In determining bandwidth, PIP data packets, may be used as a clock. The counter and computation functions 906 may be disposed prior to a pin-hole firewall function 908 that operates by allowing an application to take control of a port during a communication session. The counter and computation functions 906 have respective flow counters 910a and 910b (collectively 910) that operate to individually count real-time data packets and total data packets. In addition, the flow counters 910 may perform the computations for bandwidth for each port. A call control module probe/sniffer interface 912 may be in communication with the flow counters 910 and pin-hole firewall function 908 to provide input into the flow counters 910 based on call control protocols 914a and 914b, respectively. The counter functions store the utilization and performance management information as a measured resource for both the network element itself, and the session controllers with which the pin-hole firewall may communicate. Communication of the performance and utilization information can be with but not limited to, a session controller, bandwidth reservation system, network management system, higher layer IP protocols, and other communication systems and systems software. Further description of the operation of collecting and communicating network performance information from the pin-hole firewall device 900 is provided in FIG. 11.

FIG. 10 is a block diagram of an exemplary access node device 1000 showing structural and functional operations used for employing the principles of the present invention. The access node device 1000 may be configured as a head-end device (e.g., video distribution system), cable modem termination system (CMTS), digital subscriber line access multiplexor (DSLAM), or digital line concentrator (DLC), for example. The access node device 1000 may include a network port 1002 and access ports 1004a-1004n (collectively 1004) that are connected to communication lines 1006a-1006n (collectively 1006). VoIP, video, and RTCP or other real-time data packets, for example, may be communicated over the access transmission paths or communications lines 1006. Remote monitors 1008a-1008n are respectively associated with each of the access ports 1004 and may operate to receive 802.1AG data packets or otherwise and include PIP packets and performance collection-functions. Also associated with the access ports 104, counters 1010a-1010b (collectively 1010) may be configured to count total data packets and data packets containing real-time content being received via respective communication lines 1006. It is understood that some of the real-time information flows at this node may be available via control protocol implementations, such as Video IGMP, in which case the control protocol stack or other counter mechanisms can be utilized to measure and report real-time traffic to the PIP generators. It is also understood that other real-time streams may exist that are not under the control of a protocols stack at this node in which case the real-time and total bandwidth characteristics may be measured via methods described herein. A remote monitor 1012, which may include a PIP packet generator and performance collector, may be associated with network port 1002 and be used to generate and communicate 802.1AG data packets having network performance information generated by a statistics engine 1014. The statistics engine 1014 may be configured to generate statistics associated with the data being communicated from the access ports 1004 to a communications network (not shown) via the network port 1002. The statistics may include raw data and mathematically computed data, including (i) real-time bandwidth, (ii) total bandwidth, (iii) provisioned bandwidth, (iv) historical real-time bandwidth, and (v) averages, such as average real-time bandwidth and average total bandwidth. Indicia representative of the statistics may be communicated to the remote monitor 1012 and communicated to other network devices to which the access node 1000 is in communication by appending the indicia to PIP data packets, for example, or otherwise communicate the statistics in separate data packets. The indicia may be in any form, such as XML, of a communication protocol being communicated from the RMON 1012 and/or network port 1002. Threshold crossings may trigger special messages to other systems, as well as systems polling the measured resource pool inside the statistics engine 1014. Further description of the operation of collecting and communicating network performance information of the access node device 1000 is provided in FIG. 11.

A management function 1016 may be in communication with the statistics engine 1014 and include a number of management functions, including, but not limited to, resource reservation protocol (RSVP), call admission control (CAC), and provisioning. Session controllers 1018, which may be external from the access node 1000, may be a resource access control system or facility (RACS or RACF) that operates as a security system and provides access control and auditing functionality. The session controllers 1018 may communicate with the management function 1016 to monitor operation of the access node 1000 by collecting the statistics generated by the statistics engine 1014.

Figure 11:
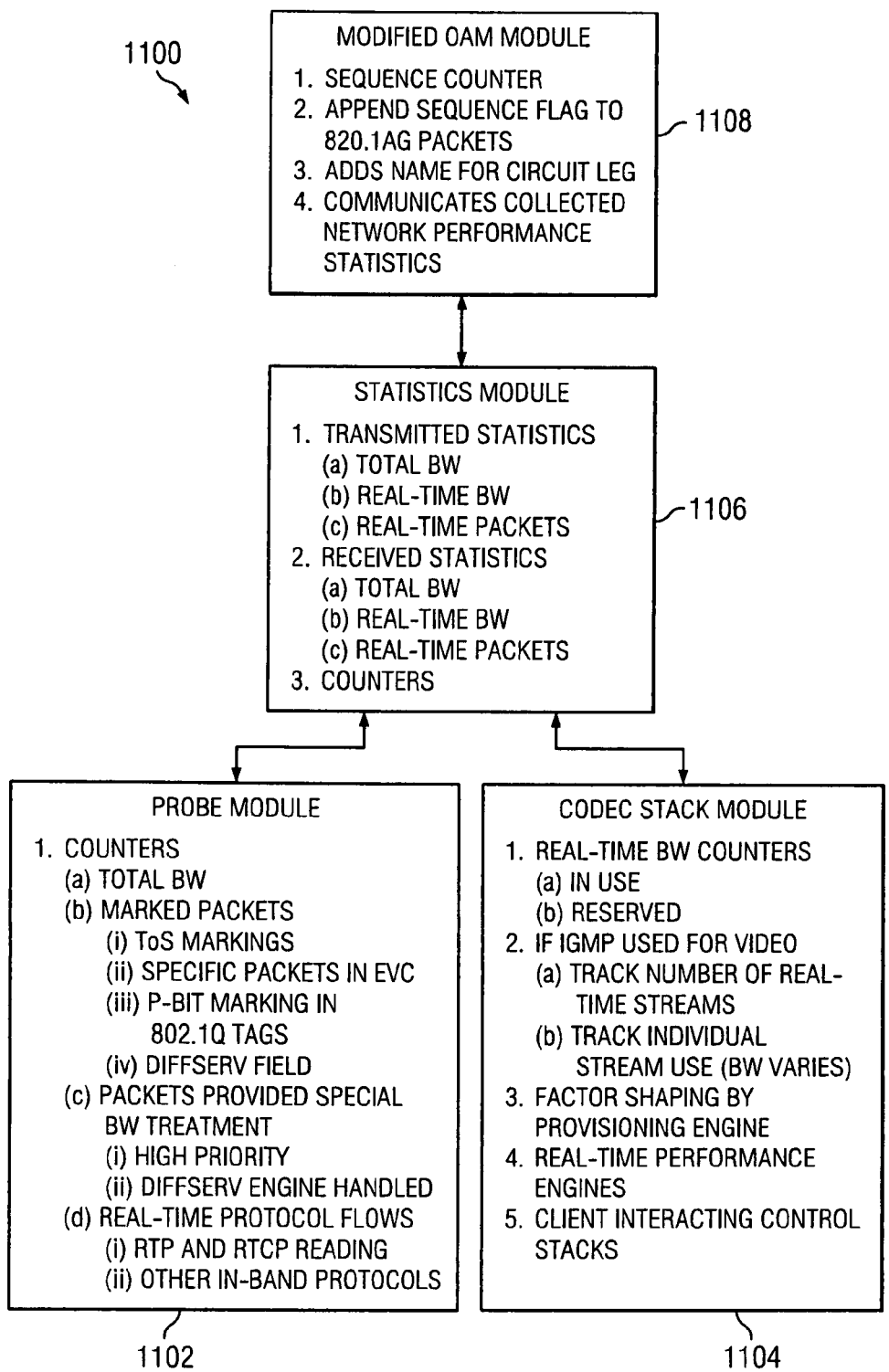
FIG. 11 is a block diagram of exemplary modules configured to determine network performance information associated with data packets communicated with network communication devices described in FIGS. 8-10.

FIG. 11 is a block diagram of exemplary modules 1100 configured to determine network performance information associated with data packets communicated with network communication devices described in FIGS. 8-10. The modules 1100 may be configured as software, hardware, firmware, or combination thereof and be generalized into the standards for different network communications devices to ensure consistency throughout one or more networks. The modules may include a probe module 1102, CODEC stack module 1104, statistics module 1106, and statistics modified operations, administration, and management (OAM) module 1108. The probe module 1102 operates using counters to count various types of data packets, including (a) total packets and/or total bandwidth, (b) marked packets, (c) packets provided special bandwidth treatment, and (d) real-time protocol flows (e) or other. The marked packets may be counted based on specifics within the packet such as (i) specific type of service (ToS) level markings contained in the IP header, (ii) specific packets in an Ethernet virtual channel (EVC) or Class of Service markings (COS), (iii) P-bit marking used in 802.1Q tags, (iv) differentiated services (Diffserv) field (IP header), or any other suitable basis. The packets provided special bandwidth treatment may include: (i) specific packets in high priority schedules (hardware specific), and (i) being treated by a QoS engine (such as Diffserv). The investigation of real-time protocol flows may include (i) RTP & RTCP reading (observing the real use in the header), and (ii) other in-band protocols that can be read in terms of use (e.g., CODEC, profile, bandwidth, call reservation, etc.). The counters may be pushed, polled or be accessed by the statistics module 1106.

The CODEC stack module 1104 may include real-time counters and be influenced by operation of the CODEC Real-time data packet counters may count when the CODEC stack is (a) in use and/or (b) reserved or (c) other. Counters may also track IGMP use for video to count (a) number of real-time streams and/or (b) individual stream use, where the bandwidth may vary. Further, traffic shaping by a provisioning engine may be factored by the CODEC stack module. Real-time performance engines that interwork with control stacks may also affect how the count of the CODEC stack module operates to collect network performance information. Client interacting control stacks that allow the user to choose functions to control specific applications may be tracked.

The statistics module 1106 may operate to collect statistics or performance information of data packets including real-time content (e.g., VoIP data stream) and total data packets communicated to and from the network communications device. In one embodiment, the statistics module 1106 is a modified Y.1731 application. The statistics module 1106 may operate to collect (1) transmitted statistics, (2) received statistics, and (3) individual counters for each port, line, or entity. The statistics module may perform mathematical calculation on the collected information. The transmitted statistics may determine, for example: (a) total bandwidth based on all the data packets that are communicated over a time period, where the time period may be determined from PIP data packets generated by the network communications device, (b) bandwidth of the real-time data packets communicated during the time period, (c) real-time data packets counted, and (d) other collected or processed information. The received data packet statistics may include the same as the transmitted statistics, including (a) total bandwidth of all the data packets counted, (b) real-time bandwidth of the real-time data packets, and (c) real-time data packets counted, and/or (d) other collected or processed information. It should be understood that other statistics, including average values, maximum values, trended prediction values, or other suitable measurements or calculations that could be beneficial to other network communications devices or soft-switches (e.g., call control manager) may be collected.

The modified OAM module may include any of the following functions: (1) sequence counting to ensure that data packets are being received in the proper sequence, (2) appending a sequence flag to 802.1AG packets, (3) adding a name for a circuit leg or segment, (4) including indicia in data packets to identify a carrier collecting network performance information, and (5) communicating collected transmission performance statistics. The communication of the collected network performance statistics may be performed in response to a poll from another network device (e.g., call control manager), in response to an event, or periodically. Such communication may be accomplished by communicating the network performance information or statistics by appending or otherwise including the information with other data packets. For example, the network performance information may be added to payloads of data packets that are being communicated to other network nodes.

Figure 12:
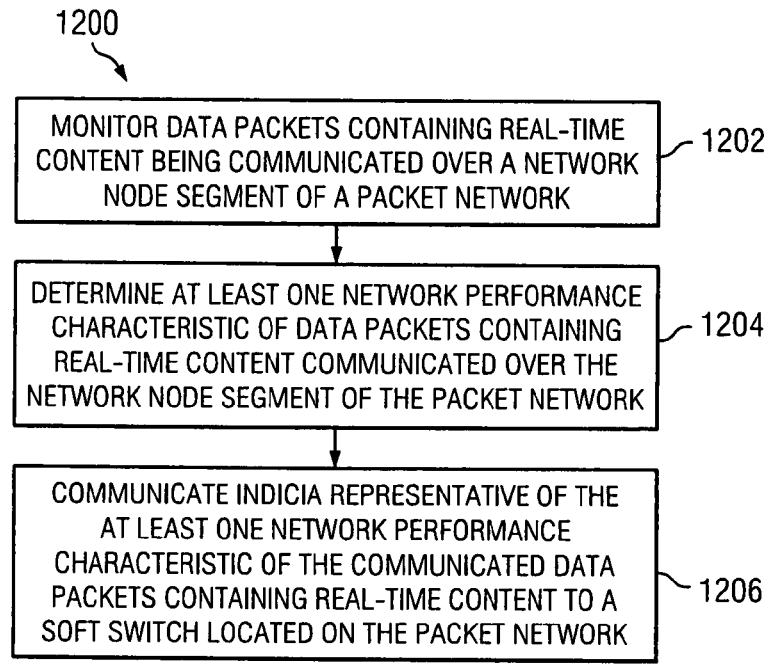
FIG. 12 is an illustration of exemplary processes performed on network nodes in a data packet network.

FIG. 12 is an illustration of an exemplary process 1200 performed on network nodes in a data packet network. The process 1200 starts at step 1202, where data packets containing real-time content (e.g., from a telephone call) being communicated over a network node segment of a packet network are monitored. Monitoring the data packets may include determining that the data packets include real-time content in the payload by examining the header for the P-bit or otherwise determining that the content includes real-time content. At step 1204, at least one item of network performance information associated with data packets containing real-time content communicated over the network node segment of the packet network may be determined. The network performance may include real-time bandwidth usage, total bandwidth usage, packet loss, delay, and/or jitter, for example. While such network performance information is typically used for determining operation of a node segment, other performance characteristics, such as packet rate and bandwidth, may also be collected for real-time and total data packets. At step 1206, indicia representative of the at least one item of network performance information regarding the communicated data packets containing real-time content may be communicated to a network element, such as a soft switch or call control manager. The indicia may be in the form of a Call Control protocol, SNMP message, XML protocol, HTML protocol, or any other protocol utilized by a data packet of a communications standard.

Distributed Transmission Performance Tables in Network Nodes

Figure 13:
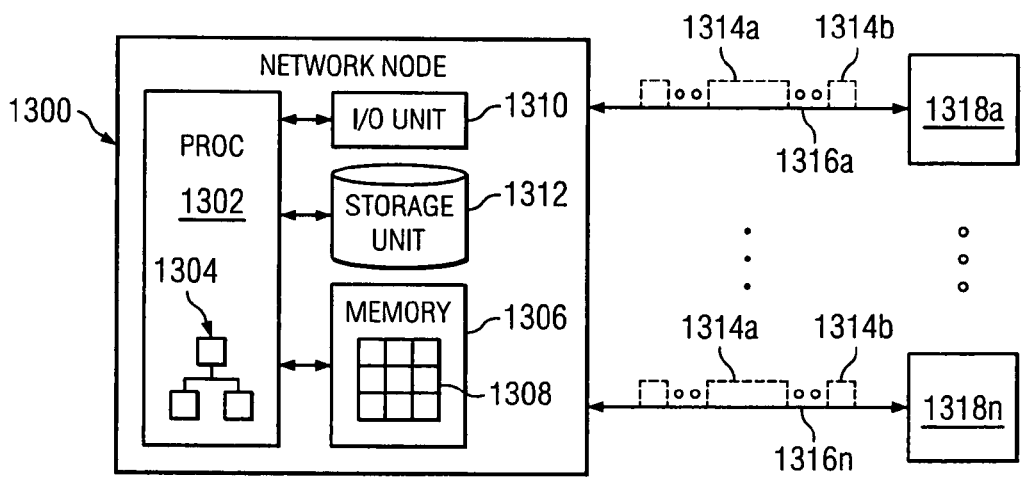
FIG. 13 is an illustration of an exemplary network node configured to perform functionality and communications over a packet network in accordance with the principles of the present invention.

FIG. 13 is an illustration of an exemplary network node 1300 configured to perform functionality and communications over a packet network in accordance with the principles of the present invention. The network node or network communications device 1300 may include a processor 1302 that executes software 1304 to perform operations for the network node 1300. The network node 1300 may be a router, switch, media gateway, or other network communications device, and include software that performs any function associated with typical operations of a network node. The processor 1302 may be in communication with the memory 1306. The memory 1306 may store a table that includes network performance information associated with node segments over which the network node 1300 communicates. The processor 1302 may further be in communication with an I/O unit 1310 and storage unit 1312. The I/O unit 1310 may be utilized to communicate data packets 1314, including content data packets 1314*a* and PIP data packets 1314*b* over node segments 1316*a*-1316*n* (collectively 1316) to other network nodes 1318*a*-1318*n* (collectively 1318).

In one embodiment, the PIP data packets 1314*b* may include network performance information of respective network communications devices 1318 describing transmission performance over respective node segments 1316. In addition, each of the network communications devices 1318 may store the network performance information describing the node segments to which each is in communication (e.g., network node 1300). The network performance information may be communicated to the network node 1300 in each PIP data packet 1314*b*, periodically (e.g., every 100$^{th}$ PIP data packet, once per second, every 5 minutes, etc.), in response to an event (e.g., in response to a network performance information value crossing a threshold value), or in response to a poll or request from the network node 1300, for example. The quantity and types of performance information contained in each PIP packet could vary between successive communications. For example, derived or summarized information may be communicated on five minute intervals, and other information may be communicated in other intervals.

As previously described, the software 1304 may be configured to generate network performance information associated with node segments between network nodes. The table 1308 may include network performance information associated with the network node 1300 and network nodes 1318 with which the network node 1300 communicates. Although the table is shown to be stored in memory 1308, it should be understood that the table 1308 may be stored in storage unit 1312 in that the memory and storage unit, for the purposes of the principles of the present invention, are both considered to be memory. It should further be understood that the term table 1308 is generally descriptive of data stored in a defined arrangement of fields and is descriptive of any organized data set, such as a database or data file containing data fields. The term table is also inclusive of multiple tables that are associated with one another.

TABLE II provides an exemplary table including network performance information. The table may include segment numbers or other alpha-numeric indicia, name of associated segment, and network performance information in one or both directions for each network segment or path (e.g., east-to-west, west-to-east). The network performance information may include additional and/or other information representative of transmission characteristics (e.g., transmission rate and bandwidth) along each bearer path. Although not shown, the network performance information associated with data packets including real-time and non-real-time content (see, for example, TABLE IV). TABLE II may also include node segments associated with the internal performance of a network node or network device. For example, if a particular network node is a network switch, the operation of such network switch may impact network performance and thereby may have its own network performance information. For example, a network node, such as a switch or router, may itself cause packet loss or introduce a delay in the delivery of packets. Thus, identifying particular elements or processes within a network node may be useful in monitoring, reporting, compensating for, troubleshooting, or otherwise reacting to problems in network performance. More particularly as illustrated in TABLE II, specific buffers or queues may be identified such as buffer/queue A corresponding to segment number 5. For example, a particular buffer within a network device may overflow resulting in lost data packets at that node and correspondingly an underflow event at a downstream device. Similarly, a particular processor B within a network device is illustrated in TABLE II as being associated with segment number 6. For example, a processor may not be able to keep up with processes required to switch or route packets over a particular network. In fact, many entities are experiencing problems with processor performance as networks become more utilized. Likewise, the internal switching fabric of a particular network device such as a switch or router may also impact network performance as data packets are required to be switched or routed by such device. Such a fabric is illustrated in TABLE II as being associated with segment 7. For example, both packet loss and delay can be introduced by the performance of a switch.

Although not illustrated herein, other software, processes, processors, memory components, or any other component of a particular network node or device that may impact network performance may be included in a table, such as TABLE II, based on data associated with the performance of such components. Likewise, although not illustrated in TABLE II, many other types of network performance information may be included relative to any particular node segment. For example, a wireless switch on a wireless network may have upwards of twenty or thirty factors that influence network performance. For example, interference, signal-to-noise ratio, signal strength, and battery or power level may all affect network performance and may all be represented in a table such as the one illustrated in TABLE II. Likewise, switches, hubs, bridges, or other interfaces between networks, portions of a network, or various media of communications may instead or additionally store information such as alarms, notifications, signal characteristics, or any other suitable type of data capable of being used to evaluate network performance. For example, with regard to a simple T1 connection, the only information available regarding such connection may be the existence of a red, yellow, or green indication or alarm. Likewise, a DSLAM device may have very different information relevant to network performance than the information available from a core IP router. All of the foregoing information is considered network performance information for purposes of this application and may be incorporated in any table, bin, database, or PIP packet described herein.

TABLE II

Network Segment Status Table
Network Segment Status Table

| | | East to West | | | West to East | | |
|---|---|---|---|---|---|---|---|
| Segment # | Name | Jitter | Delay | Packet Loss | Jitter | Delay | Packet Loss |
| 1 | Bearer Path 1 | | | | | | |
| 2 | Bearer Path 2 | | | | | | |
| 3 | Bearer Path 3 | | | | | | |
| 4 | Bearer Path 4 | | | | | | |
| 5 | Buffer/Queue A | | | | | | |
| 6 | Processor B | | | | | | |
| 7 | Fabric C | | | | | | |

TABLE III is another exemplary network segment status table that includes counter and timestamp. The counter and timestamp may be used to determine the network performance information. For example, the receiving node (e.g., node 1318*a*) may use the counter to determine the total number of data packets that were communicated over the node segment or network segment. If, for example, the counter indicates that 200 data packets were communicated since the previous PIP data packet, then the receiving node may determine how many data packets were received to determine if any data packets were lost. For example, if the counter indicates that 200 data packets were communicated and the receiving node determines that 182 data packets were received, then 18 data packets were lost. Also, the delay may be determined by recording the time that the PIP data packet is received and subtracting it from the PIP data packet timestamp.

TABLE III

Network Segment Status Table

| Node Segment | Dir. | Node 1 | Node 2 | Delay | Jitter | Packet Loss | Counter | PIP Data Packet Timestamp (hh.mm.ss.dd.mm.yy) |
|---|---|---|---|---|---|---|---|---|
| 1316a | East | 1300 | 1318a | .04 | .002 | 23 | 234723 | 03.18.43.12.07.07 |
| 1316a | East | 1300 | 1318a | .05 | .003 | 18 | 234923 | 03.18.44.12.07.07 |
| 1316n | East | 1300 | 1318n | .03 | .001 | 3 | 74832 | 03.22.17.12.07.07 |
| 1316n | East | 1300 | 1318n | .06 | .002 | 42 | 75832 | 03.22.18.12.07.07 |

The network performance information shown in TABLES II and III are representative of PIP data packets associated with unidentified content type. However, in accordance with the principles of the present invention, the network performance information may be determined with respect to communications of data packets including real-time content and non-real-time content. TABLE IV includes network performance information that distinguishes real-time content and total content (i.e., real-time and non-real-time). Although the direction is shown as going east in both of TABLES III and IV, it should be understood that west direction network performance information may also be included in the table. By providing network performance information specifically related to real-time data packets, an understanding of how the packet network is operating for different content types can be determined. In addition, these tables can provide network performance information for one-way, bi-directional unicast or multicast traffic flows.

nect based upon some criteria, such a priority bit markings or otherwise. A call control manager or individual node may alter a device (e.g., slow down a CODEC) or communications (e.g., change modulation) to attempt to improve transmission performance. It should be understood that other applications may be derived from monitoring the network performance information contained in the table(s).

Figure 14:
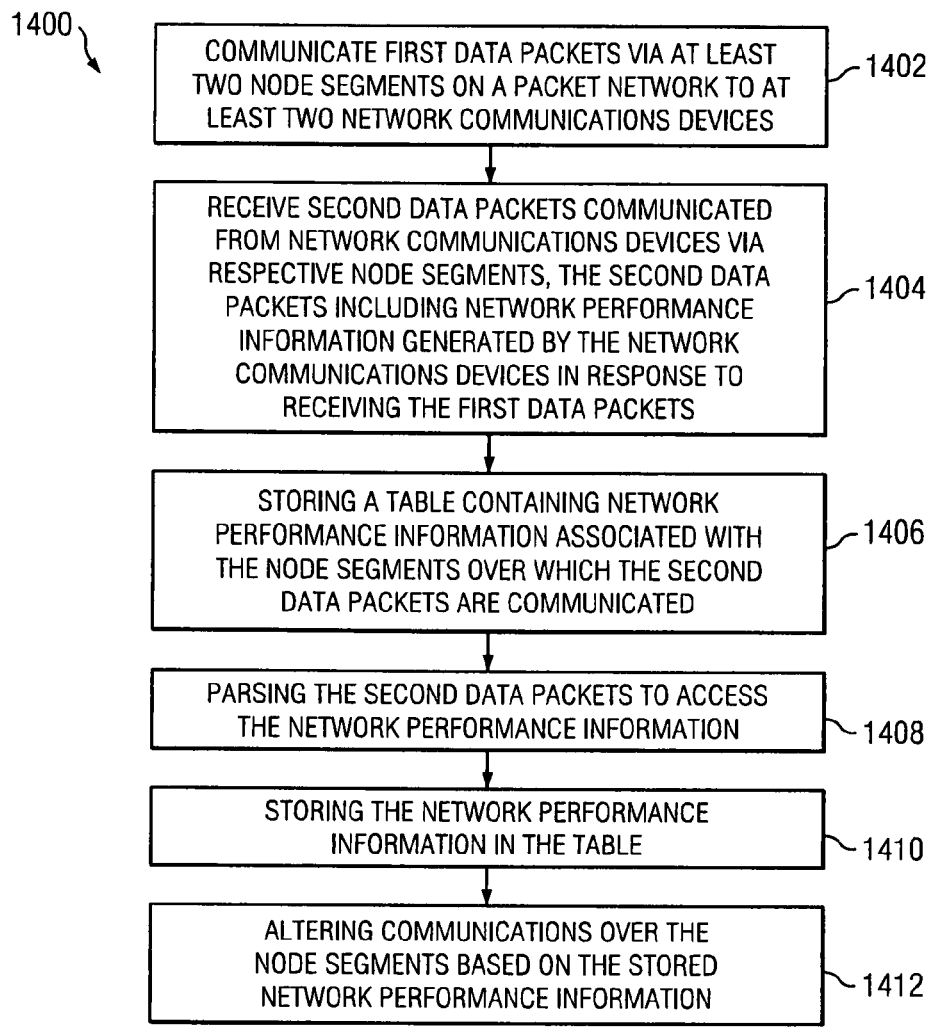
FIG. 14 is a flow chart of an exemplary process for managing network communications.

FIG. 14 is a flow chart of an exemplary process 1400 for managing network communications. The process 1400 may start at step 1402 by communicating first data packets via at least two node segments on a packet network to at least two network communications devices. Second data packets communicated from the network communications devices via respective node segments may be received at step 1404. The second data packets may include network performance information generated by the network communications devices in response to receiving the first data packets. The second data packets may be utilized to exchange transmitted and received

TABLE IV

Network Segment Status Table - Total and Real-Time

| Node Segment | Dir. | Total BW | Total Delay | Total Jitter | Total Packet Loss | RT BW | RT Delay | RT Jitter | RT Packet Loss | RT Counter | PIP Data Packet Timestamp (hh.mm.ss.dd.mm.yy) |
|---|---|---|---|---|---|---|---|---|---|---|---|
| 1316a | East | 1.54 | .04 | .002 | 23 | 1.25 | .03 | .002 | 12 | 234723 | 03.18.43.12.07.07 |
| 1316a | East | 1.62 | .05 | .003 | 18 | 1.27 | .07 | .001 | 9 | 234923 | 03.18.44.12.07.07 |
| 1316n | East | 1.52 | .03 | .001 | 3 | 0.7 | .05 | .002 | 3 | 74832 | 03.22.17.12.07.07 |
| 1316n | East | 2.25 | .06 | .002 | 42 | 1.85 | .04 | .002 | 40 | 75832 | 03.22.18.12.07.07 |

Continuing with FIG. 13, the software 1304 executed by the processor 1302 of the network node 1300 may examine the network performance information in the table and determine whether any of the network performance information parameters cross a threshold value. For example, one or more threshold values may be established for real-time bandwidth use or real-time packet loss or total packet loss. Thresholds could include a derived 'watermark' such as a condition that warrants network operator consideration, but is not critical (e.g., a 'yellow' alarm condition) or 'watermarks' indicating a moving peak during a defined time-window. If the software determines that the packet loss or other data included in the network performance information associated with a node segment crosses above the threshold value, then a call control manager module may be notified to change a network component (e.g., slow down a CODEC) or re-route current and/or future calls from that node segment. Alternatively, if it is determined that the total bandwidth is high while the real-time bandwidth is also high (e.g., node segment 1316n at time 03.22.18.12.07.07), then the call control manager may initiate processes to slow down or halt the set up of new data streams containing non-real-time or real-time content until the real-time content demand decreases or initiate a disconperformance information between network segment endpoints. In one embodiment, the first data packets are PIP data packets. In addition, in one embodiment, the second data packets are PIP data packets. At step 1406, a table containing network performance information associated with the node segments over which the second data packets are communicated may be stored. At step 1408, the second data packets may be parsed to access the network performance information, wherein parsing includes reading the content contained in the second data packets. In one embodiment, field identifiers included in the packet may define the start and end of a transmission performance parameter and may be read to access the value of the transmission performance parameter. At step 1410, the network performance information may be stored in the table. Communications over the node segments may be altered based on the stored network performance information at step 1412. The communications may be current or future communications.

Peer-to-Peer Distributed Call Control Using Distributed Tables

The network performance information that is stored in tables at each node may be used by the nodes to make network control or routing decisions when placing or routing calls.

These decisions may be based on the network performance information that is indicative of network performance at a node segment associated with a node or other node segments for which the node has access in tables stored therein. The decisions may include employing congestion avoidance processes as understood in the art. Routing decisions, such as routing a call via a different transmission path to a called party, may be performed at the node to avoid congestion or other transmission problem at a node segment. Still yet, the node may determine that packet loss is high so the node may negotiate a lower CODEC bandwidth for on-going, and new sessions with another node prior to or during a telephone call in an effort to minimize packet loss between the nodes. It should be understood that the node making the decisions may include customer premise equipment, such as a SIP telephone, or any other node within a packet network, including wireless access points, DSL modems, and/or cable modem devices that suffer variable bandwidth availability. The distributed call control, in essence, may include the same or similar functionality as may be performed by a call control manager.

Centralized Network Performance Information Table

FIG. 15 is an illustration of an exemplary packet network 1500 having a call control manager 1502 with a centralized table 1504 of network performance information for use in managing call communications over the packet network 1500. The CCM 1502 may include the same or similar hardware as provided in FIG. 5, and execute software configured to perform call control operations for end-users on the packet network 1500. The centralized table 1504 may include network performance information generated by network communications devices (e.g., end-points and intermediate points) operating on the packet network 1500 that indicate operation of the node segments. For example, router or switch 1506 may collect network performance information for node segments 1508a-1508f (collectively 1508). As previously described, the network performance information may be generated through the use of PIP data packets being communicated over the node segments. It should be understood that node segments may traverse from end-to-end and include intermediate points so that an overall packet network communications path can be described. This path could contain one or more communication technologies and protocols, such as Ethernet, SONET, IP, and ATM. For example, a node segment may extend from network-to-network interface or session border controller 1510 to end-user 1512 to describe transmission performance for bearer paths 1508d, 1508a, and 1508e and network communications devices between the end-points, including router 1506 and network access node 1514. Generation of the performance information may use standard or modified protocols, such as the IEEE 802.1AG protocol, to generate the information as associated with the PIP data packets. The performance information may be gathered and stored using a modified standard protocol, such as Y.1731, to include data packets containing real-time content and total data packets (i.e., real-time and non-real-time content) so that the CCM 1502 may make call management decisions based on the type of calls or sessions that are being placed or currently operating on the packet network 1500.

Collection of the network performance information may occur at regular intervals (e.g., every second, minute, hour, four hours, day, week month, or otherwise). Collection of the network performance information at regular intervals, especially shorter intervals, may add overhead to the CCM 1502 and network communications devices, so other collection schemes may be utilized for communication of the network performance information to the CCM, such as event and request driven collection schemes. Event driven communications of the network performance information may occur if a network communications device (e.g., media gateway 1516) determines that call quality has degraded below a predetermined threshold. For example, if jitter of real-time data packets increases above a predetermined threshold value, the network communications device may communicate current network performance information to the CCM 1502 for storage in the centralized table 1504. Alternatively, a message or alert may be communicated to the CCM 1502 to notify the CCM 1502 of the node segment problem, which may cause the CCM 1502 to store a value indicative of a problem to be included in the centralized table. Request driven communications may be performed by the CCM 1502 to send a poll or request to each of the network communications devices to communicate current and/or historical network performance information generated and/or collected by respective network communications devices. The centralized table 1504 may include the same, similar, and/or additional information as described with respect to TABLES I-IV.

The table 1504 may be used by various algorithms, thresholding events, or processes to determine routing changes, CODEC usage choice, or other call related functions that coincide with obtaining suitable or the best call quality using the network available. As provided in TABLE II, the network performance information may include transmission quality parameters (e.g., real-time bandwidth, jitter, delay, packet loss) in a duplex fashion (e.g., east to west and west to east). The values stored in the table may include derived data and actual raw data generated at the network communications devices, scaled data representative of the raw data (e.g., scale between 1 and 10 with 1 being the optimum capability and 10 being the worst capability or vice-versa), or indicia (e.g., grade rankings A-F) representative of the quality of the raw data. It should be understood that virtually any captured or derived data representative of the network performance information may be stored in the table 1504 that provides the CCM 1502 with the ability to manage calls on the packet network 1500.

In using the network performance information in the centralized table 1504, call processing within the CCM 1502 may use the network performance information for calls being set up. To accomplish this, the CCM 1502 may determine the route taken for the different calls based on location of the end-points within the packet network 1500 of the service provider. Since the CCM 1502 has end-point information recorded in conventional provisioning tables, segment information may be added to these provisioning tables that would provide information on how the bearer path would traverse the packet network 1500. This information would be added to both line and trunk provisioning tables within the CCM 1502. TABLES V and VI show possible configurations of conventional provisioning tables extended to include segment information as collected by the CCM 1502 from network communications devices.

TABLE V

Line Information Table
Line Information Table

| Line Name | Line Number | Existing Line Information | 1st Seg | 2nd Seg | Nth Seg |
|---|---|---|---|---|---|
| End-User 1 | NPA-NXX-1234 | ... | 1 | 3 | N/A |
| End-User 2 | NPA-NXX-0987 | ... | 2 | 3 | N/A |
| ... | ... | ... | ... | ... | ... |
| End-User N | NPA-NXX-0298 | ... | 1 | 7 | N/A |

TABLE VI

Trunk Group Information Table
Trunk Group Information Table

| Trunk Group Number | Location | Existing Trunk Group Information | 1st Seg | 2nd Seg | Nth Seg |
|---|---|---|---|---|---|
| XXYYYY | (Phys Location) | ... | 1 | 3 | N/A |
| XXZZZZ | (Phys Location) | ... | 2 | 3 | N/A |
| ... | ... | ... | ... | ... | ... |

As shown in TABLES V and VI, network performance information or, as shown, representative values of the actual network performance information for each segment may be stored with the associated lines and/or trunk groups. The segment information may be configured as shown above with a given set of values that corresponds to the node segments, such as the bearer paths 1508, network communications devices, or combination thereof, used in the transport of the call through the packet network 1500. The values could also be provisioned in a vector, using commas to delineate the segments. That is, the segments used in calls to/from the chosen end-point may be shown as X, Y, Z, AA, etc. No matter how the tables are provisioned, the network performance information or summary thereof may be utilized by call processing functions of the CCM 1502.

More specifically, to provide call control based on the lower layer status of the underlying packet network 1500, the CCM 1502 may employ a mechanism that queries the segment status table for each call. Algorithms may be used to access raw network performance information stored in the table and convert the raw data into a value that can be used for call processing. These algorithms may take different forms, such as determining the highest value of the network performance information columns (e.g., east-to-west delay, jitter, packet loss or west-to-east delay, jitter, real-time packet bandwidth, packet loss (see TABLE I)) and using the highest value as the status value of the segment. If using these transmission performance characteristics, three value range scales could be enacted that to signify (i) whether the segment is running normally, (ii) if there is slight impairment, or (iii) if the segment is too congested for added traffic. The three value range scale could be set at the CCM 1502 in an overall provisioning table that is commonly used in soft-switch development. For example, if the results of the algorithm are in a 1-10 scale, where 1 is the best availability and 10 is the worst availability, the "normal" availability could be a range of 1-3, impaired availability could have a range of 4-7, and congested availability could have a range of 8-10. Alternatively, the status may be defined using other indicia, such as colors (e.g., green, yellow, red) or letters (e.g., A, B, C).

Figure 16:
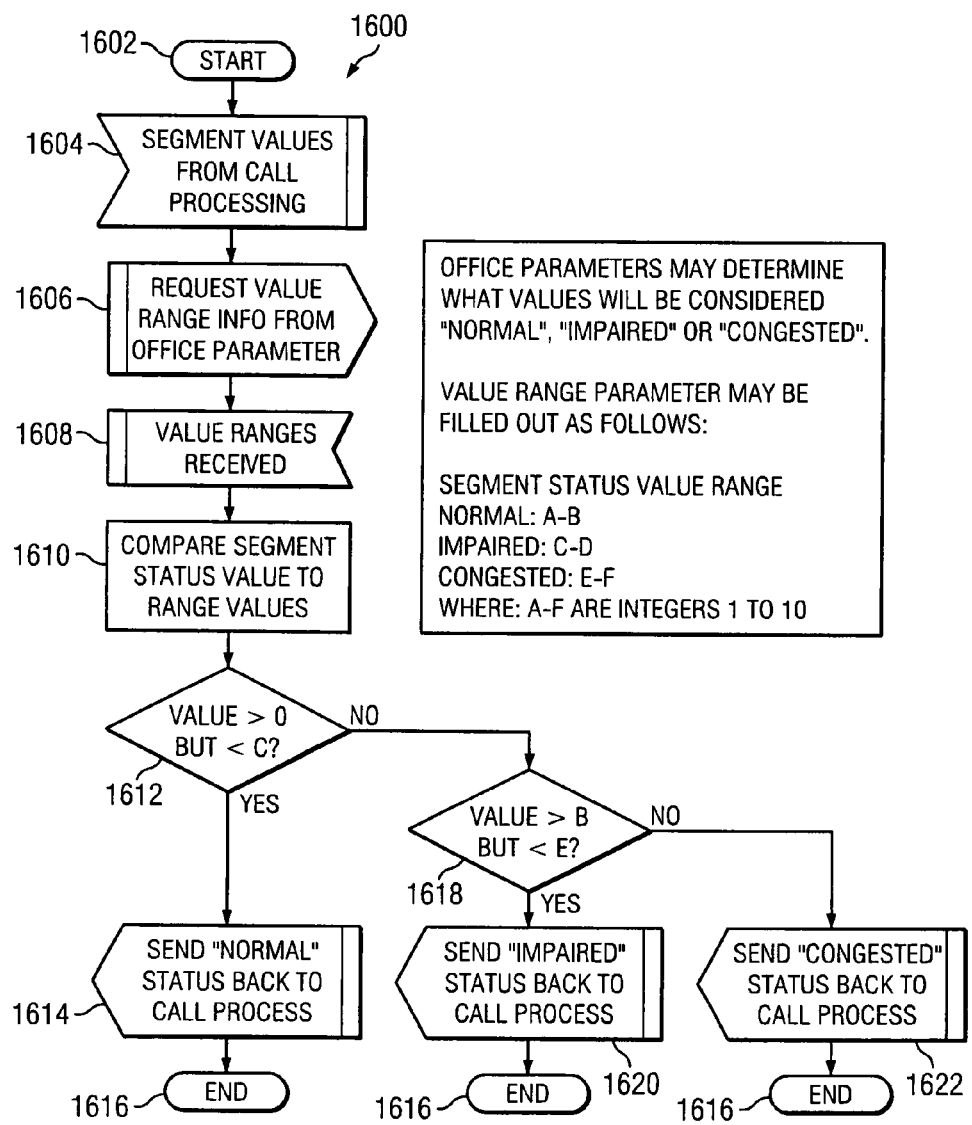
FIG. 16 is a flow chart of an exemplary process for using network performance information stored in a centralized table for controlling calls by a call control manager.

FIG. 16 is a flow chart of an exemplary process 1600 for using network performance information stored in a centralized table for controlling calls by a call control manager. The process starts at step 1602. At step 1604, node segment values generated from a call processing module may be accessed from a table. In one embodiment, the table is centralized and located at a call control manager located on a network and include network performance information for each of the packet network communications devices located on the packet network. Alternatively, the table may be located at a network communications device located on a packet network. In another embodiment, the table may be a distributed table, such as those stored on network communications devices and the network performance information may be accessed when needed. At step 1606, value range information may be requested from an office parameter, where an office parameter determines what values are considered "normal," "impaired," or "congested." Value range parameters may be defined by node segment status value ranges: normal: a-b, impaired: c-d, and congested: e-f, where a-f are integers ranging from 1 to 10. At step 1608, the value ranges may be received and a node segment status value may be compared to range values. At step 1612, a determination may be made if the node segment status value is greater than 0 and less than "c" of the "impaired" segment status value range. If so, then at step 1614, a "normal" status is set back to the call processing module. The process ends at step 1616. If at step 1612, the node segment status value is determined to have a value of "c" or greater, then a determination may be made at step 1618 as to whether the node segment status value is within the "impaired" range or "congested range." If "impaired," then an "impaired" status may be sent back to the call processing module. Otherwise, a "congested" status is sent back to the call processing module. The process 1600 may be used for each node segment over which the CCM may route a call or over which a call is currently routed. If an "impaired" or "congested" determination is returned by the process 1600, the call processing module may elect to select a different route or re-route an ongoing call or otherwise.

Figures 17A, 17B:
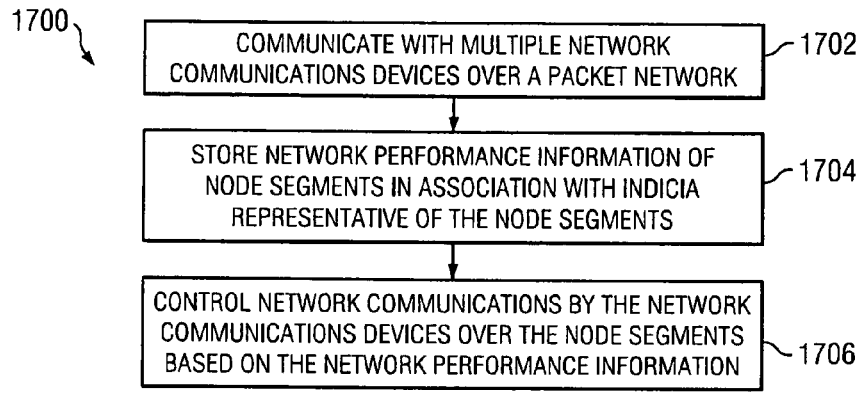
FIG. 17A is a flow chart of a high-level process for controlling communications on a packet network.
FIG. 17B is one embodiment of a permission table that may be utilized to establish permission or access levels by various network participants to network performance information that has been collected over one or more networks.

FIG. 17A is a flow chart of a high-level process 1700 for centrally controlling communications on a packet network. The process 1700 starts at step 1702 by communicating with multiple network communications devices over a packet network. In one embodiment, a call control manager is communicating with the network communications devices. At step 1704, network performance information of node segments providing communications between the network communications devices on the packet network is stored in association with indicia representative of the node segments. The indicia may be alpha-numeric and describe a physical location or logical address associated with the node segments. It should be understood that the node segments may refer to an individual network communications device for describing transmission path performance through the device itself, transmission lines, or combination of devices and lines. In another embodiment, node segments may be an aggregate of two or more segments between two end-points. Network communications by the network communications devices over the node segments may be controlled based on the network performance information at step 1706. The network communications may be controlled in a variety of ways, including re-routing calls, changing call routes during a call, and/or changing operation of network communications devices (e.g., reducing bandwidth of a CODEC).

Packet Network Diagnostics

In addition to being able to re-route calls in the event of a determination being made of a network node or segment being impaired or congested, the principles of the present invention provide for packet network diagnostics to be made manually, semi-automatically, or automatically based on network performance information collected from one or more network nodes. In one embodiment, network performance information may be collected and a parameter may be monitored. One or more threshold values may be established for use in determining that the network performance information parameter. For example, an upper and lower threshold may be established to ensure that transmission rate of data packets including non-real-time content so that a customer does not receive higher or lower transmission speed than contracted. In one embodiment, the network performance information may be collected and monitored at a central location on a packet network. Alternatively, each individual network node may monitor itself and other network nodes on the packet network and be configured to initiate the diagnostics.

If a determination is made that a threshold is crossed by the parameter being monitored, then diagnostics may be initiated. The diagnostics may include a wide range of functions, including initiating a loop-back test, trace route, modified trace route, ping, or otherwise, as understood in the art. Additionally, a command may be issued to a network node at which a network performance information parameter that crosses a threshold is associated to initiate a diagnostics routine and return a result from the diagnostics routine. For example, a software routine may be executed for the network node to execute one or more self-tests associated with data packet communications at the network node. It should be understood that the diagnostics may be initiated to monitor network nodes, segments, gateways, or any other network communications device. In addition, the network performance information from a second packet network owned by another communications carrier may be monitored by an operator of the packet network and diagnostics may be performed, but return limited result information to avoid sharing confidential information, for example.

Still yet, if the network performance information parameter determined to cross a threshold is associated with communications of data packets including real-time content or non-real-time content, the diagnostics may be directed to determining whether a problem exists with communications of data packets including real-time or non-real-time content individually depending on the problem that exists. Other diagnostics as understood in the art may be initiated in response to the type of network performance information parameter determined to cross a threshold.

Restricting Shared Access to Tables

FIG. 17B is one embodiment of a permission table that may be utilized to establish permission, state, or access levels by various network participants to network performance information that has been collected over one or more networks. Such network performance information may be stored in a PIP packet, in a table, bin, or other memory structure at a network node or access point, or at a central network or inter network resource, such as an overall network performance table, or a table used by a CCM, NOC, or EMS system.

More particularly, a permission table is illustrated as Table 17*b*0. Table 17B0 may include fields associated with an entity identifier 17*b*2, a segment identifier 17*b*4, and one or more network performance information identifiers 17*b*6.

Entity identifier 17*b*2 may be an identifier associated with an individual network participant, such as a subscriber, network operator, VPN provider, or other network participant. Alternatively, entity identifier 17*b*2 may be an identifier associated with a group or category of network participants 17*b*10. More particularly, such an identifier may identify a class of participants in a network such as a subscriber group, a network operator group, a VPN provider group, or any other suitable category. For example, there may be an identifier associated with the operator of the particular network or networks regarding which network performance information is stored in Table 17*b*0 such that administrative personnel, devices, or processes of such network operator may have full access to all of the information in Table 17*b*0. Alternatively, a group of network operators who are the operators of other networks in communication with the network that is the subject of the table illustrated as 17*b*0 may be given restricted, i.e., a much lower degree of, access to network performance information stored in Table 17*b*0.

Segment identifier 17*b*4 may be utilized to identify a particular network segment, such as a connection path between two network elements, a network element itself, or a particular process or component of a network element. Thus, an individual network segment may be identified as illustrated as 17*b*12 while a category of network segments, such as network-to-network interfaces (NNI), may be identified as illustrated relative to 17*b*22. Similarly, an entire network may be identified collectively to represent all network segments located within such network as illustrated relative to 17*b*24. Additionally, a particular network path through the network including all network segments located along such path may be identified such as is illustrated relative to 17*b*26. Similarly, a category of paths may be utilized as an identifier, such as, for example, all paths between the CPEs of a particular customer or group of customers, may be identified as illustrated relative to 17*b*28. Likewise, portions of paths including perhaps only those network segments between a customer's CPE and a network access point may be identified to give the customer or a network provider access to line state information for such customer as illustrated relative to 17*b*30.

NPI identifier 17*b*6 may identify different categories of network performance information that are available to be accessed by a particular network participant regarding a particular network segment or category of either of the foregoing. For example, individual items of network performance information, such as real-time and total bandwidth usage, packet, jitter, and latency, may be identified as illustrated relative to 17*b*14. Alternatively, an identifier representing full access to all available network performance information may be identified as illustrated relative to 17*b*16. Alternatively, NPI identifier 17*b*6 may be utilized to differentiate between categories of packets that are communicated across a network. For example, identifiers may be utilized to differentiate access between overall network performance information and more targeted network performance information, such as network performance information associated with real-time data packets. Any combination of the foregoing may also be utilized. For example, an identifier may be provided that allows full access to real-time network performance information.

Although only one example of a portion of a permission table is illustrated in FIG. 17B, any combination of entity identifiers 17*b*2 associated with individual network participants or groups of network participants may be used in a table or other data structure with segment identifiers 17*b*4 of individual network segments, categories of network segments, entire networks, particular connection paths, particular line state information, or any categorization or grouping of the foregoing, and may be further used with NPI identifier 17*b*6 that are associated with individual categories of network performance information, data types, and other NPI identifiers offering full access or no access at all may be utilized.

The network performance tables may include network performance information on many different levels. For example, the network performance information may be collected and status values indicative of the operational status or performance of the node segments may be generated in addition to storing specific network performance information (e.g., packet loss, bit rate, bandwidth, etc.) in the network performance information tables. Rules may be established to enable certain users, partners, affiliates, or otherwise, to have access to certain levels of data. The levels of data may be specified in the network performance information table and define parameters that each level may access.

Additionally, network performance information being communicated via PIP packets may also be protected from different entities, nodes, or otherwise, from having access to certain information. In one embodiment, the network performance information may be encoded or otherwise identified so that the level of the information is specified and, thereby, restricted to be accessed by parties or equipment that do not have permission to access nodes above a certain level. The levels may range from 1 to 10, for example.

PIP Data Packet Stitching

Figure 18:
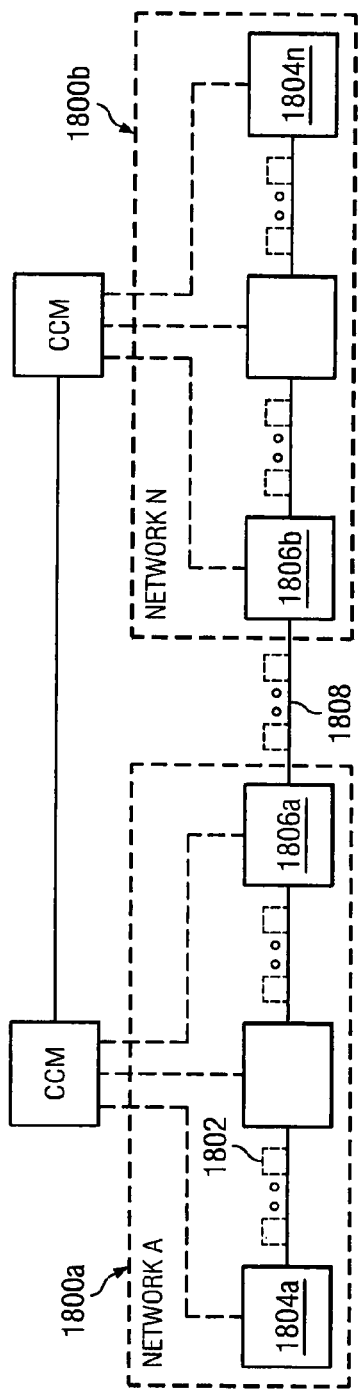
FIG. 18 is a block diagram of exemplary multi-node packet networks used to communicate data packets including network performance information generated by each node in a transmission path.

FIG. 18 is a block diagram of exemplary multi-node packet networks 1800a and 1800b (collectively 1800) used to communicate data packets 1802 including PIP packets to convey network performance information generated by each node or network element 1804a-1804n (collectively 1804) in a transmission path. As shown, there are two packet networks 1800a and 1800b formed of multiple network elements or network communications devices 1804 that may form a network of one or more service providers. Because there are two networks 1800, network-to-network interface devices 1806a and 1806b (collectively 1806) are configured to communicate with one another, thereby forming a bridge 1808 across the packet networks 1800a and 1800b. This bridge could include direct connections of the same technology as in 1800a and 1800b, or as another technology existing in a different type of network such as SONET bridging two Ethernet networks, for example.

Each of Network A and B may have its own respective PIP packets associated with each of their respective networks and respective modified Y.1731 protocol stacks or other measurement processes monitoring communications between nodes 1804 and 1806. A third set of PIP packets and associated Y.1731 protocol stacks may monitor the communications between the network-to-network interface devices 1806. Real-time data packet performance and total network performance information may be generated and communicated in the PIP data packets. In one embodiment, a first-end point in the network communications path generates a special PIP packet that routes through devices 1804 and triggering each modified Y.1731 measurement engine to inject its stored network performance information into the PIP packet by appending network performance information and a segment identifier into the PIP packets as it is passed downstream. This PIP packet with the appended network performance information then continues and triggers the same performance measurements (PM) or network performance information pull at the next network node and associated modified Y.1731 protocol stack inserts its PM information concatenated behind the first nodes PM information. This process continues for each network node such that the network node's node segment identifier and network performance information is concatenated into the next PIP packet sent in the downstream path direction. Such PIP packet travels in turn to the subsequent network node and associated Y.1731 protocol stack, where additional network performance information is appended and a node segment identifier is added and then the combined network performance information is transmitted again via a PIP packet until the PIP packet reaches the far end network node and Y.1731 protocol stack. Each Y.1731 protocol stack along the path can read the appended segment PM information and store the network performance information or optionally choose to terminate the PIP segment PM information by removing some or all of the appended data so the next PIP packet sent downstream contains only that segment's information, or simply add its own network performance information into the PIP packet. If a network node or associated modified Y.1731 stack protocol terminates the PIP packet, the network performance information is stored, and a new PIP packet that does not include the stored network performance information is communicated to start stitching new network performance information from network nodes and associated modified Y.1731 protocol stacks located downstream in a network. It should be understood that data packets other than PIP data packets and stacks or processes other than the modified Y.1731 protocol stack may be utilized to communicate the network performance information between the network communications devices. The network communications devices 1804 may be configured to communicate the network performance information in the PIP data packets on a regular basis (e.g., every second, minute, hour, $100^{th}$ PIP data packet), based on an event (e.g., performance information parameter crossing a threshold value), in response to receiving a PIP data packet with network performance information contained in the payload portion, or in response to a request or command. The PIP data packets 1802 may be 802.1AG data packets and be communicated over OSI Layer 2.

To correlate the performance manager measurements on a transmission path, the network performance information measured may use multiple bins to store data collected over a period of time. Multiple bins can concurrently exist for different time window lengths, such as 5 minutes, 10, minutes or otherwise. For example, special "bin roll" PIP packets or sequentially number packets may indicate which timeframe bin the information should be stored in. For example, PIP sequence or bin packets may be generated at time periods that include 1, 5, and 15 minutes. The modified Y.1731 performance measurement function can have multiple bins that correlate to the PIP sequencing or flags to ensure the PIP packet data is stored in the correct bin. Also, longer time periods may be added to the modified Y.1731 stack, including 1 hour and 24 hours. The modified Y.1731 stack or counters may be accessed to derive or compute the network performance information. Access may be performed by using time period numbering.

To provide isolated segment performance information, each network communications device 1804 may be configured to receive a PIP data packet 1802 containing network performance information from other network communications devices and append network performance information generated at the respective network communication device with the other network performance information within the PIP data packet 1802. This concatenation process may be considered "stitching" of network performance information along a transmission path. This function helps identify path verses shaping functions in the transmission path, and also provides the ability to retrieve network performance information in-band verses using multiple external EMS systems to retrieve the information for fault isolation. To ensure that errors in the bins do not occur, the PIP data packets 1802 may be marked (e.g., <15minupdate>) so that each of the network communications devices along a communications path appends information contained in the Y.1731 bin that is storing network performance information associated with the marking (i.e., <15minupdate>).

Figure 19:
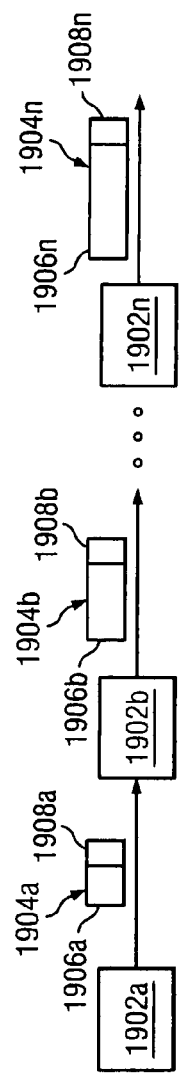
FIG. 19 is a flow diagram of an exemplary process for generating and communicating network performance information in data packets in accordance with the principles of the present invention.

FIG. 19 is an illustration of an exemplary series of network communications devices 1902a-1902n (collectively 1902) that are configured to append network performance information in PIP data packets 1904a-1904n (collectively 1904). Each of network communications devices 1902 may be configured to append most recent and/or historical network performance information to network performance information received in the PIP data packets 1904 from other network communications devices 1902, as indicated by payload portion 1906a-1906n of the PIP data packets 1904 increasing in length after each of the network communications devices 1902. Alternatively, such network performance information may be otherwise inserted into or represented in PIP data packets 1904. Header portion 1908a-1908n of the PIP data packets 1904 may be configured normally. In practice, the network performance information may be written into the PIP data packets 1904 using XML language or other language (e.g., <param start tag>param value</param stop tag>). The principles of the present invention provides support for both tag delimited and fixed width fields within the performance packet. For example, the following descriptor may include network performance information generated over a time period.

<NSEG>A204</NSEG><JITR>0.002>/
JITR><DEL>0.04</DEL><PL>125</PL> . . .
  <RTBW>1.73</RTBW><TBW>3.74</
    TBW><TIME>07.43.47.14.07.07</
    TIME><NSEG>A205</NSEG> . . .

Included at the start of the network performance information is an identifier of the node segment "A204." Additionally, an identifier of a carrier may be added to the PIP data packet, such a carrier name or code. Jitter, delay, packet loss, real-time bandwidth, total bandwidth, and time at which the network performance information was generated may also be included in the network performance information. This network performance information may be compared with historical network performance information previously sent from node segment A204 to determine whether a problem has developed over time. As shown, network performance information of network segment "A205" is appended to the network performance information "A204." It should be understood that other embodiments for communicating the network performance information may be utilized.

Continuing with FIG. 18, so that the network performance information associated with different node segments can be easily identified, an identifier that describes each node segment may be included in the PIP data packet 1802 by positioning the identifier in front of the network performance information generated by each of the network communications device 1804. Continuously concatenating the network performance information and communicating the appended network performance information in PIP data packets across a transmission path from end-to-end provides for a complete description of a transmission path with detailed viewing of network performance information associated with each connection, network element, media, or other network segment included in such transmission path. Concatenating network performance information in PIP data packets may also be performed on abbreviated transmission paths to further help isolate a transmission problem. If, for example, a transmission path is having transmission quality problems, an analysis of the network performance information collected along each node segment of the transmission path may be performed to identify the node segment(s) that are contributing to the transmission quality problem. For example, the stitching process may be performed on MEPs, MIPs, NNIs, CPEs and be performed routinely or in response to a command issued by a CCM. The last node that receives the network performance information may be configured to perform analysis on the network performance information or communicate the information to a CCM, NOC, EMS system, correlation engine, or other network device. If the network performance information is communicated over multiple networks, a CCM that manages the last node may communicate the compiled network performance information to the originating CCM for transmission performance analysis. The network performance information may be stored in tables at each of the nodes in the transmission path and/or one or more network devices may receive and store the network performance information in table(s). It should be understood that some performance information collected from different types of network nodes, such as those within the NNI, may contain performance information that is unlike performance information captured from other nodes such as MIPs or MEPs. The embodiments of this invention allow disparate types of performance information to be concatenated into a single performance flow.

The network communications devices may include performance managers (PMs) that perform the function of managing the modified Y.1731 stack. The performance manager or other software module may perform the functions of accessing the stack to collect network performance information, optionally at particular time periods, concatenating the network performance information into the PIP data packets, and communicating the data packets in-band or out-of-band. The performance managers of the network communications devices may become tools that represent correlated performance manager counter usage in-band in short time intervals, which results in (i) eliminating in-flight measuring accuracy issues, (ii) eliminating multi-carrier segment troubleshooting, (iii) optionally enabling in-band performance managers for access versus out-of-band enhanced messaging services or graphical user interfaces, (iv) and correcting the issue of stacking access technologies that introduce multiple in-line PIP packet flows that have to be polled.

Figure 20:
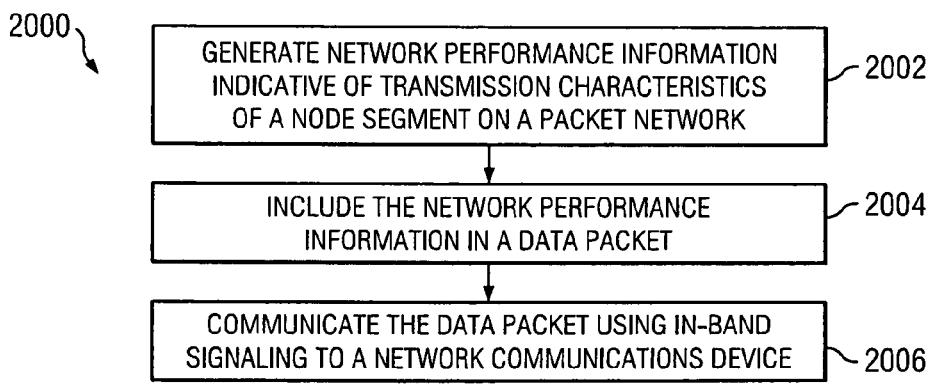
FIG. 20 is a flow diagram of an exemplary process for isolating a node within a packet network that generated network performance information indicating a transmission performance problem.

FIG. 20 is an exemplary process 2000 for communicating network performance information of a node segment of a packet network. At step 2002, network performance information indicative of transmission characteristics of a node segment on a packet network may be generated. The network performance information may be included in a data packet at step 2004 and communicated using in-band signaling to a network communications device at step 2006. The network performance information may be appended to other network performance information received in a data packet from another network communications device and communicated in turn via a third data packet to another network communications device. The data packets may be PIP data packets.

Figure 21:
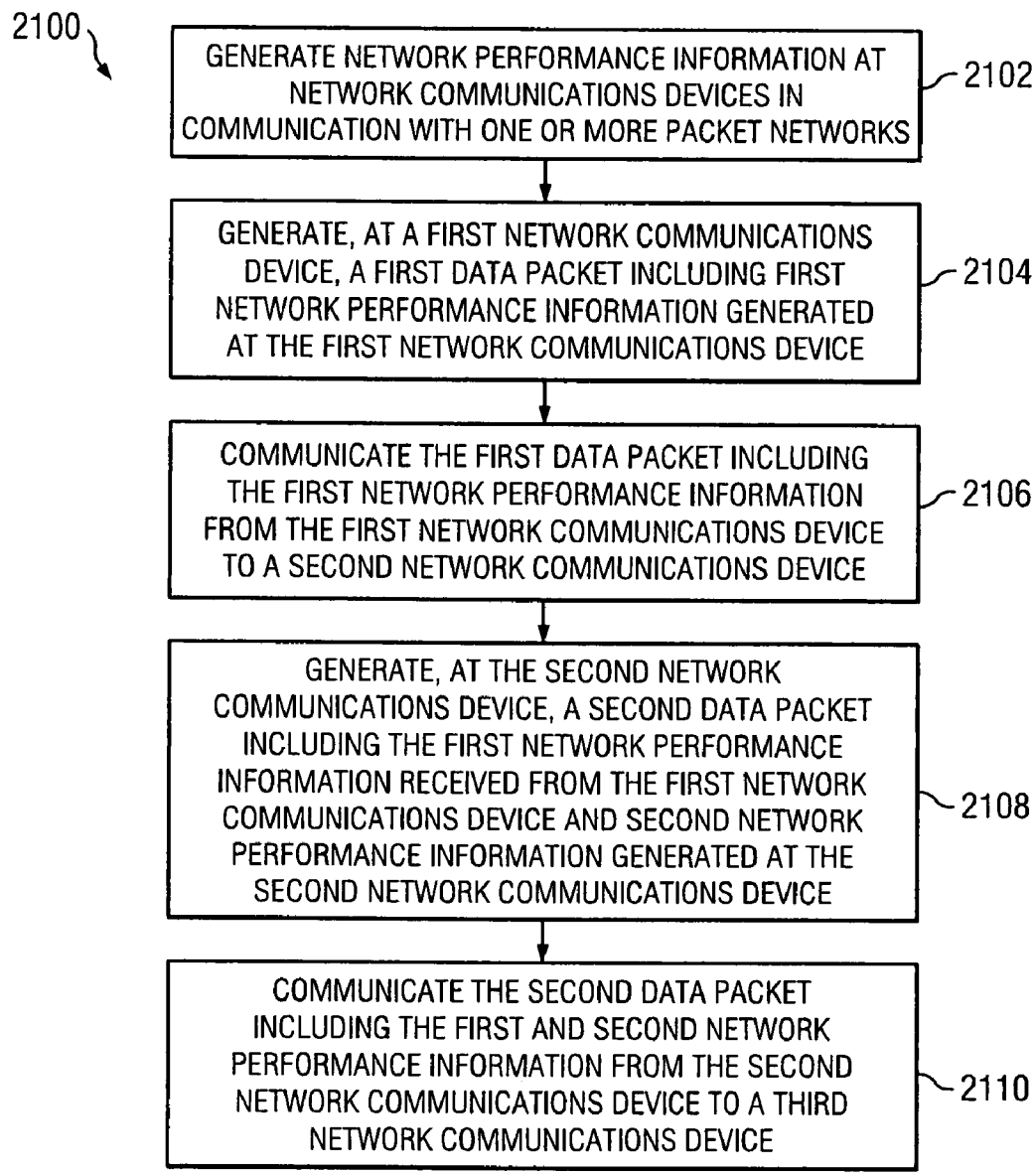
FIG. 21 is an exemplary process for identifying communication problems within one or more packet networks.

FIG. 21 is an exemplary process 2100 for identifying communication problems within one or more packet networks. At step 2102, network performance information may be generated at network communications devices in communication with one or more packet networks. At a first network communications device, a first data packet including first network performance information generated at the first network communications device may be generated at step 2104. At step 2106, the first data packet including the first network performance information from the first network communications device may be communicated to a second network communications device. At the second network communications device, a second data packet including the first network performance information received from the first network communications device and second network performance information generated at the second network communications device may be generated at step 2108. The second data packet including the first and second network performance information may be communicated from the second network communications device to a third network communications device at step 2110. This process of generating, concatenating, and communicating network performance information may start at a first end of a transmission path and finish at the second end of the transmission path so that each network communications device has provided network performance information that may be used to determine where a transmission performance problem exists along the transmission path. For example, if bandwidth for real-time applications is being lost at a node segment, a service provider may identify which node segment along the communications path is losing bandwidth for real-time applications.

FIG. 22 is an illustration of an exemplary packet network 2200 with one service provider and two operators. The packet network 2200 includes operator network equipment 2202*a*-2202*f* (collectively 2202) and subscriber equipment 2204*a* and 2204*b* (collectively 2204). The Metro Ethernet forum has defined Operations, Administration and Maintenance (OAM) Maintenance Entities (MEs) as shown. More specifically, the Metro Ethernet has defined multiple administrative domains, such as Subscriber Maintenance Entity (ME) 2206, Test Maintenance Entity, User Network Interface (UNI) 2208*a* and 2208*b* (collectively 2208), Operator Maintenance Entity 2210*a* and 2210*b* (collectively 2210), and Network-to-Network Interface Maintenance Entity (E-NNI ME) 2212. Each operator is provided with visibility across its respective network via the operator MEs 2210, but cannot view information in the Operator ME of other operators unless the other operators provide the proper permissions to allow this view.

In accordance with the principles of the present invention, an OAM domain, shown as a Stitched ME 2214, extends between the subscriber equipment 2204 through the transmission path of the operator equipment 2202 of both operators. The Stitched ME 2214 provides for communication of network performance information generated at each element of subscriber and network equipment in the packet network 2200, and PIP data packets (not shown) may be generated and communicated from the subscriber equipment 2204*a* and successively through the operator equipment 2202 on the packet network 2200 as a single flow that is stitched or concatenated together via higher order packets to the subscriber equipment 2204*b* (upstream to downstream). It should be understood that two flows may be operating in opposite directions since the full duplex nature of some communication technologies allow divergent receive and transmit paths. Each MEG Intermediate Point (MIP) (set of stitched MEG End Points (MEPs)) may transparently append or block and restart the PIP data packet flow, or selectively including network performance information. Bins having predetermined time periods (e.g., 5 minutes, 15 minutes, 1 hour, 24 hours) may be created to create a "stitched" PIP data packet that pulls network performance information from each of the communications devices (subscriber equipment 2204 and operator equipment 2202) on the packet network 2200 in a correlated manner. Sequences and counter resets may additionally be adopted for providing the PIP data packet stitching. To perform the stitching operations, the MIPs may pull the modified Y.1731 information from the upstream node segment and append it to the stitched packet traveling downstream. As previously described, node identifiers and/or carrier names or codes may be included in the PIP data packets to identify the carrier and node segment that the modified Y.1731 performance manager data was inserted. In one embodiment, MIPs, or certain MIPs, may remain "unstitched" and operate as a pass-through.

Although the Stitched ME domain extends from end-user to end-user, the principles of the present invention may provide the ability for operators to be limited to accessing information from their own network or limited information from other service provider networks. Subscribers, similarly, may be limited to having access to their own equipment or a summary of operator information. There may be a number of different techniques used to provide such limited visibility for operators and subscribers, including safeguards built into performance managers at each network communications device.

FIGS. 23A and 23B are illustrations of a multi-carrier network 2300 having multiple Ethernet service providers (ESPs) 2302*a*, 2302*b*, and 2302*c* (collectively 2302) and a multi-point network 2304 having a multi-point device 2306 in communication with network interface devices 2308*a*-2308*d* (collectively 2308). Using a stitched PIP packet stream enables an end-user to determine performance of each node segment to determine if equipment operated by one of the service providers 2302 is having a communications problem. In the case of multi-point communications, a transport performance manager may be isolated from the switching performance manager. It should be noted that non-Ethernet performance information may exist and be included in the PIP packet stream.

Call Control Manager Functionality Enhancement

To provide a better experience for end-users, a mechanism is being introduced to provide near real-time monitoring capabilities of the path and link status of the underlying packet network upon which a voice-only or multi-media call is carried. This information can be sent to the CCM and acted upon to choose or alter the call characteristics and routing of calls, such as change codec use, provide call treatment and routing, and alter overall use of the call path, etc., thereby providing a better quality of service for the end users.

One technique for providing this network monitoring capability is the use of a link state reporting structure in the form of PIP packets. Both line state (i.e., transmission path to a user), and trunk state (i.e., shared transmission path state between network nodes) can be provided to the CCM to convey the transmission path state of the packet network. The PIP packets themselves provide a line or trunk state, respectively, at each end of a line or trunk transmission path. To enable CCM management capabilities, line and trunk states may be communicated to the CCM via call control protocols or some other type of packet network signaling. The PIP and PM measurements protocols provide the means to monitor the quality of the link states and report findings to a separate network element. As previously described, included in this near real-time report may be real-time bandwidth usage, packet loss, latency, and jitter or any other network performance information. The monitoring of this information can happen within any area of a network and can provide a means to report the lower layer status of the network. As shown in FIG. 15, there are many places that these measurements can be taken. The PIP packets provide the information used to determine path capabilities from the network end points. Bearer path monitoring may be accomplished between the following elements of FIG. 15:

End User 1512 and Network Access Node 1514, or optionally to router 1506

End User 1518 and Network Access Node 1514, or optionally to router 1506

Network Access Node 1514 and the Network Router 1506

Network Router 1506 and Network-Network Interface 1510, or optionally to a Media Gateway deployed in another carriers network Network Router 1506 and Media Gateway 1520

Network Router 1506 and Media Gateway 1516

PIP packets may also provide information between two end devices even though a network element is located between the two end devices. That is, if the provider would want to see the overall "health" of the path between media gateway 1520 and media gateway 1516, the PIP packets can be configured to monitor this route even though the router 1506 is part of the routing of this path. Once collected, the raw information from these paths can be configured to show the overall health of the route. Information contained within the PIP packets may be used to determine metrics, such as real-time bandwidth usage, jitter, packet loss and overall delay, of the path being measured. These calculations may be performed at the individual element, or information may be transported to another collection device to be used by other call processing functions as shown in the CCM 1502. These real-time events may be used to provide input into the decision functions used in call routing within the CCM. The measure of real-time bandwidth being provided by the PIP packets also enables a summation of the real-time bandwidth on that path. Historically, this metric is part of a TDM CCM function, but was not replicable or available without both the number and amount of real-time bandwidth usage on a node segment. These combined functions provide for such a measure, thereby the CCM may contain a table of the amount of "Erlangs" being used on trunking facilities. Other time intervals may be used to accommodate other non-Erlang-like measures.

In accordance with the principles of the present invention, new steps are added to the call processing 1504 of the CCM 1502, over and above the normal call processing currently done. Since the CCM now has the capability to track the lower layer performance and bandwidth availability of the underlying network, a new type of status table may be added to call processing that systematically updates during specific time intervals throughout the day. These updates, which may occur periodically (e.g., once per second) may be placed in one or more tables (see TABLES II-IV) in a form that may show utilization, latency, jitter, and packet loss. While there are other types of information that could be shown, such as Mean Opinion Score (MOS) voice values, for simplicity, these three basic parameters are illustrated and discussed herein.

In normal operation, when an end-point, either a trunk or line, initiates a call, call processing operating in the CCM 1502 determines the terminating end-point to complete the call. In conventional calling scenarios, the call would then be set-up and the call path established for the end-users to converse. This is conventional call processing based on provisioned information that would give call processing the ability to route the call. The principles of the present invention take advantage of collecting the network performance and utilization information from the node segments to aid in performing call processing. Call processing may perform normal information lookup to determine the originating and terminating end-points of the call, but before routing the call, the end-point or node segment information from these end-points may be retrieved and call processing may query a network segment status table (e.g. TABLE IV) to determine the line or trunk state availability of the node segments that could be used to connect the originating and terminating end-points for the call. Depending on the availability of the paths used on the call, special call handling, load balancing, call spacing, or other special call handling can be invoked to sustain call processing, and provide relief for the call path or in extreme congestion, alternate routing could take place to provide for a satisfactory voice path on the packet network. This management can be done at call set-up and/or anytime during the call. As transmission state is available at both the CCM and call protocol stack at the user location, multiple enhanced call functions may be possible. For example, outgoing user calls could automatically query the line state on the CPE to provide the user with graphical or text based feedback as to call options for multi-media setup given they have a specific transmission quality to utilize. For example, a multi-media call could revert to a frozen image and voice-only call until congestion clears. The same condition may enable the CCM to know the state before setting up a call and either make a decision by itself or query the user or user's equipment about how to alter ongoing sessions to allow more communications. The line state information availability to the switch and user may be used to provide session control feedback. The same information of threshold crossings may be used to convey that a call may be dropped prior to the incident occurring. These functions may have significant value to the customer experience. The trunk state of shared resources is paramount for inter and intra-switch path state knowledge. Packet networks may be considered to operate autonomously given that the bandwidth being used by the CCM is also being used by other services without knowledge by the CCM. To operate appropriately, the CCM may use transmission state feedback so it can be pre-cognitive of the communications path state during call handling. Without the trunk-state information between two switches, each switch operates under the assumption that enough bandwidth exists to sustain all calls. Often, neither switch will "own" the bandwidth flow control mechanisms for flows between the switches, so this assumption is dangerous in terms of providing carrier grade call handling. Conditions can arise in which inadequate bandwidth or device resources are available to support all calls and packets are dropped. If the switch knows the path state (line or trunk), call handling alternatives may provide customers with feedback that was previously unavailable and provide better call quality and call handling. It should be understood that the CCM may use both line and trunk state tables and make call handling and customer call feedback decisions based on the severity of node segment congestion, including, for example: (i) CODEC modification, (ii) rerouting the call, and (iii) congestion control.

CODEC Modification

In a line-to-line call between two end-users 1512 and 1518 (FIG. 15), alternate routing to the line end-points is not a viable alternative since each communicates via the network access node 1514. Since most end-lines have one path for transport to the packet network, other modifications are performed to provide better call quality. One modification that provides a better call capability would be a CODEC change to raise or lower bandwidth of the CODEC (i.e., a CODEC that operates at a different speed). In one embodiment, the bandwidth is raised or lowered by sending a command to the CODEC to raise or lower its bandwidth. Alternatively, a different CODEC may be employed for performing the call. This replacement could occur in mid-call.

Figure 24A:
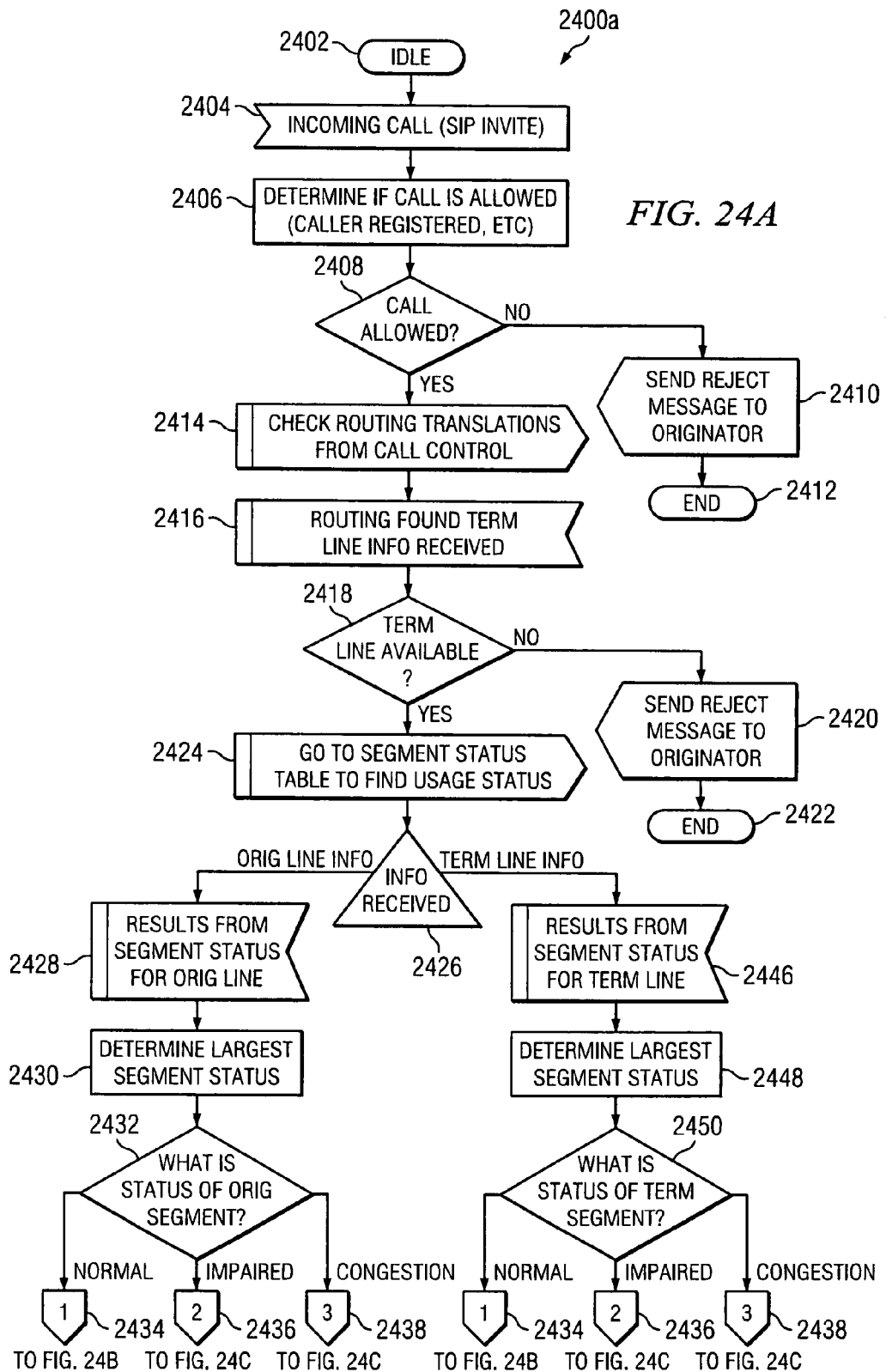

FIGS. 24A-24C are flow charts of an exemplary process for performing line-to-line call flow. The process 2400a starts at step 2402, where the call processor is idle. It should be understood that the call processor may be hardware, software, or a combination thereof. At step 2404, an originating line or calling party goes off-hook and dials a number of a called party or destination line. This call, in turn, is received by the CCM as an incoming call. Information for this call is passed from the end-unit to the CCM. In IP telephony, the signaling protocol may be Session Initiation Protocol (SIP), but other signaling protocols, such as Media Gateway Control Protocol (MGCP) or Megaco (H.248) may be used.

At step 2406, a decision is made if the call is allowed by determining whether the calling party is registered, authorized or otherwise. The CCM, more specifically, retrieves terminating end-point addressing and location based on conventional table lookups within the CCM. At step 2408, a decision is made as to whether the call is allowed. If it is determined that a call is not allowed, then at step 2410, a "reject" message may be sent to the originating line and the process ends at step 2412. If at step 2408, a determination is made that the call is allowed, then at step 2414, routing translations from call control is checked. At step 2416, routing information is found and termination line information is received. In addition, node segment assignment information for the originating and terminating lines is retrieved.

At step 2418, a determination as to whether the terminating line is available is made. If the terminating line is not available, then at step 2420, a "reject" message may be sent to the origination line and the process ends at step 2422. If, however, at step 2418 the termination line is determined to be available, then at step 2424, the node segment status table is accessed to locate usage status of node segments to be used for connecting a call between the origination and termination lines.

At step 2426, node segment state information stored in the node segment status table is received. The information from the node segment status table includes origination line information and termination line state information. The node segment status information is used to determine if a transmission path state to be used for the call has any congestion. Depending on numerical or other indicia status retrieved by the call processing, a determination of the congestion of the transmission path will be (i) normal or (ii) impaired, or (iii) congested, for example. The determination of the transmission path being normal, impaired, or congested is made based on network performance information having values determined to be within ranges, where the range may be a single value (e.g., 1, "A," "normal"). It should be understood that the range may be defined by a single value, such as "Congestion" representing status values between 7 and 10, for example. As previously described, the values may be processed to be within a scale, such as 1-10, indicative of the status of transmission performance.

At step 2428, results from the node segment status table for the originating line is received. At step 2430, a determination of a largest node segment status is made. Determination of the largest node segment status is made by determining a highest value of status indicators in the node status segment table associated with the originating line information. Determining the largest node segment status is performed to identify a limiting transmission parameter (e.g., bandwidth usage, packet loss). As previously described with regard to TABLES V and VI, the larger the value, the worse the network performance information associated with a node segment, thereby resulting in poor voice quality during a call, this information may be provided back to the caller as system feedback. Note, that the largest value may be a high quality value and is indicative of a well performing network; i.e., all paths are equal and capable of supporting high quality calls. At step 2432, a determination as to the status of the originating line node segment is made, which, in one embodiment produces one of three results, normal, impaired, or congested. If normal, the process continues at step 2434 in FIG. 24B. Alternatively, if the status of the originating line node segment is impaired, the process continues at step 2436 in FIG. 24C. Still yet, if the status of the original line node segment is congested, then the process continues at step 2438 in FIG. 24C. Continuing with a normal status of the originating line node segment, at step 2440 in FIG. 24B, a call invite set-up message with normal request is sent to the terminating line. Normal call control is continued at step 2442. The process ends at step 2444.

If it is determined at step 2432 that there is an impaired condition, then call processing being performed by the CCM may change the message that would be sent out to the terminating end-point to request a CODEC to use a lower bandwidth for the call path. This lower bandwidth request may be performed in concert with a user interface or performed via the user CODECs without user participation. This is shown at step 2452, where CODEC capabilities of the originating and terminating lines are checked and a determination is made at step 2454 as to whether a lower speed CODEC is available. If it is determined that no lower speed CODEC is available, then at step 2456, a "reject" message may be sent to the originating line. The process ends at step 2458. If, however, a determination is made at step 2454 that a lower speed CODEC is available, then at step 2460, an invite with a lower speed CODEC may be sent to the terminating line. At step 2462, a wait may be performed for a subsequent message from the terminating line. At step 2464, a positive response message may be received from the terminating line. At step 2466, a message is sent with new CODEC information to the originating line and, at step 2468, normal call control is performed. The process ends at step 2470. Not shown in this embodiment is that other call set measures could be considered in a serial or parallel fashion by the CCM in addition to CODEC negotiation to establish a quality call.

In summary, FIG. 24C operates to change a message that is sent out to the terminating end-point to request a lower bandwidth for the call path. For example, if the originating calling party requested use of a G.711 voice CODEC that uses 64 Kb/s for the bandwidth, the call processing may change the request to the terminating called party to a G.729 CODEC that uses only 8 Kb/s. While the voice quality may not be as good as the higher bandwidth CODEC originally requested, the bandwidth selected may be reduced enough to allow the call to be completed with better voice quality than if it was impaired while using the originally requested higher bandwidth CODEC. It should be understood that the line state information may be used to facilitate customer call setup feedback, and possibly call setup control with CODEC selection choice. It is understood that line state can apply to wireless network devices connected behind multiple access technologies, where a line state PIP packet may originate at the end-user device and terminate at a specific access node or at some point between the CCM dedicated switch or router. The access node may enable line state transmission path utilization and performance management tracking. Also, it should be understood that calls could be of any type, including voice, multi-media, or otherwise, where timely and quality delivery may be call path considerations.

To provide the originating caller with a CODEC change, call processing may wait for the return information from the called party to be received. Once the information is received from the called party, then the call processing may alter the message to include the change to a lower bandwidth CODEC and pass it on to the originating patty. From this point on, normal call processing would continue and the call would be set-up with the lower bandwidth CODEC.

If at step 2432, a determination is made that the originating line node segment is congested, then the process continues at step 2438 in FIG. 24C where a "reject" message may be sent to the originating line at step 2456 and the process ends at step 2458. The "reject" message is sent because call processing determined that the call could not continue even though a lower bandwidth CODEC could be used. A user notification, such as an audible or visual 'Network Busy' message, may be sent to the calling party. Depending on the severity of the deterioration of the transmission path, the CCM may send out a response to the calling party request not to allow the call to continue. This "throttling" of calls coming into the packet network provides established calls more bandwidth to use, and the calling party of the rejected call may receive a busy signal. The calling party may place the call at a later time and a determination may be made at that time as to whether the status of node segments associated with the calling party is normal (i.e., status value within a range). In an alternative embodiment, the CCM may automatically continue to regularly attempt to set-up the call. When the congestion clears, the CCM notifies the calling party that a call can now be set-up and completes the call per the calling party instructions.

Continuing with FIG. 24A, steps 2446, 2448 and 2450 are steps performed in response to receiving terminating line information and mirror the steps 2428, 2430, and 2432, respectively. In other words, the process 2400*a* makes the same or similar determinations on both the originating line and terminating line to ensure that status of node segments associated with each of the calling and called parties is operating properly.

Best Path Metrics

In determining transmission paths through a packet network, a CCM or other node may make a determination of the transmission path for a call or other communication to be made over the packet network based on current, historical usage, or network performance of node segments on the packet network. In one embodiment, a transmission path to route the call or communication may be determined by using network performance information or information derived therefrom (e.g., network segment status information) available in a table or at each node along a potential transmission path. In one embodiment, a calculation may be made to determine metrics along one or more transmission paths through the packet network to determine that the metrics result in a cumulative value below a threshold or the best metric of the potential transmission paths. Currently, most best-path algorithms use total utilization and bandwidth size for determining the quality of the path. In accordance with the principles of the present invention, characterization of real-time jitter and delay performance characteristics may be used to determine best path metrics. Modification of the best path metrics to include the real-time usage, and performance enables enhanced load balancing and path choice decisions for real-time flows. In one embodiment, these real-time network performance information characteristics may have a higher priority on the network. This modified metric enables the network to make enhanced routing decisions for traffic routing that was not possible without the transmission state or network performance information. One example of best route calculations improvement may include averaging, and, optionally, burstiness characterization. Best path calculation methods may include calculations, such as root-sum-square (RSS) and weighted vector calculations, that may be utilized to determine the path or paths with the optimum best path metrics. Further, a weighted average of the network performance information or status levels may be determined. In one embodiment, the best path metrics may create a real-time utilization state by which engines, EMS systems, and other network protocols may retrieve and utilize to gain system feedback as to the nature of the real-time network state. Also, a search for a transmission path having lowest sum of status levels may be used to determine best path metrics. In response to determining the transmission path with the best metrics, that transmission path may be used for establishing the transmission path for a call or communication.

Rerouting Calls Using Network Status Segment Table

While calls between two end-users, such as end-users 1512 and 1518 (FIG. 15), on the same network access node 1514 does not allow rerouting of calls between the two end-users, calls from an end-user 1512 through a media gateway 1516 or 1520 or other network interface device may provide additional options for alternate call routing destinations verses altering a CODEC selection. For a call between an end-user and a media gateway or other trunking device, there may be more than one route or termination point to successfully complete the call. These routing options are often the case with PSTN switching, where an end-office switch (class 5) may have an alternate tandem call termination point to reach that same end-office. That is, if the call is routed to a specific gateway and that route is congested, it may be possible to locate another media gateway with a route to the destination. By determining a transmission path and using the node segment status table (e.g., TABLES V and VI) on the route to the terminating media gateway or trunk call processing could be instructed to determine whether a secondary trunk capability is available for the call and determine if the secondary trunk has an uncongested path to the destination of the call. This same function enables geographical fail-over or call routing when network congestion or network failure significantly impairs the packet transmission path to a remotely deployed media gateway. In addition, predictive algorithms that trend performance information may recognize that a link is failing and systematically re-route traffic to an optimum link while managing the quantity and quality of the calls.

In a typical line-to-trunk call, the combination of line segment congestion and trunk segment congestion may be taken into account. It should be understood that a network switch may track all transmission paths to a central point, trunking point to trunking point, hybrid of line to central point, or line to trunk in a transmission state table. Since the end-user initiates the call, the first half of the call would use node segment analysis described previously to determine if the transmission path at the calling node segment is operating properly or has impairment. If the calling node segment is found to be impaired, then call processing may determine that a lower bandwidth CODEC may be utilized to improve the call quality or take other steps, such as allow the call to be made as a voice-only call rather than a multi-media call. If the originating node segment is congested, then the call processing may reject the call since there is no other path for the end-user to use. However, if there is a transmission quality or utilization problem at the terminating trunk node segment, then a rerouting option for the call may be available. In one embodiment, utilization means real-time utilization as compared to total bandwidth utilization with packet loss or the statically provisioned bandwidth allotted in that physical or virtual channel. Any indicators can serve to calculate the state of the user's transmission "line" or shared resource "trunk" transmission path. As stated, the CCM can now have a secondary "state" for that segment, line, or trunk by which it predetermines how call processing for that end-point should be handled. This secondary state is indicated in table VII below. TABLE VII includes an exemplary list of scenarios for the call processing to follow based on the combined status of the originating line and the terminating trunk

TABLE VII

NETWORK STATUS AND RE-ROUTING CALL OPTIONS

| Scenario | Originating Line | Terminating Trunk | Call Processing |
|---|---|---|---|
| 1 | Normal | Normal | Normal |
| 2 | Impaired | Normal | Adjust CODEC or Reroute |
| 3 | Congested | Normal | Reject Call |
| 4 | Normal or Impaired | Impaired | Adjust CODEC or Reroute |
| 5 | Normal or Impaired | Congestion | Reroute |

Scenario 1

In this scenario, normal call processing may be used since none of the transmission paths are constrained or impaired. The call may be routed without any changes to the voice coding of the call through the transmission path.

Scenario 2

Since the originating line is impaired, call processing may adjust rate of a CODEC for the call. The rate adjustment may be performed by lowering the rate of a CODEC or routing the call to another CODEC having a lower rate. Call processing may check the segments of the outgoing trunk to determine if the media gateway on the transmission path has capability to alter the CODEC used to convert the packet information (e.g., IP Packet Information) to a TDM format. If CODEC alteration is possible, then the CCM may negotiate the CODEC speed between the originating call device and the terminating trunk and establish the call via the CODEC having the lower speed. If the media gateway does not have multiple CODEC speed capability, then the call controller may have the option of routing the call via another trunk group if an alternate route to the terminating call device is available. If another route exists, then the call processor may reroute the call to the next trunk group and the node segment status check may be performed prior to establishing the call via the trunk group. If the trunk group has CODEC modification capabilities, then the call may be established via a CODEC with a lower speed and the call may be established. If another trunk cannot be found with CODEC speed alternatives, then the call may be dropped.

Scenario 3

If the originating line is determined to be congested, then since there are no alternative routes for the originating part of the call, then a call "reject" may be sent to the user and the call dropped.

Scenario 4

If the terminating side of the call is determined to be impaired, then a determination as to a lower bandwidth CODEC may be used. If the terminating trunk group has the capability to use a different CODEC, then a determination as to the CODEC capabilities of the originating line may be performed. If a lower bandwidth CODEC is available, the call may be established with these CODECs and the call may proceed normally. If there are no CODECs available at the originating side with a lower bandwidth, then the call processing may perform a reroute as described in Scenario 2.

Scenario 5

If the terminating trunk is determined to be congested, then call processing may search for a reroute for the call over a terminating trunk that is not congested. The call processing may include locating a trunk group having a normal or lower speed CODEC for establishing the call.

Figure 25A:
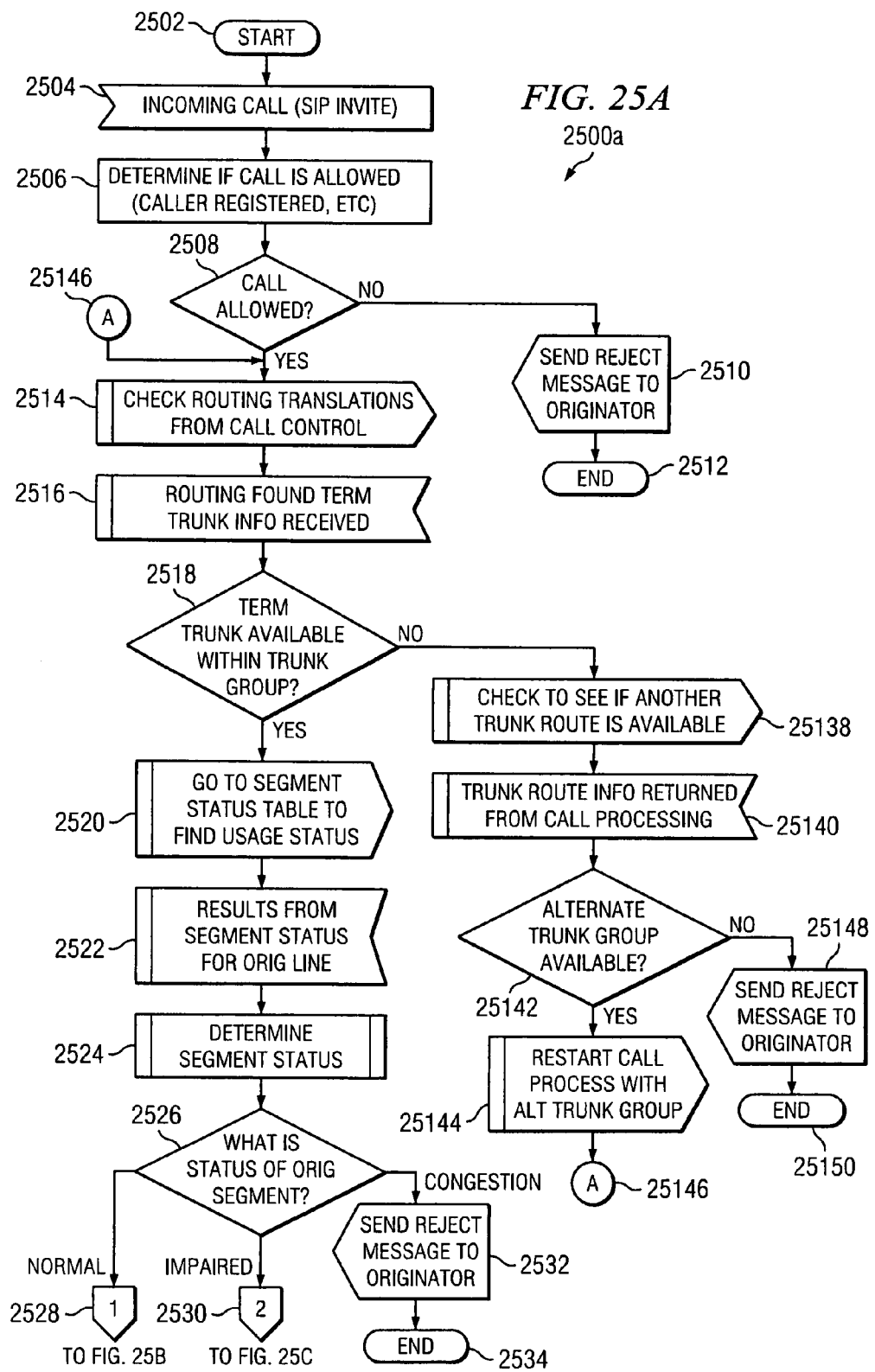
Figure 25C:
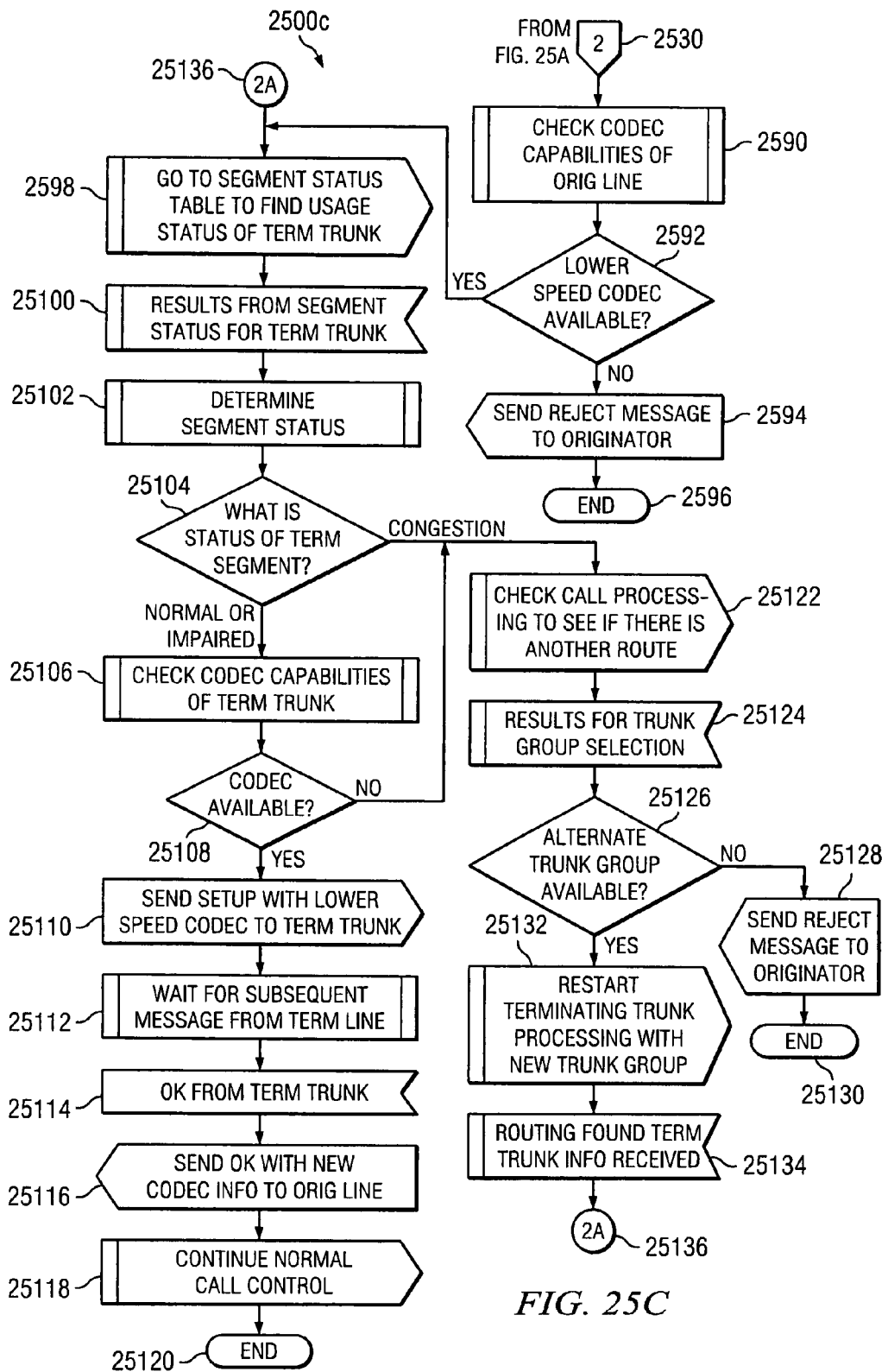

FIGS. 25A-25C (collectively FIG. 25) are flow diagrams of an exemplary process for providing call processing for rerouting a call between an originating line and terminating trunk. The process in FIG. 25 may be performed by a call processor at the CCM 1502 (FIG. 15) or, optionally, other call managers if distributed on the packet network. The process 2500a starts at step 2502. At step 2504, an incoming call is received. In one embodiment, the incoming call is an SIP invite. At step 2506, a determination may be made if the call is allowed by determining if the caller is registered with the service provider. A determination may be made at step 2508 to determine if the call is allowed. If not, the process continues at step 2510, where a "reject" message is sent to the originating call device and the process ends at step 2512. If the call is determined to be allowed at step 2508, then the process continues at step 2514, where routing translations from the call controller are checked. Terminating trunk information is received at step 2516. Additionally, node segment assignment information for the originating line and terminating trunk group may be received.

At step 2518, a determination may be made as to whether a terminating trunk in a transmission path between the originating call device and terminating call device is available within the trunk group. If so, then a node segment status table may be used to determine usage status of the node segments along the transmission path. At step 2522, results from the node segment status for the originating line may be received. At step 2524, determination of the originating line segment status may be determined. In one embodiment, three node segment statuses may be determined, including "normal," "impaired," and "congested." At step 2526, a determination as to the status of the originating node segments may be determined. If it is determined that status of the originating node segment is normal (i.e., status is within a range that provides for normal, full transmission rate operation), then the process continues at step 2528 in FIG. 25B. Otherwise, if it is determined that the originating node segment is impaired, the process continues at step 2530. If, however, it is determined that the originating node segment is congested, since there are no alternatives, the process continues at step 2532, where a "reject" message is sent to the originating call device. The process ends at step 2534.

In one embodiment, the line and trunk state checking may become part of the call processing procedure. Typically, Call Admission Control functions are blindly applied without regard to path state to reserve bandwidth. In one embodiment, the line and trunk state utilization and performance management may be provided as a state to the reservation engine in a switch to validate or accelerate the "CAC approval" verses statically assigning the number of calls allowed. This modification provides enhanced value given that CAC function assumes a static CODEC utilization and cannot predict the use of silent suppression or unknown real-time use in the transmission path. It should be understood that the CAC function may be part of the CCM or reside outside the CCM on a centralized CAC resource, such as a RSVP or RAC server.

From step 2528 in FIG. 25B, the process continues at step 2536 where the node segment status table is accessed to determine usage status of the terminating trunk. The results from the node segment status table for the terminating trunk are returned at step 2538. A determination at step 2540 is made of the node segment status of the terminating trunk. If the determination at step 2542 of the status of the terminating segment is normal, then the process continues at step 2544, where an invite to establish the call via the terminating trunk is performed. At step 2546, normal call control is performed and the process ends at step 2548.

If at step 2542, a determination is made that the status of the terminating segment is impaired, then at step 2550, a check of CODEC capabilities of the terminating trunk may be performed. If at step 2552 it is determined that a CODEC having a lower rate is available, then at step 2554, a check as to the CODEC capabilities of the originating line is performed. At step 2556, if the determination is made that a CODEC is available with a lower rate at the originating line, then the process continues at step 2558 to send a set-up request for a lower speed CODEC to the terminating trunk. At step 2560, the call processing waits for a subsequent message from the terminating trunk indicating that the terminating trunk has been able to set-up a CODEC with a lower speed at step 2562. At step 2564, a message is sent to the originating line with new CODEC information. At step 2566, the call control continues normally and the process ends at step 2568. If at step 2556 a determination is made that no CODECs are available at a lower rate for the originating line, then a "reject" message is sent to the originating call device at step 2570 and the process ends at step 2572.

If (i) at step 2542 a determination is made that the terminating segment is congested or (ii) at step 2552 that no CODEC is available at the terminating trunk, then the process continues at step 2574, where call processing is checked to determine if there is another route available from the originating call device to the terminating call device via a different trunk. At step 2576, results for a trunk group selection is returned and a determination as to whether an alternative trunk group is available at step 2578. As understood in the art, a trunk group is two or more trunks of the same type between two different nodes. If an alternative trunk group is available at step 2578, then at step 2580, a message may be sent to restart terminating trunk processing with a new trunk group. The new terminating trunk information is received at step 2582. Additionally, node segment assignment information for the alternative terminating trunk group may also be received. The process continues at step 2584, which repeats the process from step 2536 using the new terminating trunk for determining whether a call may be established via that trunk.

If at step 2578 it is determined that an alternative trunk group is not available, then at step 2586, a "reject" message may be sent to the originating call device. The process ends at step 2588.

Continuing from step 2526, if a determination that the status of the originating segment is impaired, then the process continues at step 2530 (FIG. 25C). At step 2590, CODEC capabilities of the originating line are checked. At step 2592, a determination is made as to whether a lower speed CODEC is available. The lower speed CODEC may be programmed to be lower or be another CODEC that operates at a slower speed or change from multi-media to voice-only or reduce to voice-only speed. If a lower speed CODEC is not available, then at step 2594, a "reject" message is sent to the originating call device. The process ends at step 2596.

If it is determined that a lower speed CODEC is available at step 2592, then at step 2598, the network segment status table is accessed to find usage status of the terminating trunk. At step 25100, results from the network segment status table for the terminating trunk are returned, and a determination as to the terminating trunk segment status is made at step 25102. At step 25104, a determination is made as to whether the terminating trunk segment status is normal, impaired, or congested. If it is determined that the terminating trunk segment status is no more impaired, then at step 25106, CODEC capabilities of the terminating trunk are checked. At step 25108, a determination may be performed to determine whether the CODEC is available. If a CODEC is available, then at step 25110, a set-up request for a lower speed CODEC may be sent to the terminating trunk. At step 25112, the call processing waits for a subsequent message from terminating trunk until the terminating trunk notifies the call processing that the lower speed CODEC is available and ready at step 25114. At step 25116, the new CODEC information may be sent to the originating line. The call control processing may continue normally at step 25118 and the process ends at step 25120.

If at step 25104 a determination is made that the terminating segment is congested or at step 25108 no CODEC is available at the terminating trunk, then the process continues at step 25122 to request from the call processing as to whether there is another route available via another trunk. At step 25124, results for another trunk group selection are returned. At step 25126, a determination is made as to whether an alternative trunk group is available. If not, then at step 25128, a "reject" message may be sent to the originating call device and the process ends at step 25130. If at step 25126 a determination is made that an alternative trunk group is available, then at step 25132, a message to restart the terminating trunk processing with a new trunk group is initiated. At step 25134, new terminating trunk group information is received along with segment assignment information for the alternative terminating trunk group. The process continues at step 25136, which causes the process to use the new terminating trunk group to determine whether a call may be established via that trunk group for the call by the originating call device to the terminating call device.

Continuing at step 2518 of FIG. 25A, if it is determined that no terminating trunk is available within a trunk group, then at step 25138, the call processing checks to determine if another trunk route is available. At step 25140, the call processing returns information indicative of the trunk availability. A determination at step 25142 is made as to whether an alternative trunk group is available. If an alternative trunk group is available, then at step 25144, the call processing may be restarted with the alternative trunk group and the process returns at step 25146 to step 2514 (FIG. 25A).

In summary, the process of FIG. 25 is used to determine status of a transmission path between an originating call device and a terminating call device via a trunk group. In determining the status, if the trunk group is having a communication problem as determined by a network segment status table that derives its information from network performance information received from node segments on the packet network, then the call processing determines whether it can lower the bandwidth of a CODEC or find an alternative route via another trunk group that has better communication performance for routing the call to a requested end-point.

Additional Call Rerouting

In one embodiment, the principles of the present invention provide for network performance information to be utilized in rerouting calls to subscribers in the event of a node segment being determined to be impaired or congested, or otherwise unavailable for example. In such an event, when a call comes into the CCM, the CCM may use a directory to look up other potential contact's telephone numbers or addresses to which the incoming call may be routed in an attempt to connect the calling party with the called party. For example, if a calling party has attempted to reach a called party on his or her mobile handset and the CCM determines that the transmission path to the subscriber's mobile handset is not working properly, then the CCM may locate an alternative number of the called party, such as a home or work telephone number or other identifier, such as an SIP Universal Resource Identifier, and route the incoming call to the called party's alternative number or identifier. In one embodiment, the CCM makes the decision as to which number to call based on time of day or other factors (e.g., a subscriber preference parameter).

In another embodiment, the CCM may receive a call to a subscriber that the CCM knows to be on a heavily congested or otherwise degraded node segment. The CCM may make a decision to place the call directly into a called party's voice-mail rather than tie up the heavily congested or otherwise impaired node segment with additional real-time content communication. Alternatively, the CCM may notify the heavily congested or otherwise degraded node segment to slow down, halt or otherwise offload non-real-time content communications being communicated through the node segments so that the telephone call, which is a real-time content communication, may be properly and timely placed to the called party.

Congestion Control

Calls from trunks, such as the network-to-network interface or session border controller 1510 of FIG. 15, to lines over a packet network present different challenges than line to line or line to trunk calls. Since the call control manager does not have complete control of a packet trunk path being selected for in-coming calls into the soft-switch, congestion control is somewhat limited. If a call enters the soft-switch from another network, trunk selection is actually controlled by the other or far-end network. The call control manager, however, may have some level of call control utilizing the principles of the present invention.

Generally, when a call comes into the network, call processing operating in the CCM receives an incoming call message with data identifying the port and address of the incoming call. Based on the port, address, and called number information, the CCM determines the transmission path, including the node segments, over which the call is assigned. In accordance with the principles of the present invention, the CCM may examine the status of the node segments associated with the transmission path. If the status of the node segment is classified as impaired, call processing may determine if the terminating line has the capability of using a lower bandwidth CODEC. If so, then the CCM may send a set-up message to the end-point requesting use of the lower bandwidth CODEC. In a return response to the other network, call processing may pass the new request for the lower bandwidth CODEC. If accepted by the other network, the call may proceed. Otherwise, the call is terminated.

For other calls coming into the network via the trunk, the CCM may follow the same process of determining whether a CODEC having a lower bandwidth is available. If a network segment status is congested, call processing may not try to process the incoming call and send a release to the other network via the originating trunk.

In one embodiment, the CCM may manually or automatically enact call throttling procedures based on congestion of the originating trunk segment interconnecting to the other network. These throttling procedures may be in the form of automatic congestion control (ACC), selective incoming line control (SILC), call gapping, number or IP address blocking, or any other well-known throttling call control mechanisms. Based on timers or incoming call counts, the CCM may allow calls to be attempted at certain times to test the congestion of the path. If the node segment becomes uncongested, call processing may allow calls to enter the network and throttling mechanisms may be taken off of that path.

Figure 26A:
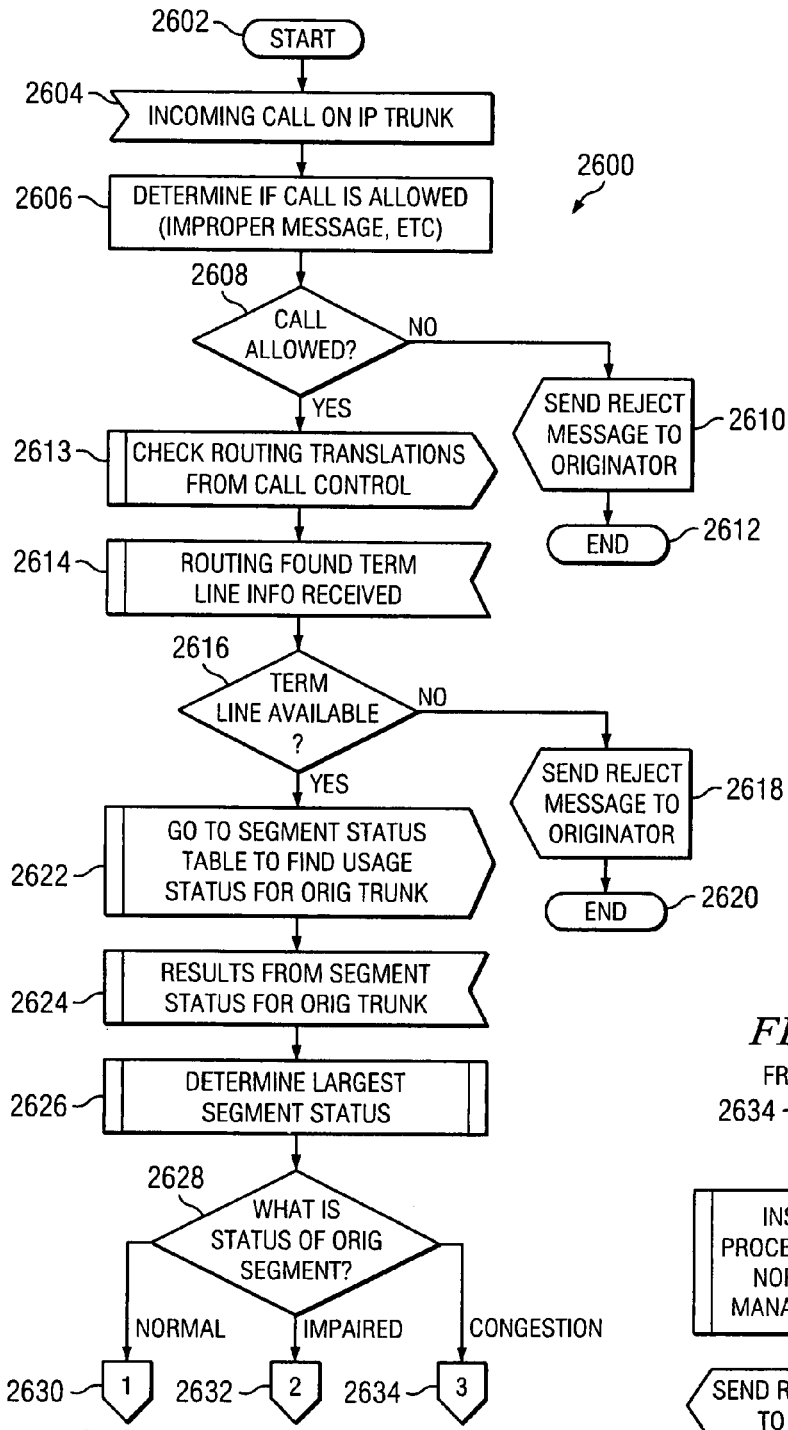
FIGS. 26A-26C (collectively FIG. 26) is a flow chart of an exemplary process for performing congestion control for calls coming through an IP trunk to a line.
Figure 26C:
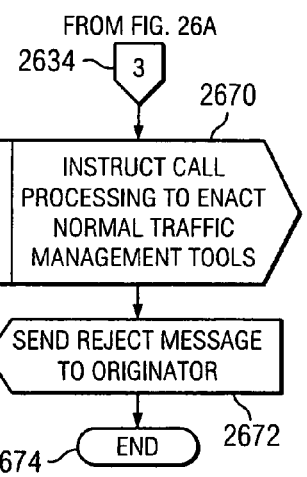

FIG. 26 is a flow chart of an exemplary process for performing congestion control for calls coming through an IP trunk to a line. The process 2600 starts at step 2602. At step 2604, an incoming call is received on an IP trunk. At step 2606, a determination is made if the call is allowed, where a call may not be allowed if an improper message is received, for example. At step 2608, determination of the call being allowed is performed. If the call is not allowed, then a "reject" message is sent to the originating call device at step 2610 and the process ends at step 2612. If the call is allowed, then the process continues at step 2613, where a request for routing translations from a call controller is made. At step 2614, the determined routing and terminating line information is received. Additionally, node segment assignment information for the originating trunk and terminating line information including all node segment assignment information may also be received.

At step 2616, a determination is made as to whether the terminating line is available. If not available, then at step 2618, a "reject" message is sent to the originator and the process ends at step 2620. If at step 2616 it is determined that the terminating line is available, then at step 2622, the network segment status table (e.g., TABLES V-VI) may be accessed to find usage status for the originating trunk. Results from the network segment status table for the originating trunk are received at the call controller at step 2624, and a determination of the largest segment status is made at step 2626 to determine a worst parameter of the trunk.

At step 2628, a determination is made as to the status of the originating segment at the trunk. If the status is determined to be normal, then the process continues at step 2630. If the status of the originating segment is determined to be impaired, then the process continues at step 2632. If the status of the originating segment is determined to have congestion, then the process continues at step 2634. It should be understood that the status may have more or fewer levels than those presented herein. The levels (i.e., normal, impaired, and congested) represent a range of values determined from network performance information reported to the CCM and stored in a table as collected by network communications devices or nodes on the packet network.

If a determination is made at step 2628 that the status of the originating segment at the trunk is normal, then the process continues at step 2636 (FIG. 26B), where a request to access the network segment status table to find usage status of the terminating line is made. At step 2638, results from the network segment status table for the terminating line is received. The termination of the network segment status of the terminating line is performed at step 2640. At step 2642, a determination is made as to the status of the terminating segment. If the status of the terminating segment is determined to be normal, then the process continues at step 2644, where an invite is sent for set-up with a normal or conventional request to the terminating trunk. At step 2646, the process continues normal call control and the process ends at step 2648.

If, at step 2642, a determination is made that the status of the terminating segment is impaired, then the process continues at step 2650, where CODEC capabilities of the terminating line are checked. If a lower rate CODEC is available, as determined at step 2652, then the process continues at step 2654, where a set-up with the lower speed CODEC is sent to the terminating line. At step 2656, the call controller waits for a subsequent message from the terminating line, and, upon receiving a response from the terminating line indicating that the lower rate CODEC is available at step 2658, a message is sent to the originating IP trunk with the new lower rate CODEC information at step 2660. At step 2662, the call control process continues to complete call set-up and ends at step 2664.

If at step 2642 a determination is made that the status of the terminating segment is congested or no lower rate CODEC is available at step 2652, then the process continues at step 2666, where a "reject" message is sent to the originating call device. The process ends at step 2668.

Figure 26B:
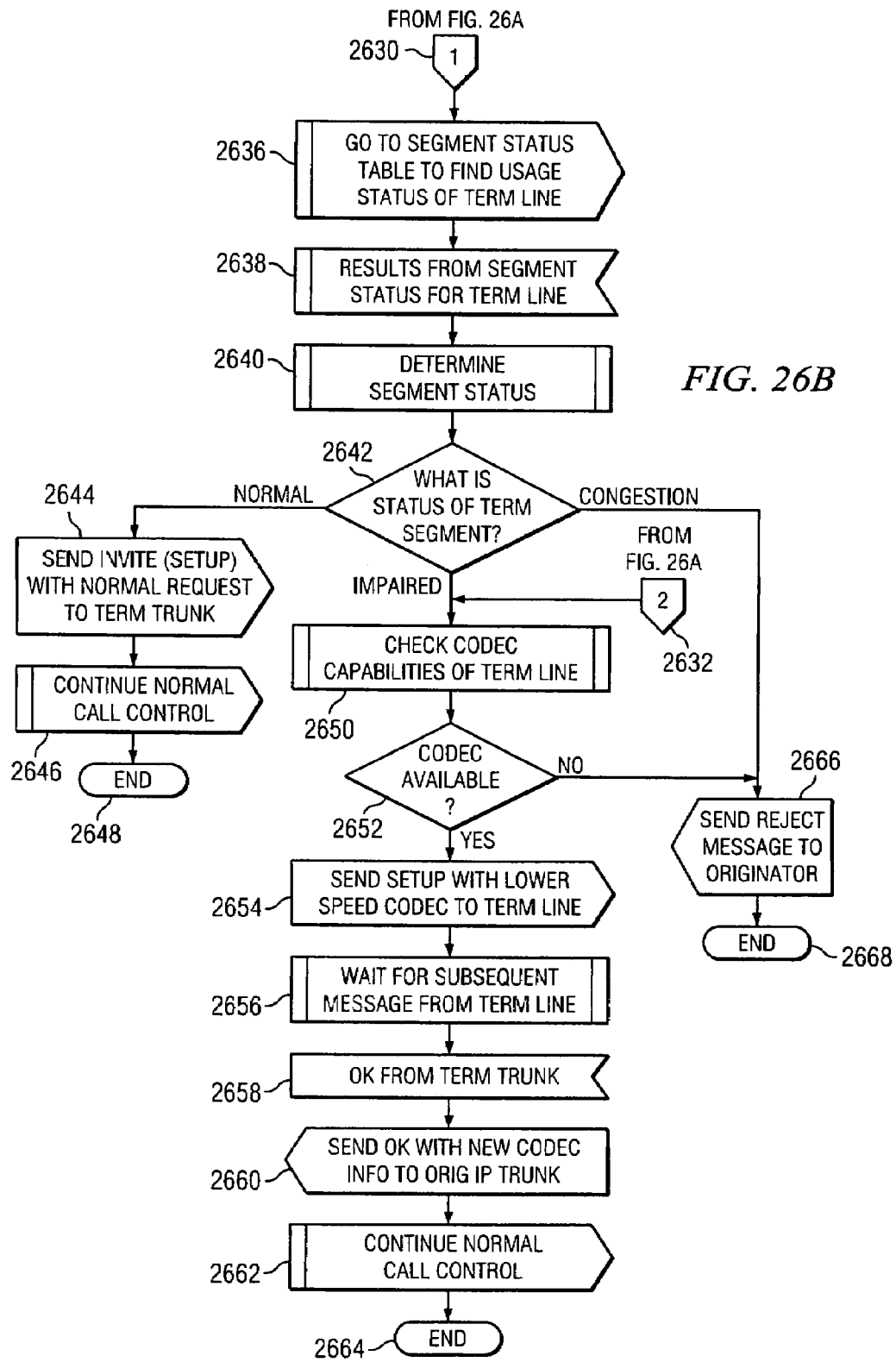

Returning back to step 2628, if the status of the originating segment is determined to be impaired, then the process continues at step 2632, which enters the process at step 2650 in FIG. 26B. If at step 2628 the status is determined to be congestion, then the process continues at step 2634 in FIG. 26C. At step 2670, an instruction to the call processing to enact normal traffic management tools is made and a "reject" message is sent to the originating call device. The process ends at step 2674.

In summary, the process provided in FIG. 26 attempts to improve call quality in the packet network when calls enter the network via a trunk to a line in the packet network by examining node segment performance for the node segments over which the call is to be routed. The CCM may examine tables that include node segment status and, if a node segment is found to be impaired, attempt to lower the rate of a CODEC through which the call is routed. Otherwise, the call may be dropped.

Data Routing

The network performance information may include information indicative of a node segment being impaired or congestion to the point that non-real-time information is buffered, blocked or otherwise impeding real-time content from being timely communicated therethrough. The node, layer 2, or above protocol stack, such as the Multi-Protocol Label Switch (MPLS) Label Description Protocol (LDP) stack, may determine that the node segment, such as a router, is being overloaded with non-real-time content and cause the node to slow down, delay, stop, or drop the non-real-time content from being communicated through the node segment. The higher protocol stacks may use the transmission state information to make decisions for Label Switched Paths (LSP) to modified, rerouted, or shaped based upon the link state measured for both real, and non-real-time content. Once the higher protocol stacks have the real-time information, functions, such as choosing LSPs or load balancing are possible. Oversubscription rules may also be dynamically calculated based upon an amount of real-time traffic traversing over a path or segment, utilization and performance information communicated to the higher protocol stacks, and provisioning engines associated with the higher network protocols. Given higher stack protocols, such as MPLS, or Provider Backbone Transport (PBT), traffic engineering may be used to setup and reroute virtual circuits knowing the amount of real-time bandwidth usage and a path state that enables a higher reliability so that failovers will not exceed oversubscription parameters. This state knowledge may be used by packet mesh networks where multiple paths exist and each path has multiple backup paths. In general, data networks use a 1:n path protection schema. When three or more links exist, protection is typically non-linear as potential bandwidth usage is a function of the destinations identified in the routing tables. To enable packet failover in a 1:n configuration where the amount of real-time traffic is known provides a network carrier with greater service assurance reliability and metrics to manage the network. In summary, the network performance information for segments is stored at network nodes tracking the real-time bandwidth usage and other performance data. The stored network performance information is made available to the higher protocols, such as MPLS, LDP, and EMS systems to track the amount of real-time or near real-time bandwidth being used. Tracking the real-time bandwidth usage enhances network management for provisioning systems, failover protocols, traffic management analysis, and billing system utilization.

In one embodiment, a decision as to which real-time content or non-real-time content to prioritize, slow, throttle, block, rate, re-route, or otherwise control may be made based on both network performance information and service level commitments or guarantees of the quality of service that have been made to a particular customer. For example, such decision may be made to minimize the amount of service level credits that have to be made to a particular service providers customers based on how such decisions would impact the ability of the service provider to satisfy one or more such service levels or quality of service guarantees. If customer quality of service levels and guarantees are to be used for managing network performance, then a database including customer quality of service and other service contract parameters may be stored and accessed to verify that the network performance information meets the contractual requirements for customers of the communications carrier. In one embodiment, a determination may be made that a particular application is utilizing too much bandwidth through a node segment. For example, an application for streaming a movie, television show, or other entertainment content may be utilizing bandwidth at a network node that is being strained to deliver real-time content during a particular time period. The non-real-time content associated with that application may be slowed down, dropped, or rerouted to another node segment so that the real-time content being communicated over the node segment may be properly serviced. The CCM may additionally track applications over time to determine that other provisioning may be utilized for that application during certain time periods or permanently due to increased traffic, either real-time or non-real-time content, via one or more network nodes.

Enhanced Messaging Services

An Element Management System (EMS) may be used by communications carriers to monitor and manage performance of their respective networks. Network performance information may be collected and sorted in a manner to provide for reporting, provisioning, billing, and troubleshooting purposes. The functions may use the network performance information and distinguish between real-time and non-real-time content communications.

Figure 27A:
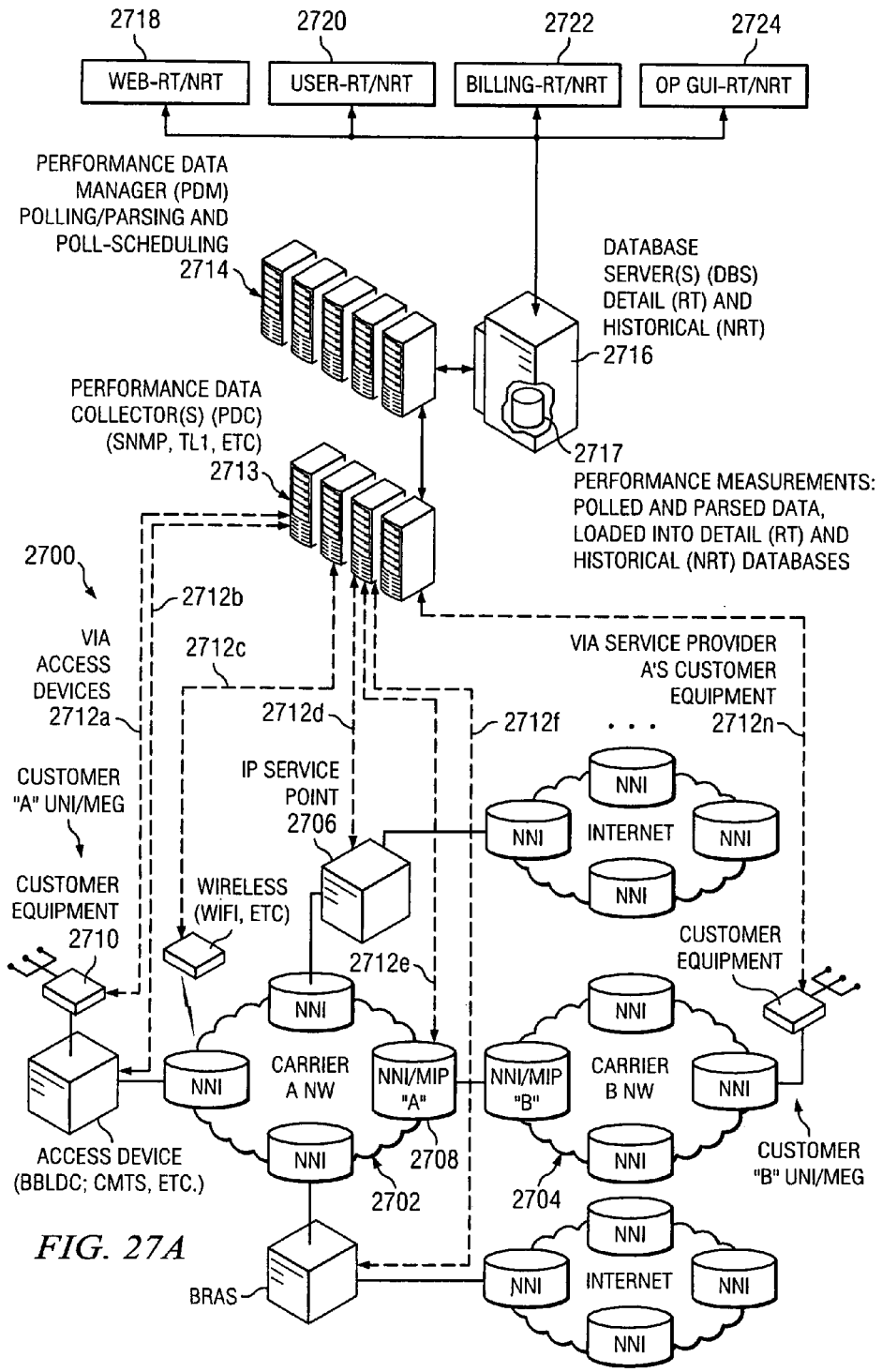
FIG. 27A is an illustration of an exemplary network system that includes two networks operated by different communications carriers.

FIG. 27A is an illustration of an exemplary network system 2700 that includes two networks 2702 and 2704 operated by different communications carriers. Each of the networks 2702 and 2704 may be used for providing communications services for customers of the respective carriers. In one embodiment, the carriers are telecommunications carriers. Alternatively, the carriers may provide Internet services or other networking services and use equipment that collects network performance information indicative of performance of the network in communicating real-time and non-real-time content over the respective networks 2702 and 2704. The network equipment may be configured to use PIP packets for generating and collecting the network performance information.

One or more performance data collectors (collectively performance data collector) 2713 may be configured to be in communication with network equipment that operates on the network of a carrier, such as network 2702. As shown, the performance data collector 2713 is in communication with end-point devices, such as IP service point 2706, network-to-network interface 2708, and customer access device 2710, for example. However, other network communications devices may also be in communication with the performance data collector 2713, either directly or indirectly. In one embodiment, the performance data collector may communicate with the network communications devices via out-of-band communications paths 2712a-2712n (collectively 2712). Alternatively, the performance data collector 2713 may communicate with the network communications devices via in-band signaling paths (not shown).

A performance data manager 2714 may be configured as one or more computing devices and be in communication with the performance data collector 2713. Although shown as two or more separate devices, the performance data manager 2714 and performance data collector 2713 may be configured as a single computing device. The performance data manager 2714 may further be in communication with a database server 2716, optionally configured in multiple devices, that is operable to store one or more databases 2717, including the network performance information collected from network communications devices on the packet network 2702 by the performance data collector 2713. The databases 2717 stored in a database server 2716 may be managed by an off-the-shelf database system, such as an Oracle® database or any other commercially available database. Alternatively, the database may be created and managed by a communications carrier or other entity.

In operation, the performance data manager 2714 is configured to instruct the performance data collector 2713 to request and access network performance information from network communications devices on the packet network 2702. The performance data collector 2713 may, in turn, issue requests or polls to the desired network communications devices, either directly or indirectly, to obtain network performance information desired by the performance data manager 2417. In one embodiment, the performance data manager 2714 may issue commands to the performance data collector 2713 on a periodic basis (e.g., every 15 minutes). More particularly, the performance data manager 2714 may be configured to request certain network performance information more often than other network performance information. For example, transmission quality and connectivity may be collected every second or minute while transmission rate and bandwidth is collected every 15 minutes. Alternatively, the performance data manager 2714 may be synchronized with the modified Y.1731 stack bins in requesting counter values in each bin at the appropriate time intervals. Still yet, the performance data manager 2714 may be configured to request network performance information in response to an event after parsing and examining network performance information previously collected. In one embodiment, the performance data manager 2714 operates to collect data from a data packet of a single carrier. Alternatively, the performance data manager 2714 may be configured to collect network performance information from multiple networks of multiple carriers, if such permission is provided by the different carriers. The performance data manager 2714 may be managed by a carrier or a third party, where the third party is independent from the carriers and has permission to access and manage certain or all network performance information post-processing operations for the carriers. In these later two cases, where a third party is involved, quantity of access requests and/or information may become a basic billing element used in providing access to this information.

In accordance with the principles of the present invention, the performance data manager 2714 and performance data collector 2713 may be configured to request and receive network performance information, including performance and utilization, associated with communications of data packets including real-time and non-real-time content. The performance data manager 2714 or performance data collector 2713 may store the network performance information in the databases on the database server 2716, as distinguished by the different types of content being communicated on the data packet network 2702. It should be understood that if other types of content were communicated over the packet network 2702 and identified as a particular data type (e.g., video, music), network performance information indicative of the particular data type may be similarly collected and stored, accordingly. Because the network performance information is stored in a manner that distinguishes network performance and utilization for communication of real-time content and total content, the service provider, its partners, and customers may use the network performance information to manage network communications equipment, monitor network usage, generate reports, and provide billing based on real-time and non-real-time content communications over the network.

Collection of the network performance information may be directly or indirectly communicated from each individual network communications device on the network 2702 or from a table or other repository of a call control manager (e.g. CCM 1502 of FIG. 15) or other device that has collected some or all of the network performance information desired by the performance data manager 2714. In one embodiment, when the performance data manager 2714 instructs the performance data collector 2713 to collect the network performance information from the network communications devices, counters are read to collect their current values. For example, the modified Y.1731 counters configured as bins for different time periods over which the counters are used to count the real-time and total data packets being communicated to and from the network communications devices. In response to the counters performance information being collected by the performance data collector 2713, the counters within each of the network communications devices may be reset so as to avoid rollover of the counters, a mathematical situation that is inherently more difficult to manage. Furthermore, tables of the network performance information that are stored at the network communication devices may be cleared or otherwise archived at the network communications devices in response to the performance data collector 2713 retrieving network performance information from the tables. Real-time archiving of all collected information from the device to the databases 2717 may be required to facilitate security or other business purposes.

The databases 2717 stored in the database server 2716 may be organized in a variety of ways to enable the network performance information to be processed and used for a variety of functions, including billing, reporting, provisioning, generating alerts, managing network communications devices, or otherwise. TABLE IV, presented hereinabove, is an exemplary table of network performance information that may be stored in the databases 2717 in the database server 2716. It should be understood that other network performance information may be stored in the databases to provide additional visibility into the network performance at each node segment. Still yet, it should be understood that virtually any network performance information that can be collected by network communications devices may be collected and stored in the databases 2717 on the database server 2716.

The database may be further expanded to include statistical or other information derived from the network performance information or other database systems and/or database information. For example, trends, such as usage over a time period of an hour, a day, a week, a month, or a year may be stored in the database in association with each node segment or otherwise. For example, customer information, circuit IDs, or other may be stored. The network transmission information and statistics may be configured to accommodate any billing or post-processing operations. For example, if the principles of the present invention provide for charging customers differently for real-time bandwidth and non-real-time bandwidth usage, that information may be separately determined and stored in the databases 2717. The databases 2717 may include virtually any data structure to accommodate current cost, and pricing structures associated with real-time and non-real-time content usage. The current cost may be defined for consumer, commercial and/or wholesale subscribers or on a customer-by-customer basis, for example.

The database 2716 server may be configured to enable access to the network performance information stored in the databases to various entities, including, but not limited to, web entity 2718, user entity 2720, billing entity 2722, and operations entity 2724. Each of these entities may access the network performance information stored on the database server 2716 via a communications device, such as a personal computer, mainframe computer, wireless device, or otherwise. Another embodiment may include pushing portions of this data from the database to similar entities, paging/text terminals, and other alarming and alerting entities.

Web Entity

Figure 28A:
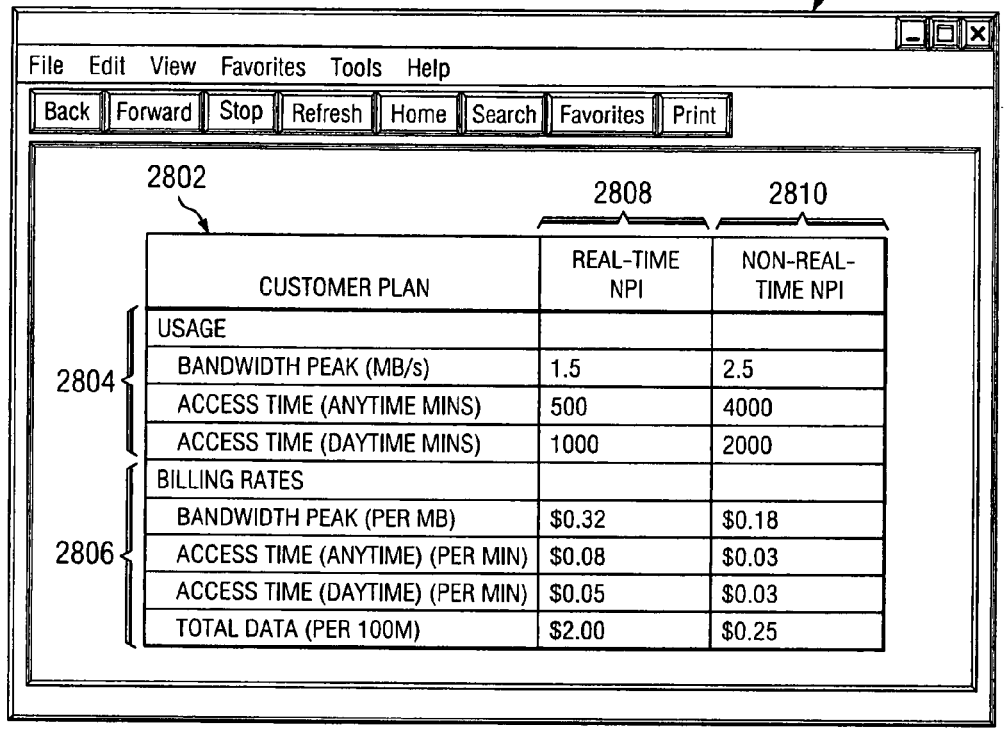
FIGS. 28A and 28B (collectively FIG. 28) are screenshots of exemplary web browser interfaces.
Figure 28B:
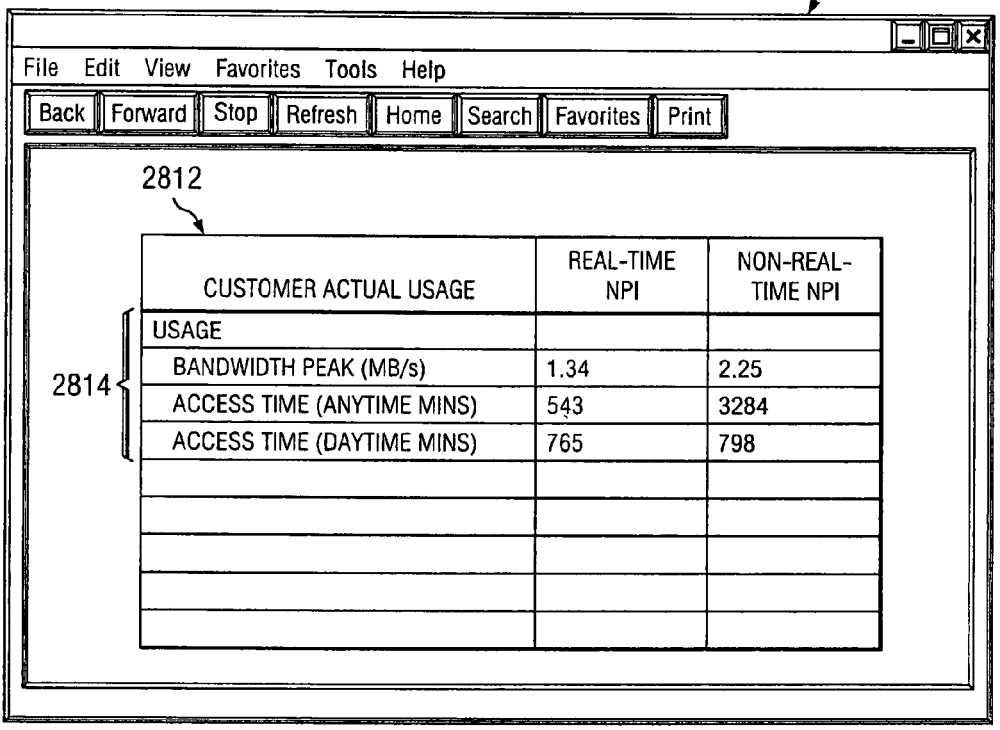

The web entity 2718 may utilize an Internet interface for displaying the network performance information, as well as customer billing plan information that distinguishes between real-time network performance information and non-real-time network performance information stored in the databases 2717 web interface. FIGS. 28A and 28B (collectively FIG. 28) are screenshots of exemplary web browser interfaces 2800a and 2800b, respectively. In web browser 2800a, an exemplary customer billing plan table 2802 may be used to display a customer billing plan that includes usage allocation 2804 and billing rates 2806 associated with that usage allocation. The billing rates and other billing related information may be stored on the billing party computer, server hosting the website, databases 2717, or other server. In one embodiment, the usage allocation may include bandwidth, peak (megabits per second), access time for "anytime" minutes, and access time for daytime minutes, for example. In another exemplary embodiment, the billing rates 2806 may include parameters, such as bandwidth, peak rate, access time (anytime on a per minute basis), access time (daytime on a per minute basis), and total data (on a per one hundred megabit basis). As shown, real-time and non-real-time settings may be different as network performance information is available for both real-time and non-real-time usages. It should be understood that total usage could also be shown or shown in place of the non-real-time column and the non-real-time information could be derived by subtracting real-time content network performance information from the total information. In addition, the information may be itemized into directional information showing the same types of information identified as information into or out of the customer location.

FIG. 28B shows a web browser interface 2800b includes exemplary table 2812 that shows customer actual usage parameters 2814. These parameters reflect the real-time and non-real-time content network performance information collected by the performance data collector 2704 (FIG. 27A) and stored by the performance data manager 2714 in the database server 2716. It should be understood that other parameters that distinguish between real-time and non-real-time content usage may be utilized for billing customers. It should further be understood that parameters that do not distinguish between real-time and non-real-time usage of the packet network may be used for billing purposes as well.

Although the tables shown in the web browsers 2800a and 2800b show information associated with billing, it should be understood that other non-billing information may be displayed in a web interface. More specifically, in addition to the usage information, other information, such as service agreement terms, including quality of service, guaranteed bandwidth, base subscription fees, or any other terms or conditions between a carrier and customers, partners, other carriers, or other commercial or governmental entity may be stored and presented on the web interface. It should further be understood that the web interface may enable other, non-subscriber partners to access various information stored in the database. For example, a partner, such as a local service provider, or other communications carrier may have access to certain network performance information that the carrier who owns the network performance information may wish to share. For example, transmission connectivity of a network-to-network interface that communicates directly with the other carriers' network-to-network interface may be shared. A permissions database or table and associated security constructs, such as authentication, may be managed by the database server 2716 or other device that define the data that the communications carrier is willing to share with other carriers, customers, equipment manufacturers, or otherwise. The permissions table may provide different levels of information to different entities.

User Entity

The user entity 2720 may be a user of the communications carrier who manages the database. The user 2720 may access the network performance information stored in the database 2717 and also perform various other management operations on the databases 2717. For example, the user 2720 may generate additional tables, reconfigure the tables, design new database architectures, and so forth, so that network performance information may be expanded and provide customers, partners, vendors, etc., with different or more detailed information, for example. In addition, the user may generate different ways of managing the network performance information, such as generating statistics based on the modified Y.1731 counter bins, setting up thresholds to cause event messages for alerts to be created, setting up and initiating polls to network communications devices for various event-driven or non-event-driven reasons, and adding statistics processing for the network performance information to provide additional information to management of the communications carrier, customers, vendors, etc. It should be understood that the user 2720 may perform any other database management operation for which the user has proper administrative permissions to manage the real-time and non-real-time network performance information as understood in the art.

Billing Entity

Figure 27B:
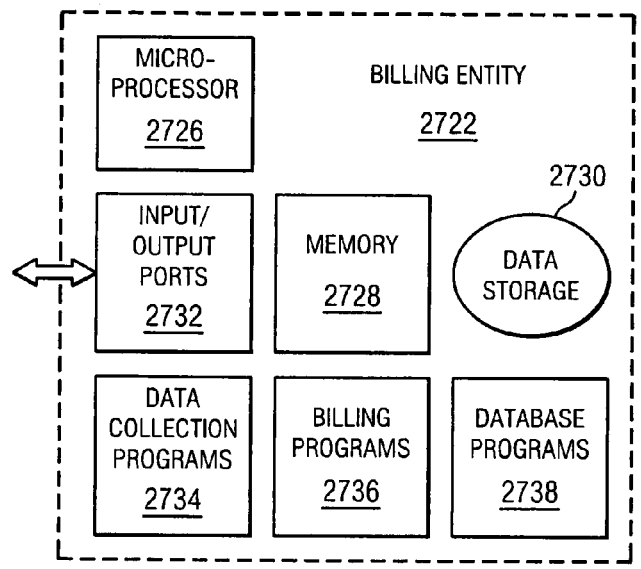
FIG. 27B is an illustration of an exemplary billing entity for use in determining billing for customers and partners of a communications carrier.

FIG. 27B is an illustration of an exemplary billing entity system 2722 for use in determining billing for customers and partners of a communications carrier. The billing entity 2722 includes a processing unit 2726 that may include one or more processors. A memory 2728 may be in communication and used for storing data and program instructions during processing operations. A storage unit 2730 may be in communication with the microprocessor 2726 and be used to store one or more databases or other storage repository that include network performance information, information derived from the network performance information, and billing information. Input/output (I/O) ports 2732 may be in communication with the processing unit 2726 and be configured to communicate over a packet network using one or more communication protocols as, too, may be the processing unit 2726. The I/O ports 2732 may be virtual in nature. For example, the I/O ports 2732 may operate as an Internet protocol socket or otherwise.

The billing entity system 2722 may use programs for managing and preparing bills. The programs may include data collection programs 2734, billing programs 2736, and database programs 2738. These programs 2734-2738 may be executed by the processing unit 2726. The data collection programs 2734 may be configured to communicate with one or more network communications devices in a virtual call path. The communication with the network communications device(s) may transfer raw (e.g., uncompressed) data records between the network and/or end-devices and the billing entity system 2722. The communication transfer may be initiated by either the billing entity system 2722, considered as an "information pull," or by network communications devices, considered an "information push." The remote network device may contain storage to aggregate multiple records and programming logic to clear information from the device once the raw information transfer has occurred.

Billing programs 2736 may use the raw data records contained within a data packet (e.g., PIP data packet) and parse data fields, such as concatenated data fields, contained within the received data packets into individual raw data fields. Each individual raw data field may be utilized by the database programs 2738 for storage in a database.

The billing programs 2736 may further routinely process the database records. This processing may include consolidation of multiple raw data records into one or more processed records, summation of real-time and/or non-real-time raw data field information into totals and/or sub-totals over a time-window or session duration. These totals or sub-totals may include start and stop time of usage, summation of time of usage, total packets sent/received with and/or without error, statistical performance calculated values, and/or any other types of information that can be derived via processing raw data records of network performance information. Additionally, the billing programs 2736 may perform ratings, which are the monetization of billing records. Totaled or derived fields may be assessed against a set of business charging rules and a monetary charge amount may be established for each data record stored in the storage unit 2730 by the database programs 2738. The billing entity system 2722 may consolidate multiple rated billing records on a per customer basis. By consolidating the multiple rated billing records, additional calculation or rating function may provide specific business functions, such as discounting or otherwise.

Continuing, the billing entity 2722 may use the network performance information stored in the database to provide for billing plans for customers and other carriers to include billing for both real-time and non-real-time network usage. This additional resolution of billing (i.e., real-time usage billing) is a result of being able to determine packet communication of real-time content over the packet network by using performance information packets, for example. Consumers may be billed for real-time content usage, non-real-time content usage, and total usage of network communication capacity. The capacity may be a function of the bandwidth usage for real-time content and total packet communications over the network. In one embodiment, Erlangs, which is generally understood to be mean total traffic volume over a period of one hour or 3600 seconds (centum call seconds), may be used as a measure for the carrier to provide accurate billing for customers. The specific calculation of Erlang may vary to account for different network performance information being used to determine the number of Erlangs used during a billing cycle. In accordance with the principles of the present invention, the Erlang measure may be used to determine real-time, non-real-time, and total usage by a subscriber or other carrier by calculating total traffic volume of subscribers of other communications carriers communicating on the communication carrier's network in a roaming situation. In addition, because a communications carrier may monitor bandwidth and other network performance information for both real-time and non-real-time content communication, the communications carrier may add or offset a subscribers bill based on factors, such as transmission quality, connectivity, or rate or other network performance information and/or business purpose, such as a Service Level Agreement, that may be collected during a billing cycle. Such offset may also be utilized for other carriers' bills as well.

As an alternative or complement to using Erlangs as a standard of measure, the carrier may assign points or other units of measure to a subscriber for real-time usage and non-real-time usage. For example, a real-time usage minute may be worth three points and a non-real-time usage minute may be worth one point. The billing may indicate the number of points that the subscriber has used and charge the subscriber accordingly. For example, if the subscriber uses thirty minutes of real-time usage, which translates to ninety points, then that subscriber may be charged differently from a subscriber using thirty minutes of non-real-time minutes, which is only thirty points. Other creative ways of billing based on real-time usage resolution may also be utilized in accordance with the principles of the present invention. Furthermore, because the database of network performance information may include timestamps with collected usage information of a subscriber and other carriers, the billing entity 2722 (FIG. 27A) may use that information based on a time of day to set rates during peak and non-peak network congestion time periods. This time of day or network congestion time period may be utilized by the carrier to bill the customer for usage during peak and non-peak times.

The billing process may further use terms of a customer's plan to limit network usage for real-time and non-real-time communications. If, for example, a customer has a service agreement for two thousand minutes of real-time minutes, the performance data manager 2714 may monitor a customers real-time content minute usage, optionally as measured in terms of Erlangs or bytes of real-time traffic, and determine that a customer has exceeded the limit based on the customers usage plan. In response to the customer exceeding the usage minutes in his or her usage plan, the carrier may perform a number of different options, including (i) shutting off the users real-time content communications, (ii) allow the customer to continue using the network for real-time content communications, for example, but use a "best efforts" process or lowest available CODEC for allowing access to the network, where "best efforts" means that the user will receive a lower priority status, such as non-real-time data communications access priority, (iii) premium bill the client so that the client pays extra to continue having priority for real-time content communications, (iv) trade units, such as allowing the customer to use additional non-real-time units for real-time usage at a higher exchange rate (e.g., five non-real-time usage points for every minute of real-time content communications usage), (v) take an advancement towards next month's usage minutes, or (vi) any other plan that enables the user to continue with real-time usage or non-real-time usage over the usage plan limits. In one embodiment, a message may be sent to the customer to select an option for continued service above his or her service agreement limits. In another embodiment, a customer may "pre-pay" for real-time units, and be denied service once the units are used. In yet another embodiment, two carriers may make business and connectivity arrangements to inter-exchange database information to allow a subscriber to "roam" onto another provider's network and still have access.

The same, similar, or different billing arrangements may be utilized for determining billings for commercial entities, such as reciprocal billing between carriers based on the real-time bandwidth transmission from one carrier to another or on an aggregate basis, for example. When managing accounts with other carriers, trade units of usage, including real-time and non-real-time content usage, may be resolved at the end of a billing cycle. By having real-time and non-real-time content usage information, trading units can become "creative" such that the carriers may either better balance the usage of each others' networks or gain a business advantage by being able to (i) restrict another carrier's usage of the packet network or (ii) collect additional fees for providing additional real-time content usage or non-real-time content usage of the carriers network. It should be understood that many real-time and non-real-time content usage network performance information parameters may be utilized in determining billing arrangements with subscribers and billing and sharing level arrangements with other carriers having reciprocal billing arrangements.

Reciprocal Billing

Carriers typically have inter-carrier service agreements that enable communications from one carrier to be routed over a network of another carrier. These service agreements often have reciprocal billing arrangements whereby the amount of usage of a carrier's network is balanced or paid for at a certain time period against the usage of that carriers network by the other carrier. This enables the carriers to balance the service payments other carriers based on usage differentials. In accordance with the principles of the present invention, the carriers may include metrics or parameters that track both real-time and non-real-time content communications over each others respective networks. Adding resolution to identify real-time content usage may identify imbalances occurring between carriers (i.e., one carrier is communicating significantly higher real-time content over another carrier's network). The CCM or other monitoring device may recognize this imbalance and determine that communications to subscribers may be routed to the network of the carrier that has a high balance as a credit for communications routed over that carrier's network may exist. A decision may be made to route the communications, real-time or non-real-time content communications or both, over that carrier's network.

As another example of carrier level service being imbalanced, carrier service level agreements may specify a certain quality of service or transmission rate, possibly with real-time content and non-real-time content being separately specified. A carrier may monitor for these service level agreement parameters to determine if another carrier is meeting its obligations under the agreement. If the obligations under the agreement are not being met, then the service provider may receive credits toward additional free communications services. Routing decisions may be made in response to determining that these or other service level agreement parameters are not being met and credit is available.

Another example of routing decisions being made in response to tracking network performance information or of service level agreement information may include monitoring pricing by other carriers throughout times of the day that are scheduled or in response to a high demand occurring within that carrier's network. The other carrier may "advertise" pricing or other parameters, such as bandwidth availability at an NNI node, for example, to notify other subscribers of pricing changes, availability, transmission problems, etc. The CCM or performance manager 2714, in learning of price changes either upwards or downwards, of other carriers may make routing decisions based on those pricing changes. The decision may also include factoring current credit, cost to carrier, customer bandwidth requirements, or any other parameter associated with performing communication services at a certain transmission quality, and cost to the carrier. Routing "shopping" may be performed by collecting such "advertised" information during regular PIP packet communications or special rate collection requests to each carrier network-to-network interface or session border controller with which the carrier has a service level agreement.

Operations Entity

Figure 29:
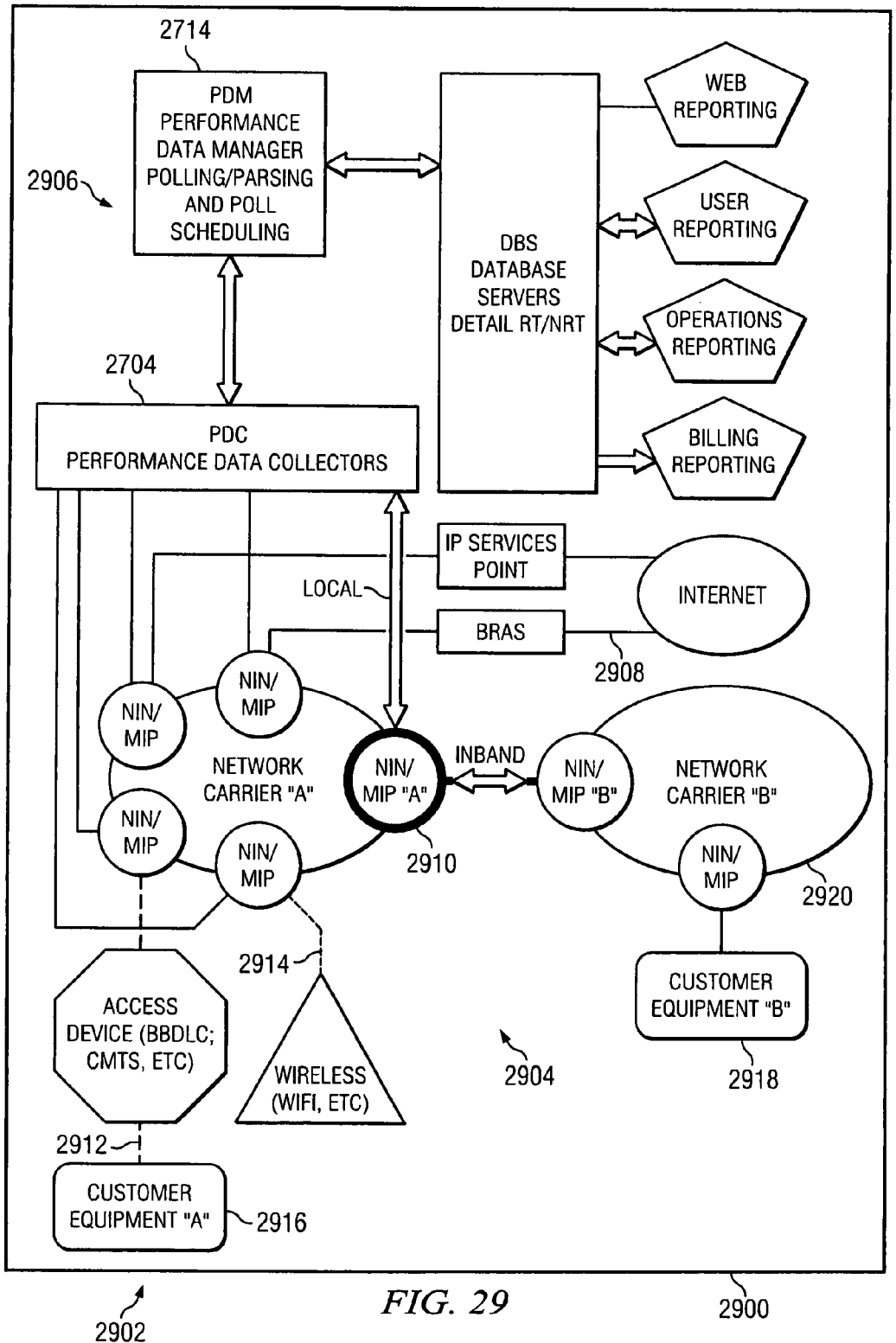
FIG. 29 is an illustration of an exemplary graphical user interface (GUI) that displays a schematic of a packet network and performance monitoring devices.

FIG. 29 is an illustration of an exemplary graphical user interface (GUI) 2900 that displays a schematic 2902 of a packet network 2904 and performance monitoring devices 2906. The schematic 2902 is a graphical representation of network communications devices located on the network 2904 including node segments over which real-time and non-real-time content communications are communicated. It should be understood that more or less detailed schematics of the packet network 2904 or other external devices or networks may be displayed. The network performance information stored in the database 2717 on the database server 2716 (FIG. 27A) may be utilized to graphically represent problems and alerts on the schematic 2902. For example, if communications on a node segment is determined to be normal, then a solid line, such as line 2908 may be displayed on the schematic. If the network performance information indicates that a node segment bandwidth is being utilized to either full or over-capacity, then the node segment may be highlighted, such as node segment 2910 using a thicker line than other node segments that are operating normally. Alternatively, color coding, flashing, or other graphical representations may be utilized to indicate high traffic volume. If a node segment is determined to be impaired, then the schematic may show a dashed line, such as line 2912. If the network performance information indicates that a node segment has congestion, then the node segment line may be dashed, such as line 2914 being visually different from a line indicating impairment. It should be understood that other graphical representations indicating high usage of real-time bandwidth, non-real-time bandwidth, or any other network performance information that is within a range or outside of a threshold may be used for graphical notification or alerting a user of an abnormal condition occurring on the network 2904. Other colors, text, pop-up windows, or any other graphical features may be displayed on the schematic for normal or abnormal operation of the network. Sounds may also be used for notification, alerts, or alarms. In one embodiment, the graphical user interface may enable the subscriber to position a cursor using a pointing device, such as a mouse, over a node segment to cause network performance information to appear in a pop-up window or otherwise displayed in relation to the node segment. The node segment information displayed may include current and, optionally, historical network performance information, and be displayed either as a value or graphically. Notifications may also be displayed in response to cursor positioning.

Figure 30:
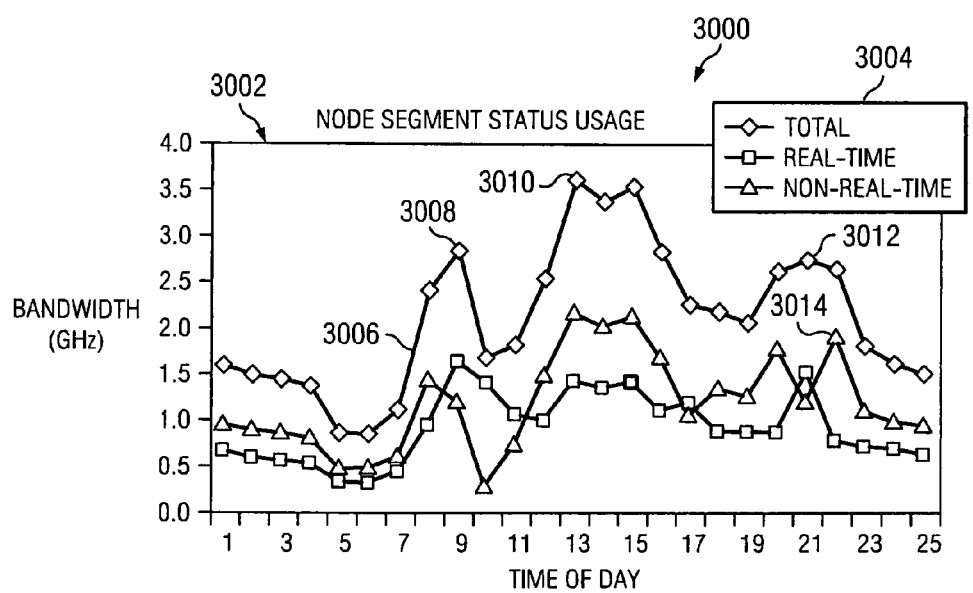
FIG. 30 is a screenshot of another exemplary graphical user interface that is displaying a chart of node segments status usage for a particular node on a network.

FIG. 30 is a screenshot of another exemplary graphical user interface 3000 that is displaying a chart 3002 of node segments status usage for a particular node on a network. Three network performance information parameters are displayed on the chart 3002, including total usage, real-time usage, and non-real-time usage as shown in the legend 3004. Total network usage is shown by line 3006, which changes over the course of a day as customers are increasing and decreasing usage of the node segment from which the usage data has been collected and stored in the database server 2716 (FIG. 27A). The total usage line 3006 is a sum of the real-time and non-real-time content usage. A total usage line 3006 is shown to have a morning peak at about 9:00 a.m. at point 3008, mid-day peak at about noon at point 3010, and evening peak at approximately 8:00 p.m. at point 3012. The real-time and non-real-time usage lines show that real-time usage increases at various times of the day and non-real-time usage increases at other times of the day. For example, the non-real-time usage spikes at about 9:00 p.m. at point 3014 when, presumably, customers are downloading movies, music, or otherwise web surfing. It should be understood that other graphical representations may be made of one or more node segments or transmission paths through a network. It should also be understood that other types of network performance information, including derived information (e.g., trend lines), may be displayed to show transmission quality or other transmission characteristics or node characteristics at any point within a network being monitored in accordance with the principles of the present invention as provided by the performance data manager 2714 (FIG. 27A) and use of PIP packets.

In addition to showing the usage information on a chart, alerts, trends, or other statistics may be presented on the GUI or via any other reporting method. Still yet, reports of the network performance information may be generated through the use of the stored network performance information stored in the databases 2717 and provide a user interface for selecting, sorting, tabulating, and any other function that can help a user generate current and historical reports, alerts, alarms, or any other information associated with or resulting from network performance information collected from a network Provisioning Entity The performance data manager may additionally use the network performance information that is collected from the packet network to provide provisioning functions. Provisioning may include a variety of functions, including (i) tracking path or element oversubscription rates and utilization prior to allowing network provisioning to occur, (i) managing network performance tracking by creating reports for newly created entities, (iii) dedicating or calculating failover, (iv) load balancing for re-routing of real-time or non-real-time content communications, (v) retrieving and presenting state information on network utilization and available resources to network managers in the form of reports and trend lines to determine where congestion is occurring, (vi) displaying locations where additional routers, gateways, or other network communications devices may be desired to alleviate congestion or provide safety valves for network communications devices that require higher bandwidth capacity during certain times of the day, or (vii) providing any other network management functionality based on the network performance information as described herein. In addition, the provisioning may enable automatic response to alerts or warnings that are detected by the performance data manager on a real-time or near real-time basis. For example, if an alert is created by a threshold for bandwidth capacity, the performance data manager may seek to re-route real-time or non-real-time content communications. Alternatively, if a spike in real-time content communications is occurring at a node that has non-real-time data being communicated at the same time, the performance data manager may notify the node to halt new provisioning or new communications sessions of the data packets including non-real-time content until the real-time content communications rate has decreased. The performance data manager 2714 may further be configured to direct one or more network nodes to change the bandwidth of a CODEC, close ports, send messages to other carriers to notify the other carrier of an overload or over-usage condition coming from their network or perform any other provisioning function through the use of monitoring the network performance information, as provided.

The performance data manager 2714 may be configured to automatically detect a problem within the network and issue one or more tests, such as a trace route, to be performed on an end-to-end basis. For example, in FIGS. 27 and 29, a message may be sent from the performance data manager 2714 via the performance data collector 2704 to cause a test to be made between customer equipment 2916 and 2918. The test may include sending PIP packets for a one minute time period, for example, between the customer equipment 2916 and 2918. During that time period, the customer equipment 2918 may collect network performance information, such as transmission quality, transmission rate, and transmission connectivity, optionally as associated with real-time and non-real-time content communications. Even though the customer equipment 2918 resides with a different carrier, the network performance information that was collected from running a test between the customer equipment 2916 and 2918 may be collected by the performance data collector 2704 without sharing any company specific, sensitive information of the network carrier or carriers managing network 2920. In one embodiment, the network performance information collected from the customer 2918 is a result of "stitching" (concatenation) of network performance information by appending the information to PIP packet payload as communicated through each of the nodes in the transmission path between customer equipment 2916 and 2918. Alternatively, the performance data collector 2704 may request data directly or indirectly from each of the nodes along the transmission path between the customer equipment 2916 and 2918.

Modified Trace Route

Network performance information collected for real-time content and non-real-time content communications may provide an indication that there is a performance problem existing at a node segment within a packet network. A call endpoint, CCM, or node within the packet network may determine that a problem exists based on the PIP performance information and automatically trigger a path trace route in the PIP packet flow. Given that higher protocol stacks can move or otherwise alter a packet transmission path without consulting the CCM, this function facilitates identifying nodes and segments being traversed at the time the trouble is encountered. It should be understood that aside from a statically configured PIP data stream for embedded network equipment, that PIP sessions may be constructed in an ad hoc basis for use on packet devices not normally associated with that network. In the ad hoc PIP case, the user end-point creates a PIP session from and to a point inside the network provider's network or to the far end-point to provide the real-time bandwidth and PM data function. An ad hoc PIP packet flow may be set up with each call from end-point-to-end-point or, alternatively, to an anchor point in the serving network provider's network. Once the PIP and PM stack detect a performance threshold crossing, a trace route may be initiated to identify the location within the path that is having a problem. A network node element may store the trace information and make the trace information available directly to the CCM and/or user. Additionally, the trace information may be communicated to the call control protocol stacks to be passed back to the CCM or EMS for troubleshooting. Other information may be stored with the trace information, such as time, date, session information and so on. The troubleshooting procedure may be performed to isolate the node segment having a problem with either or both real-time and non-real-time content being communicated through the node segment. The CCM or node may initiate a modified trace route to communicate one or more data packets, such as PIP packets to or through the node segment of concern to collect network performance information through that node segment that may be having a transmission problem. The network performance information generated from the trace route, which may last for one or more PIP packets being communicated over a long enough duration to determine the network performance information at the node segment of concern. If the node segment is a node segment located at the edge of another network or type of network (e.g., network-to-network interface) then network performance information collected at the other node in the other network may be communicated back to the CCM or originating node with network performance information specifically related to the modified trace route. Other "carrier specific sensitive" network performance information of the other network may otherwise be prevented from being accessed by the other network. It should be understood that ad hock PIP packet flows may also be associated with encrypted path protocols and presence protocols that establish remote network connectivity, such as PPP, SLIP, and/or other remote agents.

The collected network performance information may enable not only messages and alerts to be sent to operations management of the network but also notify customers, partners, affiliates, and other network carriers of problems, congestion, or other situations or events of the network. For example, if a determination that real-time content communications usage is high, a notice may be sent to subscribers and other carriers of the situation and notification of increased billing rates. Similarly, if a determination is made of high amounts of communications to other carriers, the carrier may elect to "shop" communications to destinations via other, lower priced carriers. The carrier may have thresholds for many terms and conditions of subscribers and partner carriers and automatically, semi-automatically, or manually make provisioning changes based on determining that a threshold has been crossed based on the collected network performance information.

Figure 31:
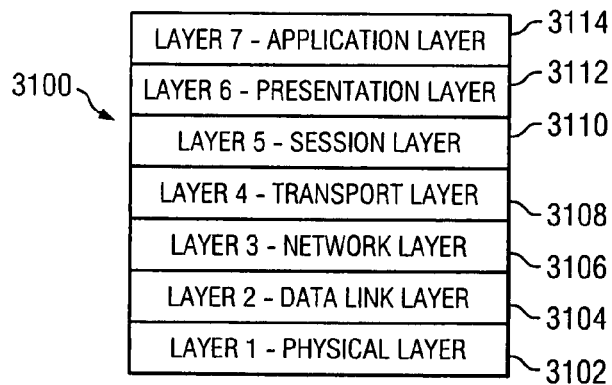
FIG. 31 is an illustration of the OSI 7-layer basic reference model.

FIG. 31 illustrates an embodiment 3100 of the OSI basic reference model of networking that include seven different layers. The reference numerals (3102-3114) on the left side of the model are used to describe these different layers of the reference model. Each of the layers provides protocols for certain types of operations. More specifically, the seven layers include: physical layer 3102 (Layer 1), data link layer 3104 (Layer 2), network layer 3106 (Layer 3), transport layer 3108 (Layer 4), session layer 3110 (Layer 5), presentation layer 3112 (Layer 6), and application layer 3114 (Layer 7). Typically, physical layer 3102 conveys bit streams, such as bits containing electrical impulses, light or radio signals, through a network at the electrical and mechanical level. The physical layer 3102 provides the hardware means for sending and receiving data, including defining cables, cards, physical aspects, data coding, and medium (B8ZS, DS-3, etc.). At the data link layer 3104, data packets are encoded and decoded into bits. The data link layer 3104 further furnishes transmission protocol knowledge and management, and handles errors in the physical layer, flow control, and frame synchronization, including Ethernet, Frame Relay (FR), ATM, Multi-Protocol Label Switching (MPLS), etc. In the following examples, the network performance information is stored in the data link layer 3104, and, optionally, the other layers 3106-3114.

The network layer 3106 provides for (i) switching and routing, and (ii) creating logical paths, known as virtual circuits, for transmitting data from node to node within a packet network. The transport layer 3108 provides transparent transfer of data between end systems, or hosts, and is responsible for end-to-end error recovery and flow control. One example of a network protocol is Internet Protocol (IP). An example of a transport layer protocol is Transmission Control Protocol (TCP). The session layer 3110 establishes, manages, and terminates connections between applications. The session layer 3110 sets up, coordinates, and terminates conversations, exchanges, and dialogues between the applications at each end of a network path. The session layer 3110 further manages session and connection coordination. The presentation layer 3112 provides independence from differences in data representation (e.g., encryption) by translating from application to network format, and vice versa. The presentation layer 3112 transforms data into the form that the application layer 3114 can accept. Such presentation layer 3112 typically includes text, voice, and video compression. The application layer 3114 also supports application and end-user processes. Some examples of application layer 3114 applications include email and file transfer applications. Each layer interacts directly with the layer immediately beneath it and provides facilities for use by the layer above it. In addition, the protocols on each layer enable entities to communicate with other entities on the same layer.

Figure 32:
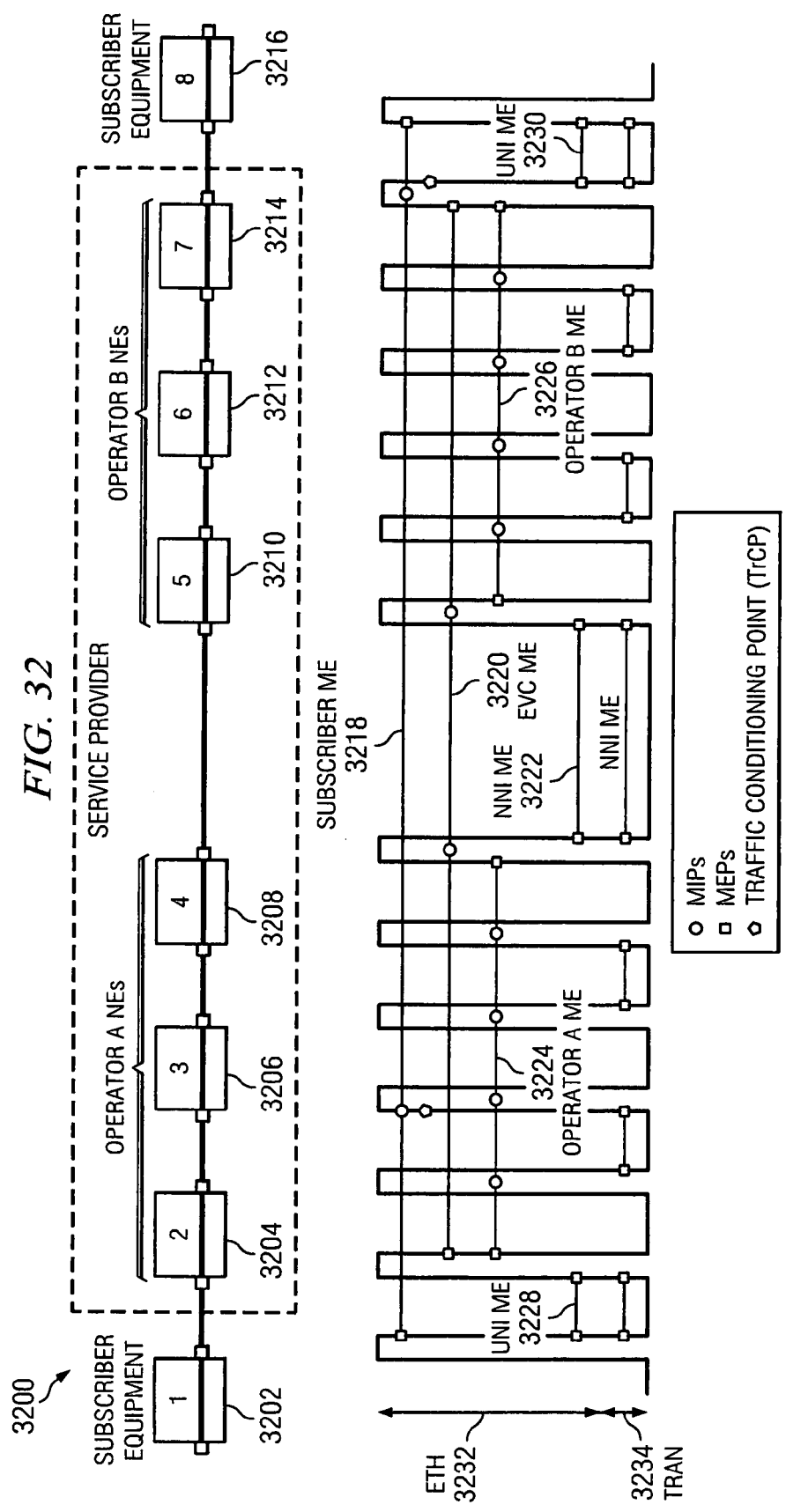
FIG. 32 is an illustration of an example of an Operations, Administration, and Maintenance Entities depicting multiple administrative domains.

FIG. 32 illustrates an embodiment 3200 of various maintenance entities (ME) depicting defined multiple administrative domains, such as Subscriber Maintenance Entity (SME) 3218, Ethernet Virtual Connection (EVC) ME 3220, Operator ME 3224 and 3226, Network-to-Network (NNI) ME 3222, and User-to-Network (UNI) ME 3228 and 3230. The domains have been constructed using Maintenance Entity Group (MEG)—8 level structures to provide limited views into the quantity and types of information available to each level (domain). A maintenance entity is a subset of all available maintenance data that has been grouped together for access by a particular network participant, such as a subscriber, Ethernet provider, network operator, or virtual network operator.

The OSI reference model described in FIG. 31 defines specific functionality contained in each of its layers 3102-3114. The principles of the present invention may utilize Ethernet services, which operate in the Data Link Layer 3104 of the OSI reference model. The Ethernet protocol is identified as ETH Layer 3232 in FIG. 32, where FIG. 32 illustrates the transport layer 3108 of the OSI model 3100 as TRAN layer 3234.

In one embodiment of the present invention, real-time transmission performance information acquired in the Data Link Layer 3104 is communicated into one or more of Physical Layer 3102, Network Layer 3106, Transport Layer 3108, Session Layer 3110, Presentation Layer 3112, and Application Layer 3114. In another embodiment, the real-time transmission performance information acquired in the Data Link Layer 3104 may be communicated into other Data Link Layer protocols, such as ATM, MPLS, Frame Relay, or other protocols. This real-time transmission performance information may be used to provide real-time notification of the ETH Layer 3232. This real-time transmission performance information may also be used to complement existing protocols and capabilities to provide quicker response time to network changes identified to ETH Layer 3232.

Data Link Layer 3104 from and to Physical Layer 3102.

In one embodiment, real-time transmission performance information acquired in the Data Link Layer 3104 may be communicated to the Physical Layer 3102. In one embodiment, the degradation of a copper-based link due to induced noise or any other source of impairment, delay, or loss of data could limit the quantity of information that can be carried error-free across the link. The transmission performance information carried in the PIP packet is capable of identifying this degradation. This degradation may be reported to the Physical Layer 3102, where a protocol operating on the Physical Layer 3102 realizes the degradation and modifies the route to optimize throughput and overcome the impairment, such as rerouting the link to an alternative physical copper link or a reduction in the number of Quadrature Amplitude Modulation (QAM) windows or change to another transmission schema all together.

Data Link Layer 3104 from and to Data Link Layer 3104.

In one embodiment, the above degradation may be communicated to the Data Link Layer 3104, where the multiplexed protocols of the Data Link Layer 3104, operating in parallel with the Ethernet due to physical layer multiplexing and protocol isolation, realize the degradation and modify their operation to overcome the impairment by conducting an MPLS Fast Re-Route.

Data Link Layer 3104 from and to Network Layer 3106.

In one embodiment, the above degradation may be communicated to the Network Layer 3106, which could alter network traffic routing to reroute packets around the degrading link. This reroute may involve moving the session from one network operator to another network operator. It should be understood that the principles of the present invention may be utilized with any Network Layer (Layer 3) 3106 protocol, including IPv4, IPv6, or otherwise. It should further be understood that the principles of the present invention may be utilized with any protocol operating on any other layer.

Data Link Layer 3104 from and to Transport Layer 3108.

In one embodiment, the above degradation may be communicated as round trip delay and other parameters to the Transport Layer 3108, where the TCP Sliding window function may be dynamically altered to modify the window size, thereby reducing the amount of subsequent retransmitted packets and avoiding congestion. In such an embodiment, such communication allows the adjustment of the window size sooner than current implementations.

Data Link Layer 3104 from and to Session Layer 3110.

In one embodiment, the above degradation may be communicated to the Session Layer 3110, where the session management functions could modify schedulers, shapers, or any network element function that provides and contains the Quality of Service (QoS) parameters, thereby dynamically adjusting the quantity of packets in a session. The effect of dynamically adjusting the quantity of packets in the session is that congestion points should experience relief as the quantity of packets flowing into a network node or element is reduced.

Data Link Layer 3104 from and to Presentation Layer 3112.

In one embodiment, the above degradation may be communicated to the Presentation Layer 3112, where the presentation protocol could dynamically control a video codec forcing a repeat of the last video frame or reducing frame quality, frame resolution, frame size, frame rate or otherwise.

Data Link Layer 3104 from and to Application Layer 3114.

In one embodiment, the above degradation may be communicated to the Application Layer 3114, where notification is generated and communicated to a user indicating that the network is experiencing congestion and to be patient until the congestion clears, try the communication later, or try to reconnect using different connection parameters. For example, if a user is engaged in online gaming, the application layer may notify the gamer that the network is slow and to wait before engaging in a fierce battle to avoid the network not having enough bandwidth to facilitate the online action. In another embodiment, the application layer 3114 may determine that the user is a low priority and cut or kill the network connection to the gamer or user.

Other uses of data packets including being passed between the Data Link Layer 3104 and Application Layer 3114 may include communications control to manage multiple real-time sessions when the user exceeds available communications resources. Functions, such as presenting the user with usage statistics of network performance information real-time content (e.g., real-time usage or bandwidth) versus total bandwidth, session usage of real-time bandwidth, and the ability to selectively choose CODEC's and session types, such as video phone versus a voice-only communications modes, are enabled utilizing the principles of the present invention. Load balancing of real-time traffic when multiple paths are available may also become user selection modes.

Layers to MEs.

In another embodiment, and continuing with FIGS. 31 and 32, real-time performance information may be communicated from the Physical Layer 3102, Data Link Layer 3104, Network Layer 3106, Transport Layer 3108, Session Layer 3110, Presentation Layer 3112, and Application Layer 3114 into the MEs (e.g., subscriber ME, EVE ME, and NNI ME of FIG. 32). This real-time information can be used to complement ME information, support real-time modification of network processes and protocols, and assist domain administrators in management of a hybrid network or group of networks, such as a Metro Ethernet Network (MEN). Several descriptions of the use of real-time information flows from protocols of various OSI layers into MEs are described below.

Further, the Metro Ethernet Network Nodes (see FIGS. 32 and 33) may utilize the information contained in a PIP packet to actively determine the best path for each connection within its network. One or more virtual performance tables (VPTs) (FIG. 34) may be created at the MEN node(s) that inputs information relating to each network node. The MEN nodes may determine that a particular link goes down at a particular time of day, such as in a carriers maintenance window, and, in anticipation of this event, reroute the data traveling on that particular link around it to other links, thereby relieving the congestion on a particular link or network node. Best path metrics may also be used to determine if certain real-time or non-real-time data content needs to be held up for a period of time to assist with relieving the congestion on a particular portion or link of a network Tables, such as VPTs, may be used by the MEN to anticipate potential congestions on a network and proactively reroute the data on other links to avoid the congestion.

Physical Layer 3234 from and to ETH Layer 3232.

In one embodiment, and continuing with FIGS. 31 and 32, the above degradation occurs on the copper link of an NNI ME 3222, a portion of the circuit that is not Ethernet-based. In this instance, this copper link is providing an end-to-end Virtual Ethernet service as the NNI portion of the EVC. This degradation may be reported as a change (reduction) in the amount of bandwidth available on the circuit link from the Physical Layer 3102 to the ETH Layer 3232. This information may be included in the appropriate ME domains by a network element or node, thereby allowing other network elements (upstream and downstream from such network element) the ability to react to the degradation prior to link failure. Such communication of degradation information provides the ability to try to pre-establish an alternative to maintain an end-to-end session in advance of a failure.

In another embodiment, a "route flapping" degradation by the Network Layer 3106 may be reported from and to the ETH Layer 3232. "Route Flapping" is a common term to describe the recalculation of route tables within an network element typically due to a link having marginal connectivity; i.e., conditions are such that the link may "flap" and be momentarily considered out of service, then naturally recovering and being placed back in service by a network element. This route flapping may occur many times over a time interval. Each time the network element is restored, a route table re-calculation may be requested by the Network Layer 3106 routing protocol. A network element could include the PIP PM information in the appropriate ME domains, thereby allowing other NEs the ability to react to the degradation prior to link failure and assess real-time stability prior to restoring the link. A potential reaction could be to identify an alternative network operator or network segment, thereby routing around the portion of the network that is "flapping." Secondarily, threshold information could be communicated to a network of another carrier to allow the other network to react to the degradation prior to the outage becoming more severe.

TCP Sliding Window

Transport Layer 3108 to and from ETH Layer 3232.

In one embodiment, a reduction in a "TCP Sliding Window" contained within the Transport Layer 3108 may be reported to the MEs. This reduction would signal to the ETH Layer 3232 that congestion is occurring somewhere within a virtual circuit over which PIP packets are being communicated. The congestion may be in the subscriber's network, where a network operator would not otherwise have visibility. In this embodiment, the TCP/IP sliding window field is modified in real-time, regardless of any network technologies, thus providing quicker TCP/IP sliding window response to performance issues.

The sliding window field within the TCP/IP protocol is modified to reflect performance changes occurring in the network. This modification may occur at any network node anywhere within a communication path. The TCP sliding window field modification may be accomplished by rewriting the specific TCP sliding window field within the TCP/IP packet as it traverses through a network node.

Session Layer 3110 to and from ETH Layer 3232.

In one embodiment, a change in session connection quality by the Session Layer 3110 to the ETH Layer 3232 may be reported. The Session Layer 3110 may notify the ETH layer 3232 that a QoS parameter, has been modified thereby dynamically adjusting the quantity of packets in the session.

A network operator or Ethernet provider may use the QoS information to manage other EVCs within an MEG, including Connection Admission Control (CAC).

Presentation Layer 3112 to and from ETH PIP Flow on Layer 3232.

In another embodiment, a CODEC buffer management algorithm within the Presentation Layer 3112 may communicate to the ETH Layer 3232. Here, a notification may signal that video CODEC buffers have multiple underflow events resulting in repeats of the last B-frame in an MPEG-4 video, for example. Underflow events are indicative of lost or delayed packets. The ETH layer 3232 may use this underflow information to by-pass the degraded segment by choosing an alternate path.

Application Layer 3114 to and from ETH Layer 3232.

In another embodiment, a user program within the Application Layer 3114 could signal to the ETH Layer 3232 that the "Network is Slow." The complaint may be reacted to by the ETH layer 3232, whereby dynamic identification of a degraded segment and an attempt to modify the session path to circumvent the degradation may be performed.

In another embodiment, instead of directly modifying fields within existing protocols traversing through a network element at any layer in the OSI reference model, an alternative may include establishing a Vector Performance Table (VPT) within the network element. This VPT may be created and managed as part of a network element operating system and embedded system programming.

Figure 33:
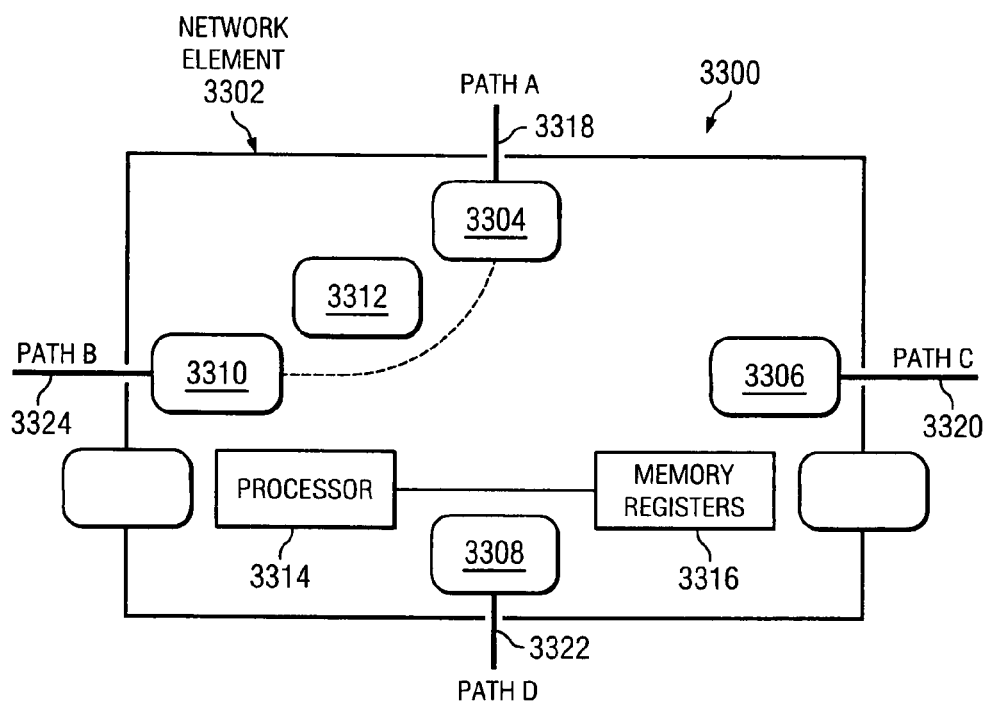
FIG. 33 illustrates a block diagram of a network entity according to an embodiment of the present invention.

In FIG. 33, an embodiment 3300 of an exemplary network element or node is illustrated. In this embodiment, the NE 3302 has four physical interface connections 3304-3310 that connect to other NEs (not shown) via connections 3318-3324. In addition to the physical interface connections 3304-3310 to other NEs, internal interconnections between physical interfaces exist. An example of an internal connection is referenced as 3312. In one aspect, the NE 3302 further includes a processor 3312 and memory 3314 in accordance with that described herein. Although not shown, physical or virtual internal connections may exist as point-to-point, point-to-multipoint, or multipoint connections between any or all physical interface connections 3304-3310 on a per packet basis. Many currently available NEs may provide different internal connection paths, which may result in different packet performance on a per packet basis. These different performances may be a result specific to internal packet handling processes, such as different types of queuing, scheduling, and rate shaping among other packet process handling. A particular path through a network element may yield different performance measurements than other paths. Other internal architectural structures could be present, too, that may impact internal performance of a network element.

Figure 34:
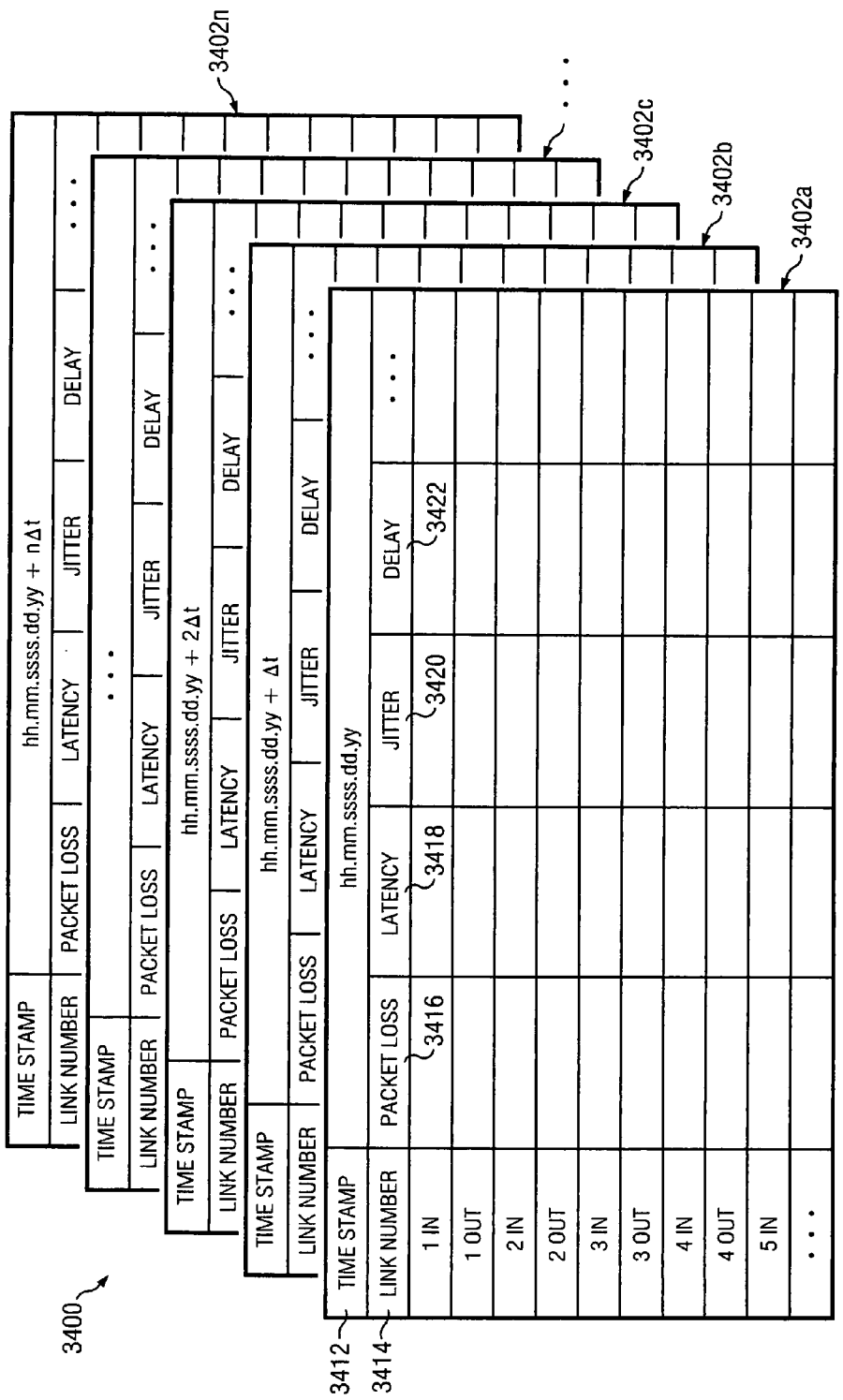
FIG. 34 illustrates a plurality of Vector Performance Tables according to an embodiment of the present invention.

FIG. 34 illustrates an embodiment of exemplary virtual performance tables (VPTs) 3402a-3402n (collectively 3402). The VPT functionality may be predetermined or operator defined and configured via the embedded programming on the NE. The NE vendor may allow the operator the capability to dynamically size the VPT via configuration parameters. Within an NE, bi-directional ME performance information is captured and placed into the VPT 3402a in the "current" timestamp 3412. At a later time interval defined as delta t ($\Delta t$), the information contained in time stamp 3412 for VPT 3402a is moved to VPT 3402b; the information contained in time stamp 3412 for VPT 3402b is moved to VPT 3402c, and so forth. Alternatively, a new VPT may be created and VPT 3402a may simply become 3402b as a result of the new VPT being created. The information may also be placed in bins or memory locations or added, summed, averaged, or otherwise summarized or used in calculations, the result of which is placed in such bins or memory locations. Bins, such as modified Y.1731 bins, may be associated with time intervals, MEs, levels of access, operator identifiers, or other parameters used to identify, communicate, process, collate, or allow access to information included in the bins. Bins that collect network performance information over shorter time intervals may be periodically added into bins that collect network performance information over longer time intervals. Once the "current" time stamp is empty, bi-directional ME performance information is placed into the "current" time slot, as illustrated in VPT 3402*a*. In essence, a first-in, last-out VPT queue is established. However, other temporal related VPT configurations may be utilized in accordance with the principles of the present invention.

The table size of the VPTs 3402 may be a function of the quantity of memory allocated, the types and quantities of network performance information captured. The network performance information may include link number 3414, real-time and total bandwidth usage, packet loss 3416, latency 3418, jitter 3420, delay 3422, real-time application data, non-real time application data, total data, and the $\Delta t$ or time stamp 3412 between successive samples. Also, "stitched" network performance information (i.e., network performance information from other network elements) for each NE could be included in the VPT 3402. In one, the VPT 3402 could be dynamically sized to accommodate the data.

Figure 35:
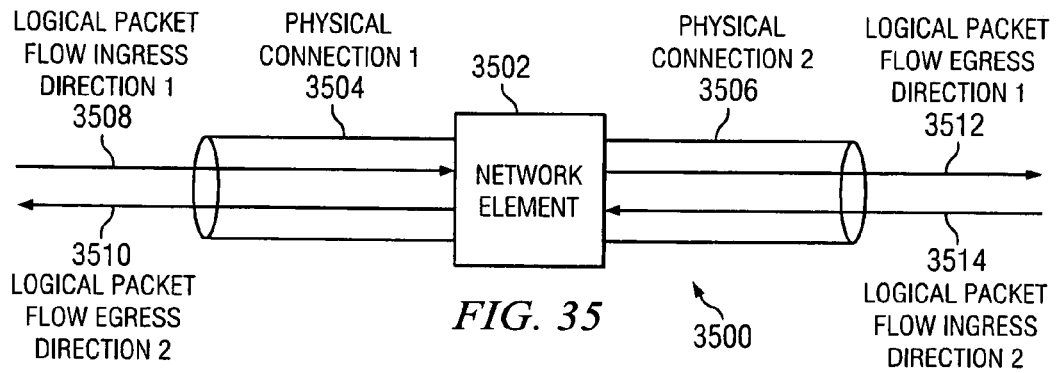
FIG. 35 illustrates a flow diagram of the MEF Maintenance Entity data flow according to an embodiment of the present invention.

FIG. 35 describes an exemplary maintenance entity data packet or logical packet flow through a network entity 3502. Bi-directional data packet flows carry network performance information. FIG. 35 further illustrates ingress data packet flows 3508 and 3514 and egress data flows 3510 and 3512 through the NE 3502. Within the NE 3502, the ME embedded programming determines local NE performance measurements and attaches this information on the end of the ME or network performance information payload portion of a packet, as discussed further below. The payload may be encapsulated within the envelope of the Ethernet Protocol or PIP packet format. In one embodiment, this information could be encapsulated within additional layers of higher protocol information, such as TCP/IP packet protocols.

Figure 36:
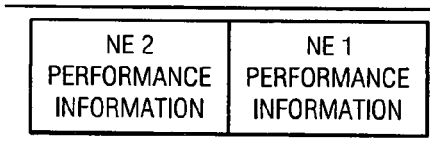
FIGS. 36-39 illustrate exemplary MEF Maintenance Entity payload ingress and egress data flows according to an embodiment of the present invention.
Figure 37:
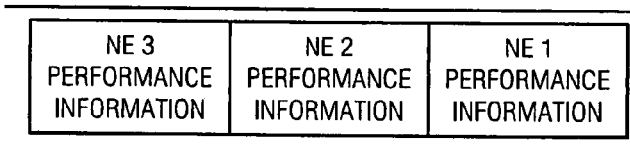
Figure 38:
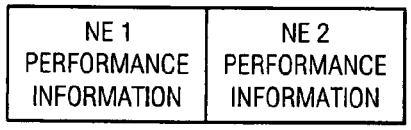
Figure 39:
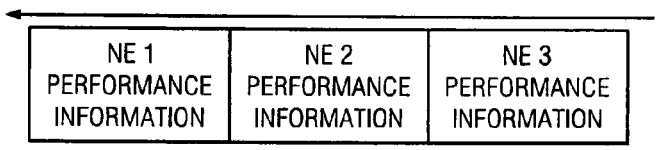
Figure 40:
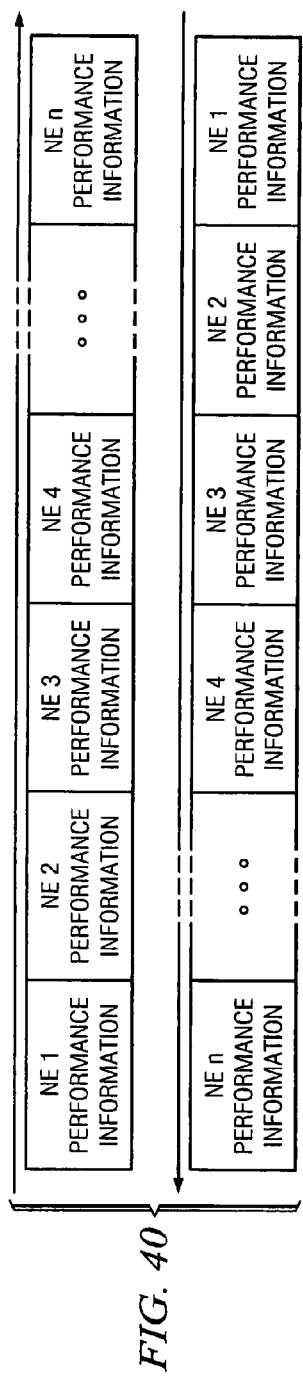
FIG. 40 illustrates an end station ME payload data flow according to an embodiment of the invention.

An exemplary logical structure of the payload portion of the PIP packet is described in FIGS. 36-39. FIG. 36 illustrates an exemplary PIP packet payload ingress flow in direction 1. FIG. 37 illustrates an exemplary PIP packet payload egress flow in direction 1. FIG. 38 illustrates an exemplary PIP packet payload ingress flow in direction 2. FIG. 39 illustrates the PIP packet payload egress flow in direction 2. In these data flows, the addition of the NE 3502 performance information at the NE 3502 egress in each direction is shown. This information may be appended to the payload of a packet received on the ingress as the flow is processed through the NE 3502. An end-station, the last device participating in the PIP packet process, may collect all NE performance information from each NE in a communication path, as illustrated in FIG. 40, which depicts PIP packet payload data flows of the end-station (i.e., data flows to and from the end-station). In one aspect, there are two directional paths, as the circuit is full duplex (i.e., transmitting and receiving in both directions concurrently, sometimes on separate physical facilities. Since the call path in each direction could be different and subject to differing forces that modify the performance statistics, two bi-directional flows may be used. The performance statistics at each end of the PIP flow may be concatenated and transmitted to the far end so each end of the transmission or communication path holds both the transmit and receive network performance information data.

This VPT information may be used locally via new protocols operating outside the PIP packet or with modifications to existing protocols to allow the use of VPT information. As described above, in one embodiment, rather than directly writing specific network performance information into other OSI Layer protocols, the network performance information may be made available via the VPT 3402. Each OSI Layer's protocols may reference any network performance information to make enhanced operations decisions.

The VPT 3402 enhances current data flows by capturing not only current data flows, but also providing historical captures over defined time windows that are $n\Delta$ samples deep. The additional samples can enable predictive functions, which can be used to improve the reliability and availability of the session or user experience, perform network maintenance, provision new network hardware or media, design new network configurations, or enhance inter-network communications.

Figure 41:
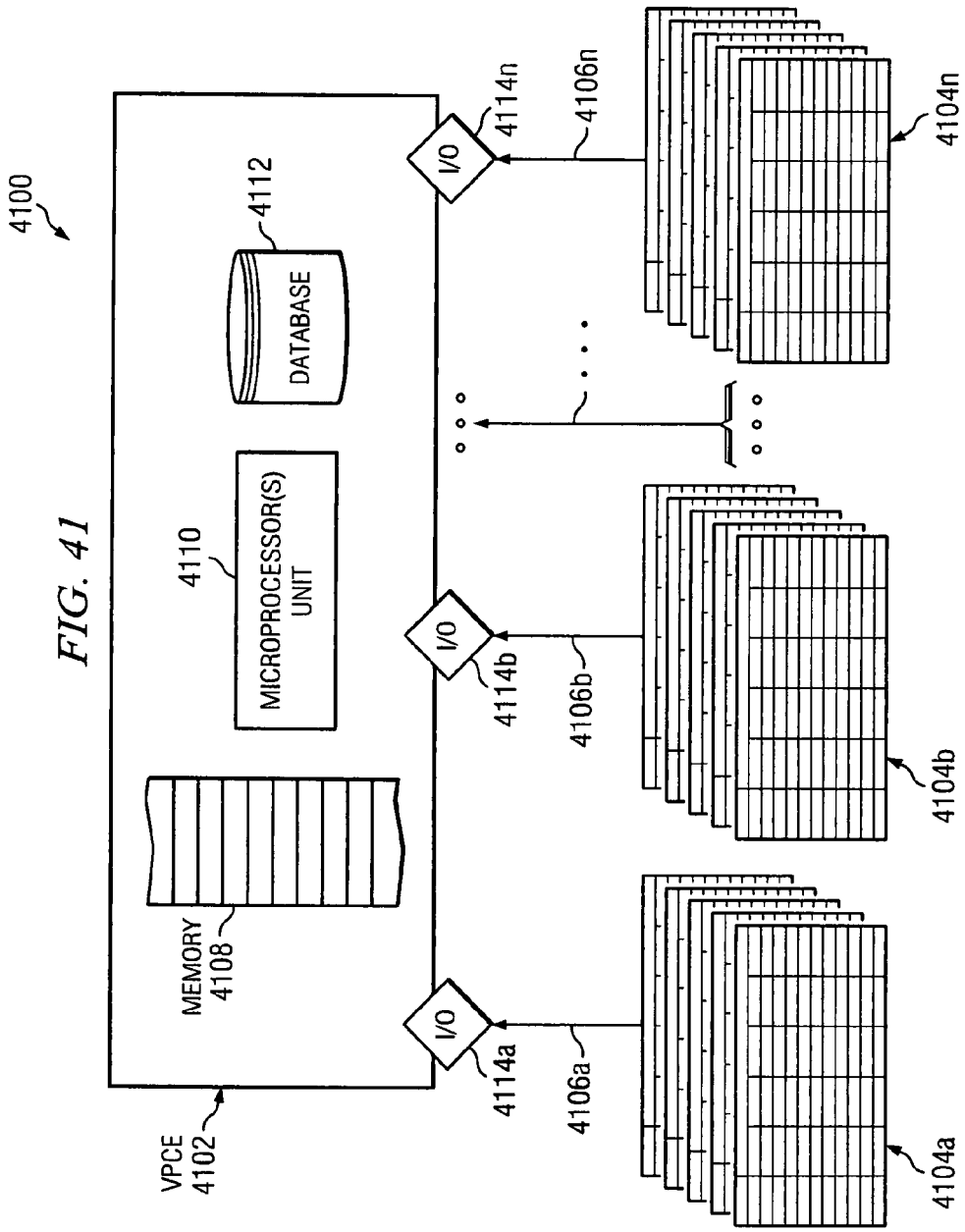
FIG. 41 illustrates a network diagram of a Vector Performance Correlation Engine (VPCE) according to an embodiment of the present invention.

The VPTs 3402 (FIG. 34) may be extended to include the collection of VPT network performance information across a single operator or multiple operators. Conceptually, this collection is illustrated in FIG. 41, which depicts an embodiment 4100 of a Vector Performance Correlation Engine (VPCE) 4102. Individual VPTs 4104*a*-4104*n* (collectively 4104) from a network element may be communicated via in-band or out-of-band communication links 4106*a*-4106*n* (collectively 4106) to the VPCE 4102. These VPTs 4104 could be transmitted as encapsulated information using common protocols, such as TCP/IP. The entire set of VPTs 4104 including $n\Delta t$ performance samples could be sent by the NE or polled via the VPCE 4102. Alternatively, each current sample of VPTs 4104 may be sent or polled and the VPCE 4102 may be utilized to establish and maintain a historical database of the performance samples for each NE.

Once the network performance information is gathered at the VPCE 4102, the network performance information may be processed to provide an encompassing performance management view of one or more networks based on input from each NE. This centralized network performance information store may be used in a variety means such as, but not limited to, Service Level Agreement (SLA) validation, near real-time NE management, predictive network management, and other functions.

Customizable algorithms and calculations that use the current and historical network performance information may be developed and included as part of the embedded programming of the operating system of the VPCE 4102. VPCE 4120 may include memory 4108, one or more processors 4110, which may include cell processors having two or more processors on a single chip, one or more databases 4112, and one or more I/O ports 4114. The algorithms and calculations may be performed using these computing resources contained within the VPCE 4102. Information processed within the VPCE 4102 could be made available to other network systems (not shown), such as a multimedia Call Control Manager (CCM) or other network management systems using the I/O ports.

In addition, the VPCE 4102 may use the data contained in the VPTs 4104 as historical logs for determining when the performance of a certain link 3414 in a network experience failure or deterioration due to congestion or other technical problem. The information contained in the PIP packets may contain the historical data rate performance as discussed herein showing the network nodes and links and based on data contained in a particular VPT 4104, such as timestamp 3412, determinations can be made that a particular node or link suffers technical problems, such as congestion during specific times of the day. The VPCE may also determine the gapping between calls based on this historical network performance information contained in individual or multiple VPTs 3402.

Figure 42C:
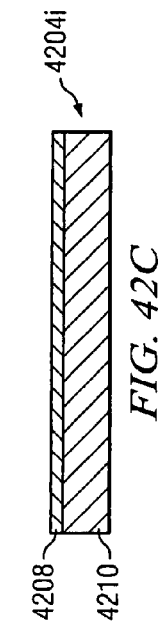
FIGS. 42a-42c illustrate a Graphical User Interface (GUI) according to an embodiment of the present invention.
Figure 42B:
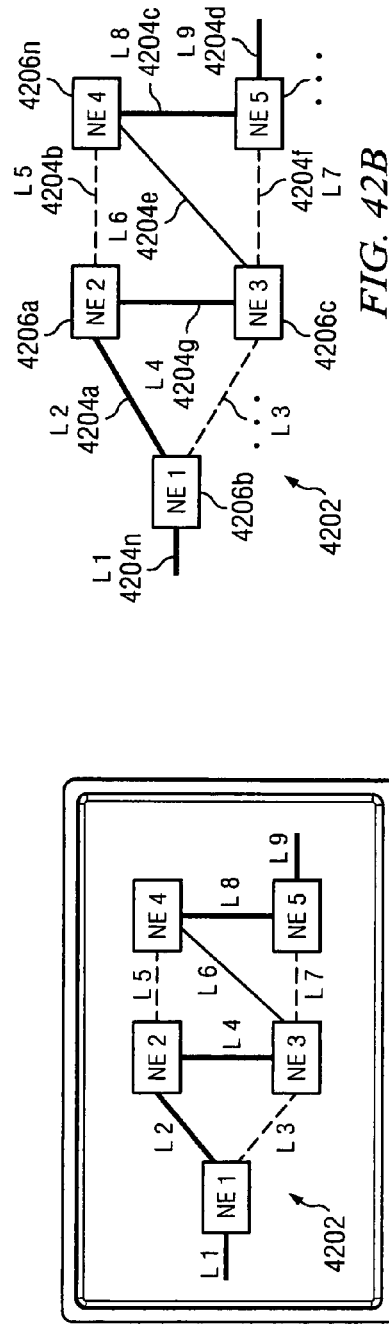
Figure 42A:
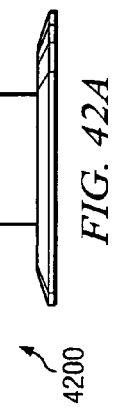

In one embodiment, the VPCE 4102 correlated information is used to create a near real-time exemplary Graphical User Interface (GUI) 4202 as illustrated in FIGS. 42a and 42b, which is an illustration of an embodiment 4200 of such a GUI. In these figures, possible connection paths may be illustrated as links 4204a-4204n (collectively 4204) that connect NE 4206a-4206n. The links 4204n, 4204a, 4204g, 4204e, 4204c, and 4204d are being used to support end-to-end connectivity. Link "...", 4204b, and 4204f are alternative circuits available to support connectivity, but are currently not carrying traffic. Path 4204e may change color, such as from yellow to red, indicating the link is in severe trouble or congested. The width of the line representing 4204e has been reduced to indicate reduced packet flow. Wider lines may represent greater packet flow. One color may be used to represent real-time application packet flow and another color for non-real-time packet flow within a single path as illustrated. Based upon this visual notification, the NMS Operator may take steps to route traffic currently traversing links 4204e to 4204b or 4204f. Alternatively, these changes could be performed automatically as described above. The same or similar graphical user interface 4202 can be provided for transmission path segments of a packet network using stitching and communicating the VPT or network performance information through in-band signals to the end customer where the information may be displayed to detail the network performance behavior of the packet transmission paths that the customer is utilizing or being sold. This principle of communicating network performance information across networks of customers can also be applied ad hoc without the knowledge of the operator with Network-to-Network interfaces at the boundaries of the $3^{rd}$ party service provider to provide each end-point with the network performance information of each network segment. This "man in the middle" scenario enables tracking of the real-time bandwidth transmission characteristics of customers or other third parties, along with the other PM data. The boundary or segmentation principle can also be utilized across wireless technologies, whereby multiple wireless connectivity segments are available. In this case, the PIP and VPT tables would provide PM or network performance information about the wireless RF route performance. It should be understood that using this boundary principle can apply to any technology deployed between two MIP or MEP points.

In yet another embodiment, one or more links 4204 may further include indicia representative of the quantity or percentage of real-time application packet flow versus non-real-time packet flow. FIG. 42C represents an enlarged view of an exemplary link 4204i that displays the amount of real-time application flow relative to the amount of non-real-time application flow by showing two different types of indicia, in this case rectangles, relative to each. For example, indicia 4208 may include a different color, cross-hatching, shading, shapes, or other type of indicia that is different than that for indicia 4210. In this example, indicia 4208 indicates the amount of non-real time application flow and indicia 4210 indicates the amount of real-time application flow. Further, the general dimensions, such as widths of the indicia 4208 and 4210 may reflect the application flows relative to each as well. In FIG. 42C, the amount of non-real time application flow is shown as being less than that for the real-time application flow by the indicias 4208 and 4210 having both different hatching and widths. Any indicia and dimension of indicia may be used to readily present this information to a user.

In another embodiment, information exchange between the ETH Layer 3232 to and from and the OSI layers 3102, 3106-3114 may manifest itself in open and closed loop interactions. Open and close loop systems are well defined in Modem Control Theory text books. In summary, in an open loop, information is exchanged without a feedback loop to track a response to the information. In the closed loop manifestation, feedback loops are present, thereby providing dynamic control of the response to the information. The principles of the present invention can use either open or closed loop manifestations.

Figure 43:
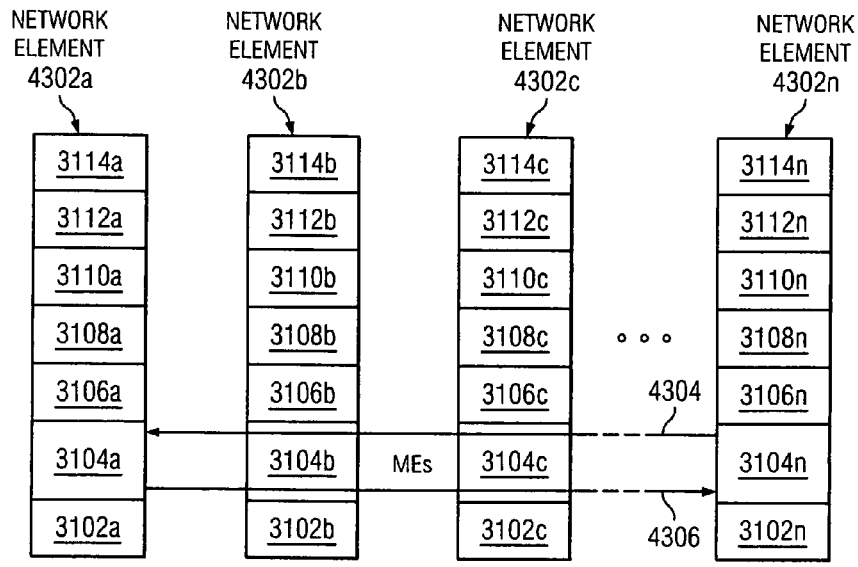
FIG. 43 illustrates a MEF network implementation according to an embodiment of the present invention.

FIG. 43 illustrates an embodiment of an exemplary network implementation 4300. In FIG. 43, NEs 4302a-4302n (collectively 4302) contain an OSI protocol stack as defined by 3102a-3114a, 3102b-3114b, 3102c-3114c, and 3102n-3114n. Additional NEs may exist in the network having similar structures as defined by NEs 4302.

Network Layer through Application Layer, 3106b-3114b and 3106c-3114c, may not exist in some types of NEs, such as Ethernet Switches. In other cases, such as with routers, some additional layers above the Data Link Layer 3104b and 3104c may exist. It is the existence of these layers above the Data Link Layer 3104b and 3104c where some embodiments of the present invention take place. The Physical Layer 3102a-3102n generally exists in each NE and is included in the embodiments of the present invention.

Bi-directional MEs 4304 and 4306 exist and operate in the OSI reference model Data Link Layer 3104a-3104n. An end-to-end user communication path may be defined by each of 3114a, 3112a, 3110a, 3108a, 3106a, 3104a, 3102a, 3102b, 3104b, 3104b, 3102b, 3102c, 3104c, 3104c, 3102c, 3102n, 3104n, 3106n, 3108n, 3110n, 3112n, and 3114n. Within NE 4302b and 4302c, information flows up from the Physical Layer to the Data Link Layer and then back down from the Data Link Layer to the Physical Layer as it is processed by each NE. The information flow can either be full duplex (bi-directional paths operating independently from each other at the same time) or simplex (operating in one direction at a time, but in both directions) or uni-directional (operating in one direction only).

Figure 44:
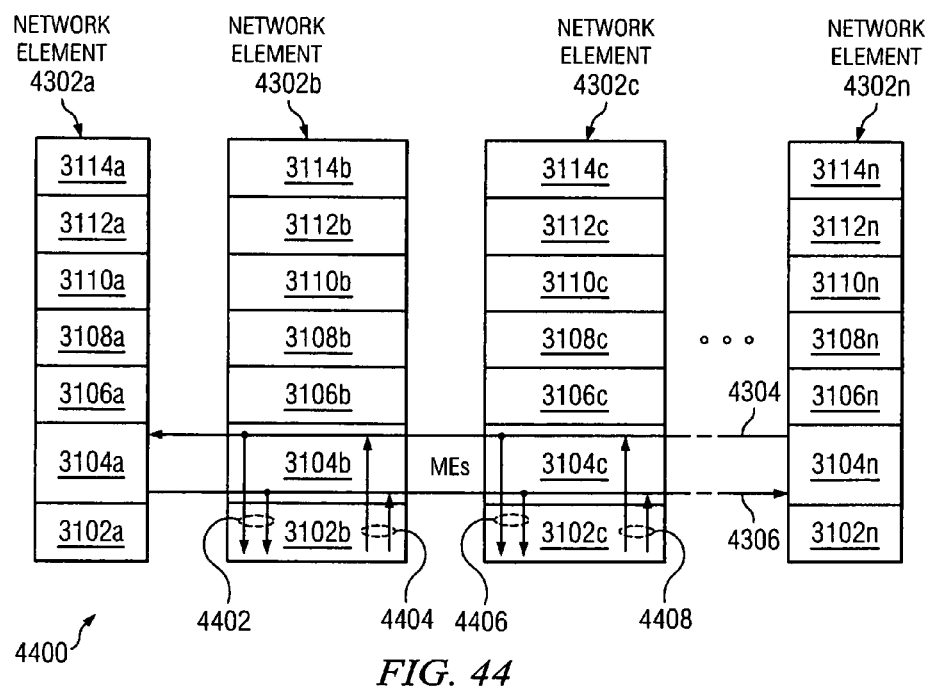
FIG. 44 illustrates a MEF network implementation of inter-layer communication between Data Link Layer devices and Physical Layer devices according to an embodiment of the present invention.

FIG. 44 illustrates another embodiment of an exemplary network implementation 4400. As described above, bi-directional MEs 4304 and 4306 exist and operate in the OSI reference model Data Link Layer 3104a-3104n. Within NEs 4302a-4302n, performance information can be extracted from PIP packets. Once extracted, this information can be sent via communication pathways 4402-4408 to the Physical Layer 3102a-3102n protocols where the operation of these Physical Layer protocols can be modified to react to real-time information provided via the performance information.

Figure 45:
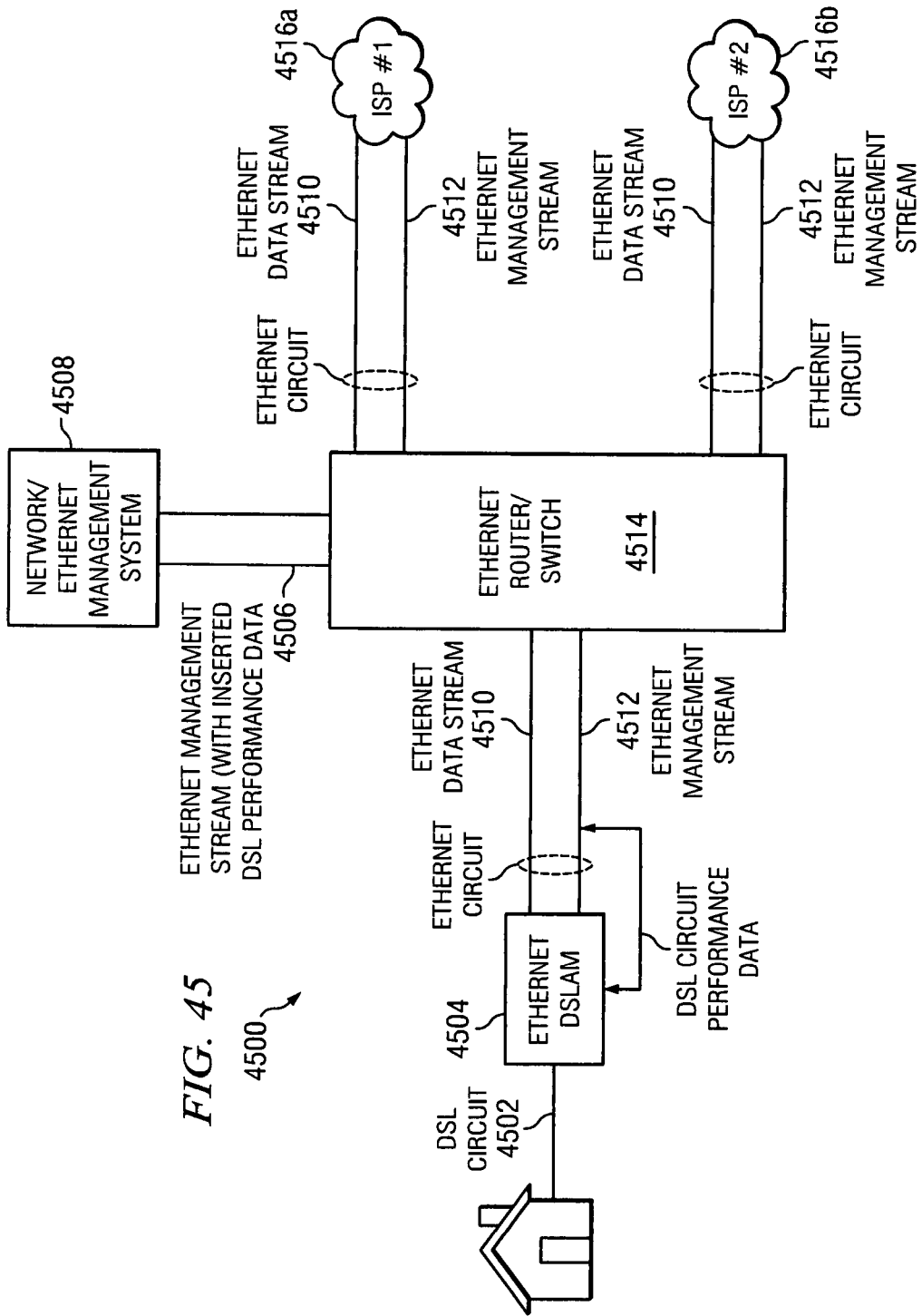
FIG. 45 illustrates a wireline digital subscriber loop network according to an embodiment of the present invention.

FIG. 45 illustrates an embodiment of a wireline Digital Subscriber Loop network 4500, including an Ethernet Router/Switch 4514, Ethernet Data Stream 4510, Ethernet Management Stream 4512, Network/Ethernet Management System 4508, and Internet Service Providers (ISPs #1 and #2) 4516a and 4516b. One example of how performance monitoring of non-Ethernet segments may be utilized is in monitoring of broadband access Digital Subscriber Loop (xDSL) connections. The term, "xDSL" generally means DSL technologies, such as ADSL, ADSL2, ADSL2+, VDSL, VDSL2, etc. By extracting and inserting relevant DSL performance statistics into the PIP packet, a single management system may have visibility to the end-to-end performance of a customer's connection. This insertion could include appending this performance information to the end of the payload of the PIP packet as previously described. This appending may occur at the DSL DSLAM 4504 (assuming the Network Connection is Ethernet). The PIP packet containing the DSL network performance information 4506 may then be made available to the Operator's Network Management System 4508.

The additional DSL network performance information improves repair resolution time, as network problems at a subscriber may be quickly identified. The DSL network performance information allows full monitoring and troubleshooting through a single network management system. In addition, dynamic configuration changes based on network performance may be made by the Network Management System 4508 to optimize circuit performance. For instance, if a DSL circuit 4502 suddenly experienced a peak or spike in impulse noise on the non-Ethernet segment, appropriate diagnostic information may be inserted into the Ethernet management stream and adjustments may be temporarily made by the network management system 4508 to the DSL Signal-to-Noise ratio to compensate for the interference and to ensure line stability. After a given timeframe or due to improving changes in captured performance data, the line could be re-provisioned by the management system to improve overall performance. This example is one of dozens of possible configuration changes that may be made in real-time to optimize DSL circuit performance.

Other exemplary network performance information parameters that may be captured and inserted into the management stream include: near-end failures, far-end failures, last state transmitted (downstream and upstream), actual signal-to-noise ratio, maximum attainable data rate, actual power spectrum density, actual aggregate transmit power, xDSL profile, xDSL limit PSD mask and band-plan, xDSL Power Spectral Density mask, estimated upstream power back-off electrical loop length, trellis code use, actual cyclic extension, band number, line attenuation per band, signal attenuation per band, signal-to-noise ratio margin per band, actual data rate (downstream and upstream), previous data rate (downstream and upstream), actual interleave delay (downstream and upstream), actual impulse noise protection, impulse noise protection report, actual size of Reed-Solomon codeword, actual number of Reed-Solomon redundancy bytes, actual number of bits per second, actual interleaving depth, actual interleaving block depth, actual latency path, interval number, interval status (valid and complete; invalid or incomplete), forward error correction seconds, errored seconds-line, severely errored seconds-line, loss of signal seconds-line, unavailable seconds-line, full initializations, failed full initializations, short initializations, failed short initializations, sync mode, or other capabilities identified in xDSL (e.g., ADSL1, ADSL2, ADSL2+, VDSL2, etc.).

Specifically, the T1.413 Standard defines methods to dynamically adapt the DSL transport stream, the subject matter of which is hereby incorporated by reference. These dynamic adaptations are described in the T1.413 standard under the sub-section "On-line adaptation and reconfiguration using the Overhead Control Channel (AOC)". In this sub-section the standard defines that the AOC data is carried as overhead bytes in the DSL framing structure. The actual multiplexing of these overhead bytes into the DSL framing structure depends on the framing structure used (i.e., full overhead or reduced overhead) and on the allocation of any bearer channel to the fast or interleaved data buffer.

The type and length of an AOC message (except for the acknowledge messages) are identified by a byte-length header. In particular, the AOC channel sends an all binary zeros "00000000" AOC stuffing pattern in the Idle State, and a valid AOC message always begins with a non-zero byte.

The T1.413 Standard further defines "On-line adaptation—Bit swapping." Bit swapping enables a DSL system to change the number of bits assigned to a sub-carrier or change the transmit energy of a sub-carrier without interrupting data flow. An ATU (DSL Termination Unit) may initiate a bit swap. The swapping procedures in the upstream and downstream channels may be independent and may be performed simultaneously. For the bit swap protocol, the "receiver" is the ATU that is receiving the data; it transmits a bit swap (extended or simple) request message and receives the bit swap acknowledge message. The "transmitter" is the ATU that is transmitting the data. It receives a bit swap request (extended or simple) message and transmits the bit swap acknowledge message.

Bit Swap Request Commands.

DSL information or other network performance information may be used to dynamically alter some performance parameters of the Physical Link, such as transmit power. A sub-process may be established in the DSL unit which would monitor PIP packets and then issue the proper AOC Bit Swapping commands (see FIG. 46) to affect the necessary performance requirements.

FIG. 47 illustrates an embodiment of an exemplary wireless network 4700 that operates in accordance with the principles of the present invention. Many types of wireless communications may benefit from the insertion of performance data into a PIP packet. By extracting and inserting relevant wireless segment performance information into the PIP packet, link performance problems may be detected, and traffic could then be rerouted via a centralized management system. Likewise, if the management system determined that a user could achieve greater overall performance by routing traffic in a different manner, that users traffic may be diverted from the current path, even if that path may have the strongest wireless signal. For example, a wireless device 4702 communicates with a wireless access point 4704 via a wireless path 4706. In one example, the wireless path 4706 between the wireless device 4702 and the wireless access point 4704 has strong signal strength. As the quantity of users on this link increases and performance over the wireless path 4706 degrades, network performance information contained in PIP packets collected by the Network management System (NMS) 4712 may trigger a wireless network management system to send instructions to the wireless device 4702 to redirect traffic to wireless access point 4708. by redirecting wireless traffic to the wireless access point 4708; performance of the wireless access point 4704 may improve and, in response, traffic may be redirected from the wireless access point 4708 to the wireless access point 4704 to accomplish load balancing.

The network performance information indicative of a problem at a wireless access point may be appended to the end of the payload of PIP packets. This appending may happen at the wireless routers 4704 and 4708. The PIP packets containing the wireless performance information 4710 would be available to the Network management System, which, in turn, may instruct the wireless device 4702 and the wireless access point 4704 to disconnect and reconnect the wireless device 4702 via wireless access point 4708, in one embodiment. This disconnection can override other wireless connectivity parameters, such as signal strength. Alternatively, the NMS 4712 could instruct the wireless devices to switch to a different channel. Other similar variations are also possible to re-route or re-channel the wireless device 4702.

One example of re-routing may be as follows. If the NMS system 4712 determines that connectivity to ISP #2 4516*b* may provide better performance than ISP #1 4516*a*, traffic would be dynamically rerouted to ISP #2 4516*b* based on rules, thresholds, etc., that the NMS 4712 could apply to network performance information collected at either or both of the ISPs 4516*a* and 4516*b*. Other exemplary variables include: wireless channel, encryption level, and connectivity mode (802.11a, 802.11b, 802.11g, 802.11n, WiMax, etc.). The NMS system 4712 may constantly monitor the network performance information data flows throughout the wireless network 4700 and evaluates traffic and paths based on the network performance information contained in the PIP packets. In response to determining that one or more node segments are underperforming, calls may be rerouted. The NMS system 4712 may evaluate the line state at and between each the connection points within the wireless network 4700. In one embodiment, the NMS system 4712 may evaluate the core network including trunk segments, in addition to evaluating the wireless access points 4704 and 4708. The NMS system 4712 may retest connections on a periodic basis, such as every 10 seconds or 10 milliseconds, for example.

Although shown as a portable computer, the wireless devices 4702 may alternatively be a phone, PDA, and/or any wireless device that may use the wireless network 4700 to communicate. Although two wireless access points 4704 and 4708 are shown, any number of wireless access points may be used with the NMS system 4712 and wireless network 4700.

Further, any number of wireless networks 4700 may be used for evaluating and routing wireless calls. For example, NMS system 4702 determines that a particular wireless network is having difficulty carrying calls due to congestion or other technical problem, then the NMS system 4702 may switch or route its calls to another wireless network. In addition, if the NMS system 4702 determines that a particular signal strength from a wireless device to a wireless access point is weak or becomes weaker due to any number of factors, including due to the user increasing distance between himself and the access node, then the NMS system 4702 may change one or more communications parameters, including encoding, modulation, frequency, and the like to improve or increase the signal strength between the user and the access node. Changing communication parameter(s) could be done automatically or manually via a button on the user's wireless device that initiates a request for determining why the signal strength is degrading or decreasing, and, in accordance with the principles disclosed herein, the information derived from the PIP packet may be used to determine these or other solutions to improving the signal or increasing the signal strength. In yet another embodiment, the NMS system 4702 may troubleshoot the networks automatically without any user initiation on a periodic basis to report back on the status of these wireless connections.

Network Layer Example.

The Network Layer 3106 may determine how data is transferred between network devices, route packets according to unique network device addresses, and provide flow and congestion control to prevent network resource depletion. For purposes of this invention, routing protocols are defined as the protocols used in the implementation of routing algorithms to facilitate the exchange of routing information between networks. This exchange of routing information allows NEs defined as routers on the Network Layer 3106 to build routing tables on a dynamic basis.

Figures 46, 48:
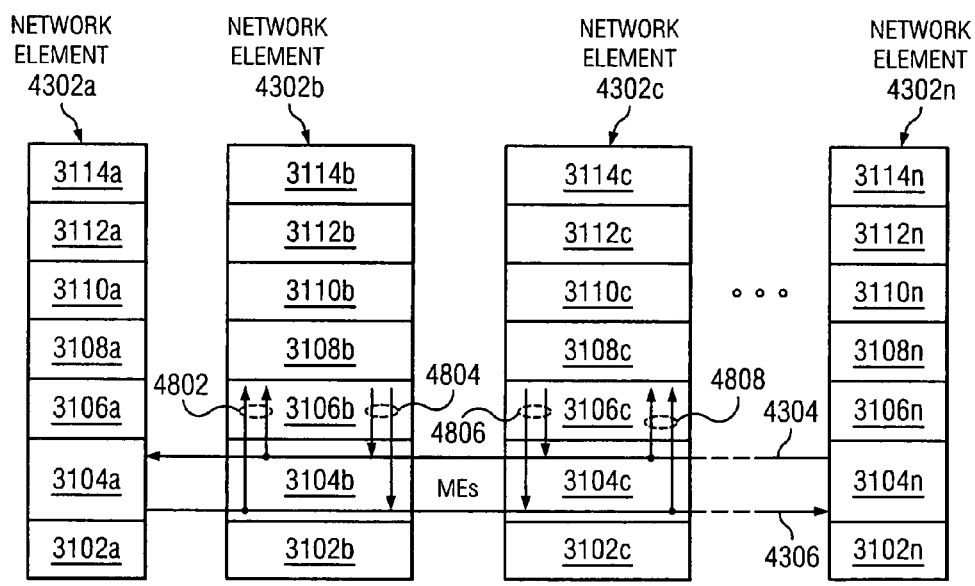
FIG. 46 illustrates a bit swapping table according to an embodiment of the present invention.
FIG. 48 illustrates a MEF network implementation of inter-layer communication between Data Link Layer devices and Network Layer devices according to another embodiment of the present invention.

In one embodiment, the principles of the present invention provides for the injection of dynamic link state information obtained from PIP packets into routing algorithms. In FIG. 48, the Data Link Layers 3104*a*-3104*n* may make network performance information in the PIP packet available to one or more of the Network Layers 3106*a*-3106*n*. The network performance information may include data associated with communications of data packets including real-time content. Data flow over the Data Link Layer may include network performance information derived from either of the MEs 4304 and 4306 to Network Layer routing protocols and routing protocol metrics. This is shown as data flows 4802-4808.

In essence, real-time network performance information, such as link failure, link degradation, MEF TRAN failure, Label Switch Path (LSP) ping, trace-route, Virtual Circuit Connection Verification, Bi-Directional Forward Detection, MPLS Fast Reroute, and other similar capabilities may be dynamically inserted into Link State routing protocols, thereby forcing recalculation of the route tables, calculation of optimal route paths, and potential Link State Advertisement (LSA) re-advertisement. LSAs are processes to update neighbor nodes in the event of a Link State change. The LSA process typically creates a short message (i.e., the link-state advertisement) which: 1) identifies the node which originates the LSA; 2) identifies all the other nodes to which it is directly connected; or 3) includes a sequence number, which increases every time the source node makes up a new version of the message. This message is then communicated throughout the network. In one embodiment, the link-state message is communicated to all other network nodes on the network. Typically, each node in the network is responsible for storing the sequence number of the last link-state message which it received from other nodes. Once the LSA process completes, each node uses this information in calculations for an optimal routing path to other nodes on the network. This information may be included as routing metric information by Network Layer routing algorithms.

Currently, many common implementations of routing protocols, such as OSPF, establish a link cost to be proportional to the inverse of the link bandwidth. A use of the ME information may be to modify the link cost to represent a larger value; hence, the cost rises and the use of the link is less likely. Once congestion clears in the ME, the link cost could be reestablished to reflect the normal setting.

Real-time dynamic link information can significantly enhance link state packet routing protocols. The dynamic link state injection into packet routing protocols may offer the capability to: 1) sample the quality of the physical connection and proactively react to failing conditions, 2) assess changing traffic flows over the connection at regular intervals providing per flow traffic rerouting to accommodate optimal performance, 3) proactively react to degradation conditions affecting the circuit such as creating alternative paths and rerouting traffic prior to circuit failure, 4) load balancing traffic flows over multiple circuits to accommodate circuits that are operating at less than optimal conditions, 5) improve route re-convergence times, 6) eliminate some route 'flapping' conditions and 7) other similar types of route enhancing capabilities.

Figure 49:
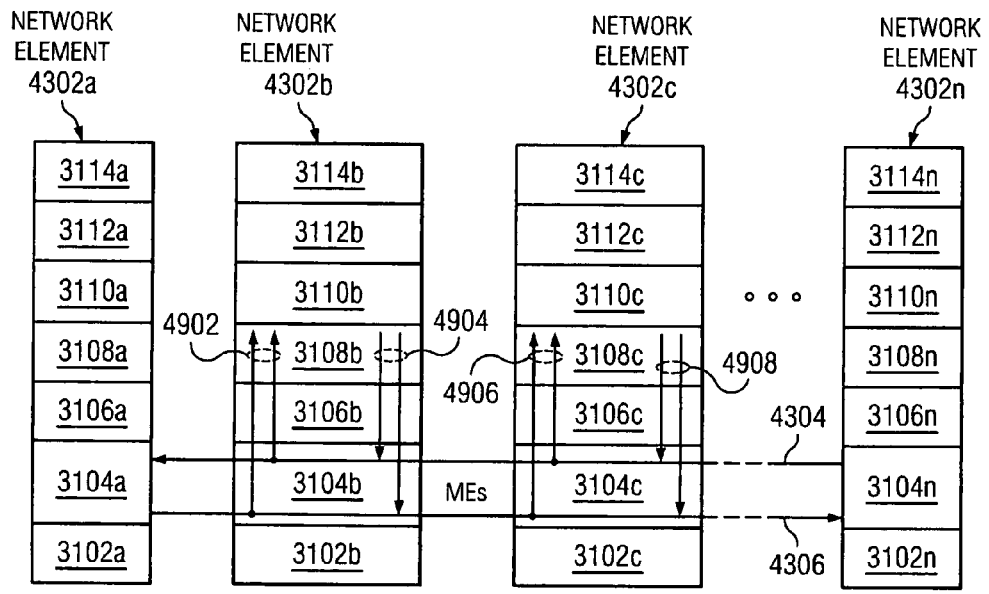
FIG. 49 illustrates a MEF network implementation of inter-layer communication between Data Link Layer devices and Transport Layer devices according to another embodiment of the present invention.

FIG. 49 illustrates an embodiment 4900 of the injection of dynamic link state information into Transport Layer protocols and algorithms. In this Transport Layer embodiment, such information flows into and out of MEs 4304 and 4306 as data flows 4902-4908. In one embodiment, this information flows via PIP packets.

Figure 50:
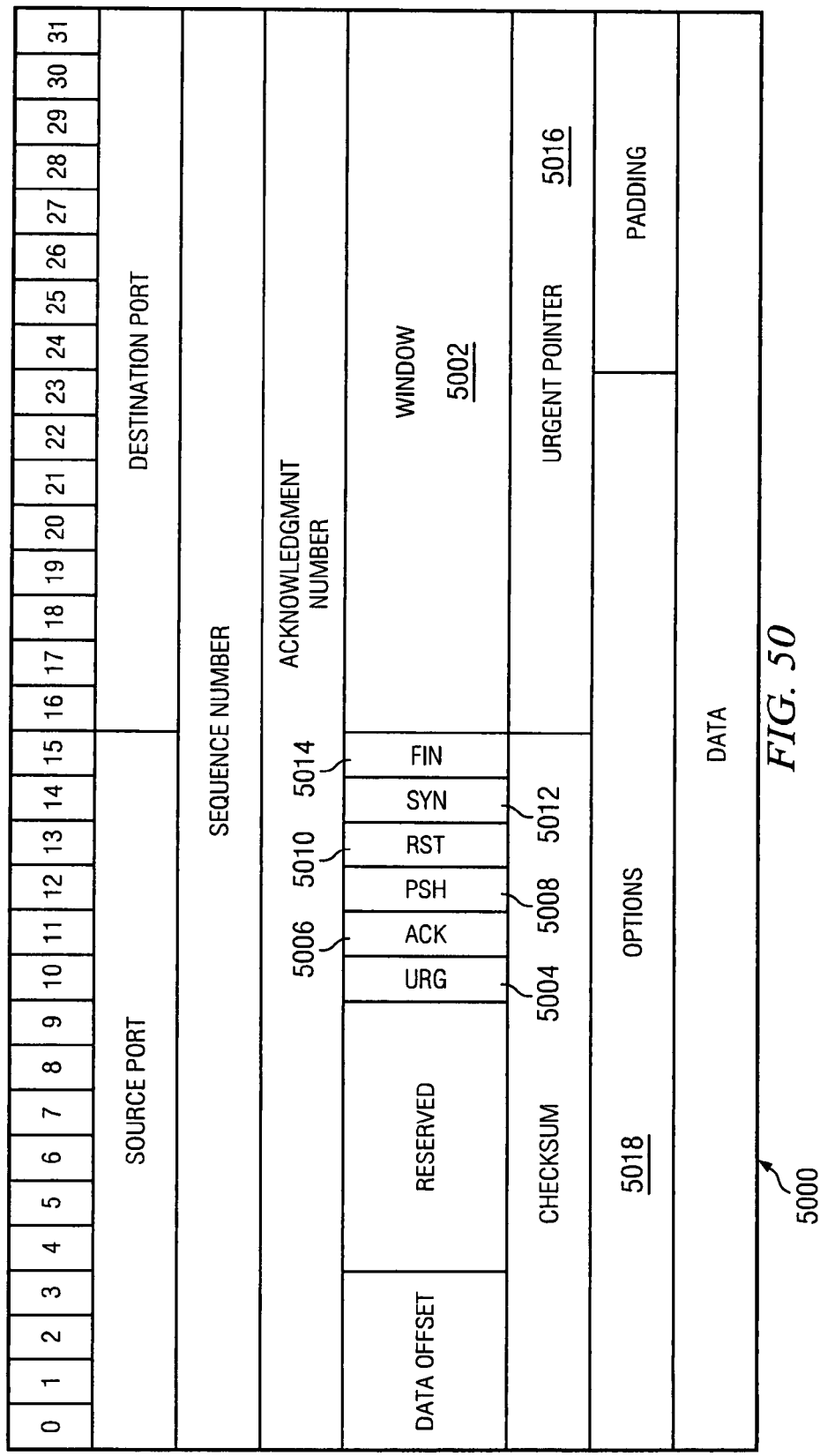
FIG. 50 illustrates a TCP packet according to an embodiment of the present invention.

FIG. 50 illustrates an embodiment 5000 of a TCP packet in accordance with the principles of the present invention. An example of the data flows into the Transport Layer 3108 would be a congestion notification via an PIP packet into the Transport Layer 3108a-3108n. TCP is a common protocol that operates in the Transport Layer. In TCP, a sliding window is a variable flow control mechanism to manage the efficiency of transmission on the network. The TCP Sliding window allows a sender to transmit a specified number of data units before an acknowledgement is received or before a specified event occurs, such as a timer expires. The TCP window function also has a tributary effect on the quantity of packets that can be transmitted during a time window given that the TCP protocol requires a far-end acknowledgement that a window-size of packets was received prior to transmission of the next packet. When the physical distance between end-points becomes large, the acknowledgement time becomes a significant contributing factor in the reduction of effective capacity of a call path. The TCP window can be set to a larger size to increase the transmit versus wait for the acknowledgement window. However, this setting has potential to cause congestion on local LAN segments given the Ethernet collision domain. In this case, the embodiment uses either an ad hoc PIP packet or existing PIP packet if the user is using a static VPN or Point of Presence protocols, such as SLIP or PPP. In this example the MEP and/or Protocol stack contains the PIP PM information, which may include a round trip delay measure. With each TCP session, the TCP protocol can automatically check the PIP PM information and dynamically adjust the TCP window size to meet the line-state conditions. This closed-loop system effectively automates the TCP window setting to the optimal setting for obtaining throughput performance. It should be understood that the same delay information can be used to alter the TCP time-out windows. The ME performance information indicative of congestion may be used to directly adjust (reduce or increase) the TCP Sliding Window 5002, which in turn, reduces the quantity of packets defined by the window that could require retransmission due to lost packets.

In a packet network an intermediate node that identifies network degradation, delay, congestion, and the like, may capture PIP packet information, which may include event data, and propagate the information to other NEs using PIP packets. At the same time, the intermediate node may also inject this information into the ACK packet flowing from the receiver to the sender. After getting this information, the sender may change the window size and follow up with other appropriate action.

Those data packets that may be flowing in the reverse direction, the window size modification information can also be passed to the receiver to take appropriate action. In one aspect, the information contained in PIP packet may be stored externally to the OSI stack or injected into a Transport Layer 3108 device and be stored as a line-state to effect the change of the TCP window size. The NEs may have the lower Transport Layer 3108 protocols, and if not, then another downstream NE that has the ability may be responsible for this action.

At each end of the TCP connection, buffers may be used to manage the data flow. This management may be in a form of flow control and uses the TCP Sliding Window 5002 to perform this flow control. In the TCP Sliding Window function, a window is defined as the maximum number of unacknowledged bytes that are allowed in any one transmission sequence. The receiver of a packet flow specifies the current receive TCP Sliding Window 5002 in every packet sent to the originator. The sender may send up to the amount of specified in the TCP Sliding Window 5002 before it has to wait for an update on the TCP Sliding Window 5002 (from the receiver). It should be understood that the TCP function may be modified to send a PIP parameter modified window and time-out settings to the far-end during the initiation of the TCP session itself and/or query PIP information stores contained on the end-points.

That the sender network node buffers its own sent data until it receives acknowledgements (ACKs) for the sent data. The TCP Sliding Window 5002 size is typically determined by whatever is the smallest between the Receive Window and the sender's buffer. The TCP Sliding Window 5002 field indicates the range of acceptable sequence numbers, beyond the last segment, that has been received successfully. This value is the allowed number of octets that the sender of the ACK is willing to accept before an acknowledgement. As the TCP process performs the transmission of a segment of data, it places a copy of the data in a retransmission queue and starts a timer. If an ACK is not received for that segment, or a part of that segment, before the timer runs out, then the segment, or the part of the segment that was not acknowledged, is retransmitted. This embodiment directly modifies values contained in the TCP Sliding Window 5002 or other portion of TCP Packet 5000 as it traverses through a NE with Layer 4 capabilities.

Within TCP packet 5000, individual code bits flags are identified as fields "U," "A," "P," "R," "S," and "F" are used to indicate the nature of the header in relationship to the protocol conversation. For example, such fields include U—Urgent Pointer (URG) 5004, A—Acknowledgement (ACK) 5006, and P—Push function 5008. Push function 5008 causes the TCP sender to push all unsent data to the receiver rather than sending segments when it gets around to them, (e.g., when the buffer is full). Additional fields typically found in a TCP packet 5000 include: R—Reset the connection (RST) 5010, S—Synchronize sequence numbers (SYN) 5012, and F—End of data (FIN) 5014.

Also within TCP packet 5000 are three other fields that may be directly modified to assist in the shaping of the traffic flow between sender and receiver. The first field is the Window field that indicates the range of acceptable sequence numbers beyond the last segment that has been received successfully. A value of the window field represents the allowed number of octets that the sender of the ACK is willing to accept before an acknowledgment. The second field is the Urgent Pointer 5016 that shows the end of the urgent data so that interrupted data streams can continue. When the URG bit 5016 is set, the data is given priority over other data streams. The last field is the Options 5018 that may contain a TCP Maximum Segment Size (MSS) and is sometimes called Maximum Window Size or Send Maximum Segment Size (SMSS).

In one embodiment, the NE 4302b-4302c supports a protocol stack through the OSI Transport Layer 3108. In addition, a NE 4302b-4302c supporting this embodiment may contain a set of embedded programming instructions that would react to the ME performance information, establish which fields in the TCP packet would be modified, modify the field values, and send the packet out of the egress interface. Modifications could be made to packets traversing in any direction (sender to receiver, receiver to sender, or both).

In another embodiment, the OAM information obtained from the Data Link Layer 3102 and contained in a PIP packet is used in other types of protocols, such as the User Datagram Protocol (UDP). Since UDP does not use a window or acknowledge packet receipts like TCP/IP, there is no control on the sending rate. Nevertheless, the rate may be controlled by setting limits on the maximum bandwidth allowed between sites used in other applications and protocols, such as File Transfer Protocol, Database Storage, and Voice over Internet Protocol (VOIP). Once the network problem is detected, the Data Link Layer 3102 information, derived from the PIP packet, may be injected into Transport Layer 3108 to make the source control the bandwidth. The fault identification process may be refreshed at certain intervals so as to get the current status. Once the fault goes away, this indication may be injected into the Transport Layer 3108 data so that the appropriate NE can take the necessary action and the original transmission rate can resume.

In another embodiment, the information contained in the PIP packets may be communicated to the protocol stacks contained with Network Layer 3106 devices, such as routers, to convey that there may be the potential for collapse due to congestion. This congestion avoidance may be achieved by packet queuing and/or packet dropping techniques to slow down excessive UDP traffic. Further, Datagram Congestion Control Protocol (DCCP) may be used to add end host TCP-related congestion control behavior to high-rate UDP streams, such as streaming media.

Figure 51:
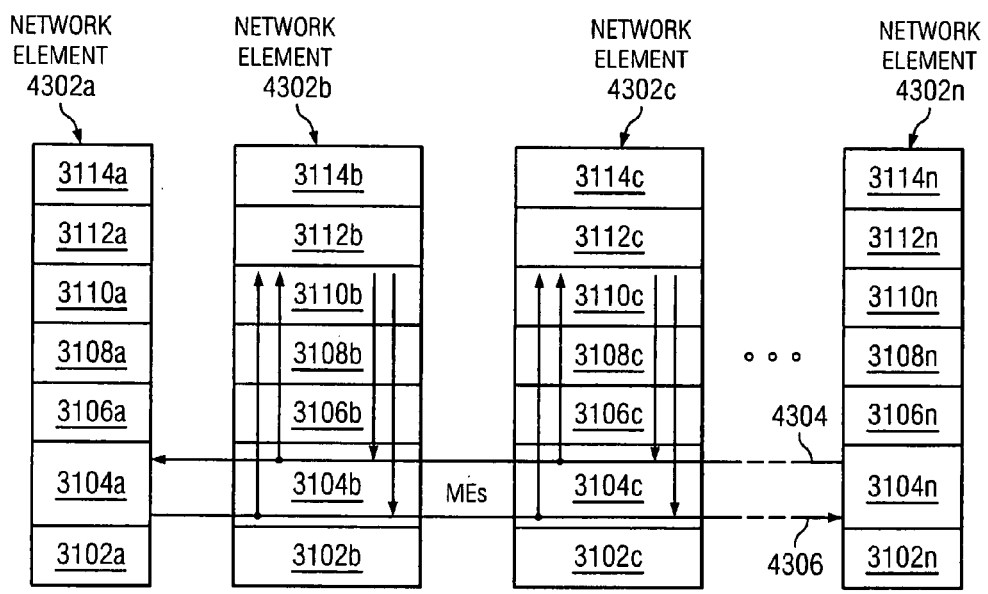
FIG. 51 illustrates a MEF network implementation of inter-layer communication between Data Link Layer devices and Session Layer devices according to another embodiment of the present invention.
Figure 52:
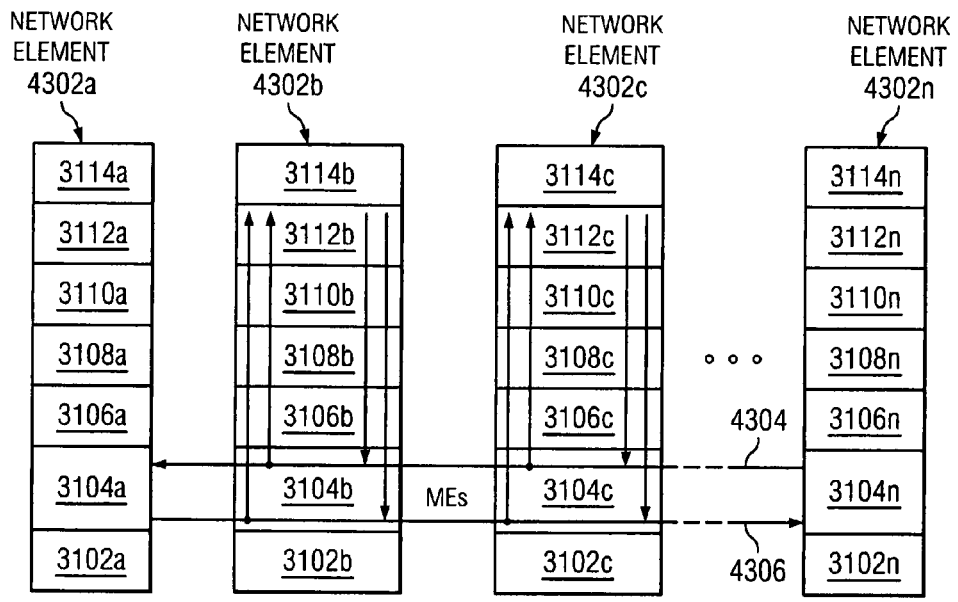
FIG. 52 illustrates a MEF network implementation of inter-layer communication between Data Link Layer devices and Presentation Layer devices according to another embodiment of the present invention.
Figure 53:
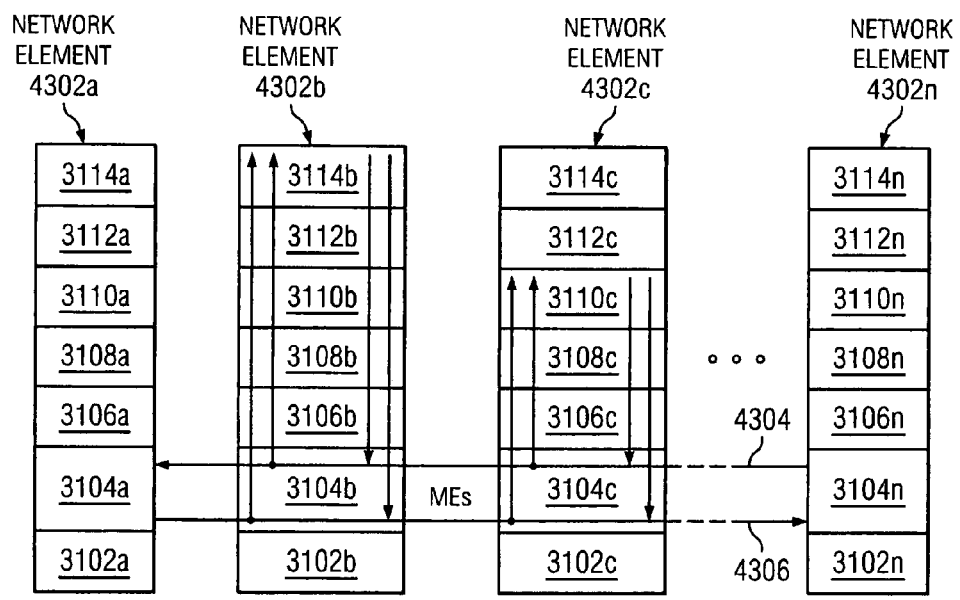
FIG. 53 illustrates a MEF network implementation of inter-layer communication between Data Link Layer devices and Application Layer devices according to another embodiment of the present invention.

FIGS. 51-53 illustrate corresponding exemplary embodiments 5100-5300 of data flows to other layers in the OSI reference model.

Figure 54:
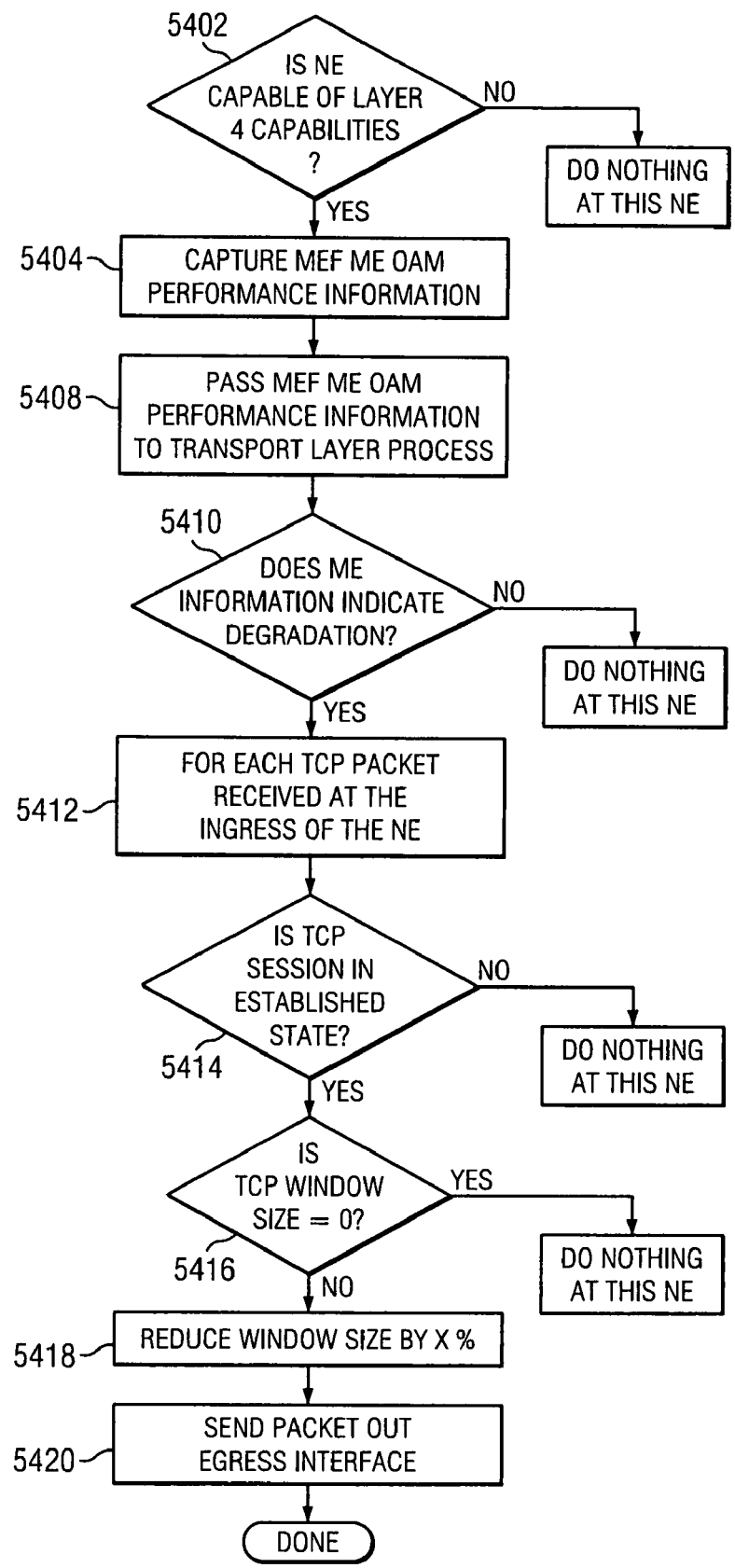
FIG. 54 illustrates a block flow diagram for a TCP Window sizing method according to an embodiment of the present invention.

Further to the discussion above to FIG. 50, FIG. 54 illustrates an embodiment of an exemplary method for adjusting TCP window size when the PIP OAM performance and utilization information indicates a fault in the middle of the network. In this embodiment, a fault is detected in the middle of the network and the fault information is injected into the Acknowledgement (ACK) packet before being sent to the packet-sending network device (sender). Upon receiving the information, the sender may change the window size. Typically, a sender starts with an initial TCP window size.

In step 5402, the capability of the network element to process layer 4 information is determined. In step 5404, the PIP ME performance and utilization information is captured and sent to the layer 4 embedded programming process in step 5408. In these steps, a QoS or traffic problem may be identified at a Data Link Layer 3104 node. Also, in step 5408, the sender may receive the ACK packet from the receiver. The fault information may be injected from Data Link Layer 3104 to Transport Layer 3108. This may include embedding this information in the TCP ACK packet. In step 5408, the nearest NE with Transport Layer 3108 may also be identified. In step 5416, the sender receives the ACK with fault information. In step 5410, the embedded program determines if the PIP performance information indicates a performance degradation. If so, then for each TCP packet received at the ingress of the NE at step 5412, a determination is made at step 5414 to determine if the TCP state is established. If in an opening state or closing state, then the NE may do nothing. If the TCP state is in an established state, then the current window size is viewed and determined if it is at zero (0). If it is at zero, then the TCP inherent flow control mechanisms may have already taken care of the congestion problem. If the window size is non-zero then the TCP window size 5418 is reduced and the packet is sent out the egress 5420. In step 5418, the sender may make additional appropriate changes in the TCP window size, such as increasing the window size.

Figure 55:
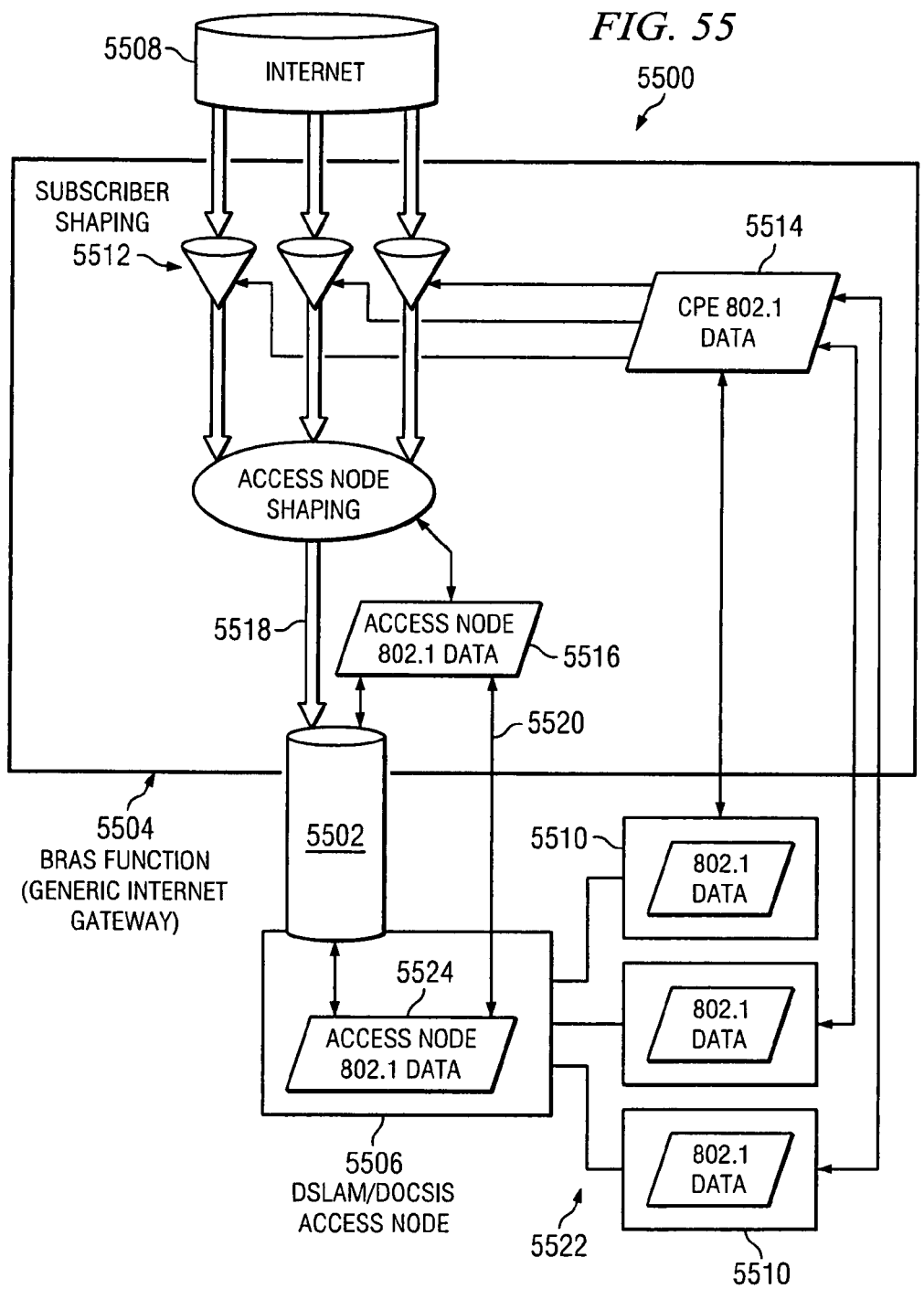
FIG. 55 illustrates a block flow diagram for a TCP Window sizing method according to another embodiment of the present invention.

In addition to the embodiments above, FIG. 55 illustrates an embodiment of an exemplary system 5500 and method for shaping network traffic ("network traffic shaping system") that includes using an Ethernet First Mile OAM Packet, PIP packet, or other suitable packet to dynamically change traffic shaping to minimize bursting and packet loss on a packet switched network. FIG. 55 illustrates a typical packet network 5502 including a broadband remote access server (BRAS) 5504 and a DSLAM 5506 interconnected across the packet network 5502 in which the network traffic shaping method operates. Typically, the packet network 5502 operates in Data Link Layer 3102 (FIG. 31) of the OSI reference model and typically includes data link communication devices, or data link layer devices, such as bridges and switches. Generally, bridges and switches extend the effective length of a LAN by permitting the attachment of distant stations. It should be understood that the virtual packet path between the BRAS, DLSAM, DSLAM modem, and User CPE devices may traverse any type of packet network or transport schema.

The packet network 5502 may support Data Link Layer 3102 or Network Layer 3106 network facilitating Data Link Layer 3102 tunnels or any other packet network that supports Data Link Layer 3102 tunneling, such as Asynchronous Transfer Mode ("ATM"). In another embodiment of the present advanced fail-over method, LAN switches are used to interconnect multiple LANs.

Some common switching technologies used with the present network traffic shaping system 5500 include store-and-forward switching and cut-through switching. Typically, store-and-forward switching waits for an entire frame, or encapsulated packet(s), to be received before forwarding. In cut-through switching, the switch begins forwarding the frame when enough of the frame is received to make a forwarding decision. It should be understood that the BRAS function is a universal edge shaping function that can be distributed throughout the network. The shaping function is normally statically set to a circuit performance level, which shapes and discards traffic to meet a specific performance parameter regardless of what is occurring downstream in the network.

In addition, the network traffic shaping system 5500 may operate with common bridges including transparent bridging as found in Ethernet environments, source-route bridging as commonly found in Token Ring environments, and source-route transparent bridging as commonly found in mixed Ethernet/Token Ring environments.

The BRAS 5504 in the instant shaping example, is typically the gateway between the Internet and DLSAMs in the network accessed by DSLAM customers. The BRAS 5504 or shaping entity may contain a MEP. The MEP may track performance or it may obtain network performance information of the customer and node or trunk levels from somewhere within the OSI stack. In one embodiment, the BRAS 5504 can use the transmission path state information by detecting transmission Frame Loss via PM information contained within the PIP packets. The PIP session(s) can be both trunk level to a network node, such as a DSLAM or to a customer level. In both cases the trunk or line state PM engine detects that transmitted packets passing beyond the shapers are being dropped in the packet network 5502 or aggregation device going to the DSLAM 5506, the DSL modems, or customer CPE. In one embodiment, the PIP PM state communicates transmission loss to the traffic shaping mechanisms, a reaction to the transmission path congestion or degradation and can further limit the transmission rates to alleviate the congestion by modifying (lowering) the shaper windows. In one example, transmission loss causes the network to slowly begin dropping these packets in the packet network and the shapers react by performing one or more shaping or scheduling functions through the BRAS 5504 to stop the packets from being dropped in the packet network. It is understood as the packet transmission rate increases or frame loss rate decreases that the shaping and scheduling functions should gracefully increase the through-put window, thereby returning the circuit state to its normal condition. As a result of these functions, the packets are dropped before entering the packet network, thus not tying up bandwidth with packets that are ultimately dropped within the packet network 5502.

In one embodiment, the BRAS 5504 is used to shape DSL traffic of each user 5510 by using end-to-end signaling outside of TCP flow control to adjust the bursting to eliminate congestion. In one embodiment, the IP protocol flows anticipate lost packets and enables dropping these packets prior to them being dropped in an internal network thereby eliminating congestion control and reducing network burst traffic, which increases the amount of capacity required by the network.

In one aspect, a CPE, such as DSLAM 5506, receives network performance information, via PIP packets, that a percentage of the packets that were sent by the BRAS 5504 did not get delivered to the DSLAM 5506. In one embodiment, the modified Y.1731 protocol PM stack is used to transmit the receive PM information performance data from the DSLAM 5506 to the BRAS 5504. The protocol performs algorithms to determine the number of dropped packets not received by the DSLAM 5506. Thus, the DSLAM 5506 contains a Y.1731 stack that correlates this information. There are three general ways in which this data is transmitted to the BRAS 5504, a trigger, a push, and a pull, as commonly known to those skilled in the art. It should be understood that to accommodate the "forward" shaping at the edge of the network a PIP PM data must be returned to the shaping entity from the far end. The relay of the PM information from MEP to MEP is understood to occur at the node trunk level, node port level, Customer NID device, and Customer CPE to obtain each subsequent level of shaping.

The BRAS 5504 performs one or more of several functions to "self-heal" the packet network 5502. For example, the BRAS 5504 can decrease the data transfer rate to each user 5510 from the Internet 5508 to the packet network 5502, thus causing the packets to be dropped prior to entering the packet network 5502 and avoiding the packets later being dropped in the packet network. The BRAS 5504 provides for real-time dynamic network traffic shaping based on session flow performance of the far-end based on the performance data included in a received packet. Thus, if a CPE, such as the DSLAM 5506, is communicating through the PIP packets that packets are being dropped in the packet network 5502, the BRAS 5504 relieves the congestion on the packet network by decreasing, via filter 5512, session flow performance of the users 5510 at the BRAS 5504 prior to the session flow entering the packet network 5502.

The foregoing exemplary BRAS operation reduces provisioning complexity by adding a "self-healing" traffic shaping mechanism to the network Internet service point. The present network traffic shaping system also enables a "plug-and-play" traffic adjustment scheme in that a user may change the network and the BRAS and/or other network elements will dynamically learn the available transport capacity and adjust accordingly without being manually configured.

In one embodiment, the network traffic shaping system 5500 includes a nodal mass calling shaping congestion control function for shaping the rate of data traffic through a network based on PIP and PM packet information. The network traffic shaping system may enforce a queue or traffic shaping for an entire access node 5516 or group of traffic in an access node 5516. Using the same principles as discussed above, all traffic from an access node may be placed into a virtual packet circuit (IP, Mac Address, VLAN, LSP, etc.) and built into a scheduler so the overall traffic 5520 may be shaped. Without knowing what is in the middle of the packet network 5502, the traffic shaping system 5500 can track the packets received at the access node 5516 and use that data at the BRAS 5504 to rate shape the entire group 5522 of customers 5510. This rate shaping preserves the cross-utilization of bandwidth between the customers 5510 on access node 5524 and minimizes the packet loss due to bursting and mass calling events that might occur in the network.

In one aspect, the traffic shaping function performed by the network traffic shaping system 5500 may be based on cutting the non-real time data flows versus the real-time data flows. In another aspect, the traffic shaping function performed by the network traffic shaping system 5500 may be based on QoS requirements and obligations to determine which data flows to drop and which data flows to keep transmitting. In yet another aspect, the traffic shaping function performed by the network traffic shaping system 5500 can also look at the (i) DIFFSERV protocol marking, (ii) recipient's IP address, and (iii) trunk from which data is being received to determine what flows to shape or drop altogether.

Generally, the present network traffic shaping system 5500 maps everything to a Media Access Control (MAC) address, an Ethernet virtual circuit, a PPPOE tunnel, a PPPOA tunnel or other similar structures. These locations are considered the egress points. Some or all of the following criteria may be used to determine how data is to be rate shaped. As discussed above, the present network traffic shaping system 5500 can determine what port the data came from. For example, a determination can be made as to whether the port is an Internet data port or a VOIP data port. In one aspect, the present network traffic shaping system 5500 may determine to drop the traffic coming from one port or shape one port to another port. In a second way, the present network traffic shaping system 5500 may have two virtual circuits going down to the CPE or DSLAM 5506, so it may shape one of them versus the other. In a third way, the present network traffic shaping system 5500 may have a large bandwidth going down to the CPE or DSLAM 5506, but it may use a priority bit marking in the packets to choose which traffic to shape or drop. In a fourth way, the present network traffic shaping system 5500 may determine the type of packet that is sent through the packet network 5502. For example, if the packet is a real-time VOIP packet and another packet is a FTP packet, then it may decide to drop the FTP packet and transmit the VOIP packet. In yet another example, the present network traffic shaping system 5500 may determine that a particular user 5510 has a multiple of IP addresses for a particular customer 5510 and decide to not transmit for a period of time on one of those IP addresses.

Figure 56:
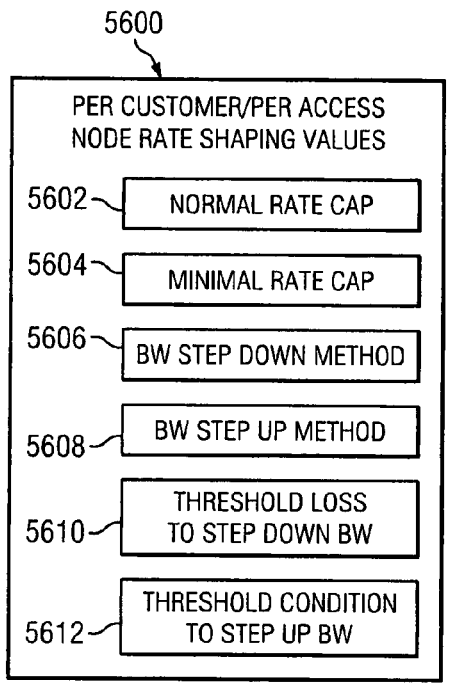
FIG. 56 illustrates a network diagram including for traffic shaping a network including a BRAS and a DSLAM according to an embodiment of the present invention.

FIG. 56 illustrates an embodiment of an exemplary user interface for the present network traffic shaping system 5500. The Normal Rate Cap field 5602 contains values relating normal rate capacity of a particular session or data flow for either a particular user 5510 (FIG. 55) or a node 5516. The Minimal Cap Rate field 5604 contains values for the minimal rate capacity for a particular session or data flow. The BW Step Down Method field 5606 and the BW Step Up Method field 5608 each contains values and related algorithms relating to the amount of the step-wise reduction or step-wise increase performed by the present network traffic shaping system 5500 when reducing the bandwidth to either the user 5510 or the node 5516. The Threshold Loss to Step Down BW field 5610 and Threshold Condition to Step Up BW field 5612 each contains values and related algorithms for initiating the step-wise reduction or step-wise increase of the Step Down Method field 5606 and the BW Step Up Method field 5608.

Figure 57:
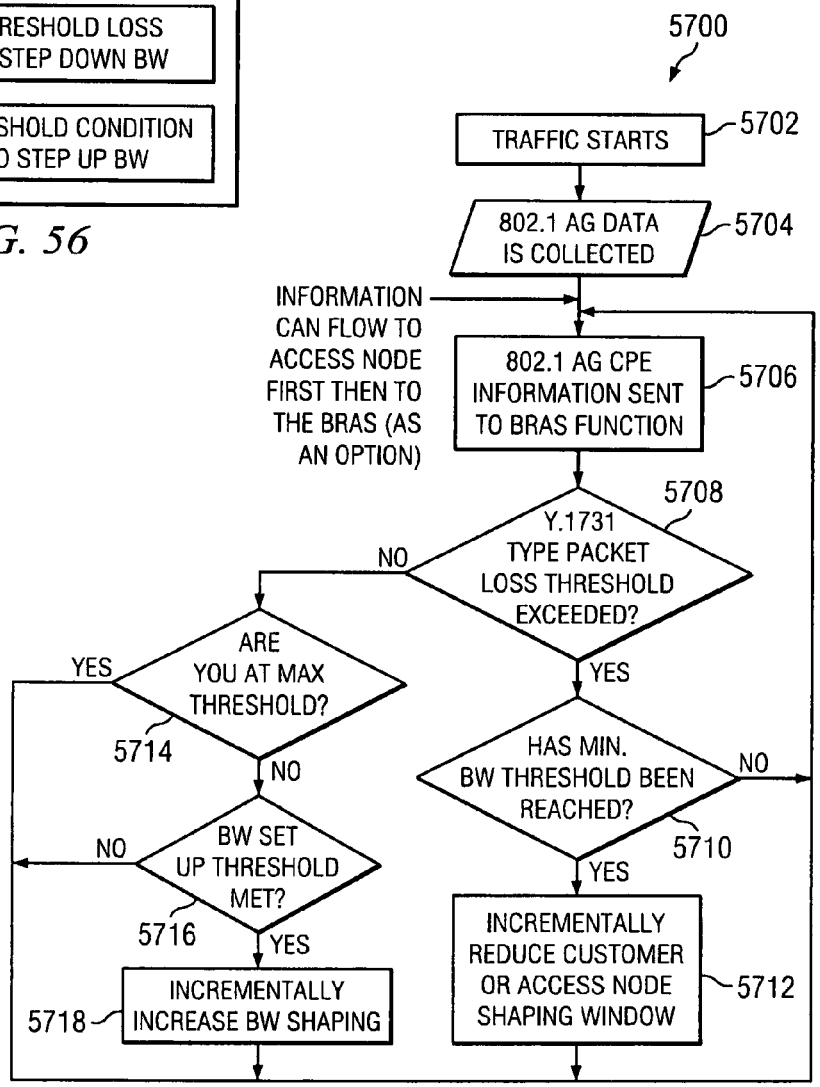
FIG. 57 illustrates a user interface for network traffic shaping method according to an embodiment of the present invention.

FIG. 57 illustrates an embodiment 5700 of an exemplary method for shaping the rate of data traffic through a network based on information from the PIP packet of the present network traffic shaping system 5500 (FIG. 55). In step 5702, the data flow is initiated. In step 5704, the PIP packet data is collected by a CPE or DSLAM 5506 as discussed herein. In step 5706, the PIP packet data is transmitted from the CPE or DSLAM 5506 to the BRAS 5504. In step 5708, the present network traffic shaping system 5500 queries whether the Y.1731 type packet loss threshold has been exceeded as described above. If it has, then the present network traffic shaping system 5500 further queries whether the minimum bandwidth threshold has been reached in step 5710. If it has, then the present network traffic shaping system 5500 incrementally reduces the customer or access node shaping window at step 5712.

In step 5708, if the Y.1731 type packet loss threshold has not been exceeded, then the present network traffic shaping system 5500 queries whether the maximum threshold has been reached in step 5714. If the maximum threshold has been reached, then the present network traffic shaping system 5500 continues at step 5706, where PIP packet data is collected from the CPE or DSLAM 5506 at the BRAS. In step 5716, the present network traffic shaping system 5500 queries whether the bandwidth set-up threshold is met. If the set-up threshold has been met, then the network traffic shaping system 5500 incrementally increases bandwidth shaping at step 5718, as described above.

Figure 58:
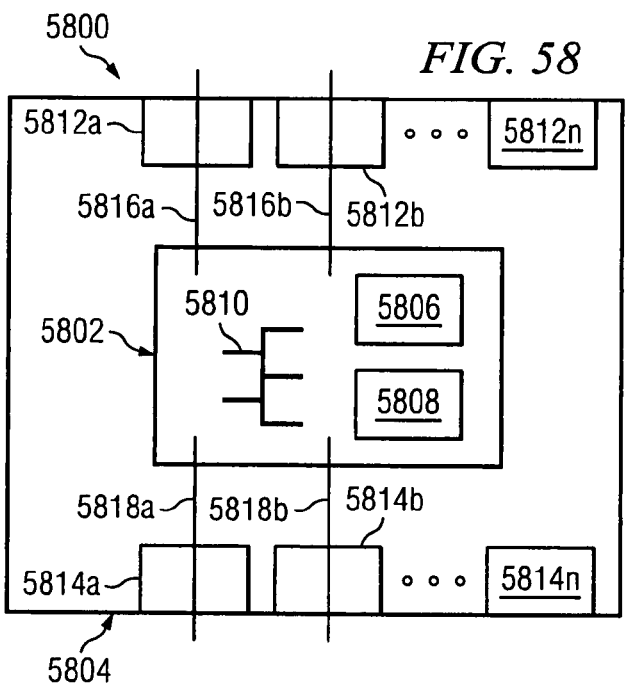
FIG. 58 illustrates and embodiment of a Data Link Layer device and an ASIC device that is associated with an incoming network interface for communicating to an outgoing network interface.

In another embodiment, an Application-Specific Integrated Circuits (ASIC) directs packet data flow and PIP packets based on their real-time and non-real-time content. FIG. 58 illustrates an embodiment 5800 of an exemplary Data Link Layer device 5804 and an ASIC device 5802 that is associated with an incoming network interface for communicating to an outgoing network interface. The ASIC 5802 may be capable of communicating switched data to an outgoing network interface also associated with the Data Link Layer device 5804. The ASIC 5802 is designed to separate or buffer particular data flows, such as data flows of data packets including real-time and non-real-time content. The data flows may be performed over a network interface card (NIC) operating in a computer Ethernet port or pluggable fiber/electrical modules.

The Data Link Layer device 5804 includes one or more incoming network interface or module 5812a-5812n (collectively 5812) and one or more outgoing network interface or module 5814a-5814n (collectively 5814). The network interfaces 5812 and 5814 may be capable of handling packet based and other suitable digital signals associated with voice, video, and data transmissions of a packet switched network. In addition, the Data Link Layer device 5804 may also include switching unit controllers, processors, memory, and buses interconnecting them, as known in the art. The network interfaces 5812 and 5814 may also be capable of communicating with other network interfaces, single or multiple, such as T1 interfaces, E1 interfaces, Integrated Services Digital Network (ISDN) interfaces, SS7 interfaces, Optical Carrier level-3 (OC-3) interfaces, other optical interfaces, any other types of interfaces, or combinations of these interfaces.

The ASIC 5802 may also include one or more incoming lines 5816a and 5816b (collectively 5816) and one or more outgoing lines 5818a and 5818b (collectively 5818) that may in communication with other devices of the packet network. The ASIC 5802 may also be connected directly to these lines 5816 and 5818 or may be connected via a bus of a suitable type, such as control, synchronization, power, isolation, serial, and the like. In one embodiment, the ASIC 5802 may receive uni-directional, bi-directional, or other serial data streams incoming from the incoming network module 5812. Moving in the opposite direction, the ASCI 5802 may transmit separated or stored real-time data flows and non-real-time data flows through outgoing network modules 3212. In one embodiment, ASIC 5802 may also contain a processor(s) 5806 memory 5808, such as ROM, RAM, EEPROM, Flash, and the like, and coded logic or software 5810 for performing the operations described herein. Memory 5808 may store registers, such as sampling registers and static registers based on the type of data flow through the ASIC 5802.

In one embodiment, the one of the two outgoing data path lines 5818a and 5818b is used for transmitting real-time data flow and the other for non-real-time data flow. Once the two data flows are separated at the ASIC, they can each be transmitted to their respective lines 5818a or 5818b for measuring in accordance with the principles of the present invention.

In one embodiment, the ASIC 5802 creates "sampling" shift registers with QoS or other mapping/replication functions. In one aspect, the sampling shift registers measure the "buckets" or total volume or amount of either real-time data content or non-real-time content through a Data Link Layer device 5804 or other network device. The ASIC 5802 may measure the total volume, as opposed to bit transfer rate, of a particular data flow that includes either real-time or non-real-time content. For example, the ASIC 5802 may measure an interval of traffic from one of these data flows and then measure another interval of traffic in a "round-robin" manner. A static register allocates a bucket per stream, bucket per flow, bucket per logical connection, bucket per port, and/or bucket per device. Further, the ASIC 5802 may contain a scheduler modification to provide actual scheduler performance information on what flows are being served at what rates. Also, it may include a "settable counter trigger" that counts when a packet has a specific TOS, QoS, or other marking. Externally, the ASIC 5802 may create a "line state" dongle or inline probe that measures, via any method, and generates the PIP packet information in both directions for real-time and total bandwidth with other peakedness measures. The term "peakedness" means within-the-hour or moment-to-moment variations in traffic.

Further, the coded logic or software 5810 of the ASIC 5802 may determine packets that contain real-time data content from those that contain non-real-time data content based on the port or device that transmitted the packet to the ASIC 5802, the payload of the packet, the p-bit of the packet, header information of the packet, or by any other means commonly known to those skilled in the art and/or described herein. Further, the ASIC 5802 may store the TOS, QoS, or other service information related to a particular customer or user associated with the packet or flow of packets.

In addition, the ASIC 5802 may characterize the "peakedness" or burst in real-time. The real-time data may be characterized as a "state," thus making it useful for mathematical calculations and algorithms to determine the amount of real-time data content transmitted.

Figure 59:
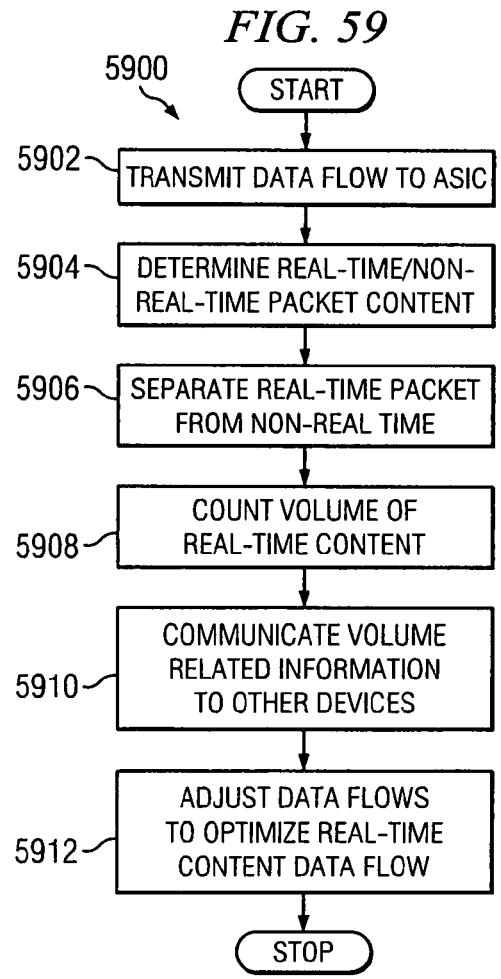
FIG. 59 illustrates a block flow diagram for the traffic shaping method according to an embodiment of the present invention.

FIG. 59 illustrates an embodiment of an exemplary method 5900 for determining the amount of real-time data flow and non-real-time data flow with an ASIC 5802. In step 5902, the data is transmitted to the ASIC 5802 in any manner commonly known to those skilled in the art and/or described herein. In step 5904, the ASIC 5902 determines the packets that contain real-time content and packets that contain non-real-time content. In step 5906, the real-time content packets are separated from the non-real-time data packets based on features of the packets or sender information associated with the packets as described herein. In step 5908, the volume of real-time content is measured in buckets or other means. In step 5910, the volume measurements of real-time content may be transmitted to other devices or systems for use in adjusting these devices and systems to optimize the real-time content flow through a network in step 5912. In addition, billing considerations can be made based on the total volume of real-time data content measured at the ASIC 5802.

Figure 60:
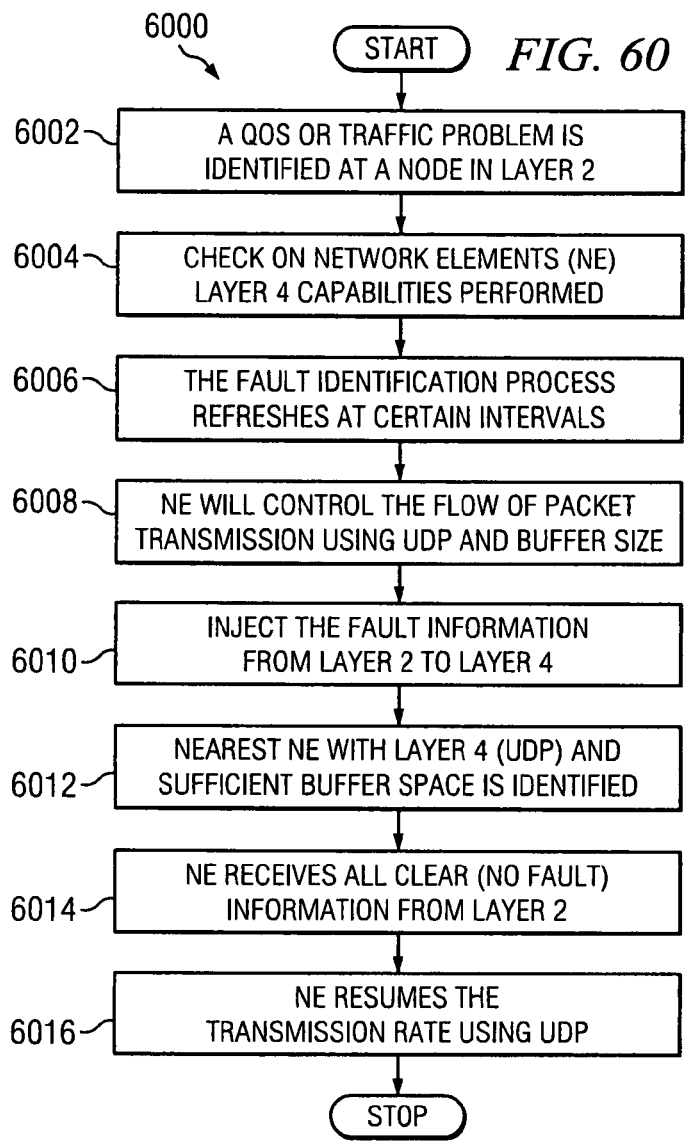
FIG. 60 illustrates a block flow diagram for a method of for using information contained in a PIP packet to control packet traffic flow with UDP.

FIG. 60 illustrates an embodiment 6000 of a method for using information contained in PIP packets to control packet traffic flow with UDP. In step 6002, a QoS or traffic problem is identified at a node in the Data Link Layer 3104. In step 6004, a check on NEs Data Link Layer 3104 capabilities is performed. In step 6006, the fault identification process refreshes at certain intervals. In step 6008, the NE may control the flow of packet transmission using UDP and buffer size. In step 6010, fault information is injected from the Data Link Layer 3104 into the Transport Layer 3108. In step 6012, the nearest NE with Transport Layer 3108 (UDP) and sufficient buffer space is identified. In step 6014, the NE receives all clear (no fault) information from Data Link Layer 3104. Finally, in step 6016, the NE resumes the transmission rate using UDP.

The system and methods of the illustrative embodiments allow bandwidth allocation, resource management, and troubleshooting across Ethernet or communications domains. Network performance information about the line state of the Ethernet network may be used in conjunction with or to adjust Connection Admission Control (CAC) policies and devices in real-time such that bandwidth and services across Ethernet domains are controlled. The network performance information may also be used to isolate nodes that are failing or sources of trouble in order to make network corrections. The changes, adjustments, fixes, work-arounds that may be implemented are available across communications domains elements with different operators and equipment in a carrier grade Ethernet network. Various access nodes, such as Broadband Remote Access Servers (BRAS), Broadband Digital Loop Carriers (BBDLC), Cable Modem Termination Systems (CMTS), or routers and switches, may use the illustrative methods to manage services and/or bandwidths by tracking both the shared network-side trunk state and the individual subscriber-side line states as a state repository for the network systems.

Figure 61:
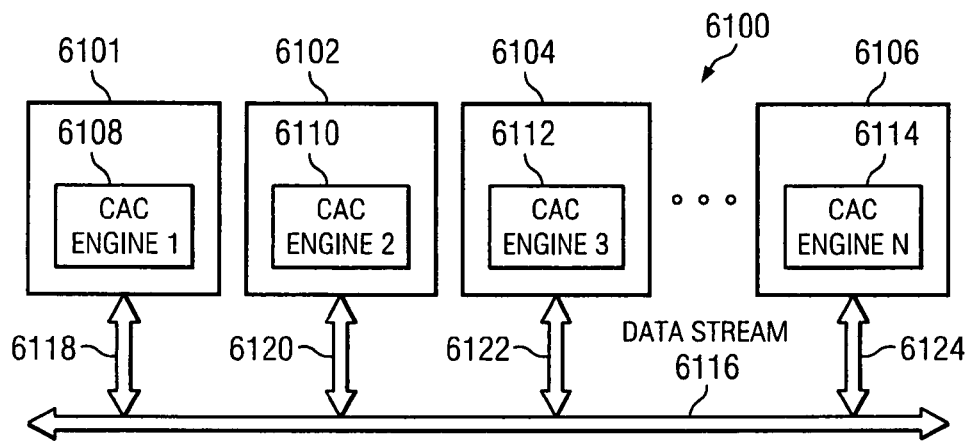
FIG. 61 is an example of an Ethernet network in accordance with an illustrative embodiment of the present invention.

FIG. 61 is an example of an Ethernet network 6100 in accordance with an illustrative embodiment of the present invention. FIG. 61 illustrates the Ethernet network 6100 with a number of access nodes 6101, 6102, 6104, and 6106 in communication with Connection Admission Control (CAC) engines 6108, 6110, 6112, and 6114. Each of these CAC engines 6108, 6110, 6112, and 6114, devices, or elements is connected to a data stream 6116 that communicates between and through the access nodes 6101, 6102, 6104, and 6106 using packet streams 6118, 6120, 6122, and 6124.

Ethernet is a network protocol and local area network (LAN) technology used for sending and receiving data packets across the Ethernet network 6100. CAC engines 6108, 6110, 6112, and 6114 control and adjust the connection bandwidth in order to accommodate the necessary communication stream. CAC engines 6108, 6110, 6112, and 6114 may be hardware and/or software elements or process performed thereby to take actions during connection initiation or re-allocation for strategically controlling congestion. Frequently, the CAC engines 6108, 6110, 6112, and 6114 may be used to determine whether or not to allow a new connection, throttle bandwidth, or to load balance across the Ethernet network 6100. The CAC engines 6108, 6110, 6112, and 6114 may communicate messages, alerts, alarms, commands, data, and other information with one another. In one embodiment the CAC engines may contain transmission path state real-time bandwidth and other PM information. The CAC policy engine may include a threshold trigger based upon the PM information or the CAC engine may dynamically change over-subscription rules for the bandwidth reservation portion of the CAC engine. These new states and state triggers are equivalent to CAC engine states that may be polled or otherwise interacted with by EMS systems and other protocols. In another embodiment, a connection may be accepted only if sufficient resources are available to establish the connection end-to-end with its required quality of service. For example, in one embodiment, for a new connection to be accepted, the contractual quality of service of existing connections and customers served by the network may not be adversely affected by the new connection.

In some cases, CAC engine 6108 may be used to control CAC engine 6114. Provisionally, the CAC engines may be applicable to a port or a transmission path. Each CAC engine 6108, 6110, 6112, and 6114 may specify permissions and authorizations for how and when it may be accessed. The permissions may include authentications, passwords, and identifications so that each CAC engine 6108, 6110, 6112, and 6114 does not have unlimited access to each of the other CAC engines 6108, 6110, 6112, and 6114. For example, if CAC engine 6114 receives a bandwidth throttling request from CAC engine 6108, the CAC engine 6114 may ensure that the CAC engine 6108 is part of an authentication list of devices, nodes, EVCs, and elements with permission to adjust bandwidth for CAC engine 6114.

The data stream 6116 may include video, data, voice, or other multimedia packet streams. Each of the packet streams 6118, 6120, 6122 and 6124 may represent separate Ethernet virtual connections that send and receive packets through the data stream 6116. The CAC engines may control the packets being placed on the data stream 6116 or being taken off the data stream 6116 and sent to a user or customer.

Figure 62:
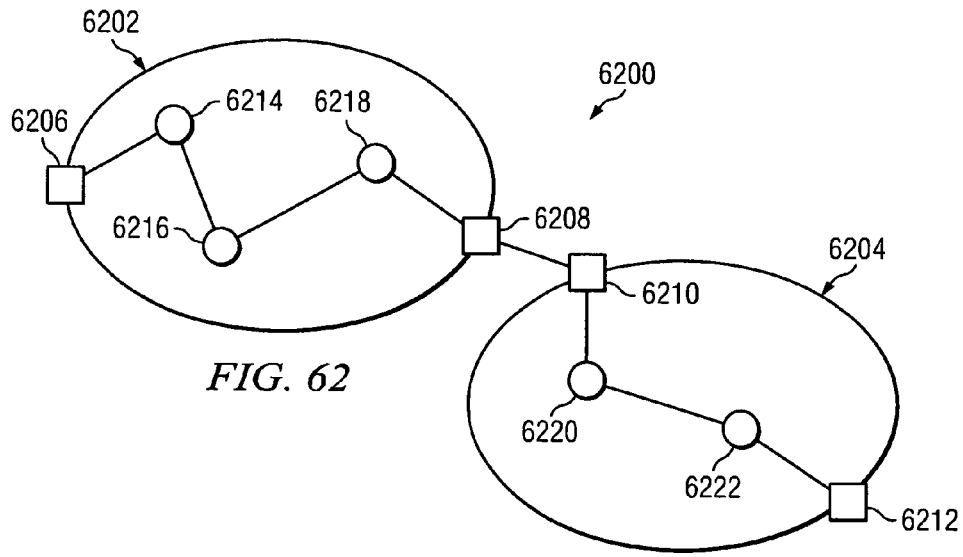
FIG. 62 is an example of an Ethernet network in accordance with an illustrative embodiment of the present invention.

FIG. 62 is an example of an Ethernet network 6200 in accordance with an illustrative embodiment of the present invention. Ethernet network 6200 may be a particular implementation of Ethernet network 6100 of FIG. 61. Ethernet network 6200 includes Ethernet domains 6202 and 6204, maintenance endpoints 6206, 6208, 6210, and 6212 and maintenance intermediate endpoints 6214, 6216, 6218, 6220, and 6222.

The Ethernet domains 6202 and 6204 represent Ethernet networks controlled by separate operators that have maintenance end-points 6206, 6208, 6210, and 6212 as defined by the IEEE 802.1AG standards. The maintenance end-points 6206 and 6208 are in the first Ethernet domain 6202 and the maintenance end-points 6210 and 6212 are in the Ethernet domain 6204. In an illustrative embodiment of the present invention, information that traverses the entire network between maintenance end-points 6206 and 6212 may be available at every end-point and intermediate point that is connected between maintenance end-points 6206 and 6212. For instance, maintenance intermediate end-point 6216 may have information from itself as well as maintenance intermediate end-points 6214, 6218, 6220, and 6222 and maintenance end-points 6206, 6208, 6210, and 6212. The information may describe the total packet rate or real-time data packet rate, average packet rates, packet rates for the streams from access node users and any other statistics related to the communications capability and health of the network. The network performance information may be contained in the Ethernet layer 2 real-time packet flows.

Figure 63:
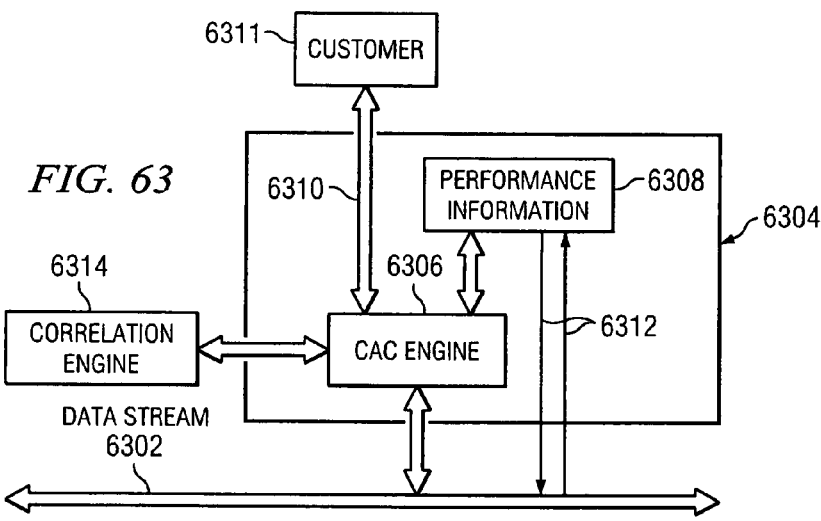
FIG. 63 is an example of a CAC engine configuration in accordance with an illustrative embodiment of the present invention.

FIG. 63 is an example of a CAC engine configuration in accordance with an illustrative embodiment of the present invention. FIG. 63 includes data stream 6302, access node 6304, CAC engine 6306, network performance information 6308, user packet stream 6310, customer 6311, line state information 6312, and correlation engine 6314. The network performance information 6308 may be updated from the line state information 6312 available on a network node, store in a table on the network, or extracted from one or more packets in the data stream 6302, such as a PIP data packet. The network performance information 6308 may include network statistics, including performance, such as real-time bandwidth, of packets including real-time content. For example, the network performance information 6308 may specify statistics calculated from the line state information 6312 including a provisioned rate, real-time packet rate, and average packet rate, real-time and total bandwidth usage. The line state information 6312 may represent the data and information obtained from operation measurements as described by the current invention.

The user packet stream 6310 is controlled by the CAC engine 6306 allowing data to be sent and received between the customer 6311 and the data stream 6302 as determined by the network performance information 6308 and the policies established by the operator of the communications network via the CAC engine policy modification based on the Performance information 6308.

In one embodiment, the access node 6304 may include a network cache that stores information, such as movies, songs, games, and other data, that may be accessed by the CAC engine 6306 and delivered to the data stream 6302 for immediate use by other network users. The network cache may also store network performance information for historical use and subsequent reference. For example, if a node within the network has repeatedly had problems, the historical data may be used to link the problem to certain events, parameters, or factors. The CAC engine 6306 may determine the adequacy of the data stream 6302 to be able to accommodate the current movie or other data packets requested by a user on the network. In addition the CAC engine 6306 may determine if the data information requested was legitimately requested and authorized as set by previously determined network policies.

Figure 64:
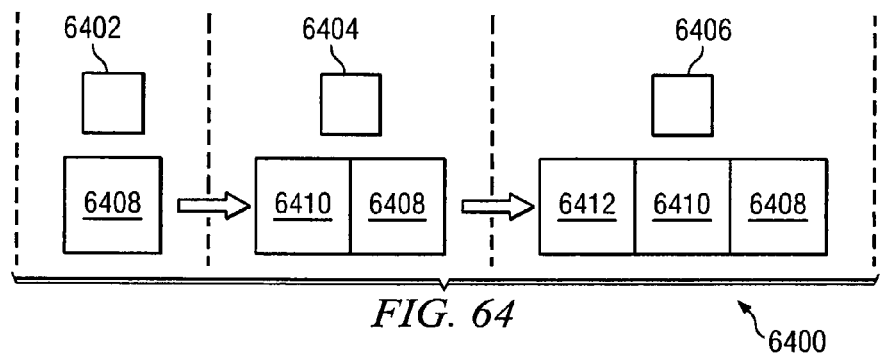
FIG. 64 is an example of PIP packet flow of network performance information in accordance with an illustrative embodiment of the present invention.

FIG. 64 is an example of PIP packet flow of network performance information in accordance with an illustrative embodiment of the present invention. Packet flow 6400 of FIG. 64 shows the network performance information obtained using the teachings of the present invention. Packet flow 6400 illustrates data and PIP packet flow across access nodes 6402, 6404, and 6406, network performance information 6408, 6410, and 6412. The PIP packet flow 6400 includes information about the network line state at intermediate points and at end-points in the network. The PIP packet flow may be a particular implementation of data stream 6302 of FIG. 63.

As the network performance information 6408 is passed through each access node 6402, 6404, and 6406 in the packet flow 6400, additional information is added by each access node 6402, 6404, and 6406. It is understood that each network segment and path may have a PIP performance and utilization PM flow and measure. For example, as shown, initial network performance information 6408 may be a single PIP packet. Later, as the network performance information reaches the access node 6404, additional network performance information 6410 may be added. The network performance information 6410 may be combined into a single PIP packet or multiple PIP packets may be used. At access node 6406, the PIP packet includes network performance information 6408, 6410, and 6412. Information may be added for any number of access nodes despite the limited examples shown.

As a result, the PIP packets are passed from and to or through each of the access nodes, devices, and other elements of a network communication system. Thus, at any given access node the network performance information for each prior node may be easily ascertained and analyzed as needed.

Similar information on the performance of the network may also be available in like manner from a PIP packet flow 6400 going the other direction because PIP packets may flow in both directions in the network. Alternatively, network performance information may be obtained from or utilized in a central database, EMS server, NOC, CCM or other central resource in communication with a CAC engine or access node.

FIG. 65 is an example of stored network performance information associated with access nodes in accordance with an illustrative embodiment of the present invention. FIG. 65 details the network performance numbers and statistics that may be available or stored at each access node 6502, such as access nodes 6402, 6404, and 6406 of FIG. 64. In another embodiment, the network performance information table may be a compilation of data stored in a central network device, general state engine, or other element or component that is accessible by different nodes and processors within the network. The network performance information table may also be stored in the correlation engine 6314 of FIG. 63. The centralized table may alternatively be updated when the network experiences problems, other tables have data overflow, or processing elements are unable to process the network performance information fast enough. The correlation engine may send alerts or alarms to access nodes or a network control center to correct or troubleshoot network issues.

The network performance information which may include numbers and statistics may be part of a table or matrix that describes the network in terms of packet count, packet delay, packet loss for the total, real-time, and/or non-real-time flows, total real-time, and non-real-time bandwidth, effective packet rate, jitter, latency, out-of-order packets, quality of service, carrier identification, or other parameters 6500 that describes the important characteristics of the end-to-end network. The different numbers, values, and measurements may be used to calculate in the overall quality of the network by viewing these numbers singularly at each access node or collectively as a network packet loss statistic or other parameter. The network performance information may be collected over time to provide an average time-bound network value.

In another instance, numbers, such as the provisioned and or available packet bandwidth rate (pn) and the real-time bandwidth packet rate in use (mn), may be used to provide a measure to individual CAC engines that may indicate that access to the network should be accepted or declined. For instance, if the network performance value: (pn−mn) is positive, it may indicate that there is capacity on the network for the access node packet stream number n. If the value (pn−mn) is negative or zero, it may indicate that the CAC engine declines the packet stream from access node n.

In another instance, individual network values such as the real-time bandwidth packet rate (kn) may be averaged over the network to provide a real-time average network packet rate such as: ((k1+k2+kn)/n). The real-time average may be used to provide a real-time use statistic to an overall monitoring center that may automatically, or through operator assistance, admit or reject additional packet streams through the CAC engines. For example, the real-time average may be used to reject additional packet streams requesting to join a certain program event that is oversubscribed at the server. As a result, additional users may be rejected. It should be understood that packet rate can be bandwidth in use, packet counts, or a combination of both.

In another embodiment, a remote server, such as a "video on demand" server, may be dedicated to providing video files for any number of customers. In response to a CAC engine receiving network performance information, via, for example, PIP packets, for node segments associated with the remote server indicative of the real-time bandwidth and other performance information, such as packet loss or congestion, are used to obtain a utilization performance measure in relation to the assumed usage and oversubscription rates or other performance issues associated with receiving content from such remote server. The CAC engine may throttle the allocation of bandwidth to devices requesting content thereby modifying the bandwidth that may be accessible by each customer, IP address, or other element. Such CAC engine may be located at an IP service or access broadband node gateway point used by the remote server or at access points used by CPEs to access content from such remote server over a packet network. For example, CAC engines with the appropriate permissions may be used to throttle the bandwidth of the remote server or to specify priorities. For example, a CAC engine in a remote location may be used to specify that a first CAC engine or a specific network device of high priority may have unlimited bandwidth access to the remote server, but all other CAC engines, CPEs, or specific network devices may only have a designated percentage of available bandwidth.

Figure 66:
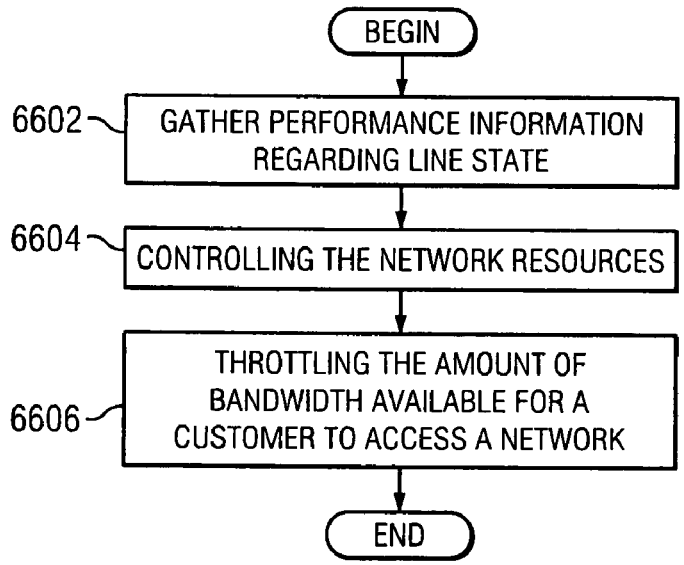
FIG. 66 is a flowchart of a process for allocating network resources in accordance with an illustrative embodiment of the present invention.

FIG. 66 is a flowchart of a process for allocating network resources in accordance with an illustrative embodiment of the present invention. The process of FIG. 66 may be implemented by an CAC engine.

The process begins by gathering network performance information regarding line and trunk transmission performance and utilization states (step 6602) and/or other network performance information. The network performance information may include performance numbers, data, utilization information, or statistical information calculated therefrom regarding real-time and non-real-time data passing through the data stream of the communications network. The network performance information may be gathered using a PIP packets and PM collection points that has been updated as it reaches each access node within a network, such as an Ethernet network. The network performance and utilization information gathered in step 6602 may also be stored for subsequent analysis.

Next, the CAC engine controls the network resources (step 6604) in response to received network performance and utilization information. The network resources are controlled based on the performance information particularly for dynamic resource allocation, diagnosis, and troubleshooting. For example, if a node, device, link, access point, or other node segment is encountering problems, the VOD session controller redirects the CAC engine as it may reroute the IP Service point traffic around the node experiencing problems via addressing, or server name response. The CAC engine may also perform load balancing between different CAC engines. For example, a single customer may be connected to the communications network through different CAC engines. Based on traffic between the customer through the different streams, load balancing may be performed so that bandwidth is more efficiently utilized across the CAC engines. The same types of balancing is commonly performed using current protocols and applications, such as Bit Torrent. These conventional protocols were designed to acquire portions of content, such as a movie from multiple sources, concurrently. These protocols by-pass the rate limiting effect imposed by egress rate shaping functions at VOD or content servers. These protocols can have significant affect on the performance of the aggregate path. PIP packets can detect the impacts of the use of these types of parallel protocols and be used to invoke any of the traffic management functionality described in accordance with the principles of the present invention.

For purposes of this example, load balancing may refer to a throttling of bandwidth by two or more VOD servers responding to CAC engines and/or the routing of traffic or sessions by two or more VOD servers responding to CAC engines transmission path utilization and performance state information to even out traffic that is directed at two or more access points to a network. Thus, a customer network may access a larger packet network such as the Internet, through connections associated with network access points. The bandwidth of data passing through each network access point may be controlled by one or more CAC engines working in concert basing load balancing on the transmission state information for the paths under the governance of reach CAC engine. To balance the amount of traffic through each of the network access points, one or more CAC engines may cause traffic intended for one of such network access points that is approaching full load or a overloaded state to be rerouted or redirected to another network access point that is not experiencing as much traffic. The one or more network access points may be access points to the same network, such as the Internet, or may alternatively access different packet networks. However, even if such network access points are egresses from a customer network into two different packet networks, both of such packet networks may eventually allow a connection to an IP address or other network address located outside of the customer network. For example, one of the network access points may allow egress into a first network that contains the IP address to which a data communication is addressed, while the other network access point may allow egress to a second network that is then connected to a third network, that is, in turn, connected to the first network including the IP address to which a communication is addressed. In such a manner, even if network access points and associated CAC managers are not connected to the same external network, both such network access points may allow egress of a data packet in a manner that allows the data packet to eventually be communicated to the target IP address.

Although the foregoing is described generally with respect to rerouting of traffic and the distribution of new sessions based on actual performance and utilization information of the transmission paths the system intelligently distributes the bandwidth across two or more network access points by one or more CAC managers, it should be understood that more complicated schemes of load balancing can be utilized that involve algorithms associated with bandwidth reservation and allocation, the throttling of bandwidth, the rerouting of traffic to alternative network access points, known connection paths to an IP address located outside of the network through one or more network access points, or any combination of the foregoing. In yet another embodiment, load balancing may include a determination of particular application data included in packets intended to be communicated through network access points such that such load balancing may be accomplished not only with respect to traffic generally, but with respect to traffic associated with a particular application or class of applications. For example, the most readily apparent example of the need for such specific load balancing may be with regard to the load balancing of real-time session packets associated with applications that perform real-time or near real-time content communications. The handling of real-time packets may cause more network performance issues than the handling of non-real-time packets as a result of the need to minimize latency and jitter associated with such real-time packets. In this case, the goal of the CAC function is to balance the load of real-time traffic across multiple network paths to optimize network performance. It should be understood that other real-time flows may exist in the egress trunk of which the CAC engine may not have knowledge. In order to balance the real-time traffic, the performance and utilization state information may be present in or accessible to the CAC engine. Thus, complex load balancing schemes that take into account real-time data packets and non-real-time data packets in balancing the two categories of data packets across one or more network access points by CAC managers that take into account network performance information regarding external networks and the connection paths available therein may greatly enhance the user experience associated with applications using real-time content and offer a unique way to respond to performance issues identified from network performance information in order to address such issues and enhance the general performance of the network.

In one embodiment, a CAC engine may manage one or more additional CAC engines within the network or in a secondary network in response to received network performance information. For example, a CAC engine may control bandwidth usage in an interconnected network. For example, the network performance information or instructions to a CAC engine located in another network may be carried or "piggybacked" from a first network to a second network via, for example, PIP packets for allowing a secondary CAC engine to control a CAC engine in the first network.

In one embodiment, the CAC engine may throttle sessions or restrict the amount of allocated bandwidth (for a smaller codec) based on the amount of bandwidth available for a customer to access a network (step 6606) in response to received network performance information. Bandwidth requests may be granted, throttled, and bandwidth reserved and allocated based on external or internal factors that are affecting the communications network. For example, bandwidth may be throttled based on interference through a CAC engine that relies on a wireless transmission point. The bandwidth through the CAC engine may be throttled to accommodate the available connection speeds and limiting factors of the wireless transmission point.

A CAC engine reserves and allocates bandwidth for customers at a network access point. For example, the customer may have a service level agreement or quality of service requirement specifying certain parameters and resources for which the customer is paying. For example, the customer may have reserved 10 megabits/second for real-time streaming video. If the bandwidth of real-time data packets dedicated for the customer is running at 12 megabits/second, the CAC engine may throttle or adjust the customer stream so that only 10 megabits/second is provided to the customer. As a result, bandwidth may become available to other customers that are paying more for increased bandwidth or a guarantee that bandwidth will be available from the communication service provider at any time. Some service level agreements and quality of service provisions allow for refunds or discounts if available rates or bandwidth levels drop below specified thresholds as provided to the customer by the communication network service provider.

In another embodiment, the additional 2 megabits/second of bandwidth may be allocated on a "best efforts" or similar non-guaranteed basis. As a result, if bandwidth is available, the customer may be provided the entire 12 megabits/second, otherwise the customer is provided only the 10 megabits/second that are guaranteed the customer. In another embodiment, the customer may be provided the entire 12 megabits/second and is charged a premium rate for the data overage.

The customer may also be billed for the amount of time that the bandwidth used exceeds 10 megabits/second. The updates may be sent from the CAC engine to a billing database. The customer service level agreement may specify different rates, charges, guarantees, quality of service, or service level agreements for both real-time and non-real-time content.

The network performance and utilization information located in the CAC engine may also be used to enforce usage limitations, or track customer bandwidth to identify an IP address that is monopolizing or overusing resources. Once the customer or IP address found to be a over-using resources has been located via threshold mechanisms set on the line performance and utilization state information for that line, by the CAC engine or other network process or device, the CAC engine may throttle sessions, shut down or alter shaping windows for that customer flow, or send a message to session controllers or customer GUI interfaces to provide a usage warning message, or otherwise limit the customer's access to the network in order to preserve bandwidth and bandwidth availability across the network or meet business objectives. For example, a student in a dorm that is streaming too much real-time data for a movie may have their real-time bandwidth limited to provide bandwidth for other students or customers.

In another example, the bandwidth percentages or rates available to a customer may be increased in step 6606 in response to received network performance information. The bandwidth available for customers across the Ethernet network may be dynamically adjusted based on service level agreements, guarantees, performance representations, type of packets, performance indicators, and other parameters or factors. The bandwidth may be adjusted for access nodes, customers, devices, software applications, and IP addresses. In many cases, the throttling of step 6606 is performed based on the type of data, including real-time and non-real-time data. For example, a customer may have desired rates and percentages of dedicated bandwidth for real-time and non real-time data packets. In many cases, real-time Voice over Internet Protocol (VoIP) may be considered a higher priority than regular Internet traffic. Step 6606 may also shift bandwidth and network traffic for load balancing between access nodes for better network performance.

Throttling requests and other configuration and maintenance changes implemented by a CAC engine may be implemented by inserting commands or other data in the PIP packet. By inserting the changes to be made in the PIP packet, the CAC engine may perform the changes in-band and does not need access to an out-of-band communication connection in order to implement the desired allocation and reservation. Alternatively, allocation and reservation changes made by a CAC engine may occur out-of-band using an alternative communication line or medium.

The PIP packets may also include data for load balancing between CAC engines, access nodes, and other communications elements. The network performance information, control signal communication, and/or PIP packets may also be sent to access nodes, CAC engines, a network operation center using enhanced messaging service (EMS) or other messaging protocols. The PIP packets may also specify real-time thresholds, percentages, and parameters that may be used to regulate the communications network. The PIP packets may add reservation and allocation information that regulates the control process by customer, identification, IP address, or program application. For example, a PIP packet may specify that a CAC engine is to dedicate five percent of available bandwidth to real-time data from IP address 128.063.254.

Figure 67:
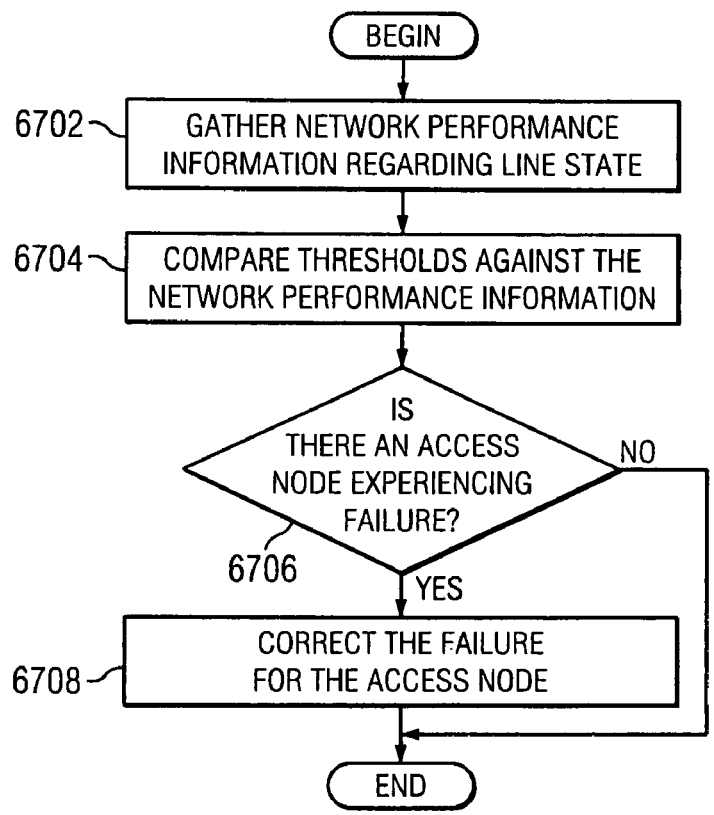
FIG. 67 is a flowchart of a process for correcting failure of network resources in accordance with an illustrative embodiment of the present invention.

FIG. 67 is a flowchart of a process for correcting failure of network resources in accordance with an illustrative embodiment of the present invention. The process of FIG. 67 may be implemented by an access node.

The process begins in step 6702 by gathering network performance information regarding line state. Step 6702 may be performed as previously described in step 6602 of FIG. 66. Next, the access node compares thresholds against the network performance information in step 6704. The comparison of step 6704 may be performed by a correlation engine that is part of the access node or independent from the access node. The network performance information may be compared against a table, matrix numbers, or statistics. The results of the comparison may be compared against rule-based statistics. The results may be used to determine the status and performance of the communications network including software and hardware components within the network.

The access node determines whether there is an access node experiencing failure in step 6706. The determination may be made based on the comparison of the network performance information to thresholds in step 6704. If there is not an access node experiencing failure, the process terminates. If there is an access node experiencing failure in step 6706, the access nodes corrects the failure for the access node in step 6708 with the process terminating thereafter. In one example, if a problem or failure is detected in step 6706, the problem may be corrected manually or automatically by a network control center. For example, if there is a failure, the access point may send a correction message, alert, or alarm to the network control center so that the failing or problem node may be fixed with a software patch, reboot, maintenance order, replacement, or work-around.

The network corrections may occur in any number of ways based on the parameters, designated preferences, rules, and policies. The corrections may be temporary or permanent fixes. The solution to the failure may not always be easily fixed. In one embodiment, the failure may be corrected by sending a notification to other networks that are dependent on the network. In another embodiment, the traffic may be rerouted through different CAC engines, access nodes, or networks in order to correct network issues.

In another embodiment, the network correction may involve rerouting data through different CAC engines, networks, and access nodes. The data may be rerouted to preserve quality of service and performance of the network. The CAC engine may also request or generate trace information for the failing access node. The CAC engine may also request that the failing access node or surrounding access nodes or device provide additional information. The additional information may supplement the data provided by the PIP packet to diagnose and remedy the problem. The CAC engine may also ping the network access nodes to determine how data and information is flowing within the network and whether each access node is available. For example, a number of access nodes may be systematically pinged by the CAC engine to determine which nodes are still responsive.

The CAC engine may broadcast a message out to other access nodes, a NOC, EMS system, CCM, or other network device or process that identifies the failing access node and the associated problem. The message may specifically indicate the failing node, network performance information for the failing node, and a network solution, remedy, or work-around, if applicable. The message may be sent specifically to a network operation center, performance log or table, or a rule based engine that may use network topology to select or provide solutions for the problem. The rule-based engine may also be used to select the next step taken address the problem, such as send a text message to a network administrator.

The network performance information may be archived or stored. The historical data may be used to reserve and allocate bandwidth changes. The historical data may be used to implement different control and algorithm changes based on an analysis of the historical data. For example, the historical data may reflect particular network performance issues that occur at specific times of day or in response to specific events. Such specific network performance issues can then be addressed by changing the throttling, reservation, and allocation scheme of particular CAC managers associated with particular network access points during such times or prior to such events. Thus, a CAC manager may respond to reservation requests associated with a particular network access point during particular times of the day with the allocation of bandwidth to requesting IP addresses that is less than the allocation that is made at other times of day. For example, a CAC engine may respond to bandwidth reservation requests by allocating only 50% of the bandwidth requested in such an allocation request.

Such historical data may also be used to implement particular load balancing algorithms between different network access points using one or more CAC managers. For example, if a particular network access point receives a number of requests for bandwidth allocation associated with real-time data packets for an application using real-time content, such as a video conferencing application, allocations associated with such real-time applications may be directed alternatively to a different network access point based on the particular load balancing algorithm. Thus, historical data related to network performance information can be stored by CAC manager and utilized to change bandwidth throttling, reservation, and allocation algorithms that take into account the level of granularity of network performance information obtained by such CAC manager.

In one embodiment, the CAC manager may completely block reservation requests received that are associated with particular IP addresses, applications, or network protocols. In yet another embodiment, a CAC manager may receive network performance information associated with enhanced levels of jitter experienced in the external network, and in response thereto, may limit requests to reserve bandwidth that are associated with a SIP protocol or itself request that a particular network device located at a particular IP address utilize a lower rate codec than may have previously requested before allocating bandwidth in response to such bandwidth reservation requests.

As previously discussed, one CAC engine may communicate with one or more CAC engines located elsewhere within a customer network or even within an external network. The historical data may, therefore, also be used to request or command that alternative throttling, reservation, and allocation algorithms or instructions be utilized by other CAC managers. For example, corrections for different nodes, devices, or elements of the communications network may be made to avoid disrupting as few customers and network traffic as possible.

In one embodiment, the CAC engine may access a table of network performance information that is stored within the engine or that is stored remotely within the network or within another communications network. The CAC engine may access data within the table to identify the problem for troubleshooting purposes.

In one embodiment, network performance information that is obtained using PIP packets, from any of the tables disclosed herein, or any other manner, may be utilized to change the way in which future network performance information is gathered, collected, or analyzed. For example, if an analysis of network performance information reveals a problem in a particular network or portion of a network then the frequency at which PIP packets are sent through that portion of the network may be increased. Alternatively, the level of network performance information collected by such PIP packets may be increased such that more data and more types of data are collected by PIP packets as they are routed through that network or portion of the network. In yet another embodiment, the normal routing of PIP packets through a network may be changed to avoid a severed communication link obtain more information about a particular portion of the network encountering problems, or to send instructions to such portion of the network to cause such portion or the notes therein to collect additional information, run diagnostic routines, otherwise troubleshoot the problem, or implement changes in the ways that network devices within such portion of the network are configured or operate. For example, a particular network node such as a switch may be instructed to begin particular congestion control behavior, reroute traffic, or any other appropriate solution or work-around to a particular problem identified by network performance information.

In one embodiment, a network device may be instructed by information within a PIP packet to reboot itself, refresh a routing table, increase the amount of data buffered within such network device, or otherwise begin, change, or terminate any process or operation within such network device. In one embodiment, the control regimen for managing PIP packet flow may be changed entirely in response to a change in network performance information. For example, a network or portion of the network over which PIP packets were being sent every five seconds may be increased in frequency to every one second or tenth of a second to collect more information about a particular network performance problem.

Alternatively, in an embodiment that does not include the use of PIP packets, each network node may be instructed to update its own internal table or update a table of network performance information used as an essential resource by one or more networks on a more frequent basis or with increasing levels of detail of network performance information. In another embodiment, when PIP packets or other updates regarding network performance information were previously generated only in response to events or triggers or requests received from another network device, such network node may instead be instructed to generate such PIP packets or other updates on a routine basis until a problem has been resolved. All the foregoing may be implemented at any time in response to a trigger, or may alternatively be scheduled at a particular time based on an instruction. Similarly, the entire PIP packet system and/or system of updates regarding network performance information may revert back to a normal mode of operation after a network performance problem has been resolved, if a period of time has elapsed, or it receives additional instructions from a central network resource or other network noted device.

As a result of the foregoing or as the result of other events not described above, the payload of PIP packets may be altered. For example, the PIP packet may be instructed to obtain network performance information at a node that was previously a pass-through node from which network performance information was not obtained. In another embodiment, PIP packets may include a payload of specific instructions to a network device at a particular network node to change the operation of such network node. In yet another embodiment, a PIP packet that was originally instructed only to obtain network performance information with regard to latency, packet loss, and jitter, may instead be instructed to obtain a full description of all network performance information that is available, alternative network performance information, or some level of network performance information between full network performance information and the limited amount of network performance information it would normally receive.

The use of injecting instructions into a PIP packet allows the use of PIP packets as much more than a simple reporting system of network performance information. Instead, it allows an inband system for sending instructions, initiating processes, or otherwise configuring the parameters or operation of a network. Although not expressly described herein, the foregoing schemes to modify PIP packets or other methods of reporting network performance information may be directed through a network outside of the packet network (such as LAN) generating the PIP packets or otherwise seeking to obtain network performance information. For example, if a particular network is experiencing delays, packet loss, or jitter in a large number of data packets that originate from a particular outside network, the network can increase the number of PIP packets that are sent to such outside network in order to obtain network performance information from such network or may request that such outside network generate more of its own PIP packets directed to such network from such outside network. In such a manner, the network may ascertain specific performance problems in the outside network, and if necessary, reroute calls or other data communications through other networks instead of such outside network.

In one embodiment, network performance information may be utilized by a processor to determine the best gateway, access point, network-to-network interface, or other network egress point for a particular data packet or session of data packets. For example, if a particular network has five different egress points to an outside network, such as a PSTN, such five egress points represent five different ways in which a VoIP call or other communication may be routed in order to access such PSTN or other outside network. Within the network itself, there may be five network connection paths between a customer access point making a VoIP call connection request and each of such egress points. Thus, there may be twenty-five different routes in which a VoIP call may be connected from the customer access points through the network in order to communicate with the PSTN or other outside network. An EMS system, inter-network system, CCM, router, or other network device may utilize network performance information to determine which of such twenty-five potential connections paths will offer the best quality of service for the customer attempting to connect the VoIP. Such network device may also consider which of the twenty-five connection paths least negatively affects the performance of the remainder of such network.

Such decision may be made in response to known information about network performance outside of the network within the PSTN. For example, if one of the egress points is known to be in a portion of the PSTN experiencing significant performance issues, the five potential connections associated with such point of egress may be avoided. Likewise, if ten out of the twenty-five potential connection paths go through a common core switch within the network that is experiencing problems, those ten options can likewise be discarded.

Each of the twenty-five potential network connection paths between a customer's access point and the PSTN may be rated, graded, or otherwise compared to determine the best possible connection path for either customer quality service and/or general network performance. For example, the present application discloses different ways to rate particular node segments of a network by assigning a particular rating to them. Different ratings can be assigned to each node segment based on different criteria such as latency, jitter, packet loss, percentage of real-time traffic, real-time bandwidth, or any other parameter. Thus, each node segment may have different grades or ratings in different areas.

Using the one or more grades or ratings for each of the node segments, many different algorithms may be used to calculate the best overall path between the customer's access point to the network and the PSTN or other outside network. For example, ratings associated with jitter could be given one weighting factor and averaged across all node segments located between the customer's network access point and the PSTN, which may, in turn, be added to another weighted factor with respect to latency that represents the average latency grade across each of the node segments between the customers network access point and the PSTN. In another embodiment, connection paths between the network access point and the PSTN may be examined to determine the highest or lowest rating that has been given to any node segment located in such path which such highest or lowest rating being then assigned to the entire path.

In some cases, actual measurements may be utilized to determine whether or not to use a path. For example, the average jitter experienced by a real-time application packet passing through a particular node segment may be added to such averaged jitter of each of the other node segments located along such connection path to given overall average jitter that may be experienced by a real-time application communicating packets along such path. Similarly, the overall latency of a path can be calculated. The overall rating of the twenty-five possible connection paths may be compared to each other either in aggregate or based on different factors and otherwise weighted, filtered, or analyzed, to determine the best possible connection path for the customer's quality of service and/or the general performance of the network. Some algorithms may weight the effect on overall network performances being more important than the customers quality of service as long as, for example, a particular minimum quality of service is reached. Algorithms may also take into account the guarantees or service level agreements that the network provider may have with a particular customer such that the network provider may meet its commitments to the customer and does not have to pay to the customer any service level credits, penalties, damages, or expenses.

In one embodiment of the present invention, network performance information associated with a particular network that has been collected using PIP packets, retrievals from tables of network performance information, or any other means of obtaining network performance information may be utilized by a particular application being executed by a client of such network. In such an embodiment, information from a table or a PIP packet may be communicated into the particular application using the application's protocol, an injection from another OSI layer into the application layer, an XML interface, or any other suitable means. Such application may then have instructions that execute in response to receiving particular network performance information.

For example, an application may be a network computer game wherein the gamer is looking for the best possible connection with the least amount of latency and packet loss that is available between the gamer's client and a remote server hosting the on-line game. The application may obtain network performance information in order to itself calculate such best connection or instead query a central network resource, such as a VPCE described earlier, to respond with the best network connection possible. In one embodiment, an application may display network performance information to a user of a client. In another embodiment, an application may cause an instruction to be injected into a PIP packet or similar packet to obtain specific network performance information from a remote network or node segment or to cause changes in a remote network or node segment to enhance the user's experience of a particular application.

In one embodiment, an application may affirmatively monitor network performance information in order to determine a better network connection than the connection it is currently using and switch to such better connection as soon as it is detected. Alternatively, a PIP packet or other instruction may be sent to a particular application in response to network performance issues believed to be caused by such application in order to reduce the amount of bandwidth utilized by such application, change the operation of such application, terminate such application, restart such application, or otherwise change the application to reduce any negative effects on network performance and/or potentially purchased user experience.

In one embodiment, the network performance information and different levels of detail thereof may be utilized with one or more of the various permission schemes described herein or any other suitable security-based access to network performance information may be used to share network performance information between two or more networks. In one embodiment, the information, or a subset thereof, from all networks participating in a global network such as the Internet may be updated to a central resource and shared among all participants in the global network. In another embodiment, networks may share their network performance information with any network to which they have a network-to-network interface. In another embodiment, a network may combine other networks network performance information with its own network performance information in a table or other central or distributed resource.

Although the permission's table described herein relative to FIG. 17B is illustrated and described to show access to different levels of network performance information, a similar table may be utilized to establish what access, testing, instructions, commands, and other communications an outside network is permitted to make within a particular network operator's network. For example, a particular network operator may allow an outside network to manage or send certain instructions to CAC managers, or certain CAC managers, located within the network operators network. In another embodiment, a network operator may permit an outside network to control certain aspects of the operation of a device of such network operators that forms part of a network-to-network interface with such outside network. In yet another embodiment, the network operator may allow an outside network to control a particular trunk node segment, or connection path used solely or primarily to route traffic to or from such outside network.

In yet another embodiment, particular emergency circumstances may change the level of access that a network operator gives to outside networks over its own network devices and node segments. For example, a particular emergency event may trigger a command to remove all outside network access to a network operator's network, whether with respect to receiving network performance information, issuing commands and responses thereto, executing troubleshooting or testing routines, or any other communication inconsistent with normal data communication and network operation. In response to another event, a network operator may configure permissions to allow an outside network to obtain enhanced or additional network performance information from within a network operators network.

Any combination of the foregoing may be utilized to allow interconnected networks and the operators thereof to have increased visibility into the operation of each of the interconnected networks and offer some measure of allowing each network to control certain aspects of network performance to address problems determined by analyzing such received network performance information.

In one embodiment, the network performance information is collected, shared, and analyzed automatically by network devices and processes and instructions, commands, further troubleshooting, work-arounds, or other solutions may be automatically generated using suitable ruled-based engines or algorithms to reroute traffic, throttle or block traffic, change the configuration of network devices, or implement any other change in one or more networks to resolve problems associated with the interconnection of data packets across such networks. Different schemes, automated processes, rules, and algorithms may be utilized with respect to real-time data packet communication as opposed to non real-time data packet communication or overall data packet communication.

Although network performance information is described as being stored in tables and carried by PIP packets and otherwise monitored with respect to raw network performance information such as actual measurements of packet loss, latency, bandwidth, real-time bandwidth, jitter, or any other measured or detected item of data associated with network performance, such data may also be stored in tables or communicated via PIP packets after being converted, analyzed, summarized, averaged, or otherwise used in a calculation or statistical analysis to form derived data. Such derived data shall also be considered network performance information.

In one embodiment, statistical information may be kept regarding network performance information that is gathered over a certain interval of time. During such certain interval of time, many measurements of the same data may be made. Different data can be collected and determined at the end of such interval. For example, each measurement itself may be stored, an average of a measurement, such as bandwidth, may be stored, a mode associated with the most frequent bandwidth range or value measured may be stored such as for example, the most frequently measured range of bandwidth.

In another embodiment, the peak bandwidth or other network performance data may be determined and stored. In yet another embodiment, information may be presented as network performance information that establishes the percentage of such interval that the bandwidth was within a particular range. For example, during a measurement interval of one second, 100 measurements may be taken in response, for example, to receiving 100 PIP packets at a particular network node. Such 100 measurements may be analyzed and: (i) an average packet loss, latency and jitter determined, (ii) a peak latency, packet loss, and jitter determined, (iii) a mode or mode range of latency, packet loss, and jitter may be determined, or (iv) any other statistical measure of any data collected as a result of the receipt of such PIP packet may be determined.

For the same 100 sets of network performance data generated, percentages and ranges may be utilized to enhance visibility of the network performance information. For example, if 50 of the 100 measurements taken for bandwidth of real-time data packets are determined to be between zero and 100 Mbps, 20 measurements are determined to be between a range of 100 Mbps and 500 Mbps, and the remaining 20 measurements are determined to be greater than 500 Mbps. Network performance information may be generated to indicate that during one second interval of time, less than 100 Mbps of real-time data packets will be received 50% of the time between 100 and 500 Mbps of real-time data packets will be received 30% of the time, and greater than 500 Mbps of real-time data packets will be received 20% of the time. As described above, filtering may also be utilized. For example, the five lowest measured and the five highest measured amounts of bandwidth may be discarded before doing calculations. In another example, measurements may be tracked as a function of time. In yet another embodiment, the rate of change of bandwidth, latency, packet loss, jitter, or any other measurement may be utilized to generate indications associated with increasing or declining congestion, increasing or declining latency, increasing or declining jitter, or increasing or declining packet loss from one interval to the next interval. Thus, for example, network performance information may be generated that shows the degree of change in any data measured by the node between intervals that may be useful to identify trends in network performance or otherwise detect declining network performance or declining traffic through a particular network element that may be indicative of a problem elsewhere in the network.

In one embodiment, an identifier associated with a graphical element may be included as network performance information such that when network performance information is received by a network operation's center, Internet work system, EMS system, or any other network resource or network device, the graphical element may be displayed as an up arrow, down arrow, blockage symbol, impaired symbol, normal symbol, or any other symbol indicative of network performance information. Thus, for example, an operator of such a resource may see displayed an up arrow indicating that congestion at a particular network switch is increasing, which may alert an operator to look more closely at the remaining network performance information associated with one or more network devices.

The previous detailed description is of a small number of embodiments for implementing the invention and is not intended to be limiting in scope. The following claims set forth a number of the embodiments of the invention disclosed with greater particularity.

What is claimed:

1. A method for adjusting the window size of a TCP communications session on a packet network, the method comprising:

determining network performance information associated with a communications path between a sending network element and a receiving network element wherein communications over the communications path are conducted using an Ethernet protocol;

storing the network performance information in a packet;

communicating the packet to the sending element;

adjusting the window size of the TCP communications session in response to the communicated packet; and delaying said adjusting said window size to increase a wait versus transmit time for an acknowledgement data packet to accommodate packet network link lengths.

2. The method for adjusting the window size of a TCP session on a packet network of claim 1 further comprising an intermediate network element in communication with one of said sending network element and receiving network element:

determining network performance information between said intermediate network element and one of said sending network element and receiving network element on said packet network;

concatenating said network performance information into said packet;

transmitting said data packets to one of said sending network element and receiving network element; and adjusting said window size of said TCP session based on said network performance information.

3. The method for adjusting the window size of a TCP session on a packet network of claim 2 further comprising:

storing said transmitted data packets by at least one of said intermediate network element, sending network element, and receiving network element for re-transmission to one of the other of said intermediate network element, sending network element, and receiving network element in the event of receiving an unacknowledged data packet.

4. The method of claim 1, wherein determining network performance information includes determining first network performance information associated with packets that each include data for real-time applications and second network performance information associated with both the packets that include data for real-time applications and packets that include data for non-real time applications.

5. The method of claim 1, wherein determining the network performance information includes determining data indicative of a total number of data packets communicated over the path in at least one direction and data indicative of a total amount of bandwidth of data communicated over the path.

6. The method of claim 1, wherein determining the network performance information includes determining data indicative of a total number of data packets that each include data for real-time applications communicated over the path in at least one direction and data indicative of a total amount of bandwidth of data for real-time applications communicated over the path.

7. The method for adjusting the window size of a TCP session on a packet network of claim 1 further comprising:

determining whether at least one network performance information value of said packet network exceeds a predetermined threshold value; and communicating an instruction in an acknowledgement data packet to said receiving network element to adjust said window size of said data packet.

8. The method for adjusting the window size of a TCP session on a packet network of claim 1 wherein one of said sending network element and receiving network element includes a ITU-T Y.1731 model configured to separately count total data packets and data packets including real-time content.

9. A system for adjusting the window size of a TCP session on a packet network, the system comprising:

means for determining network performance information associated with a communications path between a sending network element and a receiving network element, wherein communications over the communications path are conducted using an Ethernet protocol;

means for storing the network performance information in a packets;

means for communicating the packet to the sending element;

means for adjusting the window size of the TCP communications session in response to the communicated packet; and means for delaying said means for adjusting said window size to increase a wait versus transmit time for an acknowledgement data packet to accommodate packet network link lengths.

10. The system for adjusting the window size of a TCP session on a packet network of claim 9 further comprising an intermediate network element in communication with one of said sending network element and receiving network element comprising:

means for determining network performance information between said intermediate network element and one of said sending network element and receiving network element on said packet network;

means for concatenating said network performance information into said packet;

means for transmitting said data packets to one of said sending network element and receiving network element; and means for adjusting said window size of said TCP session based on said network performance information.

11. The system for adjusting the window size of a TCP session on a packet network of claim 10 further comprising:

means for storing said transmitted data packets by at least one of said intermediate network element, sending network element, and receiving network element for re-transmission to one of the other of said intermediate network element, sending network element, and receiving network element in the event of receiving an unacknowledged data packet.

12. The system of claim 9, wherein the means for determining network performance information includes means for determining first network performance information associated with packets that each include data for real-time applications and second network performance information associated with both the packets that include data for real-time applications and packets that include data for non-real time applications.

13. The system of claim 9, wherein the means for determining the network performance information includes means for determining data indicative of a total number of data packets communicated over the path in at least one direction and data indicative of a total amount of bandwidth of data communicated over the path.

14. The system of claim 9, wherein the means for determining the network performance information includes means for determining data indicative of a total number of data packets that each include data for real-time applications communicated over the path in at least one direction and data indicative of a total amount of bandwidth of data for real-time applications communicated over the path.

15. The system for adjusting the window size of a TCP session on a packet network of claim 9 further comprising:

means for determining whether at least one network performance information value of said packet network exceeds a predetermined threshold value; and means for communicating an instruction in an acknowledgement data packet to said receiving network element to adjust said window size of said data packet.

16. The system for adjusting the window size of a TCP session on a packet network of claim 9 wherein one of said sending network element and receiving network element includes a ITU-T Y.1731 module configured to separately count total data packets and data packets including real-time content.

* * * * *